United States Patent
Iguchi et al.

(10) Patent No.: US 11,323,751 B2
(45) Date of Patent: *May 3, 2022

(54) TRANSMITTING METHOD, RECEIVING METHOD, TRANSMITTING DEVICE, AND RECEIVING DEVICE

(71) Applicant: Panasonic Intellectual Property Corporation of America, Torrance, CA (US)

(72) Inventors: Noritaka Iguchi, Osaka (JP); Tadamasa Toma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/423,756

(22) Filed: May 28, 2019

(65) Prior Publication Data

US 2019/0281328 A1    Sep. 12, 2019

Related U.S. Application Data

(63) Continuation of application No. 15/598,959, filed on May 18, 2017, now Pat. No. 10,349,091, which is a
(Continued)

(51) Int. Cl.
*H04N 21/231* (2011.01)
*H04N 21/2365* (2011.01)
(Continued)

(52) U.S. Cl.
CPC .......... *H04N 21/231* (2013.01); *H04H 60/40* (2013.01); *H04J 3/0661* (2013.01);
(Continued)

(58) Field of Classification Search
CPC .. H04N 21/231; H04N 21/234; H04N 21/235; H04N 21/2365; H04N 21/4307;
(Continued)

(56) References Cited

U.S. PATENT DOCUMENTS

| | | | |
|---|---|---|---|
| 7,447,931 B1 * | 11/2008 | Rischar | H04J 3/0697 368/46 |
| 2008/0165624 A1 * | 7/2008 | Urano | G04R 20/18 368/47 |

(Continued)

FOREIGN PATENT DOCUMENTS

| | | |
|---|---|---|
| CN | 102822751 | 12/2012 |
| EP | 3 258 697 | 12/2017 |
| JP | 2010-272071 | 12/2010 |

OTHER PUBLICATIONS

International Search Report issued in International Application No. PCT/JP2015/005601 dated Feb. 16, 2016.
(Continued)

*Primary Examiner* — Nnenna N Ekpo
(74) *Attorney, Agent, or Firm* — Wenderoth, Lind & Ponack, L.L.P.

(57) ABSTRACT

A transmitting method stores data making up a coded stream into a predetermined data unit and transmits the stored data in the predetermined data unit. The transmitting method further generates presentation time information indicating a presentation time of the predetermined data unit, based on reference time information received from an external source; and transmits the predetermined data unit, first control information which includes the generated presentation time information, and second control information which includes leap second information indicating whether or not the presentation time information is a time that is before a leap second adjustment. A receiving method receives the predetermined data unit, first control information, and second
(Continued)

(a)
| 8:59:58 | 8:59:59 | 8:59:59 | 9:00:00 | 9:00:01 |

(b)
| 8:59:57 | 8:59:58 | 9:00:00 | 9:00:01 | 9:00:02 | control information; and reproduces the received predetermined data unit based on the first and second control information that are received.

8 Claims, 84 Drawing Sheets

Related U.S. Application Data continuation of application No. PCT/JP2015/005601, filed on Nov. 10, 2015.

(60) Provisional application No. 62/117,610, filed on Feb. 18, 2015, provisional application No. 62/089,005, filed on Dec. 8, 2014, provisional application No. 62/082,223, filed on Nov. 20, 2014.

(51) Int. Cl.
| | |
|---|---|
| *H04H 60/40* | (2008.01) |
| *H04J 3/06* | (2006.01) |
| *H04L 65/611* | (2022.01) |
| *H04N 21/434* | (2011.01) |
| *H04N 21/63* | (2011.01) |
| *H04N 21/43* | (2011.01) |
| *H04N 21/234* | (2011.01) |
| *H04N 21/235* | (2011.01) |
| *H04N 21/845* | (2011.01) |

(52) U.S. Cl.
CPC ....... *H04L 65/4076* (2013.01); *H04N 21/234* (2013.01); *H04N 21/235* (2013.01); *H04N 21/2365* (2013.01); *H04N 21/4347* (2013.01); *H04N 21/43072* (2020.08); *H04N 21/631* (2013.01); *H04N 21/8456* (2013.01)

(58) Field of Classification Search
CPC ............. H04N 21/4347; H04N 21/631; H04N 21/8456; H04H 60/40; H04J 3/0661; H04L 65/4076
USPC ........................................................ 725/115
See application file for complete search history.

(56) References Cited

U.S. PATENT DOCUMENTS

| | | | |
|---|---|---|---|
| 2012/0201101 A1* | 8/2012 | Akiyama | G04R 20/06 368/47 |
| 2013/0003506 A1 | 1/2013 | Kato et al. | |
| 2014/0003417 A1* | 1/2014 | Shauh | G04R 20/18 370/350 |
| 2014/0028498 A1* | 1/2014 | Lin | G01S 19/33 342/357.63 |
| 2014/0282791 A1* | 9/2014 | Schmidt | H04N 21/8547 725/116 |
| 2014/0362873 A1 | 12/2014 | Herzog | |
| 2017/0012765 A1* | 1/2017 | Kitazato | H04J 3/0664 |

OTHER PUBLICATIONS

Information technology—High efficiency coding and media delivery in heterogeneous environment—Part1: MPEG media transport (MMT), ISO/IEC Dis 23008-1 (Apr. 26, 2013).
Extended European Search Report dated Apr. 2, 2019 in European Patent Application No. 19150577.5.
"MMT-Based Media Transport Scheme in Digital Broadcasting Systems, ARIB STD-B60 Version 1.0," Association of Radio Industries and Businesses, Jul. 31, 2014, pp. 4-6, 74,105-106, with partial English-language translation.
Office Action dated Mar. 3, 2020 in Chinese Patent Application No. 201580062315.1, with English-language translation of the Search Report.

* cited by examiner

FIG. 36

FIG. 48
(a)
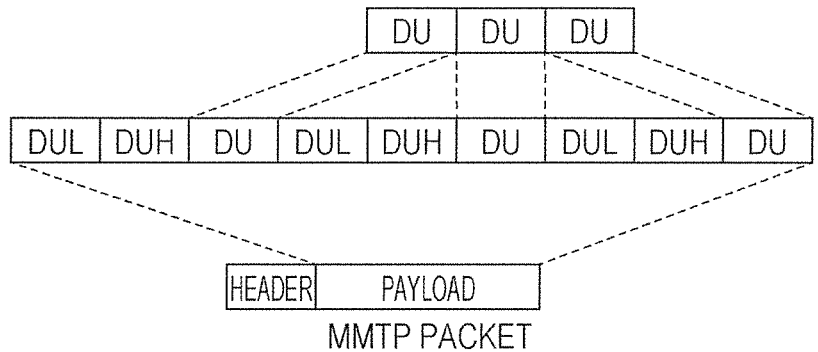
(b)
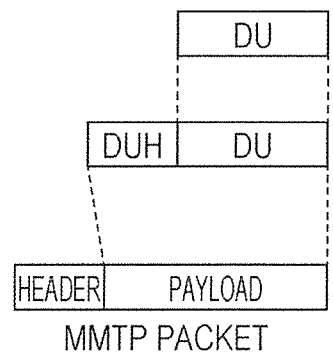
(c)
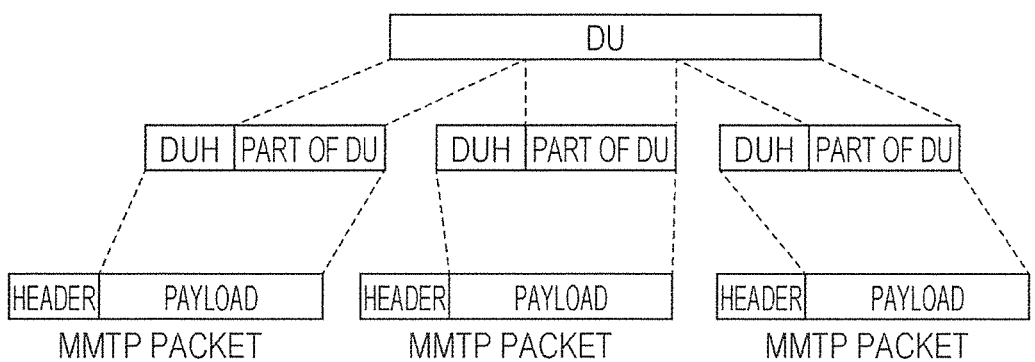

FIG. 54

|  | DIVIDED INTO M | | | | | |
|---|---|---|---|---|---|---|
|  | item = File #1 | | | | | |
| DIVIDED DATA (DIVIDED DATA NUMBER) | 1 | 2 | 3 | ... | 49 | M |
| PACKET SEQUENCE NUMBER | A | A+1 | A+2 | ... | A+M-2 | A+M-1 |
| FRAGMENT COUNTER | M-1 | M-2 | M-3 | ... | 1 | 0 |
| FRAGMENTATION INDICATOR | 01 | 10 | 10 | ... | 10 | 11 |
| MPU SEQUENCE NUMBER | 33 | 33 | 33 | ... | 33 | 33 |
| ITEM ID | 54 | 54 | 54 | ... | 54 | 54 |

FIG. 55

| | | | | DIVIDED INTO N | | |
|---|---|---|---|---|---|---|
| | | | | item = File #2 | | |
| DIVIDED DATA (DIVIDED DATA NUMBER) | 1 | 2 | 3 | ... | N−1 | N |
| PACKET SEQUENCE NUMBER | A | A+1 | A+2 | ... | A+N−2 | A+N−1 |
| FRAGMENT COUNTER | (N−1)%256 | (N−2)%256 | (N−3)%256 | ... 255 0 | 1 | 0 |
| FRAGMENTATION INDICATOR | 01 | 10 | 10 | ... 10 | 10 | 11 |
| MPU SEQUENCE NUMBER | 32 | 32 | 32 | ... 32 | 32 | 32 |
| ITEM ID | 23 | 23 | 23 | ... 23 | 23 | 23 |

FIG. 56

| | |
|---|---|
| `for (k=0; k<num_of_items; k++){` | |
|     `item_ID` | 32 |
|     `node_tag` | 16 |
|     `item_size` | 32 |
|     `item_version` | 8 |
|     `checksum_flag` | 1 |
|     `reserved_future_use` | 7 |
|     `if (checksum_flag == 1){` | |
|         `item_checksum` | 32 |
|     `}` | |
|     `item_info_length` | 8 |
|     `for (l=0; l<item_info_length; l++){` | |
|         `item_info_byte` | 8 |
|     `}` | |
| `}` | |

DATA TYPE : IP PACKET / COMPRESSED IP PACKET
/ TRANSFER CONTROL INFORMATION (TLV-NIT, AMT)

| DATA TYPE | DATA LENGTH 16 BITS | DATA |
|---|---|---|

| DATA STRUCTURE | BIT COUNT | DATA NOTATION |
|---|---|---|
| MPU_Timestamp_Descriptor(){ | | |
|   descriptor_tag | 16 | uimsbf |
|   descriptor_length | 8 | uimsbf |
|   for (i=0; i<N; i++){ | | |
|     mpu_sequence_number | 32 | uimsbf |
|     mpu_presentation_time | 64 | uimsbf |
|   } | | |
| } | | |

(b)

| DATA STRUCTURE | BIT COUNT | DATA NOTATION |
|---|---|---|
| MPU_Extended_Timestamp_Descriptor(){ | | |
|   descriptor_tag | 16 | uimsbf |
|   descriptor_length | 8 | uimsbf |
|   reserved | 5 | bslbf |
|   pts_offset_type | 2 | uimsbf |
|   timescale_flag | 1 | bslbf |
|   if(timescale_flag==1){ | | |
|     timescale | 32 | uimsbf |
|   } | | |
|   if(pts_offset_type==1){ | | |
|     default_pts_offset | 16 | uimsbf |
|   } | | |
|   for (i=0; i<N; i++){ | | |
|     mpu_sequence_number | 32 | uimsbf |
|     mpu_decoding_time_offset | 16 | uimsbf |
|     num_of_au | 8 | uimsbf |
|     for (j=0; j<num_of_au; j++){ | | |
|       dts_pts_offset | 16 | uimsbf |
|       if(pts_offset_type==2){ | | |
|         pts_offset | 16 | uimsbf |
|       } | | |
|     } | | |
|   } | | |
| } | | |

| 8:59:58 | 8:59:59 | 8:59:59 | 9:00:00 | 9:00:01 |
|---|---|---|---|---|

(b)

| 8:59:57 | 8:59:58 | 9:00:00 | 9:00:01 | 9:00:02 |
|---|---|---|---|---|

FIG. 94

```
MPU_Extended_Timestamp_Descriptor(){
    descriptor_tag
    descriptor_length
      NTP_leap_indicator
    reserved
    pts_offset_type
    timescale_flag
      if(timescale_flag==1){
            timescale
    }
      if(pts_offset_type==1){
            default_pts_offset
    }
      for (i=0; i<N; i++){
            mpu_sequence_number
            mpu_decoding_time_offset
              if(NTP_leap_indicator){
                    mpu_presentation_time_type
            }
            num_of_au
              for (j=0; j<num_of_au; j++){
                    dts_pts_offset
                      if(pts_offset_type==2){
                            pts_offset
                    }
            }
        }
}
```

TRANSMITTING METHOD, RECEIVING METHOD, TRANSMITTING DEVICE, AND RECEIVING DEVICE

CROSS REFERENCE TO RELATED APPLICATIONS

This application is a U.S. continuation of U.S. application Ser. No. 15/598,959 filed on May 18, 2017 which is a U.S. continuation application of PCT International Patent Application Number PCT/JP2015/005601 filed on Nov. 10, 2015, claiming the benefit of priority of Japanese Patent Application Number 2015-212359 filed on Oct. 28, 2015, Number 2015-212363 filed on Oct. 28, 2015, and Number 2015-212367 filed on Oct. 28, 2015, and U.S. Provisional Application No. 62/082,223 filed on Nov. 20, 2014, No. 62/089,005 filed on Dec. 8, 2014, and No. 62/117,610 filed on Feb. 18, 2015, the entire content of which is hereby incorporated by reference.

BACKGROUND

1. Technical Field

The present disclosure relates to a transmitting device, a receiving device, a transmitting method and a receiving method.

2. Description of the Related Art

As broadcasting and communication services are sophisticated, introduction of super-high definition moving image content such as 8K (7680×4320 pixels: also referred to as 8K4K) and 4K (3840×2160 pixels: also referred to as 4K2K) has been studied. A receiving device needs to decode and display encoded data of the received ultra-high definition moving image in real time. A processing load of a moving image of a resolution such as 8K in particular is great during decoding, and it is difficult to decode such a moving image in real time by using one decoder. Hence, a method for reducing a processing load of one decoder by parallelizing decoding processing by using a plurality of decoders, and achieving processing in real time has been studied.

Further, encoded data is multiplexed based on a multiplexing method such as MPEG-2 TS (Transport Stream) or MMT (MPEG Media Transport), and is transmitted. For example, Information technology—High efficiency coding and media delivery in heterogeneous environment—Part1: MPEG media transport (MMT), ISO/IEC DIS 23008-1 (Non-Patent Literature 1) discloses a technique of transmitting encoded media data per packet according to MMT.

SUMMARY

As the broadcasting and communication services have advanced, an introduction of moving image content of super-high definition such as 8K and 4K (3840×2160 pixels) has been considered. Under the MMT/TLV scheme, a reference clock on a transmission side is synchronized with a 64-bit long-format NTP defined in RFC 5905, and a time stamp such as a presentation time stamp (PTS) or a decode time stamp (DTS) is attached to a synchronized media based on the reference clock. In addition, reference clock information of the transmission side is transmitted to a reception side, and a receiving device generates a system clock for the use in the receiving device based on the reference clock information.

However, under such MMT transfer scheme, in the case where a leap second adjustment is made to reference time information such as an NTP or the like, it is difficult to decode or present, at an intended time, a media presentation unit (MPU) which is a predetermined data unit included in a packet received by the receiving device, even though the decoding or presentation is performed according to the DTS or the PTS associated with the MPU. Therefore, the solutions for this problem are required.

The present disclosure provides a transmitting method and others, by which a receiving device can reproduce a predetermined data unit at an intended time even when a leap second adjustment is made to the reference time information serving as a reference for the reference clocks of the transmission side and the receiving device.

In order to achieve the abovementioned objective, a transmitting method according to one aspect of the present disclosure is a transmitting method of storing data configuring an application into a predetermined data unit and transmitting the stored data in the predetermined data unit. The transmitting method includes: generating time specification information indicating an operation time of the application, based on reference time information received from an external source; and transmitting (i) the predetermined data unit and (ii) control information indicating the generated time specification information. The control information includes the generated time specification information and identification information indicating whether or not the time specification information is time information indicating a time that is before a leap second adjustment.

In addition, these overall or specific aspects may be realized by a system, a device, an integrated circuit, a computer program or a computer-readable recording medium such as a CD-ROM, and may be realized by an arbitrary combination of the system, the device, the integrated circuit, the computer program and the recording medium.

The present disclosure enables the receiving device to execute, at an intended time, an application stored in predetermined data units, even when a leap second adjustment is made to the reference time information serving as the reference for the reference clocks of the transmission side and the receiving device.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 36 is a second view for explaining an operation example of the receiving device in a case where one MPU is configured by a plurality of movie fragments;

FIG. 48 is a view for explaining a method for storing a data unit in a payload according to MMT;

FIG. 54 is a view illustrating an example where each of a plurality of items of divided data obtained by dividing a file is packetized and is transmitted;

FIG. 55 is a view illustrating another example where each of a plurality of items of divided data obtained by dividing a file is packetized and is transmitted;

FIG. 56 is a view illustrating a syntax of a loop per file in an asset management table;

FIG. 81 is a diagram for explaining time stamp descriptors;

FIG. 82 is a diagram for explaining a leap second adjustment;

FIG. 94 is a diagram showing an extension example of an MPU extension time stamp descriptor;

DETAILED DESCRIPTION OF THE EMBODIMENTS

Figure 1:
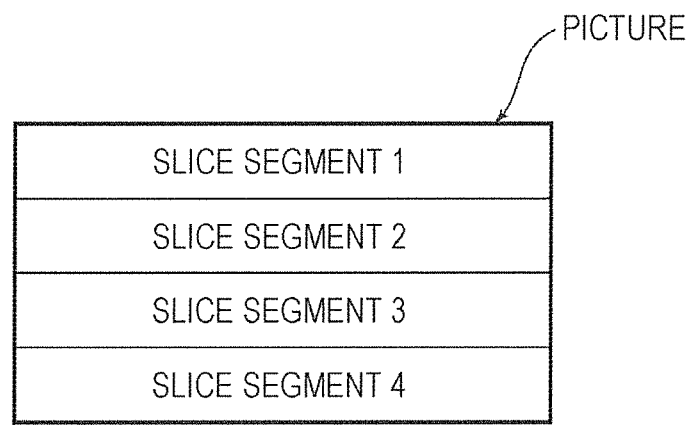
FIG. 1 is a view illustrating an example where a picture is divided into slice segments.

The transmitting method according to one aspect of the present disclosure is a transmitting method of storing data configuring an application into a predetermined data unit and transmitting the stored data in the predetermined data unit. The transmitting method includes: generating time specification information indicating an operation time of the application, based on reference time information received from an external source; and transmitting (i) the predetermined data unit and (ii) control information indicating the generated time specification information. The control information includes the generated time specification information and identification information indicating whether or not the time specification information is time information indicating a time that is before a leap second adjustment.

Such transmitting method enables execution, at an intended time, of an application stored in predetermined data units, even when a leap second adjustment is made to the reference time information serving as a reference for the reference clocks of the transmission side and the receiving device.

In the generating, the time specification information of the predetermined data unit may be generated by adding a predetermined period of time to the time information.

The identification information may indicate whether or not the time specification information is generated based on the time information indicating a time within a time range from a time preceding, by a predetermined period of time, a time immediately before a leap second adjustment up to the time immediately before the leap second adjustment.

The time specification information may be a coordinated universal time (UTC) time and a normal play time (NPT), and the control information may be a UTC-NPT reference descriptor indicating a relationship between the UTC time and the NPT.

The reference time information may comply with a network time protocol (NTP).

The receiving method according to one aspect of the present disclosure is a receiving method of receiving a predetermined data unit in which data configuring an application is stored. The receiving method includes: receiving (i) the predetermined data unit, and (ii) control information which includes: time specification information indicating an operation time of the application; and identification information indicating whether or not the time specification information is time information indicating a time that is before a leap second adjustment, and executing the application stored in the received predetermined data unit, based on the received control information.

Such receiving method enables execution, at an intended time, of an application stored in predetermined data units, even when a leap second adjustment is made to the reference time information serving as a reference for the reference clock.

In addition, these comprehensive or specific aspects may be realized by a system, a device, an integrated circuit, a computer program or a computer-readable recording medium such as a CD-ROM, and may be realized by an arbitrary combination of the system, the device, the integrated circuit, the computer program and the recording medium.

Exemplary embodiments will be specifically described below with reference to the drawings.

In addition, the exemplary embodiments described below are each a comprehensive or specific example. Numerical values, shapes, materials, components, placement positions and connection modes of the components, steps and a step order described in the following exemplary embodiments are exemplary, and by no means limit the present disclosure. Further, components which are not recited in the independent claims representing the uppermost generic concepts among components in the following exemplary embodiments will be described as arbitrary components.

(Underlying Knowledge Forming Basis of the Present Disclosure)

In recent years, more displays of TVs, smart phones and table terminals have higher resolutions. For example, broadcast in Japan in particular schedules a service for 8K4K (a resolution is 8K×4K) in 2020. A single decode has difficulty in decoding a moving image of a ultra-high resolution such as 8K4K in real time. Therefore, a method for performing decoding processing in parallel by using a plurality of decoders has been studied.

Encoded data is multiplexed based on a multiplexing method such as MPEG-2 TS or MMT and transmitted. Therefore, a receiving device needs to demultiplex encoded data of a moving image from multiplexed data. Processing of demultiplexing encoded data from multiplexed data will be referred to as demultiplexing.

It is necessary to sort decoding target encoded data to each decoder to parallelize decoding processing. It is necessary to analyze the encoded data to sort the encoded data, a bit rate of content such as 8K in particular is high, and therefore a processing load related to the analysis is great. Therefore, there is a phenomenon that demultiplexing processing is a bottleneck and it is not possible to perform playback in real time.

By the way, according to moving image encoding methods such as H.264 and H.265 standardized by MPEG and ITU (International Telecommunication Union), a transmitting device can divide a picture into a plurality of areas called slices or slice segments, and encode the areas such that the divided areas can be independently decoded. Hence, in the case of H.265, for example, a receiving device which receives a broadcast can parallelize decoding processing by demultiplexing data of each slice segment from received data, and outputting data of each slice segment to different decoders.

FIG. 1 is a view illustrating an example where one picture is divided into four slice segments according to HEVC (High Efficiency Video Coding). For example, a receiving device includes four decoders, and each decoder decodes one of four slice segments.

According to a conventional broadcast, a transmitting device stores one picture (an access unit according to MPEG system standards) in one PES packet, and multiplexes a PES packet on a TS packet train. Hence, the receiving device needs to demultiplex each slice segment by demultiplexing a payload of the PES packet and analyzing data of the access unit stored in the payload, and output data of each demultiplexed slice segment to each decoder.

However, the inventors of the present invention found a phenomenon that a processing amount for analyzing the data of the access unit and demultiplexing slice segments is great, and therefore it is difficult to perform this processing in real time.

Figure 2:
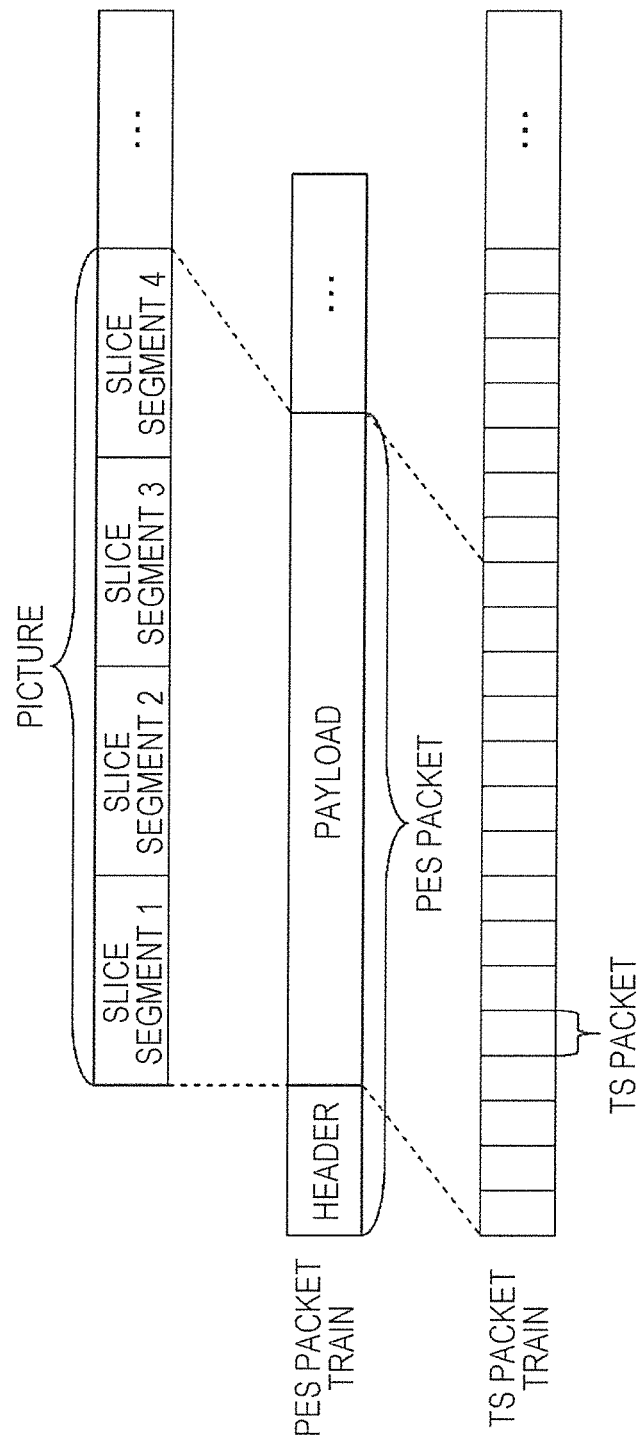
FIG. 2 is a view illustrating an example of a PES (Packetized Elementary Stream) packet train in which picture data is stored.

FIG. 2 is a view illustrating an example where data of a picture divided into slice segments is stored in a payload of a PES packet.

As illustrated in FIG. 2, for example, items of data of a plurality of slice segments (slice segments 1 to 4) are stored in a payload of one PES packet. Further, the PES packet is multiplexed on a TS packet train.

First Exemplary Embodiment

A case where H.265 is used as a moving image encoding method will be described below as an example. However, the present exemplary embodiment is applicable to a case where another encoding method such as H.264 is used, too.

Figure 3:
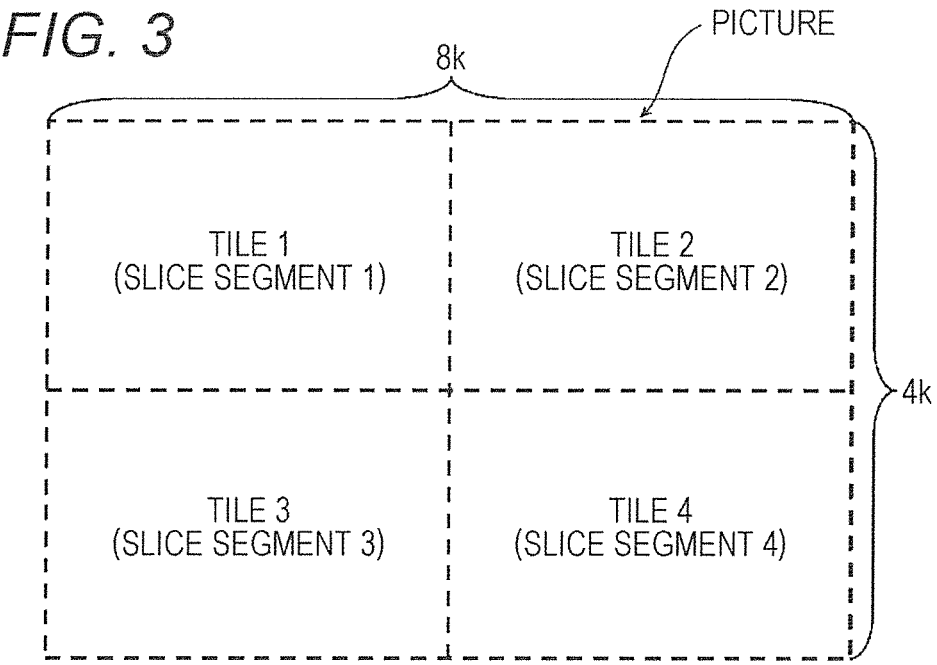
FIG. 3 is a view illustrating a picture division example according to a first exemplary embodiment.

FIG. 3 is a view illustrating an example where an access unit (picture) according to the present embodiment is divided in division units. The access unit is equally divided into two in horizontal and vertical directions by a function called a tile introduced by H.265, and is divided into four tiles in total. Further, each slice segment and each tile are associated on a one-to-one basis.

A reason for equally dividing an access unit into two in the horizontal and vertical directions will be described. First, during general decoding, a line memory which stores data of one horizontal line is necessary. However, in the case of an ultra-high resolution such as 8K4K, a horizontal direction size increases, and therefore a line memory size increases. It is desirable to reduce the line memory size for implementation on the receiving device. It is necessary to divide an access unit in the vertical direction to reduce a line memory size. A data structure which is a tile is necessary to perform division in the vertical direction. For these reasons, tiles are used.

Meanwhile, general images have a high correlation in the horizontal direction, and therefore when a reference can be made in a wide range in the horizontal direction, encoding efficiency improves. Therefore, it is desirable to divide an access unit in the horizontal direction from a viewpoint of encoding efficiency.

By equally dividing an access unit into two in the horizontal and vertical directions, it is possible to realize both of these two characteristics, and take into account both of mounting and encoding efficiency. When a single decoder can decode a 4K2K moving image in real time, the receiving device can decode 8K4K images in real time by equally dividing an 8K4K image into four, and dividing each slice segment to realize 4K2K.

Next, a reason for associating each tile obtained by dividing an access unit in the horizontal and vertical directions, and each slice segment on a one-to-one basis will be described. According to H.265, an access unit is configured by units called a plurality of NAL (Network Adaptation Layer) units.

In a payload of each NAL unit, one of an access unit delimiter indicating a start position of the access unit, an SPS (Step Sequence Parameter Set) which is initialization information which is commonly used in sequence units during decoding, a PPS (Picture Parameter Set) which is initialization information which is commonly used in a picture during decoding, SEI (Step Supplemental Enhancement Information) which is unnecessary for decoding processing yet is necessary to process and display a decoding result, and encoded data of each slice segment is stored. A header of each NAL unit includes type information for identifying data to be stored in a payload.

In this regard, the transmitting device can set a basic unit to an NAL unit when encoded data is multiplexed in a multiplexing format such as MPEG-2 TS, MMT (MPEG Media Transport), MPEG DASH (Dynamic Adaptive Streaming over HTTP) or RTP (Real-time Transport Protocol). In order to store one slice segment in one NAL unit, it is desirable to divide an access unit in slice segment units when the access unit is divided into areas. For this reason, the transmitting device associates each tile and each slice segment on one-to-one basis.

Figure 4:
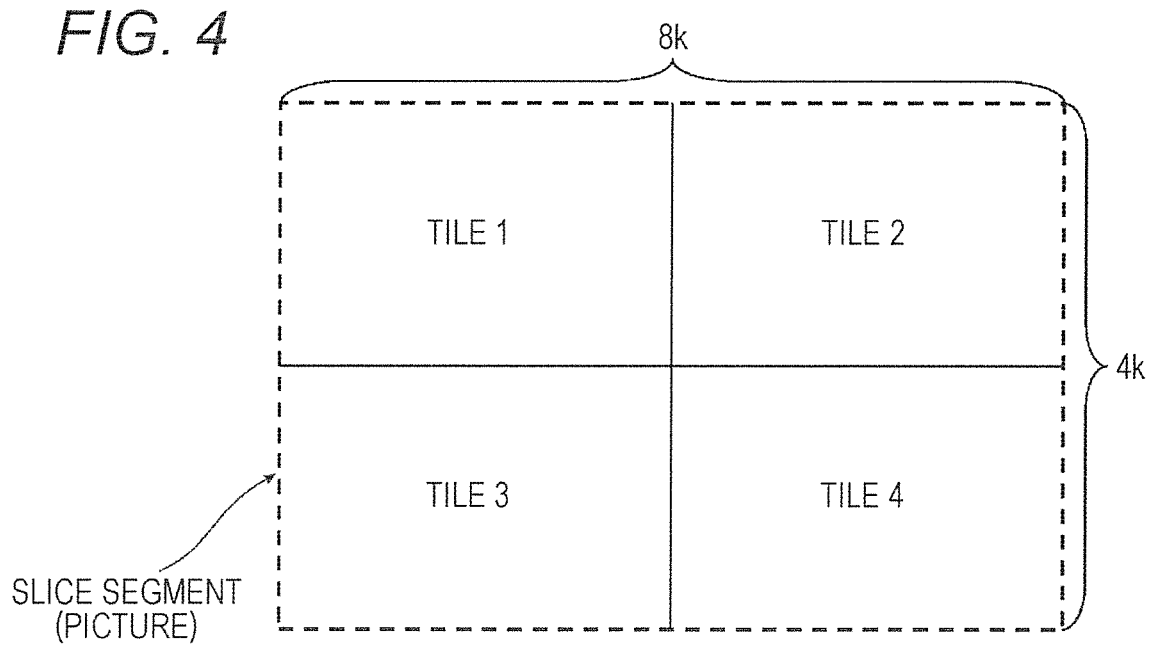
FIG. 4 is a view illustrating a picture division example according to a comparative example of the first exemplary embodiment.

In addition, as illustrated in FIG. 4, the transmitting device can also collectively set tile 1 to tile 4 to one slice segment. However, in this case, all tiles are stored in one NAL unit, and the receiving device has difficulty in demultiplexing the tiles in a multiplexing layer.

In addition, slice segments include independent slice segments which can be independently decoded, and reference slice segments which refer to the independent slice segments. Hereinafter, a case where the independent slice segments are used will be described.

Figure 5:
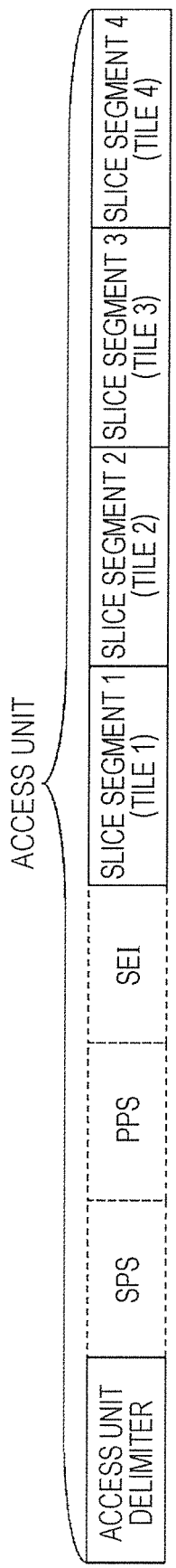
FIG. 5 is a view illustrating an example of data of an access unit according to the first exemplary embodiment.

FIG. 5 is a view illustrating an example of data of an access unit divided such that boundaries of tiles and slice segments match as shown in FIG. 3. The data of the access unit includes an NAL unit in which an access unit delimiter disposed at a head is stored, NAL units of an SPS, a PPS and SEI which are subsequently disposed, and data of slice segments in which items of data of subsequently disposed tile 1 to tile 4 are stored. In addition, data of the access unit may not include part or all of NAL units of an SPS, a PPS and SEI.

Figure 6:
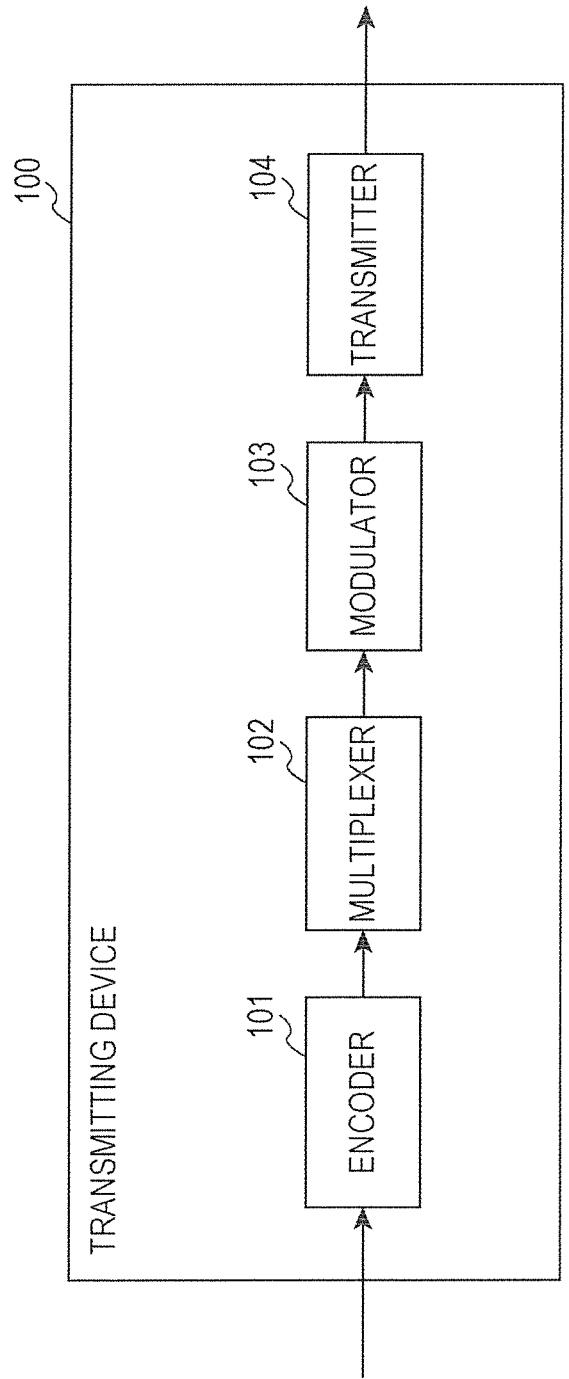
FIG. 6 is a block diagram of a transmitting device according to the first exemplary embodiment.

Next, a configuration of transmitting device 100 according to the present exemplary embodiment will be described. FIG. 6 is a block diagram illustrating a configuration example of transmitting device 100 according to the present exemplary embodiment. This transmitting device 100 includes encoder 101, multiplexer 102, modulator 103 and transmitter 104.

Encoder 101 generates encoded data by encoding an input image according to H.265, for example. Further, as illustrated in, for example, FIG. 3, encoder 101 divides an access unit into four slice segments (tiles), and encodes each slice segment.

Multiplexer 102 multiplexes the encoded data generated by encoder 101. Modulator 103 modulates the data obtained by the multiplexing. Transmitter 104 transmits the modulated data as a broadcast signal.

Figure 7:
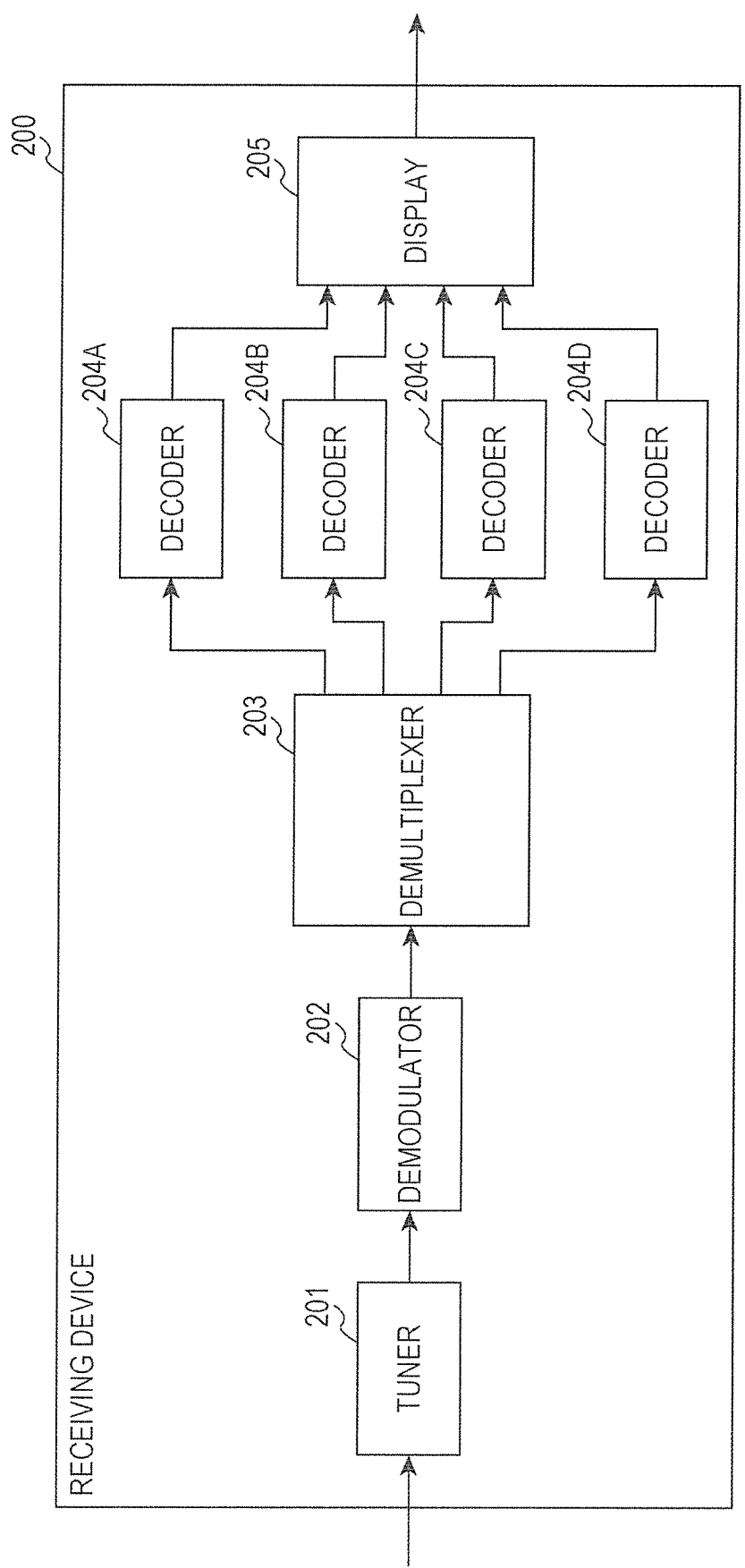
FIG. 7 is a block diagram of a receiving device according to the first exemplary embodiment.

Next, a configuration of receiving device 200 according to the present embodiment will be described. FIG. 7 is a block diagram illustrating a configuration example of receiving device 200 according to the present exemplary embodiment. This receiving device 200 includes tuner 201, demodulator 202, demultiplexer 203, a plurality of decoders 204A and 204D and display 205.

Tuner 201 receives a broadcast signal. Demodulator 202 demodulates the received broadcast signal. The demodulated data is input to demultiplexer 203.

Demultiplexer 203 demultiplexes the demodulated data in division units, and outputs the data of each division unit to decoders 204A to 204D. In this regard, the division units refer to division areas obtained by dividing an access unit, and are, for example, slice segments according to H.265. Further, an 8K4K image is divided into four 4K2K images. Therefore, there are four decoders 204A to 204D.

A plurality of decoders 204A to 204D operates in synchronization with each other based on a predetermined reference clock. Each decoder decodes encoded data in each division unit according to a DTS (Decoding Time Stamp) of the access unit, and outputs a decoding result to display 205.

Display 205 generates an 8K4K output image by integrating a plurality of decoding results output from a plurality of decoders 204A to 204D. Display 205 displays the generated output image according to a PTS (Presentation Time Stamp) of an additionally obtained access unit. In addition, display 205 may perform filtering processing such as deblock filtering to make a tile boundary indistinctive in a boundary area of neighboring division units when integrating decoding results.

In addition, an example of transmitting device 100 and receiving device 200 which transmit and receive broadcast content has been described above. However, content may be transmitted and received via a communication network. When receiving device 200 receives content via the communication network, receiving device 200 demultiplexes multiplexed data from IP packets received from a network such as the Ethernet (registered trademark).

A broadcast has a fixed channel delay caused until a broadcast signal arrives at receiving device 200 after being transmitted. Meanwhile, due to an influence of congestion in a communication network such as the Internet, a channel delay caused until data transmitted from a server arrives at receiving device 200 is not fixed. Hence, receiving device 200 does not usually perform strict synchronization and playback based on a reference clock such as a PCR (Program Clock Reference) according to MPEG-2 TS for a broadcast. Hence, receiving device 200 may cause the display to display an 8K4K output image according to the PTS without strictly synchronizing each decoder.

Further, due to communication network congestion, decoding processing for all division units is not finished at a time indicated by a PTS of an access unit in some cases. In this case, receiving device 200 skips displaying the access unit or finishes decoding at least four division units, and delays the display of the access unit until generation of the 8K4K image is finished.

In addition, content may be transmitted and received by using broadcasting and communication in combination. Further, this method is applicable to play back multiplexed data stored in a recording medium such as a hard disk or a memory.

Next, a method for multiplexing access units divided into slice segments when MMT is used for a multiplexing method will be described.

Figure 8:
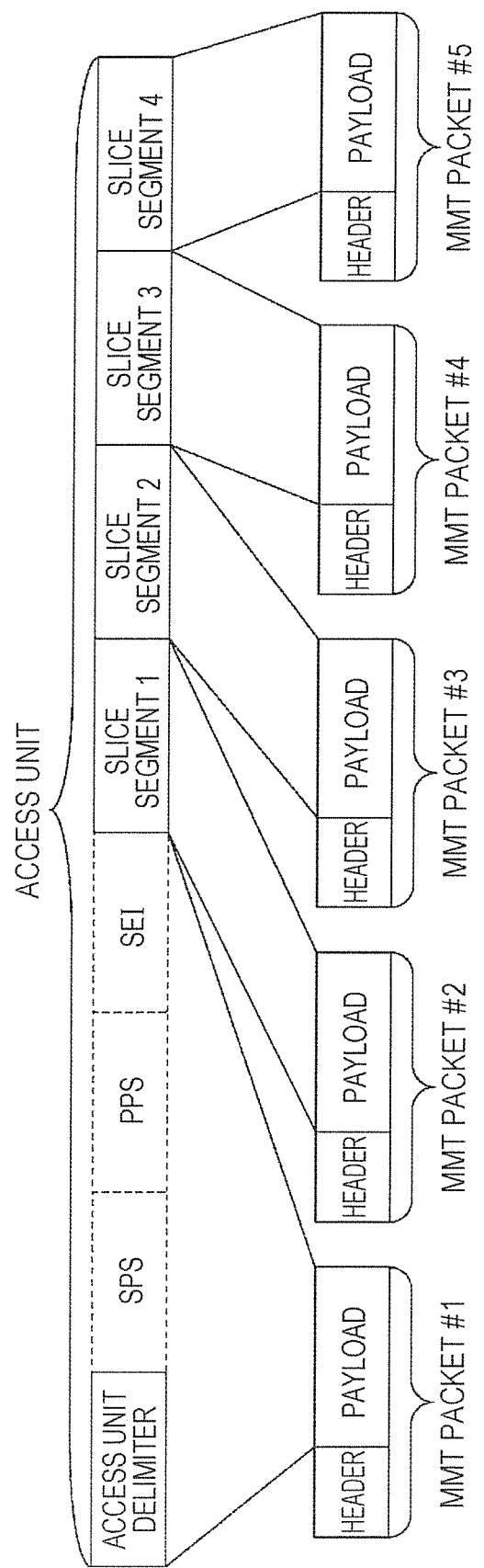
FIG. 8 is a view illustrating an example of an MMT packet according to the first exemplary embodiment.

FIG. 8 is a view illustrating an example where data of an access unit according to HEVC is packetized as an MMT packet. An SPS, a PPS and SEI do not necessarily need to be included in an access unit, yet a case where an SPS, a PPS and SEI are in an access unit will be described.

NAL units such as an access unit delimiter, an SPS, a PPS and SEI disposed before a head slice segment in the access unit are collectively stored in MMT packet #1. Subsequent slice segments are stored in different MMT packets per slice segment.

Figure 9:
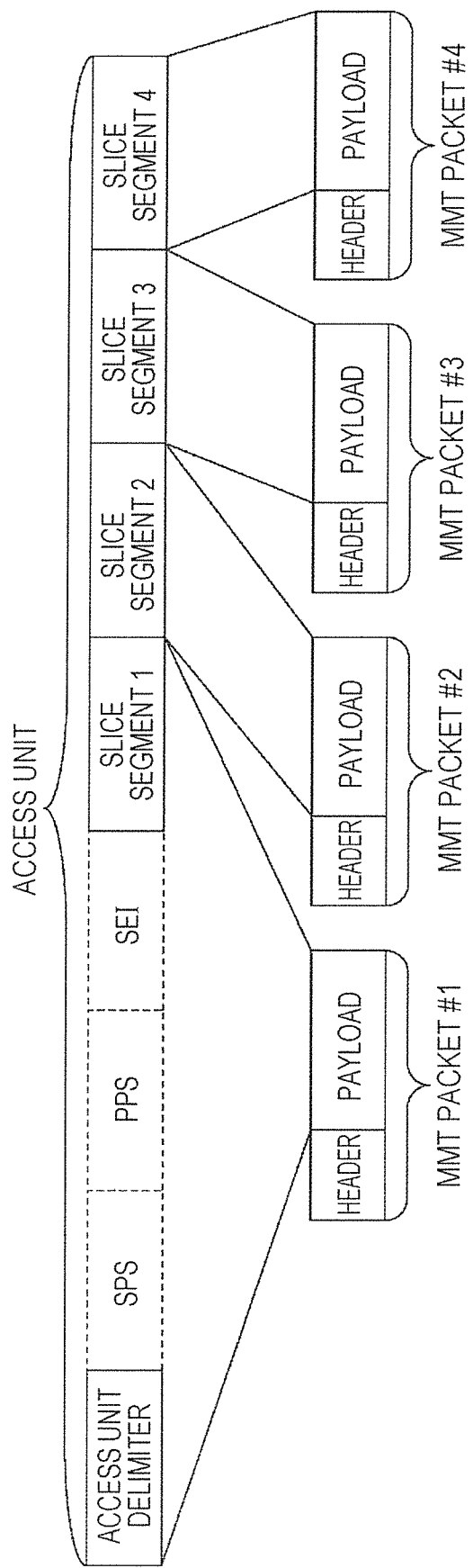
FIG. 9 is a view illustrating another example of the MMT packet according to the first exemplary embodiment.

In addition, as illustrated in FIG. 9, NAL units disposed before a head slice segment in an access unit may be stored in the same MMT packet as that of the head slice segment.

Further, when an NAL unit such as End-of-Sequence or End-of-Bit stream indicating an end of a sequence or a stream is added at a tail of a last slice segment, this NAL unit is stored in the same MMT packet as that of the last slice segment. In this regard, the NAL unit such as End-of-Sequence or End-of-Bit stream is inserted in a decoding process end point or a connection point of two streams. Therefore, desirably, receiving device 200 can easily obtain these NAL units in a multiplexing layer. In this case, these NAL units may be stored in an MMT packet different from slice segments. Consequently, receiving device 200 can easily demultiplex these NAL units in the multiplexing layer.

In addition, TS (Transport Stream), DASH (Dynamic Adaptive Streaming over HTTP) or RTP may be used for a multiplexing method. According to these methods, too, transmitting device 100 stores different slice segments in different packets. Consequently, it is possible to guarantee that receiving device 200 can demultiplex slice segments in a multiplexing layer.

When, for example, TS is used, encoded data is packetized as a PES packet in slice segment units. When RTP is used, encoded data is packetized as an RTP packet in slice segment units. In these cases, similar to MMT packet #1 illustrated in FIG. 8, NAL units disposed before slice segments, and slice segments may be separately packetized.

When TS is used, transmitting device 100 indicates units of data to be stored in a PES packet by using a data alignment descriptor. Further, DASH is a method for downloading data units in an MP4 format called a segment by HTTP, and therefore transmitting device 100 does not packetize encoded data when performing transmission. Hence, transmitting device 100 may create a subsample in slice segment units and store information indicating a subsample storage position in an MP4 header to enable receiving device 200 to detect slice segments in a multiplexing layer according to MP4.

MMT packetization of slice segments will be described below in detail.

As illustrated in FIG. 8, when encoded data is packetized, items of data such as an SPS and a PPS which are commonly referred to during decoding of all slice segments in an access unit are stored in MMT packet #1. In this case, receiving device 200 couples payload data of MMT packet #1 and data of each slice segment, and outputs the obtained data to the decoders. Thus, receiving device 200 can easily generate items of data input to the decoders by coupling payloads of a plurality of MMT packets.

Figure 10:
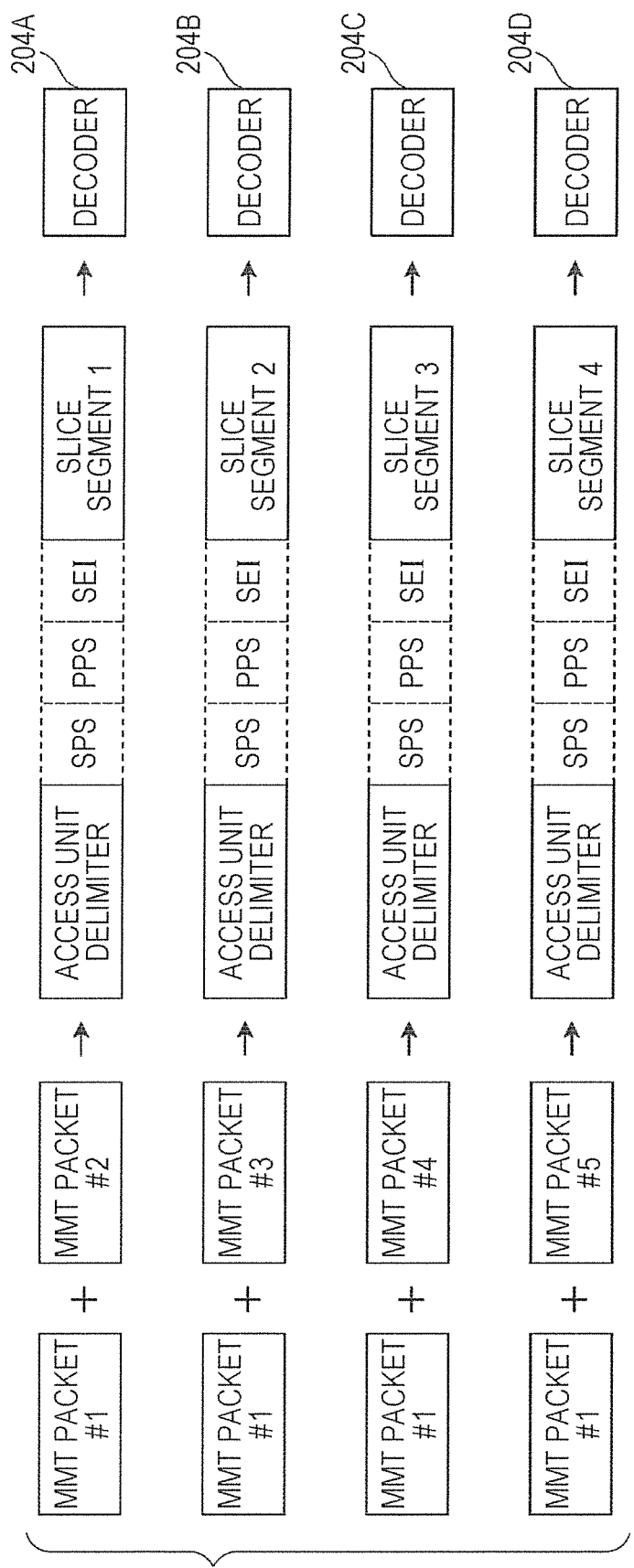
FIG. 10 is a view illustrating an example of data input to each decoder according to the first exemplary embodiment.

FIG. 10 is a view illustrating an example where items of data input to decoders 204A to 204D are generated from MMT packets illustrated in FIG. 8. Demultiplexer 203 generates data which is necessary for decoder 204A to decode slice segment 1 by coupling items of payload data of MMT packet #1 and MMT packet #2. Demultiplexer 203 generates items of input data likewise for decoder 204B to decoder 204D, too. That is, demultiplexer 203 generates data input to decoder 204B by coupling items of payload data of MMT packet #1 and MMT packet #3. Demultiplexer 203 generates data input to decoder 204C by coupling items of payload data of MMT packet #1 and MMT packet #4. Demultiplexer 203 generates data input to decoder 204D by coupling items of payload data of MMT packet #1 and MMT packet #5.

In addition, demultiplexer 203 may remove NAL units such as an access unit delimiter and SEI which are not necessary for decoding processing, from the payload data of MMT packet #1, demultiplex NAL units such as an SPS and a PPS which are necessary for decoding processing, and add the NAL units to data of slice segments.

When encoded data is packetized as illustrated in FIG. 9, demultiplexer 203 outputs to first decoder 204A MMT packet #1 including the head data of the access unit in the multiplexing layer. Further, demultiplexer 203 generates data input to each of the second and subsequence decoders by analyzing an MMT packet including head data of an access unit in a multiplexing layer, demultiplexing NAL units of an SPS and a PPS, and adding the demultiplexed NAL units of the SPS and the PPS to items of data of second and subsequent slice segments.

Furthermore, desirably, by using information included in the header of the MMT packet, receiving device 200 can identify a type of data stored in an MMT payload, and an index number of a slice segment in an access unit in a case where the slice segment is stored in the payload. In this regard, the data type refers to one of slice segment previous data (NAL units disposed before a head slice segment in an access unit will be collectively referred in this way), and slice segment data.

When units such as slice segments obtained by fragmenting an MPU are stored in an MMT packet, a mode for storing an MFU (Media Fragment Unit) is used. When this mode is used, transmitting device 100 can set, for example, Data Unit which is a data basic unit of the MFU to a sample (a data unit according to MMT and corresponding to an access unit) or a subsample (a unit obtained by dividing a sample).

In this case, a header of the MMT packet includes a field called Fragmentation indicator, and a field called Fragment counter.

Fragmentation indicator indicates whether or not data to be stored in a payload of an MMT packet is obtained by fragmenting Data unit, and indicates whether the fragment is a head or last fragment of Data unit or a fragment which is not the head or last fragment when the fragment is obtained by fragmenting Data unit. In other words, Fragmentation indicator included in a header of a given packet is identification information indicating one of that (1) this packet is included in Data unit which is a basic data unit, that (2) Data unit is divided into a plurality of packets and stored and the packets are head packets of Data unit, that (3) Data unit is divided into a plurality of packets and stored and the packets are packets other than head and last packets of Data unit, and that (4) Data unit is divided into a plurality of packets and stored and the packets are last packets of Data unit.

Fragment counter is an index number indicating which fragment of Data unit data to be stored in an MMT packet corresponds to.

Hence, transmitting device 100 sets a sample according to MMT, to Data unit, and sets slice segment previous data and each slice segment to fragment units of Data unit, respectively, so that receiving device 200 can identify a type of data stored in a payload by using information included in a header of an MMT packet. That is, demultiplexer 203 can generate data input to each of decoders 204A to 204D by referring to a header of an MMT packet.

Figure 11:
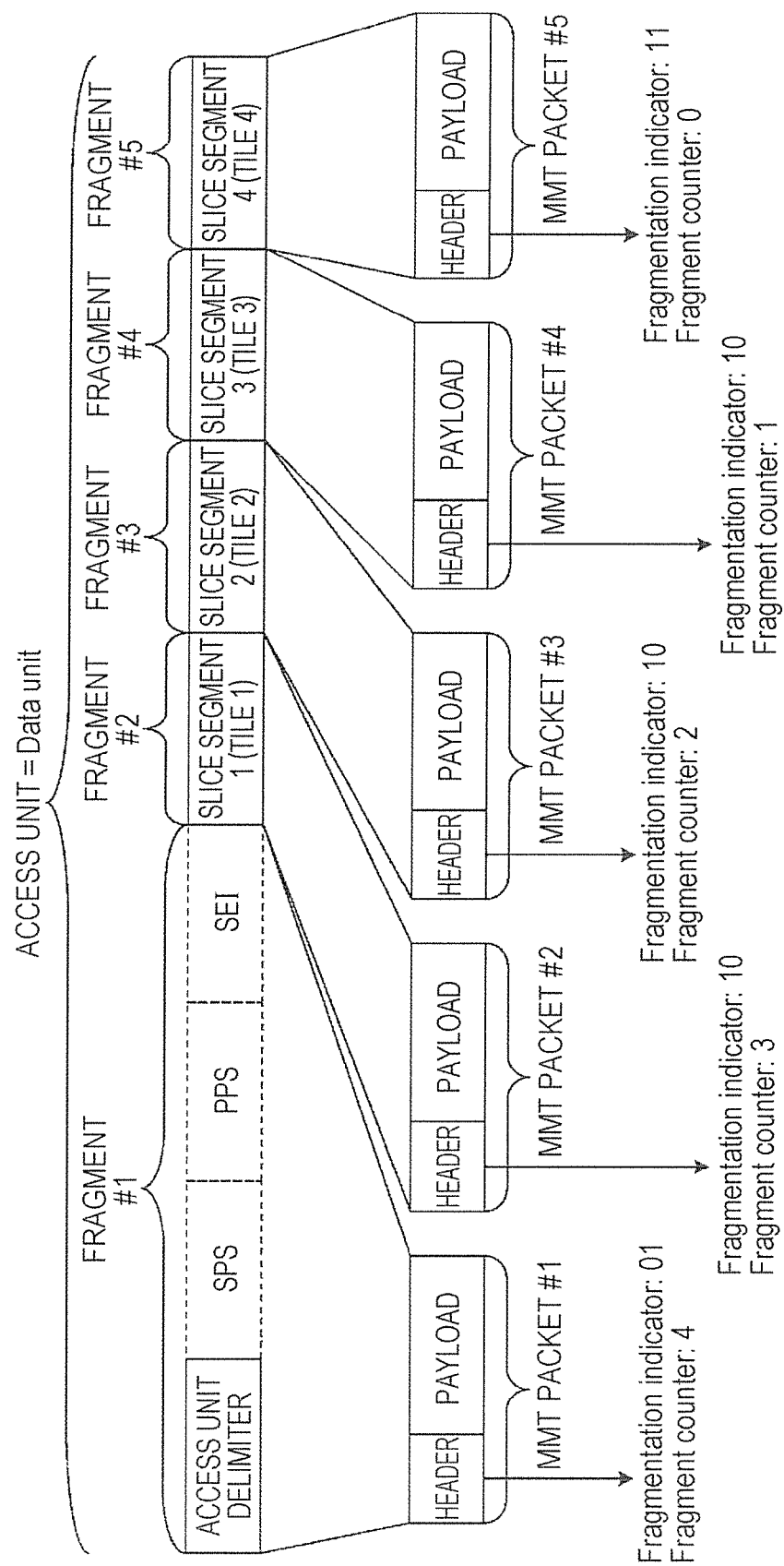
FIG. 11 is a view illustrating an example of an MMT packet and header information according to the first exemplary embodiment.

FIG. 11 is a view illustrating an example where a sample is set to Data unit, and slice segment previous data and slice segments are packetized as fragments of Data unit.

The slice segment previous data and the slice segments are divided into five segments of fragment #1 to fragment #5. Each fragment is stored in an individual MMT packet. In this case, values of Fragmentation indicator and Fragment counter included in a header of the MMT packet are as illustrated in FIG. 11.

For example, Fragmentation indicator is a 2-bit value of a binary digit. Fragment indicator of MMT packet #1 which is a head of Data unit, Fragment indicator of last MMT packet #5 and Fragment indicators of MMT packet #2 to MMT packet #4 which are in-between packets are set to different values. More specifically, Fragment indicator of MMT packet #1 which is a head of Data unit is set to 01, Fragment indicator of last MMT packet #5 are set to 11, and Fragment indicators of MMT packet #2 to MMT packet #4 which are in-between packets are set to 10. In addition, when Data unit includes one MMT packet, Fragment indicator is set to 00.

Further, Fragment counter is 4 which is a value obtained by subtracting 1 from 5 which is a total number of fragments in MMT packet #1, values of subsequent packets decrease one by one in order, and the value is 0 in last MMT packet #5.

Hence, receiving device 200 can identify an MMT packet in which slice segment previous data is stored, by using one of Fragment indicator and Fragment counter. Further, receiving device 200 can identify an MMT packet in which an Nth slice segment is stored, by referring to Fragment counter.

A header of an MMT packet additionally includes a sequence number in an MPU of Movie Fragment to which Data unit belongs, a sequence number of the MPU and a sequence number in Movie Fragment of a sample to which Data unit belongs. Demultiplexer 203 can uniquely determine the sample to which Data unit belongs by referring to these sequence numbers.

Further, demultiplexer 203 can determine an index number of a fragment in Data unit based on Fragment counter, and, consequently, can uniquely determine a slice segment to be stored in the fragment even when packet loss occurs. When, for example, fragment #4 illustrated in FIG. 11 cannot be obtained due to packet loss, demultiplexer 203 learns that a fragment received next to fragment #3 is fragment #5, and, consequently, can output slice segment 4 stored in fragment #5 to decoder 204D, not to decoder 204C.

In addition, when a channel which is guaranteed not to cause packet loss is used, demultiplexer 203 only needs to periodically process arriving packets without determining a type of data stored in an MMT packet or an index number of a slice segment by referring to a header of the MMT packet. When, for example, an access unit is transmitted by using five MMT packets in total including slice segment previous data and fours slice segments, receiving device 200 can obtain the slice segment previous data and items of data of the four slice segments in order by determining the slice segment previous data of the access unit which starts being decoded, and then processing the received MMT packet in order.

A modified example of packetization will be described below.

A slice segment does not need to be obtained by dividing a plane of an access unit in both of the horizontal direction and the vertical direction, and, as illustrated in FIG. 1, may be obtained by dividing an access unit in the horizontal direction or may be obtained by dividing an access unit in the vertical direction as illustrated in FIG. 1.

Further, when an access unit is divided in the horizontal direction, it is not necessary to use tiles.

Furthermore, the number of divisions of a plane of an access unit is arbitrary and is not limited to four. In this regard, area sizes of slice segments and tiles need to be a lower limit of encoding standards of H.265 or more.

Transmitting device 100 may store identification information indicating a method for dividing a plane of an access unit, in an MMT message or a TS descriptor. For example, information indicating the numbers of divisions of a plane in the horizontal direction and the vertical direction may be stored. Further, unique identification information indicating that a plane is equally divided into two in the horizontal direction and the vertical direction, respectively, as illustrated in FIG. 3 or that a plane is equally divided into four in the horizontal direction as illustrated in FIG. 1 may be allocated to a dividing method. When, for example, an access unit is divided as illustrated in FIG. 3, identification information indicates mode 2, and, when an access unit is divided as illustrated in FIG. 1, the identification information indicates mode 1.

Further, information indicating a limitation of encoding conditions related to a plane dividing method may be included in a multiplexing layer. For example, information indicating that one slice segment is configured by one tile may be used. Further, information indicating that a reference block for motion compensation during decoding of slice segments or tiles is limited to a slice segment or a tile at the same position in a screen or is limited to a block within a predetermined range of neighboring slice segments may be used.

Furthermore, transmitting device 100 may switch whether or not to divide an access unit into a plurality of slice segments according to a resolution of a moving image. For example, transmitting device 100 may divide an access unit into four when a processing target moving image is 8K4K without dividing a plane when a processing target moving image has a 4K2K resolution. Defining a dividing method in advance in the case of an 8K4K moving image enables receiving device 200 to determine whether or not to divide a plane, and the dividing method, and to switch a decoding operation by obtaining a resolution of a moving image to be received.

Further, receiving device 200 can detect whether or not to divide a plane by referring to a header of an MMT packet. When, for example, an access unit is not divided, if Data unit of MMT is set to a sample, Data unit is not fragmented. Hence, receiving device 200 can determine that an access unit is not divided when a value of Fragment counter included in the header of the MMT packet is zero. Alternatively, receiving device 200 may detect whether or not the value of Fragmentation indicator is 01. Receiving device 200 can determine that the access unit is not divided when the value of Fragmentation indicator is 01.

Further, receiving device 200 can support a case where a number of divisions of a plane of an access unit and a number of decoders do not match. When, for example, receiving device 200 includes two decoders 204A and 204B which can decode 8K2K encoded data in real time, demultiplexer 203 outputs to decoder 204A two of four slice segments configuring the 8K4K encoded data.

Figure 12:
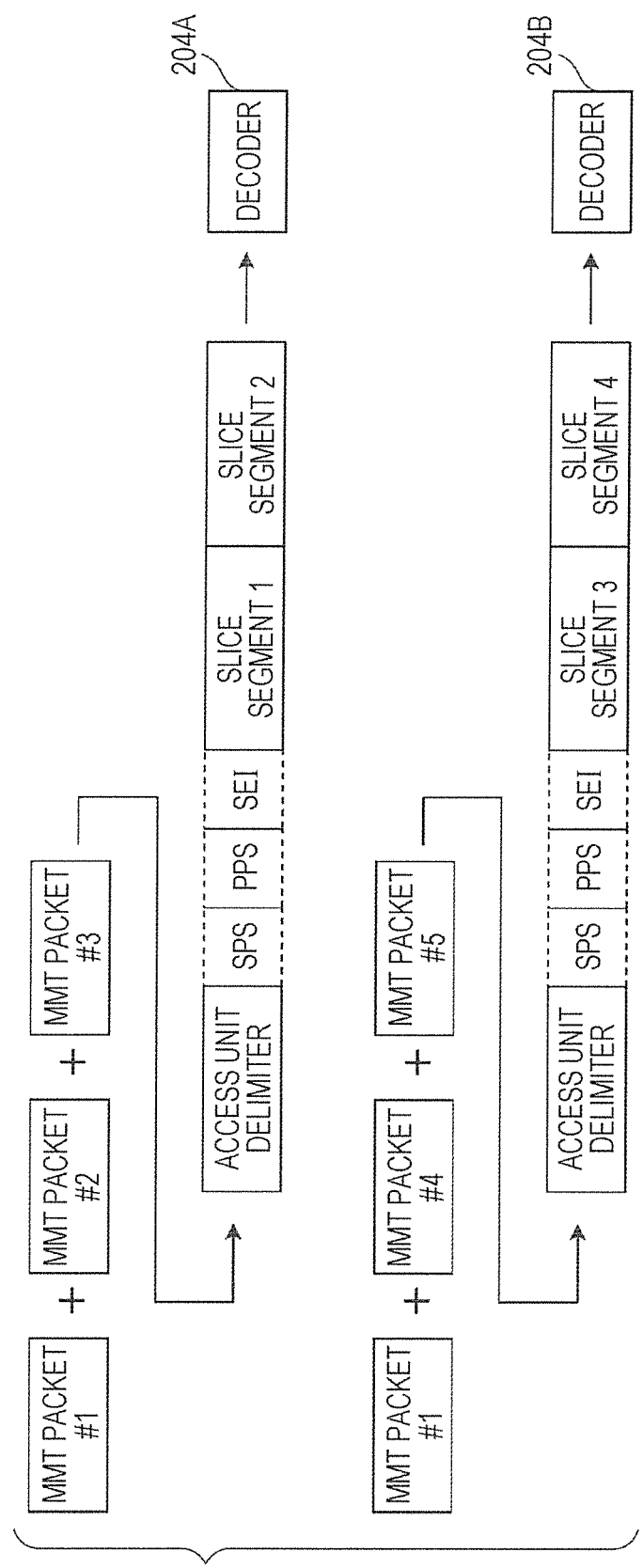
FIG. 12 is a view illustrating another example of data input to each decoder according to the first exemplary embodiment.

FIG. 12 is a view illustrating an operation example in a case where data packetized as an MMT packet as illustrated in FIG. 8 is input to two decoders 204A and 204B. In this regard, desirably, receiving device 200 can directly integrate and output decoding results of decoders 204A and 204B. Hence, demultiplexer 203 selects slice segments to output to decoders 204A and 204B, respectively, such that the decoding results of decoders 204A and 204B spatially continue.

Further, demultiplexer 203 may select a decoder to use according to a resolution or a frame rate of moving image encoded data. When, for example, receiving device 200 includes four 4K2K decoders, and a resolution of an input image is 8K4K, receiving device 200 performs decoding processing by using all of the four decoders. Further, when a resolution of an input image is 4K2K, receiving device 200 performs decoding processing by using one decoder. Alternatively, even when a plane is divided into four and when 8K4K can be decoded in real time by a single decoder, demultiplexer 203 integrates all division units to output to one decoder.

Further, receiving device 200 may determine a decoder for use by taking into account a frame rate. There is a case where, when, for example, receiving device 200 includes two decoders whose upper limit of a frame rate which enables decoding in real time is 60 fps when a resolution is 8K4K, 8K4K encoded data of 120 fps is input. In this case, when a plane is configured by four division units, similar to the example in FIG. 12, slice segment 1 and slice segment 2 are input to decoder 204A, and slice segment 3 and slice segment 4 are input to decoders 204B. Each of decoders 204A and 204B can decode 8K2K encoded data (the resolution is a half of 8K4K) up to 120 fps in real time, and therefore these two decoders 204A and 204B perform decoding processing.

Further, even when the resolution and the frame rate are the same, if a profile or a level of an encoding method or an encoding method such as H.264 or H.265 is different, a processing amount is different. Hence, receiving device 200 may select a decoder to be used based on these pieces of information. In addition, when receiving device 200 has difficulty in decoding all items of encoded data received by way of broadcasting or communication or has difficulty in decoding all slice segments or tiles configuring an area selected by a user, receiving device 200 may automatically determine slice segments or tiles which can be decoded in a processing range of a decoder. Further, receiving device 200 may provide a user interface which the user uses to select an area to be decoded. In this case, receiving device 200 may display a warning message indicating that it is difficult to decode all areas, or may display information indicating decodable areas or a number of slice segments or tiles.

Further, the above method is applicable to a case where an MMT packet in which slice segments of the same encoded data are stored is transmitted and received by using a plurality of channels for broadcasting and communication, too.

Figure 13:
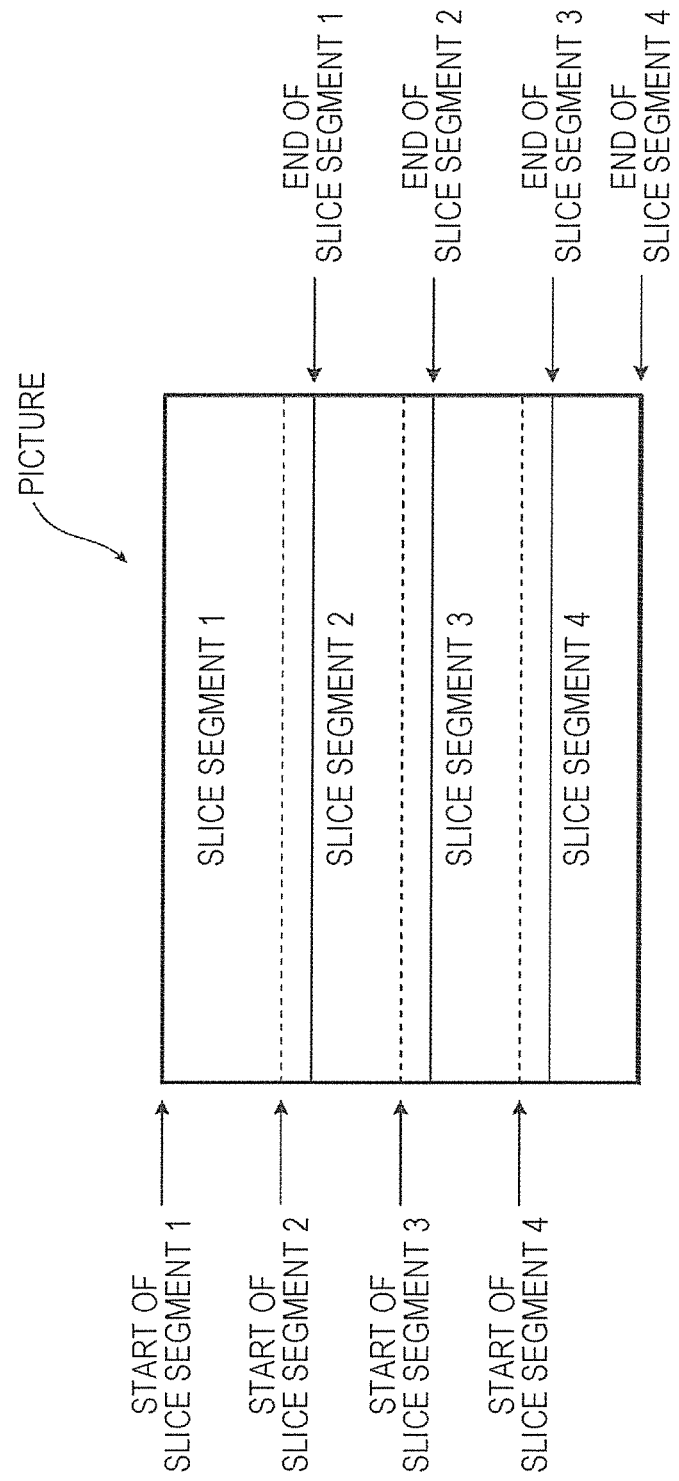
FIG. 13 is a view illustrating a picture division example according to the first exemplary embodiment.

Furthermore, transmitting device 100 may perform encoding such that an area of each slice segment overlaps to make a boundary of a division unit indistinctive. In an example illustrated in FIG. 13, an 8K4K picture is divided into slice segments 1 to 4. Each of slice segments 1 to 3 is, for example, 8K×1.1K, and slice segment 4 is 8K×1K. Further, neighboring slice segments overlap each other. By so doing, it is possible to efficiently perform motion compensation during encoding at a boundary in the case where a picture is divided into four as indicated by dotted lines, so that image quality at the boundary portions improves. Thus, it is possible to reduce deterioration of image quality at the boundary portions.

In this case, display 205 clips an 8K×1K area from an 8K×1.1K area, and integrates resulting areas. In addition, transmitting device 100 may separately transmit information which indicates whether or not slice segments overlapping each other are encoded and indicates an overlapping range, and which is included in a multiplexing layer or encoded data.

In addition, when tiles are used, too, the same method is applicable.

Figure 14:
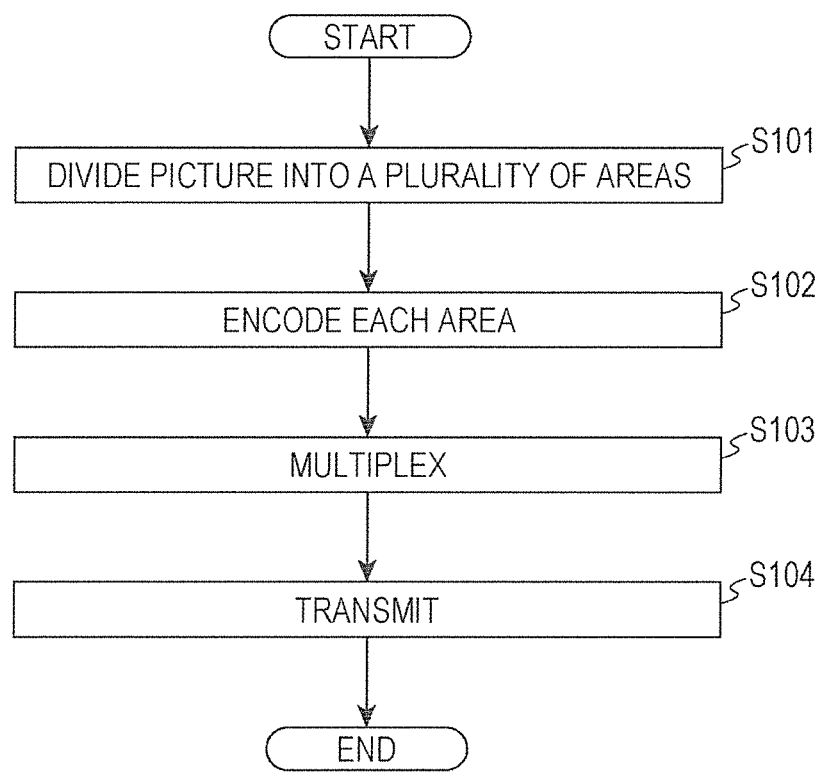
FIG. 14 is a flowchart of a transmitting method according to the first exemplary embodiment.

An operation flow of transmitting device 100 will be described. FIG. 14 is a flowchart illustrating an operation example of transmitting device 100.

First, encoder 101 divides a picture (access unit) into a plurality of slice segments (tiles) which is a plurality of areas (step S101). Next, encoder 101 generates encoded data corresponding to each of a plurality of slice segments by encoding a plurality of slice segments such that a plurality of slice segments can be independently decoded (step S102). In addition, encoder 101 may encode a plurality of slice segments by using a single encoder or by performing parallel processing in a plurality of encoders.

Next, multiplexer 102 stores a plurality of items of encoded data generated by encoder 101, in a plurality of MMT packets, and multiplexes a plurality of items of encoded data (step S103). More specifically, as illustrated in FIGS. 8 and 9, multiplexer 102 stores a plurality of items of encoded data in a plurality of MMT packets such that items of encoded data corresponding to different slice segments are not stored in one MMT packet. Further, as illustrated in FIG. 8, multiplexer 102 stores control information which is commonly used for all decoding units in a picture, in MMT packet #1 different from a plurality of MMT packets #2 to #5 in which a plurality of items of encoded data is stored. The control information includes at least one of an access unit delimiter, an SPS, a PPS and SEI.

In addition, multiplexer 102 may store the control information in the same MMT packet as one of a plurality of MMT packets in which a plurality of items of encoded data is stored. For example, as illustrated in FIG. 9, multiplexer 102 stores control information in a head MMT packet (MMT packet #1 in FIG. 9) of a plurality of MMT packets in which a plurality of items of encoded data is stored.

Lastly, transmitting device 100 transmits a plurality of MMT packets. More specifically, modulator 103 modulates data obtained by multiplexing, and transmitter 104 transmits the modulated data (step S104).

Figure 15:
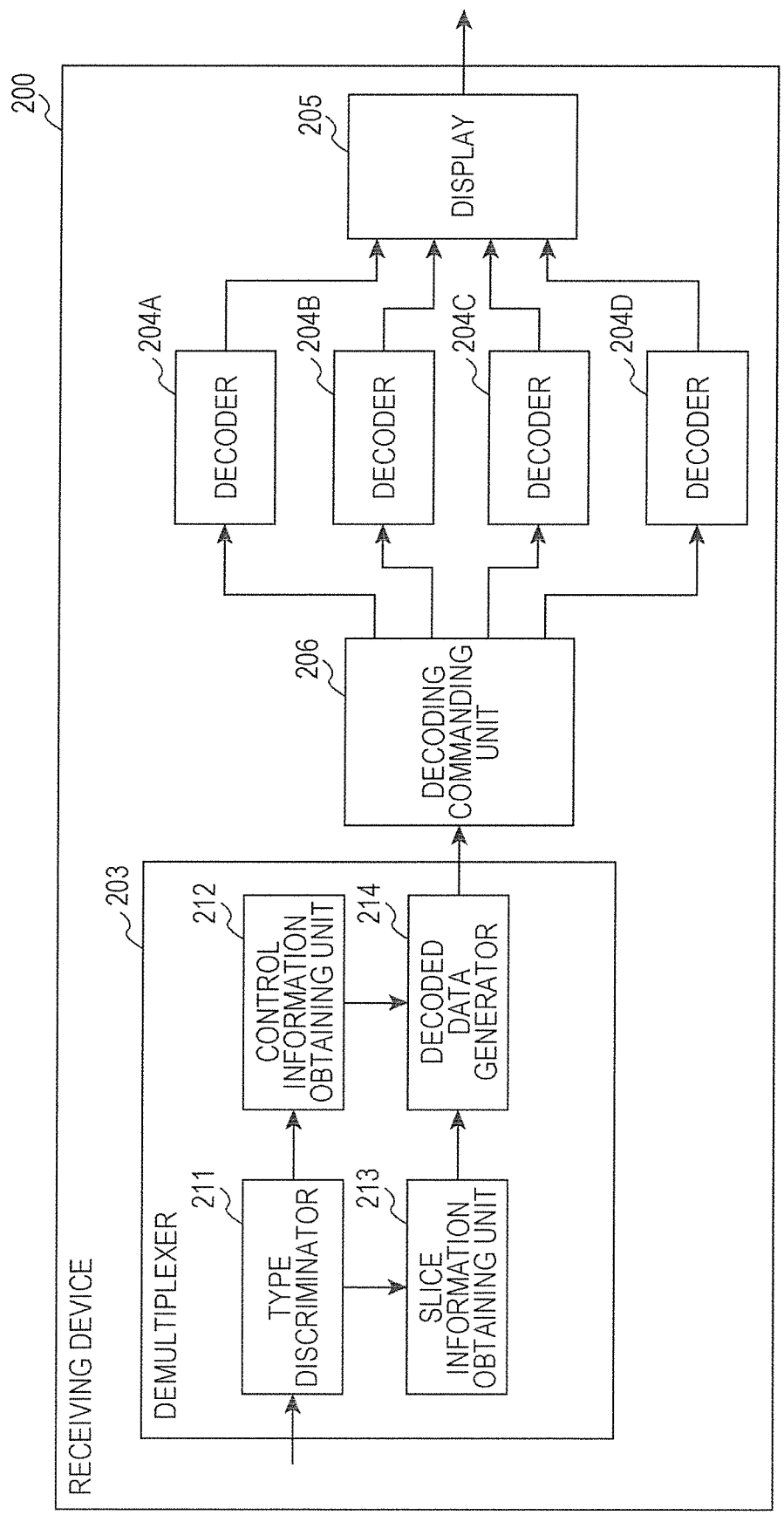
FIG. 15 is a block diagram of the receiving device according to the first exemplary embodiment.

FIG. 15 is a block diagram illustrating a configuration example of receiving device 200, and is a view illustrating a detailed configuration of demultiplexer 203 and a subsequent stage illustrated in FIG. 7. As illustrated in FIG. 15, receiving device 200 further includes decoding commanding unit 206. Further, demultiplexer 203 includes type discriminator 211, control information obtaining unit 212, slice information obtaining unit 213 and decoded data generator 214.

Figure 16:
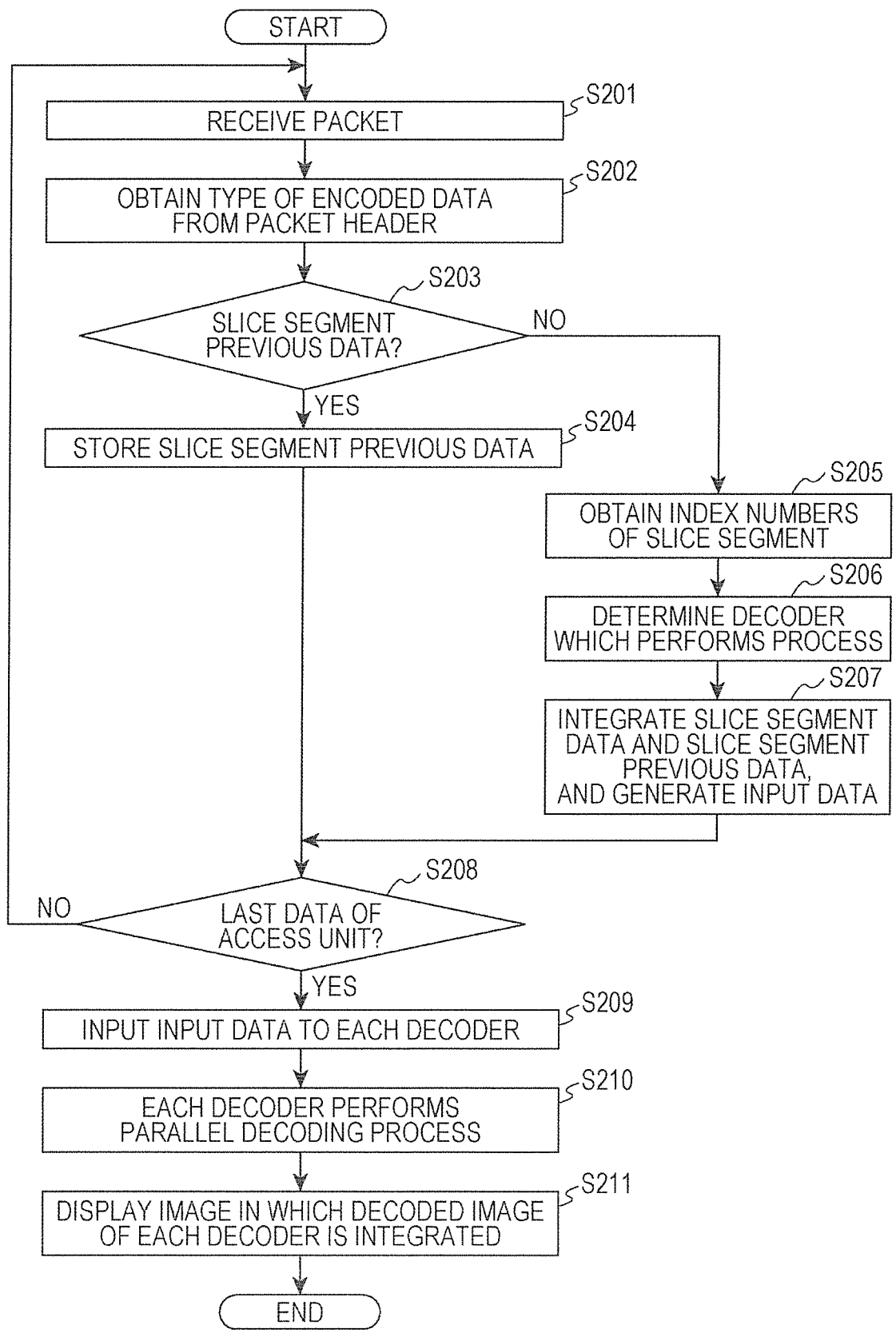
FIG. 16 is a flowchart of a receiving method according to the first exemplary embodiment.

An operation flow of receiving device 200 will be described below. FIG. 16 is a flowchart illustrating an operation example of receiving device 200. Hereinafter, an operation for one access unit will be described. When decoding processing of a plurality of access units is performed, processing of this flowchart is repeated.

First, receiving device 200 receives, for example, a plurality of packets (MMT packets) generated by transmitting device 100 (step S201).

Next, type discriminator 211 obtains a type of encoded data stored in the received packet by analyzing a header of the received packet (step S202).

Next, type discriminator 211 determines whether the data stored in the received packet is slice segment previous data or slice segment data, based on the type of the obtained encoded data (step S203).

When the data stored in the received packets is the slice segment previous data (Yes in S203), control information obtaining unit 212 obtains the slice segment previous data of a processing target access unit from a payload of the received packet, and stores the slice segment previous data in a memory (step S204).

Meanwhile, when the data stored in the received packet is the slice segment data (No in step S203), receiving device 200 determines which encoded data of an area of a plurality of areas the data stored in the received packet corresponds to by using header information of the received packets. More specifically, slice information obtaining unit 213 obtains index numbers Idx of slice segments stored in the received packet by analyzing the header of the received packet (step S205). More specifically, index numbers Idx are index numbers in Movie Fragment of an access unit (a sample according to MMT).

In addition, the processing in this step S205 may be collectively performed in step S202.

Next, decoded data generator 214 determines a decoder which decodes the slice segments (step S206). More specifically, index numbers Idx and a plurality of decoders are associated in advance, and decoded data generator 214 determines a decoder which is associated with index number Idx obtained in step S205 as the decoder which decodes the slice segments.

In addition, as described with reference to the example in FIG. 12, decoded data generator 214 may determine a decoder which decodes the slice segments based on at least one of a resolution of an access unit (picture), a method for dividing the access unit into a plurality of slice segments (tiles) and processing performances of a plurality of decoders of receiving device 200. For example, decoded data generator 214 determines an access unit dividing method based on an MMT message or identification information in a descriptor such as a TS section.

Next, decoded data generator 214 generates a plurality of items of input data (coupled data) input to a plurality of decoders by coupling control information which is included in one of a plurality of packets and is commonly used for all decoding units in a picture, and each item of a plurality of items of encoded data of a plurality of slice segments. More specifically, decoded data generator 214 obtains slice segment data from a payload of the received packet. Decoded data generator 214 generates data input to the decoder determined in step S206 by coupling the slice segment previous data stored in the memory in step S204, and the obtained slice segment data (step S207).

When data of the received packet is not last data of the access unit after step S204 or S207 (No in step S208), processing subsequent to step S201 is performed again. That is, the above processing is repeated until items of input data which correspond to a plurality of slice segments included in the access unit, and are input to a plurality of decoders 204A to 204D are generated.

In addition, a timing to receive a packet is not limited to a timing illustrated in FIG. 16, and a plurality of packets may be received in advance or successively and may be stored in the memory or the like.

Meanwhile, when the data of the received packet is the final data of the access unit (Yes in step S208), decoding commanding unit 206 outputs a plurality of items of input data generated in step S207, to corresponding decoders 204A to 204D (step S209).

Next, a plurality of decoders 204A to 204D generates a plurality of decoded images by decoding a plurality of items of input data in parallel according to a DTS of the access unit (step S210).

Lastly, display 205 generates a display image by coupling a plurality of decoded images generated by a plurality of decoders 204A to 204D, and displays the display image according to a PTS of the access unit (step S211).

In addition, receiving device 200 obtains a DTS and a PTS of the access unit by analyzing payload data of an MMT packet in which header information of an MPU or header information of Movie Fragment is stored. Further, receiving device 200 obtains the DTS and the PTS of the access unit from a header of a PES packet when TS is used for a multiplexing method. Receiving device 200 obtains the DTS and the PTS of the access unit from a header of an RTP packet when RTP is used for a multiplexing method.

Further, display 205 may perform filtering processing such as deblock filtering on each boundary of neighboring division units when integrating decoding results of a plurality of decoders. In addition, a filter process is unnecessary when a decoding result of a single decoder is displayed, and therefore display 205 may switch a process according to whether or not to perform a filter process on each boundary of decoding results of a plurality of decoders. Whether or not it is necessary to perform the filter process may be defined in advance according to whether or not division is performed. Alternatively, information indicating whether or not it is necessary to perform filtering processing may be additionally stored in a multiplexing layer. Further, information such as a filter coefficient which is necessary for the filtering processing is stored in an SPS, a PPS, SEI or a slice segment in some cases. Decoders 204A to 204D or demultiplexer 203 obtains these pieces of information by analyzing SEI, and outputs the pieces of obtained information to display 205. Display 205 performs the filtering processing by using these pieces of information. In addition, when these pieces of information are stored in the slice segment, decoders 204A to 204D desirably obtain these pieces of information.

In addition, an example where types of data stored in fragments are two types of slice segment previous data and slice segments has been described above. The data types may be three types or more. In this case, classification is performed in step S203 according to a type.

Further, transmitting device 100 may fragment slice segments when a data size of the slice segments is large to store in an MMT packet. That is, transmitting device 100 may fragment slice segment previous data and the slice segments. In this case, when an access unit and Data unit are equally set as in the example of packetization illustrated in FIG. 11, the following phenomenon takes place.

When, for example, slice segment 1 is divided into three segments, slice segment 1 is divided into three packets whose Fragment counter values are 1 to 3, and is transmitted. Further, Fragment counter values of slice segment 2 and subsequent slice segments are 4 or more, and the Fragment counter values and data stored in a payload cannot be associated. Therefore, receiving device 200 has difficulty in specifying a packet in which head data of the slice segments is stored, based on the header information of an MMT packet.

In such a case, receiving device 200 may analyze data of the payload of the MMT packet, and specify a start position of the slice segments. In this regard, formats for storing NAL units in a multiplexing layer according to H.264 or H.265 includes two types of a format which is called a byte stream format for adding a start code including a specific bit sequence immediately before an NAL unit header, and a format which is called an NAL size format for adding a field indicating an NAL unit size.

The byte stream format is used for an MPEG-2 system and RTP. The NAL size format is used for MP4, and DASH and MMT which use MP4.

When the byte stream format is used, receiving device 200 analyzes whether or not head data of a packet matches with the a start code. When the head data of the packet and the start code match, receiving device 200 can detect whether or not data included in a packet is data of a slice segment by obtaining an NAL unit type from a subsequent NAL unit header.

Meanwhile, in the case of the NAL size format, receiving device 200 has difficulty in detecting a start position of an NAL unit based on a bit sequence. Hence, receiving device 200 needs to shift a pointer by reading data according to the NAL unit size in order from a head NAL unit of an access unit to obtain a start position of the NAL units.

However, when a subsample unit size is indicated in an MPU or a header of Movie Fragment according to MMT, and the subsample corresponds to slice segment previous data or a slice segment, receiving device 200 can specify a start position of each NAL unit based on subsample size information. Hence, transmitting device 100 may give information indicating whether or not there is the subsample unit information in an MPU or Movie Fragment, to information such as MMT or MPT (Media Transfer Protocol) obtained when receiving device 200 starts receiving data.

In addition, data of the MPU is extended based on an MP4 format. MP4 includes a mode that parameter sets such as an SPS and a PPS according to H.264 or H.265 can be stored as sample data, and a mode that it is difficult to store the parameter sets. Further, information for specifying this mode is indicated as an entry name of SampleEntry. When the mode that the parameter sets can be stored is used and the parameter sets are included in a sample, receiving device 200 obtains the parameter sets according to the above method.

Meanwhile, when the mode that it is difficult to store the parameter sets is used, the parameter sets are stored as Decoder Specific Information in SampleEntry or are stored by using a parameter set stream. In this regard, the parameter set stream is not generally used, and therefore transmitting device 100 desirably stores the parameter sets in Decoder Specific Information. In this case, receiving device 200 obtains the parameter sets to which the access unit refers by analyzing SampleEntry transmitted as meta data of the MPU in the MMT packet or as meta data of Movie Fragment.

When the parameter sets are stored as sample data, receiving device 200 can obtain the parameter sets which are necessary for decoding by referring to the sample data without referring to SampleEntry. In this case, transmitting device 100 may not store the parameter sets in SampleEntry. By so doing, transmitting device 100 can use identical SampleEntry in different MPUs, so that it is possible to reduce a process load of transmitting device 100 during generation of MPUs. Further, it is possible to provide an advantage that receiving device 200 does not need to refer to the parameter sets in SampleEntry.

Furthermore, transmitting device 100 may store one default parameter set in SampleEntry, and store parameter sets to which the access unit refers, in sample data. According to conventional MP4, the parameter sets are generally stored in SampleEntry, and therefore when there are no parameter sets in SampleEntry, a receiving device which stops playback may exist. By using the above method, it is possible to solve this phenomenon.

Further, transmitting device 100 may store parameter sets in sample data when parameter sets different from default parameter sets are used.

In addition, both of the modes enable parameter sets to be stored in SampleEntry, and therefore transmitting device 100 may store the parameter sets in VisualSampleEntry and receiving device 200 may obtain parameter sets from VisualSampleEntry.

In addition, according to MMT standards, MP4 header information such as Moov and Moof is transmitted as MPU meta data or movie fragment data. However, transmitting device 100 may not necessarily transmit MPU meta data and movie fragment meta data. Further, receiving device 200 can also determine whether or not an SPS and a PPS are stored in sample data based on whether or not service according to ARIB (Association of Radio Industries and Businesses) standards, an asset type or an MPU meta is transmitted.

Figure 17:
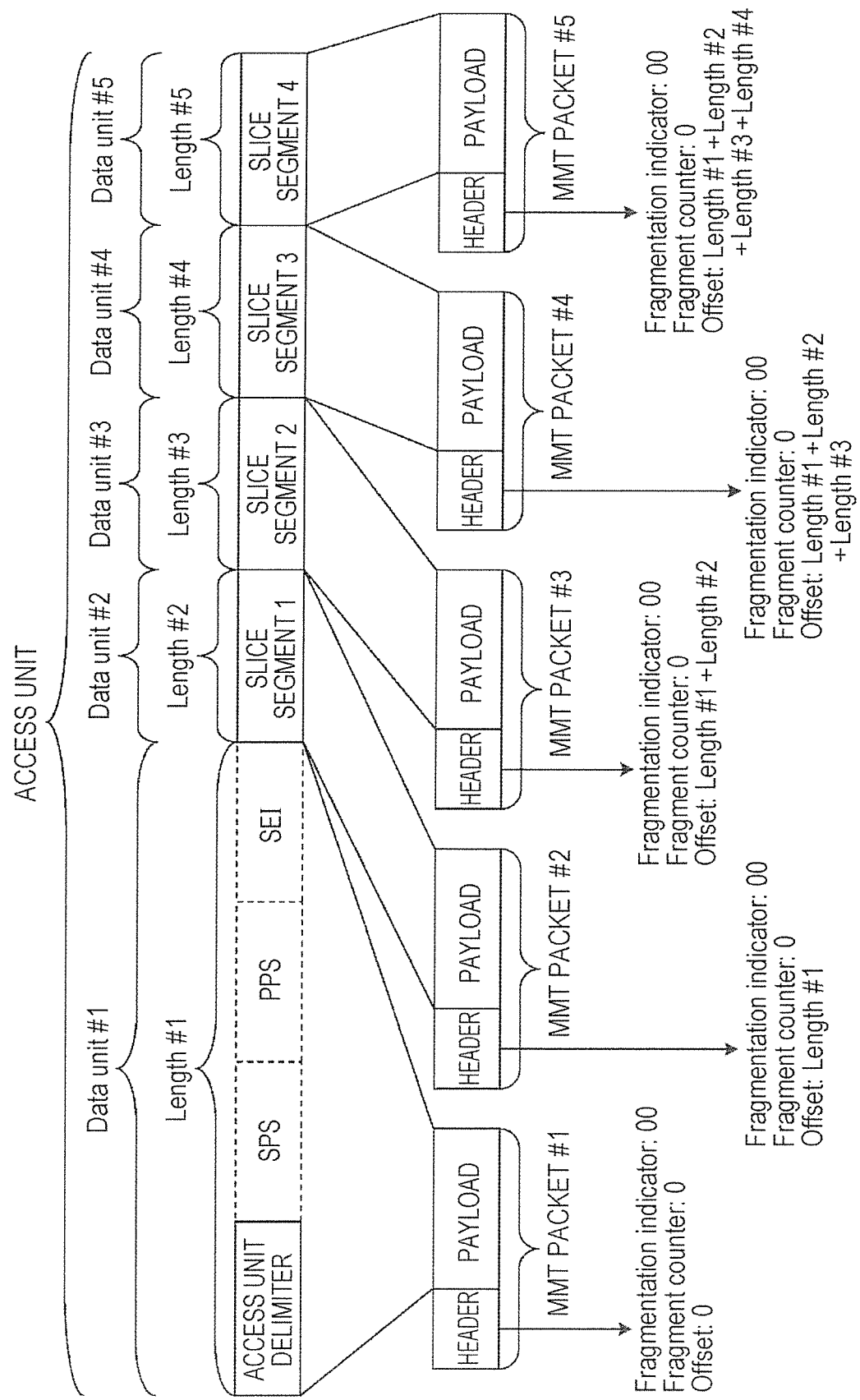
FIG. 17 is a view illustrating an example of the MMT packet and the header information according to the first exemplary embodiment.

FIG. 17 is a view illustrating an example where slice segment previous data and each slice segment are set to different Data units, respectively.

In an example illustrated in FIG. 17, data sizes of slice segment previous data and slice segment 1 to slice segment 4 are Length #1 to Length #5, respectively. Each field value of Fragmentation indicator, Fragment counter and Offset included in a header of an MMT packet are illustrated in FIG. 17.

In this regard, Offset is offset information indicating a bit length (offset) from a head of encoded data of a sample (an access unit or a picture) to which payload data belongs, to a head byte of the payload data (encoded data) included in the MMT packet. In addition, that a value of Fragment counter starts from a value obtained by subtracting 1 from a total number of fragments will be described; however, the value of Fragment counter may start from another value.

Figure 18:
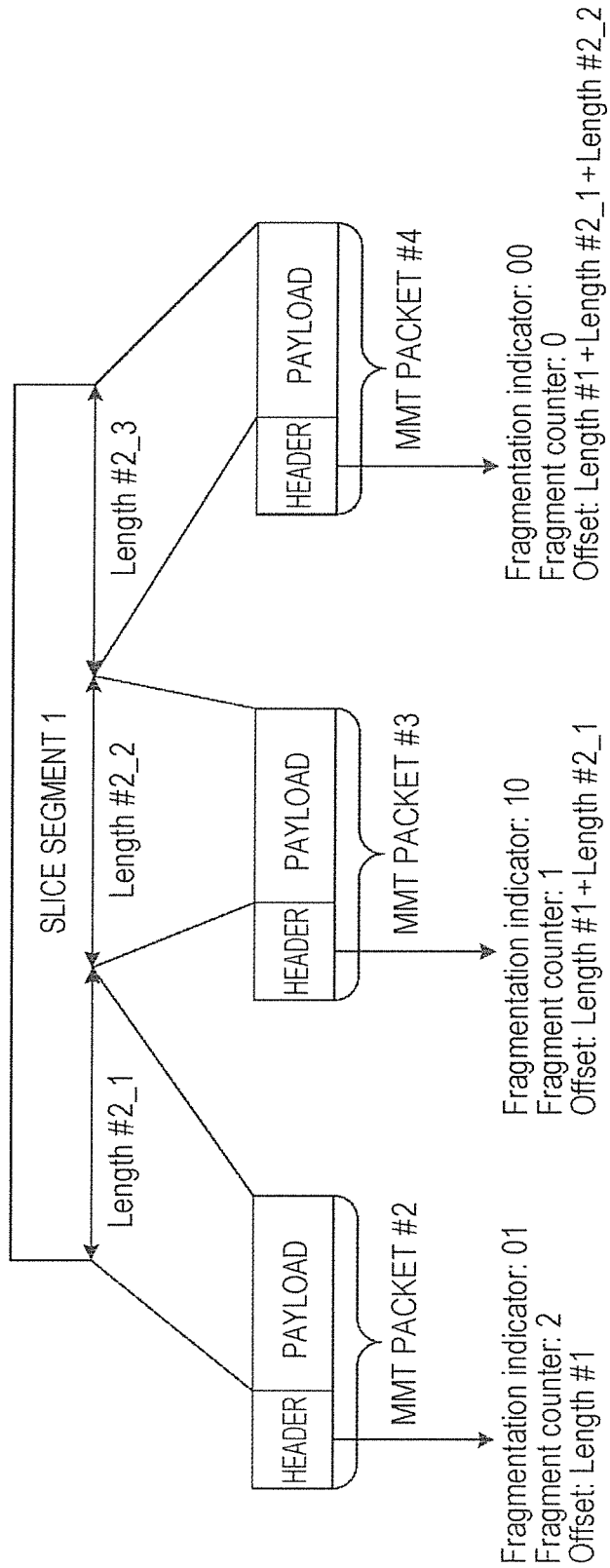
FIG. 18 is a view illustrating an example of the MMT packet and the header information according to the first exemplary embodiment.

FIG. 18 is a view illustrating an example where Data unit is fragmented. In the example illustrated in FIG. 18, slice segment 1 is divided into three fragments, and the fragments are stored in MMT packet #2 to MMT packet #4, respectively. In this case, too, when data sizes of the fragments are Length #2_1 to Length #2_3, each field value is as illustrated in FIG. 18.

Thus, when a data unit such as a slice segment is set to Data unit, a head of an access unit and a head of a slice segment can be determined as follows based on a field value of an MMT packet header.

A head of a payload in a packet in a packet whose Offset value is 0 is a head of an access unit.

A head of a payload of a packet whose Offset value takes a value different from 0 and whose Fragmentation indicator value takes 00 or 01 is a head of a slice segment.

Further, when Data unit is not fragmented and packet loss does not occur, either, receiving device 200 can specify index numbers of slice segments to be stored in an MMT packet based on the number of slice segments obtained after the head of the access unit is detected.

Furthermore, even when Data unit of the slice segment previous data is fragmented, receiving device 200 can detect the heads of the access unit and the slice segment likewise.

Still further, even when packet loss occurs or even when an SPS, a PPS and SEI included in slice segment previous data are set to different Data units, receiving device 200 can specify a start position of a slice segment or a tile in a picture (access unit) by specifying an MMT packet in which head data of a slice segment is stored based on an analysis result of an MMT header, and then analyzing a header of the slice segment. A processing amount of slice header analysis is small, and a processing load does not need to be taken into account.

Thus, each item of a plurality of items encoded data of a plurality of slice segments is associated with a basic data unit (Data unit) which is a unit of data to be stored in one or more packets on a one-to-one basis. Further, each item of a plurality of items of encoded data is stored in one or more MMT packets.

Header information of each MMT packet includes Fragmentation indicator (identification information) and Offset (offset information)

Receiving device 200 determines as a head of encoded data of each slice segment a head of payload data included in a packet including header information including Fragmentation indicator whose value is 00 or 01. More specifically, receiving device 200 determines as a head of encoded data of each slice segment a head of payload data included in a packet including header information including offset whose value is not 0 and Fragmentation indicator whose value is 00 or 01.

Further, in an example in FIG. 17, a head of Data unit is one of a head of an access unit and a head of a slice segment, and a value of Fragmentation indicator is 00 or 01. Furthermore, receiving device 200 can also detect a head of an access unit or a head of slice segments without by referring to Offset, by referring to an NAL unit type and by determining whether a head of Data Unit is an access unit delimiter or a slice segment.

Thus, transmitting device 100 performs packetization such that a head of NAL units starts from a head of a payload of an MMT packet. Consequently, even when slice segment previous data is divided into a plurality of Data units, receiving device 200 can detect the access unit or the head of the slice segments by analyzing Fragmentation indicator and the NAL unit header. An NAL unit type is in a head byte of an NAL unit header. Hence, when analyzing a header portion of an MMT packet, receiving device 200 can obtain an NAL unit type by additionally analyzing data of one byte.

In the case of an audio, receiving device 200 only needs to detect a head of an access unit, and perform determination based on whether a value of Fragmentation indicator is 00 or 01.

Further, as described above, when encoded data encoded to enable division and decoding is stored in a PES packet according to MPEG-2 TS, transmitting device 100 can use a data alignment descriptor. An example of a method for storing encoded data in a PES packet will be described below in detail.

According to, for example, HEVC, transmitting device 100 can indicate which one of an access unit, a slice segment and a tile data to be stored in a PES packet corresponds to by using the data alignment descriptor. Alignment types according to HEVC are defined as follows.

Alignment type=8 indicates a slice segment of HEVC. Alignment type=9 indicates a slice segment or an access unit of HEVC. Alignment type=12 indicates a slice segment or a tile of HEVC.

Consequently, transmitting device 100 can indicate which one of the slice segment and slice segment previous data the data of the PES packet corresponds to by, for example, using type 9. Instead of slice segments, a type indicating a slice is additionally defined, so that transmitting device 100 may use a type indicating a slice instead of a slice segment.

Further, a DTS and a PTS included in a header of the PES packet are set in a PES packet including head data of an access unit. Consequently, when the type is 9 and the PES packet includes a field of a DTS or a PTS, receiving device 200 can determine that the entire access unit or a division unit of a head of the access unit is stored in the PES packet.

Further, transmitting device 100 may use a field such as transport_priority indicating a priority of a TS packet in which a PES packet including head data of an access unit is stored to enable receiving device 200 to distinguish data included in a packet. Furthermore, receiving device 200 may determine data included in a packet by analyzing whether or not a payload of the PES packet is an access unit delimiter. Still further, data_alignment_indicator of a PES packet header indicates whether or not data is stored in the PES packet according to these types. It is guaranteed that, when 1 is set to this flag (data_alignment_indicator), data stored in the PES packet conforms to the type indicated in the data alignment descriptor.

Further, transmitting device 100 may use the data alignment descriptor when performing PES packetization in division decodable units such as slice segments. Consequently, receiving device 200 can determine that encoded data is packetized as a PES packet in division decodable units when there is the data alignment descriptor, and can determine that the encoded data is packetized as a PES packet in units of access units when there is no data alignment descriptor. In addition, when data_alignment_indicator is set to 1, and there is no data alignment descriptor, the MPEG-2 TS standards define that a unit of PES packetization unit is an access unit.

Receiving device 200 can determine that encoded data is packetized as a PES packet in division decodable units when a PMT (program Map Table) includes the data alignment descriptor, and generate data input to each decoder based on packetized units. Further, when the PMT does not include the data alignment descriptor and it is determined that it is necessary to decode encoded data in parallel based on program information or information of another descriptor, receiving device 200 generates data input to each decoder by analyzing a slice header of a slice segment. Furthermore, when a single decoder can decode encoded data, receiving device 200 causes the decoder to decode data of the entire access unit. In addition, when information indicating that encoded data is configured by division decodable units such as slice segments or tiles is additionally indicated by the descriptor of the PMT, receiving device 200 may determine whether or not encoded data can be decoded in parallel based on an analysis result of the descriptor.

Further, a DTS and a PTS included in a header of the PES packet are set in a PES packet including head data of an access unit. Therefore, when an access unit is divided and packetized as a PES packet, second and subsequent PES packets do not include information indicating the DTS and the PTS of the access unit. Hence, when decoding processing is performed in parallel, each of decoders 204A to 204D and the display 205 use the DTS and the PTS stored in the header of the PES packet including head data of the access unit.

Second Exemplary Embodiment

A method for storing data of an NAL size format in an MP4 format-based MPU according to MMT will be described in the second exemplary embodiment. In addition, the method for storing data in an MPU used in MMT will be described as an example below. Such a storage method is applicable to the same MP4 format-based DASH, too.

[Storage Method for MPU]

According to an MP4 format, a plurality of access units is collectively stored in one MP4 file. Data of each medium is stored in one MP4 file in an MPU used for MMT, and data can include an arbitrary number of access units. The MPU is a unit which can be decoded alone, and therefore access units are stored in the MPU in GOP (Group Of Picture) units.

Figure 19:
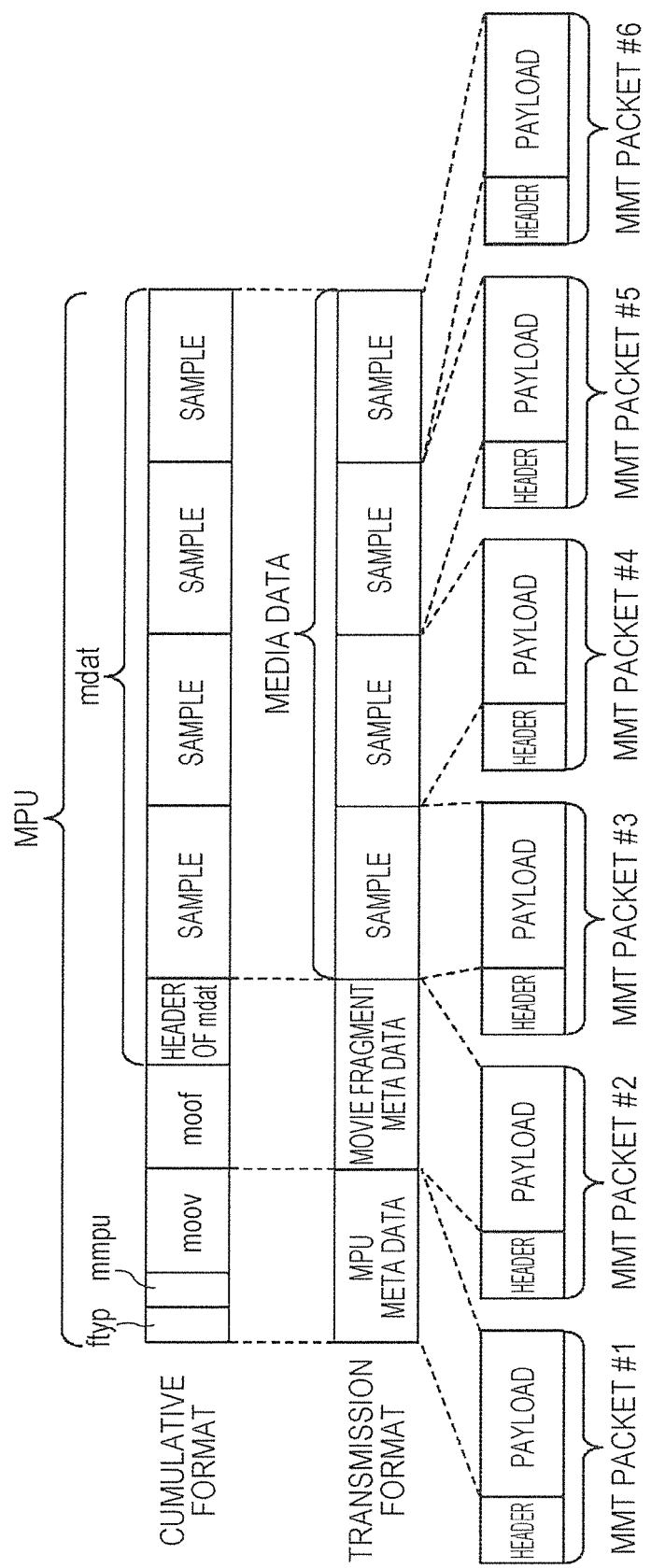
FIG. 19 is a view illustrating a configuration of an MPU (Media Processing Unit)

FIG. 19 is a view illustrating a configuration of an MPU. An MPU head is ftyp, mmpu and moov which are collectively defined as MPU meta data. Initialization information which is common between files, and an MMT hint track are stored in moov.

Further, information (Step Sample_duration, sample_size, and sample_composition_time_offset) which makes it possible to specify initialization information and each size of each sample or each subsample, and a presentation time (PTS) and a decoding time (DTS), and data_offset indicating a data position are stored in moof.

Further, a plurality of access unit is stored as each sample in mdat (mdat box). Data except for samples among moof and mdat is defined as movie fragment meta data (described as MF meta data below), and sample data of mdat is defined as media data.

Figure 20:
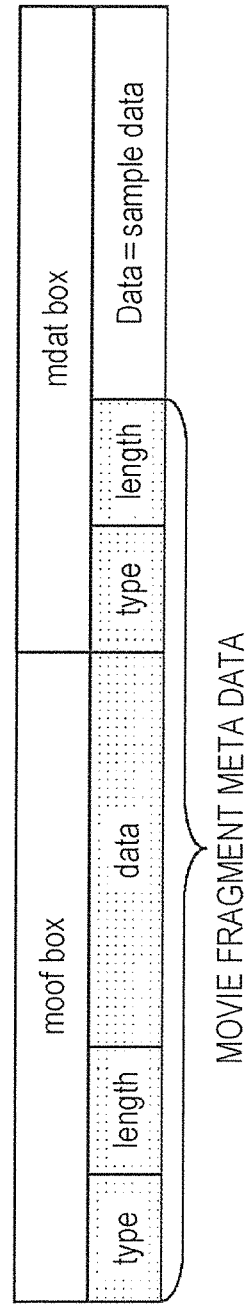
FIG. 20 is a view illustrating a configuration of MF (Movie Fragment) meta data.

FIG. 20 is a view illustrating a configuration of MF meta data. As illustrated in FIG. 20, the MF meta data more specifically includes type, length and data of moof box (moof), and type and length of mdat box (mdat).

When an access unit is stored in MP4 data, there are a mode that parameter sets such as an SPS and a PPS according to H.264 or H.265 can be stored as sample data and a mode that it is difficult to store the parameter sets.

In this regard, in the mode that it is difficulty to store the parameter sets, the parameter sets are stored in Decoder Specific Information of SampleEntry in moov. Further, in the mode that the parameter sets can be stored, the parameter sets are included in a sample.

Each of MPU meta data, MF meta data and media data is stored in an MMT payload, and a fragment type (FT) is stored as an identifier which enables identification of these items of data in a header of the MMT payload. FT=0 indicates MPU meta data, FT=1 indicates MF meta data and FT=2 indicates media data.

In addition, FIG. 19 illustrates an example where MPU meta data units and MF meta data units are stored as data units in an MMT payload. However, units such as ftyp, mmpu, moov and moof may be stored as data units in the MMT payload in units of data units. Similarly, FIG. 19 illustrates an example where sample units are stored as data units in the MMT payload. However, sample units and units of NAL units may configure data units, and these data units may be stored in the MMT payload as units of data units. Units obtained by further fragmenting such data units may be stored in the MMT payload.

[Conventional Transmitting Method, and Phenomenon for which Countermeasure Needs to be Taken]

Conventionally, when a plurality of access units is encapsulated in an MP4 format, and at a point of time at which all samples to be stored in MP4 are ready, moov and moof are created.

When the MP4 format is transmitted in real time by way of broadcasting and when, for example, samples to be stored in one MP4 file are GOP units, time samples of the GOP units are accumulated and then moov and moof are created, and therefore the encapsulation causes a delay. Such encapsulation at the transmission side increases an End-to-End delay by a GOP unit time. Thus, it is difficult to provide service in real time, and service for viewers deteriorates when, for example, live content is transmitted.

Figure 21:
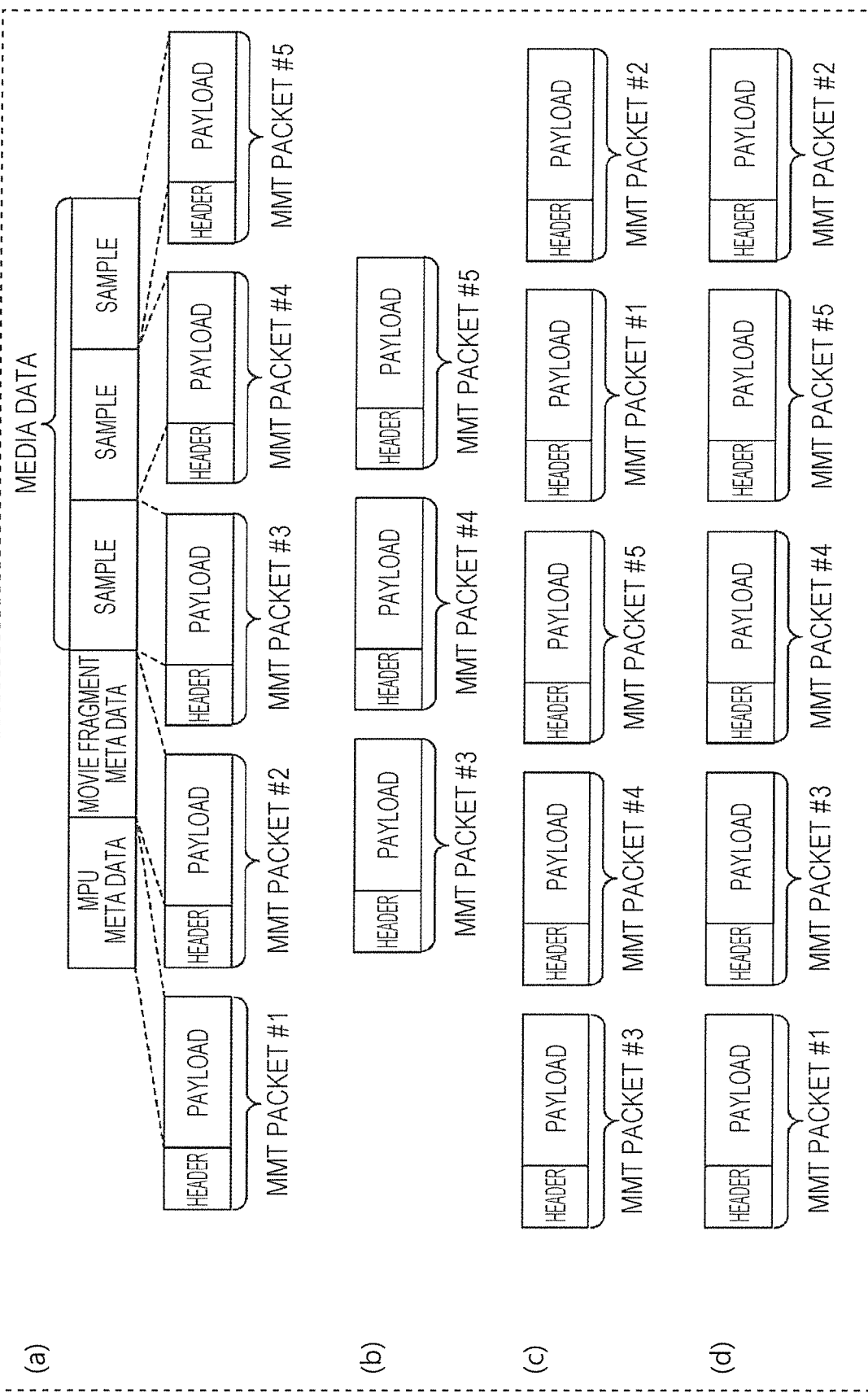
FIG. 21 is a view for explaining a data transmission order.

FIG. 21 are views for explaining a data transmission order. When MMT is applied to broadcasting, and when MMT packets are transmitted in an MPU configuration order (transmitted in order of MMT packets #1, #2, #3, #4, and #5) as illustrated in FIG. 21(a), encapsulation causes a delay during transmission of the MMT packets.

A method for not transmitting MPU header information such as MPU meta data and MF meta data (not transmitting packets #1 and #2 and transmitting packets #3 to #6 in order) as illustrated in FIG. 21(b) to prevent this delay caused by encapsulation has been proposed. Further, as illustrated in FIG. 20(c), a method for transmitting media data in advance without waiting for creation of MPU header information, and transmitting the MPU header information (transmitting packets #3 to #6, #1 and #2 in order) after transmitting the media data may be used.

The receiving device performs decoding without using the MPU header information when MPU header information is not transmitted, or the receiving device waits for the MPU header information to be obtained, and performs decoding when the MPU header information is transmitted subsequent to media data.

However, it is not guaranteed that conventional MP4-compliant receiving devices perform decoding without using MPU header information. Further, when the receiving device uses a conventional transmitting method to perform decoding without using an MPU header by another process, the decoding process becomes complicated, and it is highly likely that it is difficult to perform decoding in real time. Furthermore, when the receiving device waits for MPU header information to be obtained, and performs decoding, the receiving device needs to buffer media data until the receiving device obtains the header information. However, a buffer model is not defined, and decoding has not been guaranteed.

Hence, a transmitting device according to the second exemplary embodiment transmits MPU meta data prior to media data by storing common information in the MPU meta data as illustrated in FIG. 20(d). Further, the transmitting device according to the second exemplary embodiment transmits, subsequent to media data, MF meta data which is generated with a delay. Thus, there is provided the transmitting method or the receiving method which can guarantee that media data is decoded.

A receiving method in a case where each transmitting method is used in FIGS. 21(a) to (d) will be described below.

According to each transmitting method illustrated in FIG. 21, first, MPU data is configured in order by data MPU meta data, MF meta data and media data.

When the transmitting device transmits items of data in order of the MPU meta data, the MF meta data and the media data as illustrated in FIG. 21(a) after configuring the MPU data, the receiving device can perform decoding according to one of following methods (A-1) and (A-2).

(A-1) The receiving device obtains the MPU header information (the MPU meta data and the MF meta data), and then decodes the media data by using the MPU header information.

(A-2) The receiving device decodes the media data without using the MPU header information.

According to both of the methods, encapsulation causes a delay at the transmission side.

However, there is an advantage that the receiving device does not need to buffer the media data to obtain an MPU header When the receiving device does not perform buffering, a memory for the buffering does not need to be mounted, and, moreover, a buffering delay does not occur. Further, method (A-1) is applicable to conventional receiving devices, too, since decoding is performed by using MPU header information.

When the transmitting device transmits the media data as illustrated in FIG. 21(b), the receiving device can perform decoding according to following method (B-1).

(B-1) The receiving device decodes the media data without using the MPU header information.

Further, although not illustrated, when MPU meta data is transmitted before media data in FIG. 21(b) is transmitted, it is possible to perform decoding according to following method (B-2).

(B-2) The receiving device decodes media data by using MPU meta data.

Both of above methods (B-1) and (B-2) have an advantage that encapsulation does not cause a delay at the transmission side and it is not necessary to buffer media data to obtain an MPU header. However, according to both of methods (B-1) and (B-2), decoding is not performed by using MPU header information, and therefore it may be necessary to perform another processing for decoding.

When the transmitting device transmits items of data in order of media data, MPU meta data, and MF meta data as illustrated in FIG. 21(c), the receiving device can perform decoding according to one of following methods (C-1) and (C-2).

(C-1) The receiving device obtains the MPU header information (the MPU meta data and the MF meta data), and then decodes the media data.

(C-2) The receiving device decodes the media data without using the MPU header information.

However, when above method (C-1) is used, it is necessary to buffer the media data to obtain MPU header information. By contrast with this, when above method (C-2) is used, it is not necessary to perform buffering to obtain the MPU header information.

Further, according to both of above methods (C-1) and (C-2), encapsulation does not cause a delay at the transmission side. Furthermore, according to above (D-2) method, the MPU header information is not used, and therefore it may be necessary to perform another process.

When the transmitting device transmits items of data in order of MPU meta data, media data and MF meta data as illustrated in FIG. 21(d), the receiving device can perform decoding according to one of following methods (D-1) and (D-2).

(D-1) The receiving device obtains MPU meta data, then further obtains MF meta data and subsequently decodes media data.

(D-2) The receiving device obtains the MPU meta data, and then decodes media data without using the MF meta data.

While, when above method (D-1) is used, it is necessary to buffer the media data to obtain the MF meta data, it is not necessary to perform buffering to obtain the MF meta data in the case of above method (D-2).

According to above (D-2) method, decoding is not performed by using MF meta data, and therefore it may be necessary to perform another process.

As described above, there is an advantage that, when it is possible to perform decoding by using MPU meta data and MF meta data, even conventional MP4 receiving devices can perform decoding.

In addition, in FIG. 21, the MPU data is configured in order of the MPU meta data, the MF meta data and the media data, and, in moof, position information (offset) of each sample or each subsample is defined in moof based on this configuration. Further, the MF meta data includes data (a size or a type of box), too, other than media data in mdat box.

Hence, when the receiving device specifies the media data based on the MF meta data, the receiving device reconfigures data in an MPU data configuration order irrespectively of a data transmission order, and then performs decoding by using the moov of the MPU meta data or moof of the MF meta data.

In addition, in FIG. 21, the MPU data is configured in order by the MPU meta data, the MF meta data and the media data. However, the MPU data may be configured in a different order from that in FIG. 21, and position information (offset) may be defined.

For example, MPU data may be configured in order of MPU meta data, media data and MF meta data, and negative position information (offset) may be indicated in MF meta data. In this case, too, irrespectively of a data transmission order, the receiving device reconfigures items of data in an MPU data configuration order at the transmission side, and then performs decoding by using moov or moof.

In addition, the transmitting device may signal information indicating an MPU data configuration order, and the receiving device may reconfigure data based on the signaled information.

As described above, as illustrated in FIG. 21(d), the receiving device receives the packetized MPU meta data, the packetized media data (sample data) and the packetized MF meta data in order. In this regard, the MPU meta data is an example of first meta data, and the MF meta data is an example of second meta data.

Next, the receiving device reconfigures the MPU data (MP4 format file) including the received MPU meta data, the received MF meta data and the received sample data. Further, the receiving device decodes the sample data included in the reconfigured MPU data by using the MPU meta data and the MF meta data. The MF meta data is meta data including data (e.g., length stored in mbox) which can be generated after the transmission side generates sample data.

In addition, more specifically, operations of the above receiving device are performed by each component which composes the receiving device. For example, the receiving device includes a receiver which receives the data, a reconfiguring unit which reconfigures the MPU data, and a decoder which decodes the MPU data. In addition, each of the receiver, the generator and the decoder is realized by a microcomputer, a processor or a dedicated circuit.

[Method for Performing Decoding without Using Header Information]

Next, a method for performing decoding without using header information will be described. Hereinafter, a method for performing decoding without using header information in the receiving device irrespectively of whether or not the transmission side transmits the header information will be described. That is, this method is applicable to a case where each transmitting method described with reference to FIG. 21 are used, too. In this regard, part of decoding methods is applicable in the case of a specific transmitting method.

Figure 22:
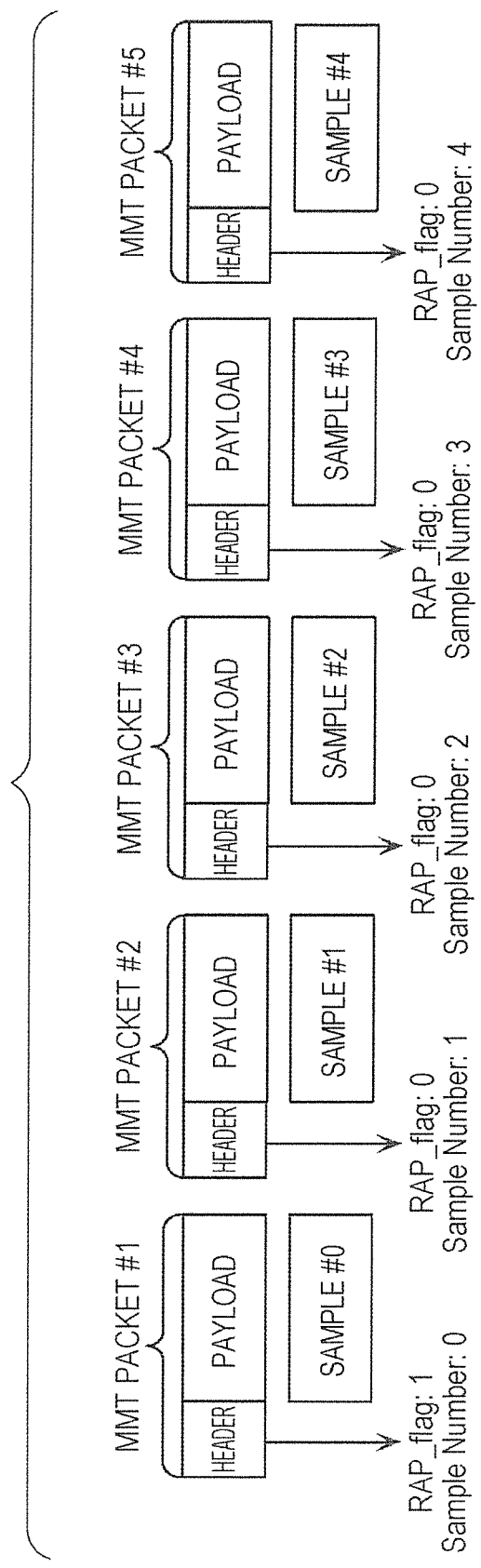
FIG. 22 is a view illustrating an example of a method for performing decoding without using header information.

FIG. 22 is a view illustrating an example of a method for performing decoding without using header information. FIG. 22 illustrates MMT payloads and MMT packets including media data, and does not illustrate MMT payloads and MMT packets including MPU meta data and MF meta data. Further, as described below with reference to FIG. 22, media data belonging to the same MPU is continuously transferred. Furthermore, a case where each sample is stored as media data in each payload will be described as an example. In the following description of FIG. 22, an NAL unit may be stored or fragmented NAL units may be stored.

The receiving device needs to first obtain initialization information necessary for decoding to decode media data. Further, when a medium is a video, the receiving device needs to obtain initialization information of each sample, specify a start position of an MPU which is a random access unit and obtain start positions of a sample and an NAL unit. Furthermore, the receiving device needs to specify a decoding time (DTS) and a presentation time (PTS) of each sample.

Hence, the receiving device can perform decoding by, for example, using the following method without using header information. In addition, when units of NAL units or units obtained by fragmenting NAL units are stored in a payload, a "sample" in the following description needs to be read as "an NAL unit of a sample".

<Random Access (=To Specify Head Sample of MPU)>

When header information is not transmitted, there are following method 1 and method 2 to enable the receiving device to specify a head sample of an MPU. In addition, when header information is transmitted, method 3 can be used.

[Method 1] The receiving device obtains a sample included in an MMT packet of 'RAP_flag=1' in an MMT packet header.

The receiving device obtains a sample included in an MMT packet of 'RAP_flag=1' in an MMT packet header.

[Method 2] The receiving device obtains a sample of 'sample number=0' in an MMT payload header.

[Method 3] When at least one of MPU meta data and MF meta data is transmitted at least before or after media data, the receiving device obtains a sample included in an MMT payload whose fragment type (FT) in the MMT payload header has been switched to media data.

In addition, according to method 1 and method 2, when there is a mix of a plurality of samples belonging to different MPUs in one payload, it is not possible to determine which NAL unit is a random access point (RAP_flag=1 or sample number=0). Hence, it is necessary to set a limitation that samples of different MPUs are not mixed in one payload, or a limitation that, when samples of different MPUs are mixed in one payload, and a last (or first) sample is a random access point, RAP_flag is 1.

Further, the receiving device needs to shift a pointer by reading data according to the NAL unit size in order from a head NAL unit of a sample to obtain a start position of the NAL unit.

When data is fragmented, the receiving device can specify a data unit by referring to fragment_indicator or fragment_number.

<Determination of DTS of Sample>

A method for determining a DTS of a sample includes following method 1 and method 2.

[Method 1] The receiving device determines a DTS of a head sample based on a predicted structure. In this regard, according to this method, it is necessary to analyze encoded data and it is difficult to decode the encoded data in real time, and therefore next method 2 is desirable.

[Method 2] The receiving device additionally transmits a DTS of a head sample, and obtains a DTS of the transmitted head sample. Transmitting methods for transmitting a DTS of a head sample include, for example, a method for transmitting a DTS of an MPU head sample by using MMT-SI (MMT-Signaling Information), and a method for transmitting a DTS of each sample by using an MMT packet header extended area. In addition, the DTS may be an absolute value or a relative value with respect to a PTS. Further, signaling whether or not a DTS of the head sample is included in the transmission side may be performed.

In addition, according to both of method 1 and method 2, DTSs of subsequent samples are calculated as a fixed frame rate.

Methods for storing a DTS of each sample in a packet header include a method for using an extended area and, in addition, a method for storing a DTS of a sample included in an MMT packet, in an NTP (Network Time Protocol) time stamp field of 32 bits in an MMT packet header. When it is difficult to express the DTS by a number of bits (32 bits) of one packet header, the DTS may be expressed by using a plurality of packet headers. Further, the DTS may be expressed by a combination of an NTP time stamp field and an extended area of a packet header. When DTS information is not included, a known value (e.g. ALL0) is used.

<Determination of PTS of Sample>

The receiving device obtains a PTS of a head sample from an MPU time stamp descriptor of each asset included in an MPU. The receiving device calculates PTSs of subsequent samples from parameters indicating a sample display order such as a POC (Proof Of Concept) assuming a fixed frame rate. Thus, to calculate a DTS and a PTS without using header information, it is necessary to perform transmission at a fixed frame rate.

Further, when MF meta data is transmitted, the receiving device can calculate absolute values of a DTS and a PTS based on relative time information of the DTS or the PTS of the head sample indicated in the MF meta data, and an absolute value of a time stamp of an MPU head sample indicated in an MPU time stamp descriptor.

In addition, when a DTS and a PTS are calculated by analyzing encoded data, the receiving device may calculate the DTS and the PTS by using SEI information included in an access unit.

<Initialization Information (Parameter Sets)>

[In the Case of Video]

In the case of a video, parameter sets are stored in sample data. Further, it is guaranteed that, when MPU meta data and MF meta data are not transmitted, it is possible to obtain necessary parameter sets for decoding by referring to sample data.

Further, as illustrated in FIG. 21(a) and FIG. 21(d), it may be defined that, when MPU meta data is transmitted prior to media data, parameter sets are not stored in SampleEntry. In this case, the receiving device refers to the parameter sets in a sample without referring to the parameter sets of SampleEntry.

Further, when MPU meta data is transmitted prior to media data, parameter sets which are common between MPUs and default parameter sets are stored in SampleEntry, and the receiving device may refer to parameter sets of Sample Entry and parameter sets in a sample. The parameter sets are stored in SampleEntry, so that even conventional receiving devices has difficulty in performing decoding when there are no parameter sets in SampleEntry.

[In the Case of Audio]

In the case of an audio, an LATM (Low Overhead Audio Transport Multiplex) header is necessary for decoding, and, according to MP4, an LATM header needs to be included in a sample entry. However, when header information is not transmitted, it is difficult for the receiving device to obtain an LATM header, and therefore the LATM header is additionally included in control information such as SI. In addition, an LATM header may be included in a message, a table or a descriptor. In addition, an LATM header is included in a sample in some cases.

The receiving device obtains the LATM header from the SI before starting decoding, and starts decoding an audio. Alternatively, as illustrated in FIG. 21(a) and FIG. 21(d), when MPU meta data is transmitted prior to media data, the receiving device can receive an LATM header prior to the media data. Consequently, when the MPU meta data is transmitted prior to the media data, it is possible to perform decoding even by using conventional receiving devices.

<Others>

A transmission order or a transmission order type may be notified as an MMT packet header, a payload header, an MPT or control information such as another table, a message or a descriptor. In addition, the transmission order type described herein is, for example, four types of transmission orders in FIGS. 21(a) to 21(d), and needs to be stored in a location from which each identifier for identifying each type can be obtained before decoding starts.

Further, for the transmission order types, different types between an audio and a video may be used, or common types between an audio and a video may be used. More specifically, for example, an audio is transmitted in order of MPU meta data, MF meta data, and media data as illustrated in FIG. 21(a), and a video may be transmitted in order of MPU meta data, media data and MF meta data as illustrated in FIG. 21(d).

According to the above-described method, the receiving device can perform decoding without using header information. Further, when MPU meta data is transmitted prior to media data (FIG. 21(a) and FIG. 21(d)), even conventional receiving devices can perform decoding.

For example, when MF meta data is transmitted subsequent to media data (FIG. 21(d)), encapsulation does not cause a delay and even conventional receiving devices can perform decoding.

[Configuration and Operation of Transmitting Device]

Figure 23:
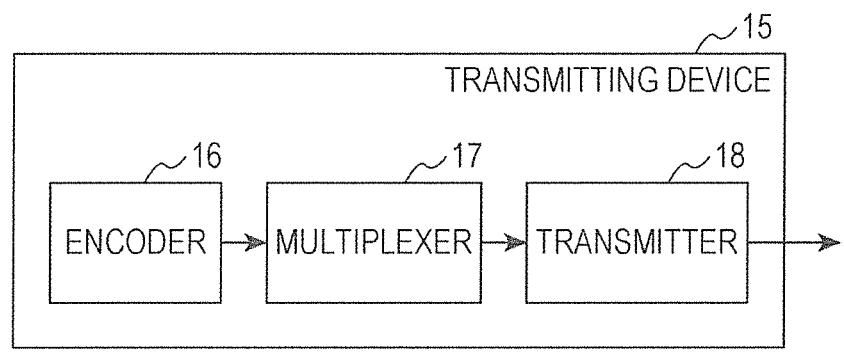
FIG. 23 is a block diagram of a transmitting device according to a second exemplary embodiment.
Figure 24:
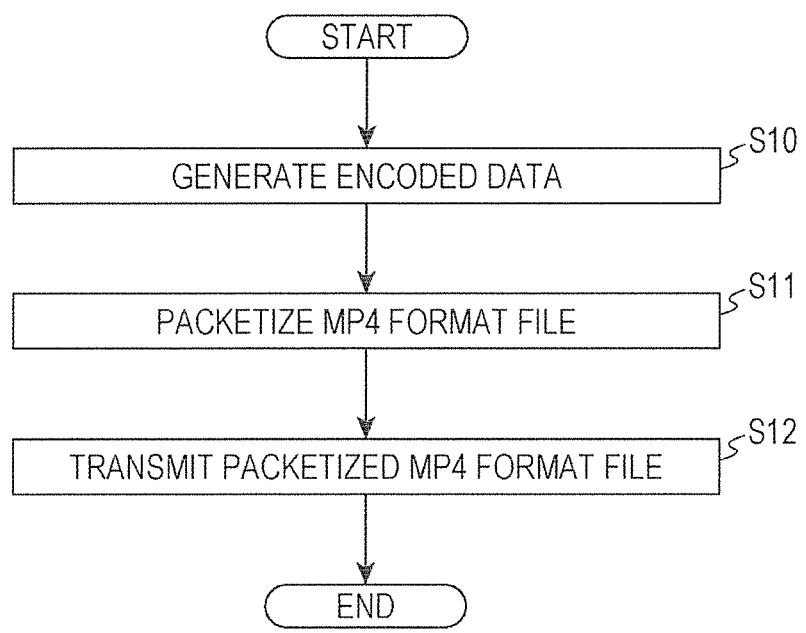
FIG. 24 is a flowchart of a transmitting method according to the second exemplary embodiment.

Next, a configuration and an operation of the transmitting device will be described. FIG. 23 is a block diagram of the transmitting device according to a second exemplary embodiment, and FIG. 24 is a flowchart illustrating a transmitting method according to the second exemplary embodiment.

As illustrated in FIG. 23, transmitting device 15 includes encoder 16, multiplexer 17 and transmitter 18.

Encoder 16 generates encoded data by encoding an encoding target video or audio according to, for example, H.265 (step S10).

Multiplexer 17 multiplexes (packetizes) the encoded data generated by encoder 16 (step S11). More specifically, multiplexer 17 packetizes each of sample data, MPU meta data and MF meta data configuring an MP4 format file. The sample data is data obtained by encoding a video signal or an audio signal, the MPU meta data is an example of first meta data and the MF meta data is an example of second meta data. The first meta data and the second meta data are each meta data used for decoding sample data, and differ in that the second meta data includes data which can be generated after the sample data is generated.

In this regard, the data which can be generated after the sample data is generated is, for example, data other than the sample data which is stored in mdat of an MP4 format (data in a header of mdat, i.e., type and length illustrated in FIG. 20). In this regard, the second meta data may include length which is at least part of this data.

Transmitter 18 transmits the packetized MP4 format file (step S12). Transmitter 18 transmits the MP4 format file according to, for example, the method illustrated in FIG. 21(d). That is, transmitter 18 transmits the packetized MPU meta data, the packetized sample data and the packetized MF meta data in this order.

In addition, each of encoder 16, multiplexer 17 and transmitter 18 is realized by a microcomputer, a processor or a dedicated circuit.

[Configuration of Receiving Device]

Figure 25:
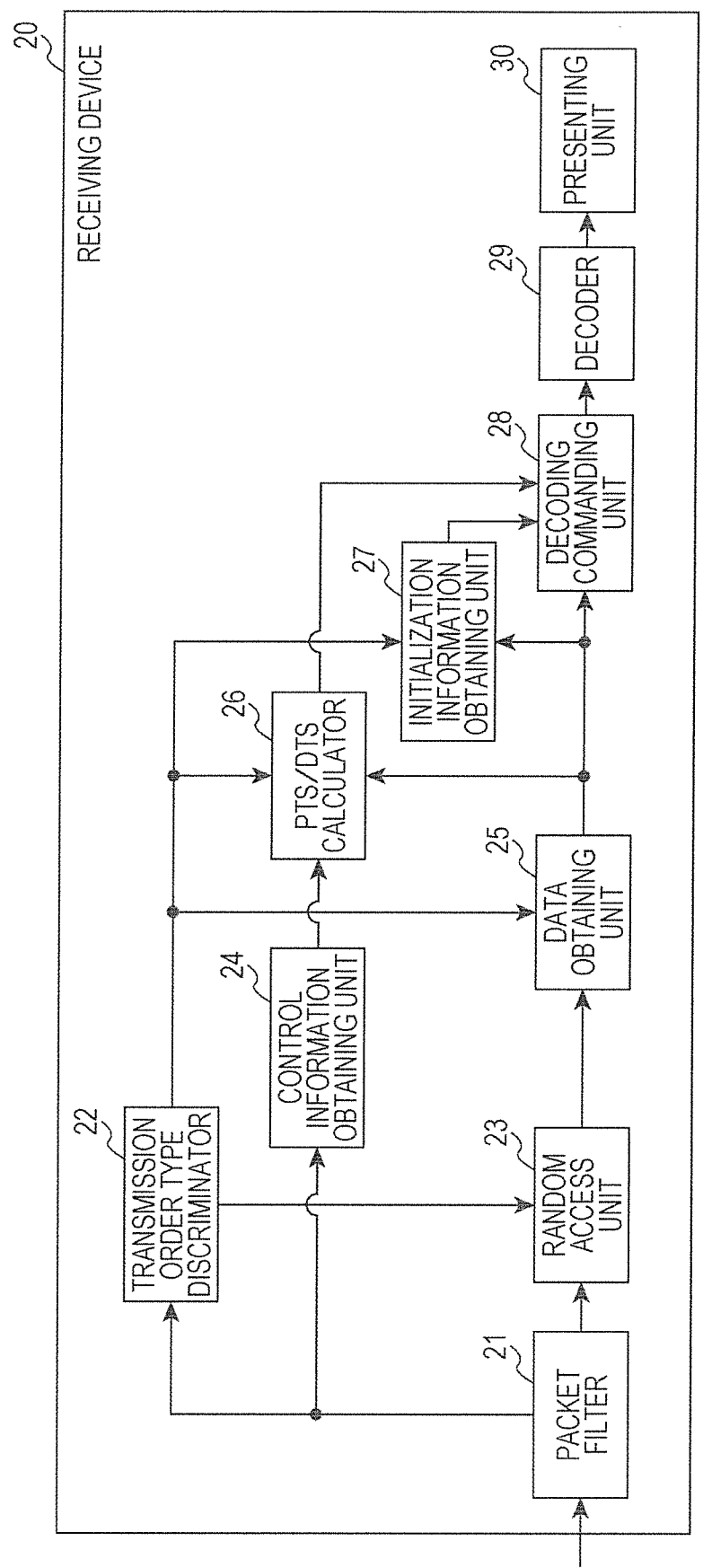
FIG. 25 is a block diagram of a receiving device according to the second exemplary embodiment.

Next, a configuration and an operation of the receiving device will be described. FIG. 25 is a block diagram of the receiving device according to the second exemplary embodiment.

As illustrated in FIG. 25, receiving device 20 includes a packet filter 21, transmission order type discriminator 22, random access unit 23, control information obtaining unit 24, data obtaining unit 25, PTS/DTS calculator 26, initialization information obtaining unit 27, decoding commanding unit 28, decoder 29 and presenting unit 30.

[Operation 1 of Receiving Device]

Figure 26:
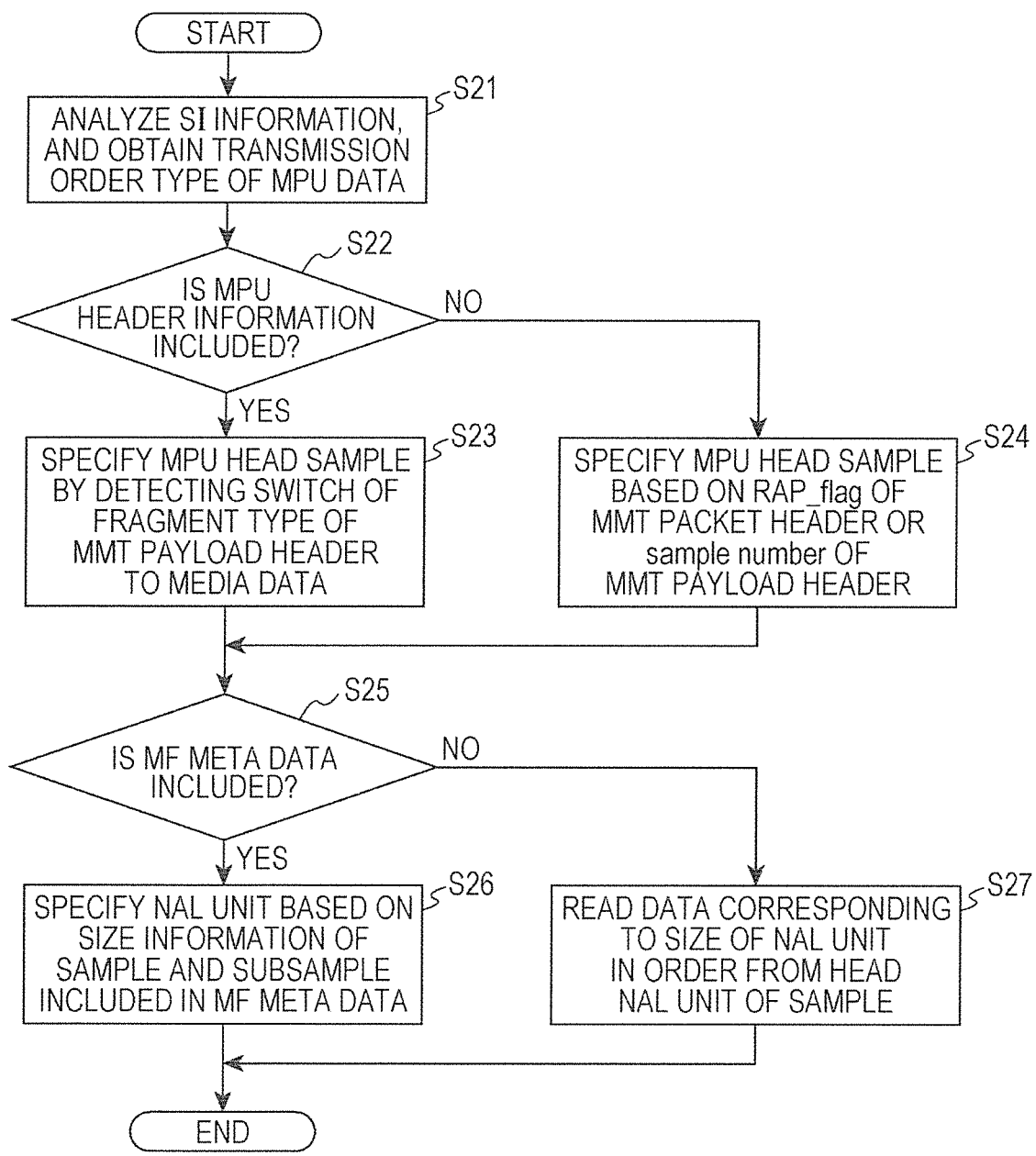
FIG. 26 is a flowchart of an operation of specifying an MPU head position and an NAL (Network Adaptation Layer) unit position.

First, an operation of specifying an MPU head position and an NAL unit position in receiving device 20 in a case where a medium is a video will be described. FIG. 26 is a flowchart illustrating such an operation of receiving device 20. In addition, an MPU data transmission order type is stored in SI information by transmitting device 15 (multiplexer 17).

First, packet filter 21 packet-filters a received file. Transmission order type discriminator 22 analyzes SI information obtained by the packet filtering, and obtains the MPU data transmission order type (step S21).

Next, transmission order type discriminator 22 determines (discriminates) whether or not the packet-filtered data includes MPU header information (at least one of MPU meta data or MF meta data) (step S22). When the data includes the MPU header information (Yes in step S22), random access unit 23 specifies an MPU head sample by detecting a switch of a fragment type of an MMT payload header to media data (step S23).

Meanwhile, when the data does not include the MPU header information (No in step S22), random access unit 23 specifies an MPU head sample based on RAP_flag of the MMT packet header or sample number of an MMT payload header (step S24).

Further, transmission order type discriminator 22 determines whether or not the packet-filtered data includes MF meta data (step S25). When it is determined that the data includes the MF data (Yes in step S25), data obtaining unit 25 obtains an NAL unit by the reading NAL unit based on an offset of a sample or a subsample and size information included in the MF meta data (step S26). Meanwhile, when it is determined that the data does not include the MF meta data (No in step S25), data obtaining unit 25 obtains an NAL unit by reading data of an NAL unit size in order from a head NAL unit of the sample (step S27).

In addition, even when it is determined in step S22 that the data includes the MPU header information, receiving device 20 may specify an MPU head sample by using the processing in step S24 instead of step S23. Further, when it is determined that the data includes the MPU header information, the processing in step S23 and the processing in step S24 may be used in combination.

Furthermore, even when it is determined in step S25 that the data includes the MF meta data, receiving device 20 may obtain an NAL unit by using the processing in step S27 without using the processing in step S26. Still further, when it is determined that the data includes the MF meta data, the processing in step S26 and the processing in step S27 may be used in combination.

Further, it is assumed that it is determined in step S25 that the data includes MF meta data and the MF meta data is transmitted subsequent to the media data. In this case, the receiving device 20 may buffer the media data, waits for the MF meta data to be obtained and then perform the process in step S26 or receiving device 20 may determine whether or not to perform the process in step S27 without waiting for the MF meta data to be obtained.

For example, receiving device 20 may determine whether or not to wait for the MF meta data to be obtained based on whether or not receiving device 20 includes a buffer of a buffer size which can buffer the media data. Further, receiving device 20 may determine whether or not to wait for the MF meta data to be obtained based on whether or not an End-to-End delay becomes little. Furthermore, receiving device 20 may perform decoding processing by mainly using the processing in step S26, and use the processing in step S27 in a processing mode in a case where packet loss occurs.

In addition, in the case of a predetermined transmission order type, step S22 and step S26 may be skipped, and, in this case, receiving device 20 may determine a method for specifying an MPU head sample and a method for specifying an NAL unit by taking into account a buffer size or an End-to-End delay.

In addition, when a transmission order type is known in advance, receiving device 20 does not need transmission order type discriminator 22.

Further, although not illustrated with reference to FIG. 26, decoding commanding unit 28 outputs to decoder 29 data obtained by the data obtaining unit based on a PTS and a DTS calculated by PTS/DTS calculator 26 and initialization information obtained by initialization information obtaining unit 27. Decoder 29 decodes the data, and presenting unit 30 presents the decoded data.

[Operation 2 of Receiving Device]

Figure 27:
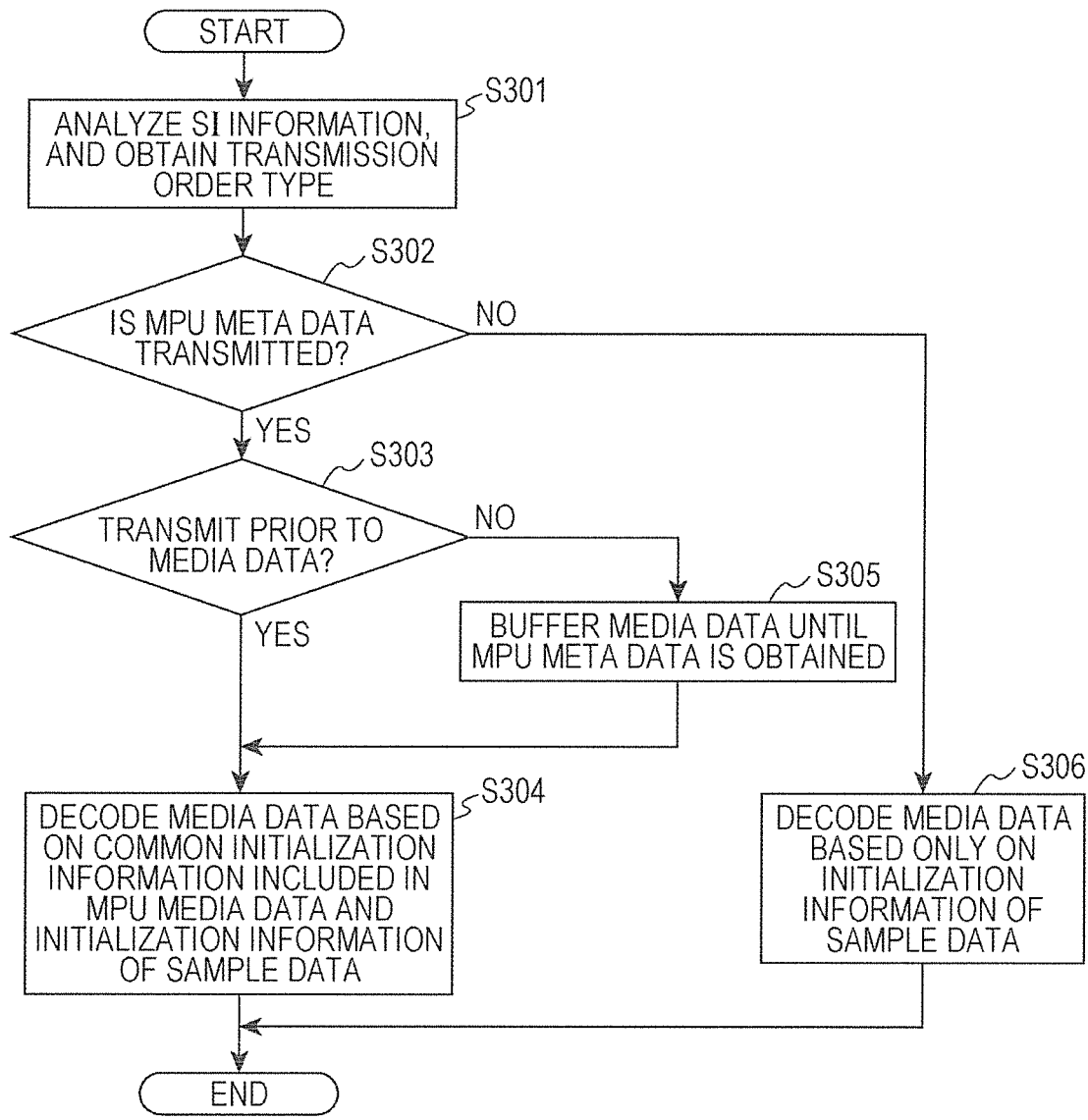
FIG. 27 is a view of a flowchart of an operation of obtaining initialization information based on a transmission order type, and decoding media data based on the initialization information.

Next, an operation of obtaining initialization information based on a transmission order type, and decoding media data based on initialization information in receiving device 20 will be described. FIG. 27 is a flowchart illustrating such an operation.

First, packet filter 21 packet-filters a received file. Transmission order type discriminator 22 analyzes SI information obtained by the packet filtering, and obtains a transmission order type (step S301).

Next, transmission order type discriminator 22 determines whether or not MPU meta data has been transmitted (step S302). When it is determined that the MPU meta data has been transmitted (Yes in step S302), transmission order type discriminator 22 determines whether or not the MPU meta data has been transmitted prior to the media data as a result of analysis in step S301 (step S303). In a case where the MPU meta data has been transmitted prior to the media data (Yes in step S303), initialization information obtaining unit 27 decodes the media data based on common initialization information included in the MPU meta data and initialization information of sample data (step S304).

Meanwhile, when it is determined that the MPU meta data has been transmitted subsequent to the media data (No in step S303), data obtaining unit 25 buffers the media data until the MPU meta data is obtained (step S305), and performs the processing in step S304 after the MPU meta data is obtained.

Further, when it is determined in step S302 that the MPU meta data has not been transmitted (No in step S302), initialization information obtaining unit 27 decodes the media data based on the initialization information of the sample data (step S306).

In addition, when it is guaranteed that the transmission side can decode the media data when the decoding is based on the initialization information of the sample data, the processing in step S306 is used without performing processing based on the determination in step S302 and step S303.

Further, receiving device 20 may determine whether or not to buffer the media data before step S305. In this case, receiving device 20 moves to the processing in step S305 when determining to buffer the media data, and moves to the processing in step S306 when determining not to buffer the media data. Whether or not to buffer the media data may be performed based on a buffer size and an occupied amount of receiving device 20 or may be determined by taking into account an End-to-End delay by, for example, selecting a less End-to-End delay.

[Operation 3 of Receiving Device]

Hereinafter, a transmitting method and a receiving method in a case where MF meta data is transmitted subsequent to media data (FIG. 21(c) and FIG. 21(d)) will be described in detail. Hereinafter, a case of FIG. 21(d) will be described as an example. In addition, the method in FIG. 21(d) is used for transmission, and a transmission order type is not signaled.

As described above, when items of data are transmitted in order of MPU meta data, media data and MF meta data as illustrated in FIG. 21(d), (D-1) Receiving device 20 obtains the MPU meta data, then further obtains the MF meta data and subsequently decodes the media data.

(D-2) Receiving device 20 obtains the MPU meta data, and then decodes the media data without using the MF meta data.

The above two decoding methods are provided.

In this regard, according to D-1, it is necessary to buffer the media data to obtain the MF meta data; however, the conventional MP4-compliant receiving devices can perform decoding by using MPU header information. Further, according to D-2, it is not necessary to buffer the media data to obtain the MF meta data; however, it is difficult to perform decoding by using the MF meta data, and therefore it is necessary to perform another processing for decoding.

Further, according to the method in FIG. 21(d), the MF meta data is transmitted subsequent to the media data, and therefore it is possible to provide an advantage that encapsulation does not cause a delay and it is possible to reduce an End-to-End delay.

Receiving device 20 can select the above two types of decoding methods according to performance of receiving device 20 and service quality provided by receiving device 20.

Transmitting device 15 needs to guarantee that it is possible to reduce occurrence of an overflow or an underflow of a buffer and perform decoding in a decoding operation of receiving device 20. For an element which defines a decoder model for performing decoding by using method D-1, the following parameter can be used, for instance.

Buffer size (MPU buffer) for reconfiguring MPU

For example, buffer size=maximum rate×maximum MPU time×α holds, and the maximum rate is upper limit rate of profile and level of encoded data+overhead of MPU header. Further, a maximum MPU time is a maximum time length of a GOP in the case of 1 MPU=1 GOP (video).

In this regard, the audio may be a GOP unit which is common between videos, or may be another unit. α represents a margin for not causing an overflow, and may be multiplied on or added to maximum rate×maximum MPU time. In the case of multiplication, $\alpha \geq 1$ holds, and, in the case of addition, $\alpha \geq 0$ holds.

An upper limit of a decoding delay time until data is decoded after the data is input to the MPU buffer. (TSTD_delay in STD (System Target Decoder) of MPEG-TS)

For example, during transmission, a DTS is set such that obtaining completion time of MPU data in receiver<=DTS holds, by taking into account a maximum MPU time and an upper limit value of a decoding delay time.

Further, transmitting device 15 may allocate a DTS and a PTS according to a decoder model for performing decoding by using method D-1. Thus, transmitting device 15 may guarantee decoding for the receiving device which performs decoding by using method D-1, and transmit auxiliary information which is necessary to perform decoding by using method D-2.

For example, transmitting device 15 can guarantee an operation of the receiving device which performs decoding by using method D-2 by signaling a pre-buffering time in a decoder buffer when performing decoding by using method D-2.

The pre-buffering time may be included in SI control information such as a message, a table or a descriptor, or may be included in a header of an MMT packet or an MMT payload. Further, SEI in encoded data may be overwritten. A DTS and a PTS for performing decoding by using method D-1 may be stored in an MPU time stamp descriptor and SampleEntry, and a DTS and a PTS for performing decoding by using method D-2 or a pre-buffering time may be described in SEI.

Receiving device 20 may select decoding method D-1 when receiving device 20 supports an MP4-compliant decoding operation which uses an MPU header, and may select one of methods D-1 and D-2 when receiving device 20 supports both of the methods D-1 and D-2.

Transmitting device 15 may allocate a DTS and a PTS to guarantee one decoding operation (D-1 in this description), and further transmit auxiliary information for assisting the one decoding operation.

Further, End-to-End delay in method D-2 is likely to be great due to a delay caused by pre-buffering of MF meta data compared to that in method D-1. Hence, receiving device 20 may select method D-2 and perform decoding to reduce an End-to-End delay. For example, receiving device 20 may use method D-2 to reduce an End-to-End delay. Further, receiving device 20 may use method D-2 when operating in a low delay presentation mode for presenting live content, channel selection or a zapping operation with a low delay.

Figure 28:
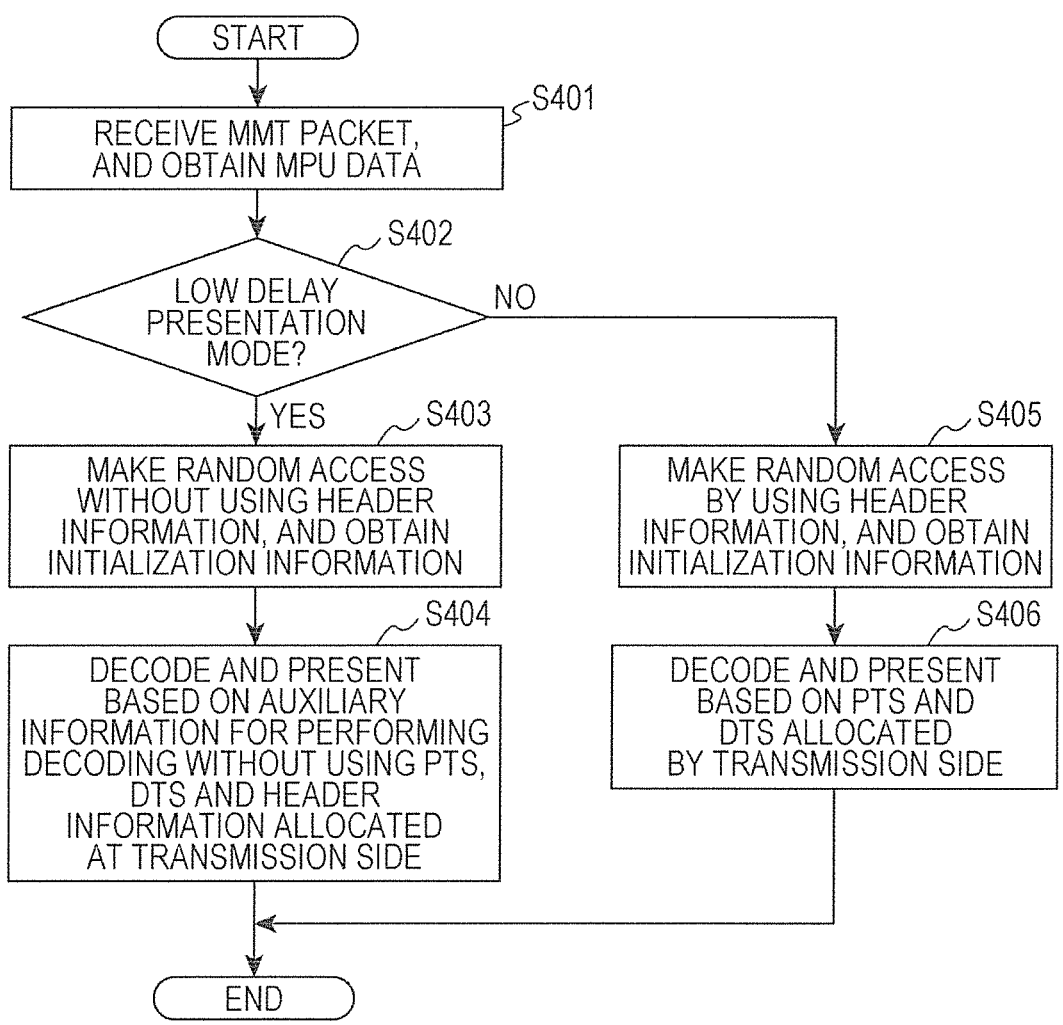
FIG. 28 is a flowchart of an operation of the receiving device in the case where low delay presentation mode is provided.

FIG. 28 is a flowchart illustrating such a receiving method.

First, receiving device 20 receives an MMT packet, and obtains MPU data (step S401). Further, receiving device 20 (transmission order type discriminator 22) determines whether or not to present the program in the low delay presentation mode (step S402).

When not presenting the program in the low delay presentation mode (No in step S402), receiving device 20 (random access unit 23 and initialization information obtaining unit 27) makes a random access unit by using header information and obtains initialization information (step S405). Further, receiving device 20 (PTS/DTS calculator 26, decoding commanding unit 28, decoder 29 and presenting unit 30) performs decoding and presentation processing based on a PTS and a DTS allocated by a transmission side (step S406).

Meanwhile, when presenting the program in the low delay presentation mode (Yes in step S402), receiving device 20 (random access unit 23 and initialization information obtaining unit 27) makes a random access by using a decoding method which does not use header information, and obtains initialization information (step S403). Further, receiving device 20 performs decoding and the presentation processing based on auxiliary information for performing decoding without using a PTS and a DTS allocated by the transmission side and header information (step S404). In addition, in step S403 and step S404, processing may be performed by using MPU meta data.

[Transmitting and Receiving Methods Using Auxiliary Data]

The transmitting and receiving operations in a case where MF meta data is transmitted subsequent to media data (FIG. 21(*c*) and FIG. 21(*d*)) will be described above. Next, a method for enabling transmitting device 15 to start decoding earlier by transmitting auxiliary data including a function of part of MF meta data and to reduce an End-to-End delay will be described. Hereinafter, an example where auxiliary data is further transmitted based on the transmitting method illustrated in FIG. 21(*d*) will be described. However, a method using auxiliary data is applied to the transmitting methods illustrated in FIGS. 21(*a*) to (*c*).

Figure 29:
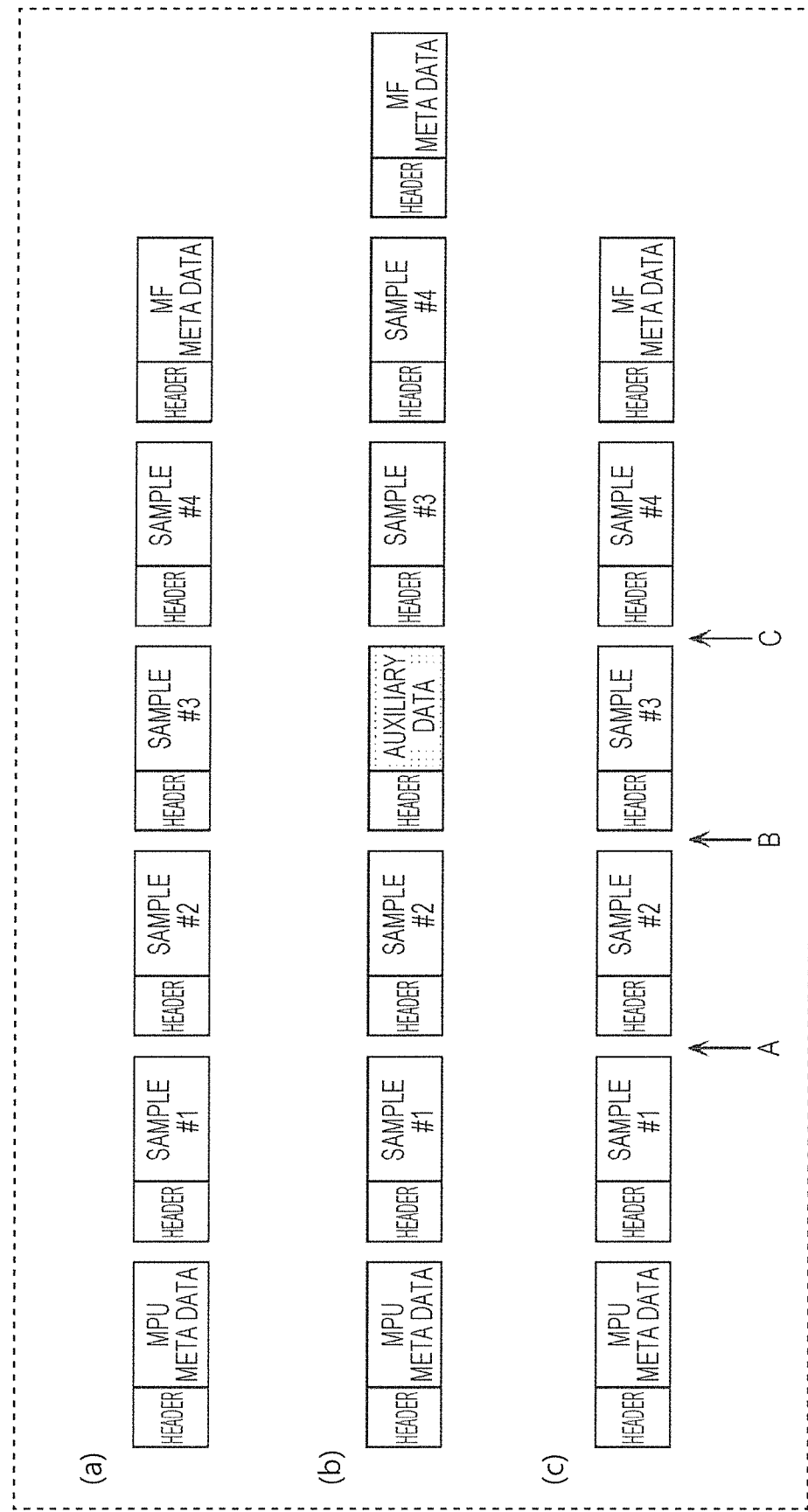
FIG. 29 is a view illustrating an example of an MMT packet transmission order in the case where auxiliary data is transmitted.

FIG. 29(*a*) is a view illustrating an MMT packet transmitted by using the method illustrated in FIG. 21(*d*). That is, items of data are transmitted in order of MPU meta data, media data and MF meta data.

In this regard, sample #1, sample #2, sample #3 and sample #4 are samples included in the media data. In addition, an example where media data is stored in sample units in an MMT packet will be described. The media data may be stored in units of NAL units in an MMT packet or may be stored in units obtained by dividing an NAL unit. In addition, a plurality of NAL units is aggregated and is stored in an MMT packet in some cases.

As described above with reference to method D-1, in the case of the method illustrated in FIG. 21(*d*), i.e., when items of data are transmitted in order of MPU meta data, media data and MF meta data, the MPU meta data is obtained, then the MF meta data is further obtained and then the media data is decoded. According to such method D-1, it is necessary to buffer the media data for obtaining the MF meta data; however, decoding is performed by using MPU header information. Consequently, method D-1 is applicable to conventional MP4-compliant receiving devices, too. Meanwhile, receiving device 20 needs to wait for decoding to start until MF meta data is obtained.

By contrast with this, as illustrated in FIG. 29(b), according to a method using auxiliary data, auxiliary data is transmitted prior to MF meta data.

MF meta data includes DTSs or PTSs of all samples included in a movie fragment, and information indicating an offset and a size. By contrast with this, auxiliary data includes DTSs or PTSs of part of samples among samples included in a movie fragment, and information indicating an offset and a size.

For example, while MF meta data includes information of all samples (sample #1 to sample #4), auxiliary data includes information of part of samples (samples #1 and #2).

In a case illustrated in FIG. 29(b), sample #1 and sample #2 can be decoded by using the auxiliary data, so that an End-to-End delay is little compared to transmitting method D-1. In addition, information of samples may be combined in any way and may be included in the auxiliary data or the auxiliary data may be repeatedly transmitted.

For example, as illustrated in FIG. 29(c), transmitting device 15 imparts information of sample #1 to the auxiliary information when transmitting the auxiliary information at timing A, and imparts pieces of information of sample #1 and sample #2 to the auxiliary information when transmitting the auxiliary information at timing B. When transmitting the auxiliary information at timing C, transmitting device 15 imparts pieces of information of sample #1, sample #2 and sample #3 to the auxiliary information.

In addition, MF meta data includes pieces of information of sample #1, sample #2, sample #3 and sample #4 (information of all samples in a movie fragment).

The auxiliary data does not necessarily need to be immediately transmitted after being generated.

In addition, a type indicating that the auxiliary data is stored is specified in a header of an MMT packet or an MMT payload.

When, for example, auxiliary data is stored in an MMT payload by using an MPU mode, a data type indicating auxiliary data is specified as a fragment_type field value (e.g. FT=3). The auxiliary data may be data based on a configuration of moof, or employ another configuration.

When the auxiliary data is stored as a control signal (a descriptor, a table and a message) in an MMT payload, a descriptor tag, a table ID and a message ID indicating the auxiliary data are specified.

Further, a PTS or a DTS may be stored in a header of an MMT packet or an MMT payload.

[Generation Example of Auxiliary Data]

Figure 30:
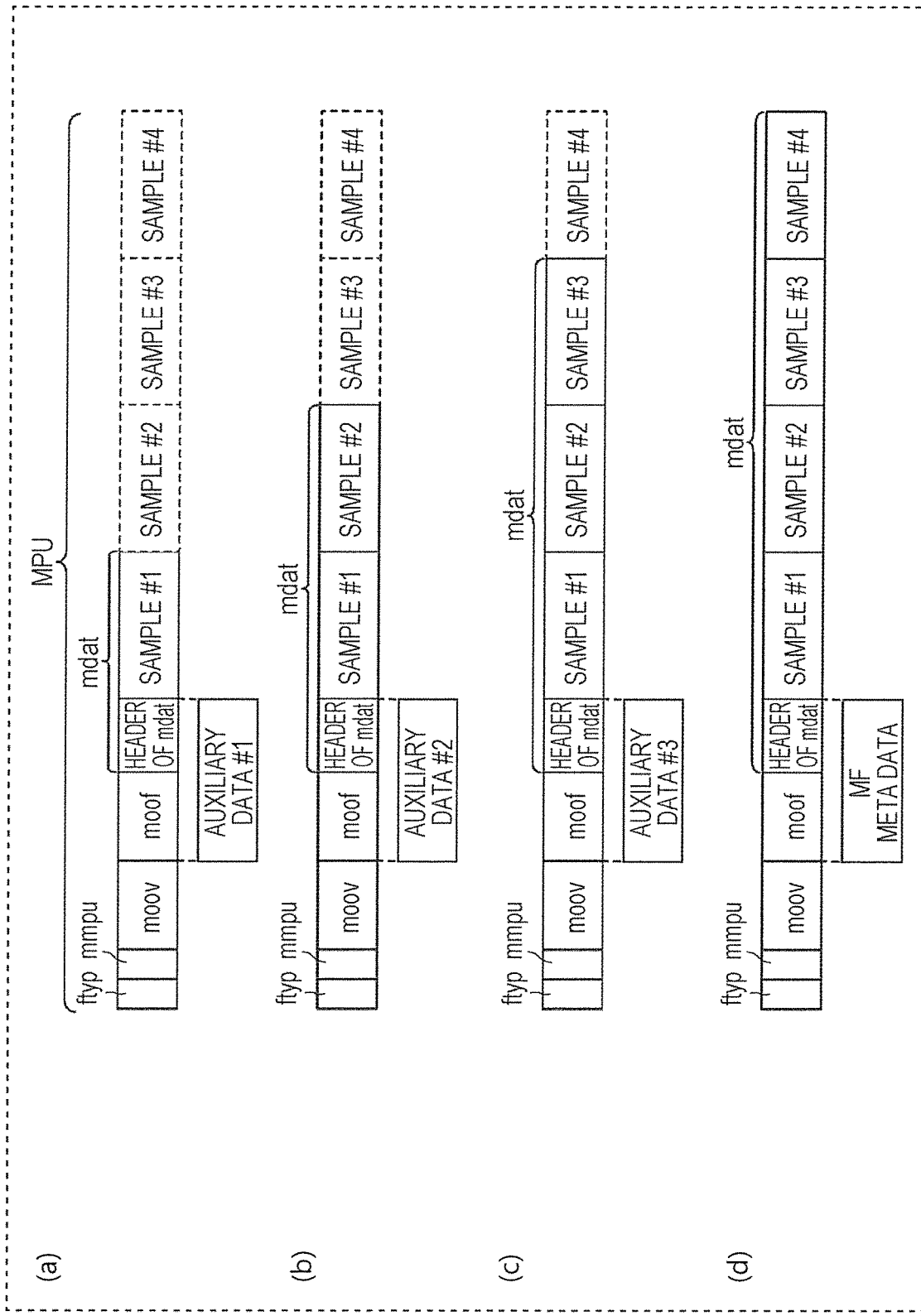
FIG. 30 is a view for explaining an example where the transmitting device generates auxiliary data based on a configuration of moof.

An example where the transmitting device generates auxiliary data based on a configuration of moof will be described below. FIG. 30 are views for explaining an example where the transmitting device generates auxiliary data based on a configuration of moof.

According to general MP4, as illustrated in FIG. 20, moof is created for each movie fragment. moof includes a DTS or a PTS of a sample included in each movie fragment, and information indicating an offset or a size.

In this regard, transmitting device 15 configures MP4 (MP4 file) by using part of items of sample data among items of sample data configuring an MPU, and generates auxiliary data.

As illustrated in, for example, FIG. 30(a), transmitting device 15 generates MP4 by using sample #1 among samples #1 to #4 configuring an MPU, and uses a header of moof+mdat as auxiliary data.

Next, as illustrated in FIG. 30(b), transmitting device 15 generates MP4 by using sample #1 and sample #2 among samples #1 to #4 configuring the MPU, and a header of moof+mdat as next auxiliary data.

Next, as illustrated in FIG. 30(c), transmitting device 15 generates MP4 by using sample #1, sample #2 and sample #3 among samples #1 to #4 configuring the MPU, and a header of moof+mdat as next auxiliary data.

Next, as illustrated in FIG. 30(d), transmitting device 15 generates MP4 by using all samples among samples #1 to #4 configuring an MPU, and uses a header of moof+mdat as movie fragment meta data.

In addition, transmitting device 15 generates auxiliary data per sample, yet may generate auxiliary data per N sample. A value of N is an arbitrary numeral, and, when, for example, one MPU is transmitted and auxiliary data is transmitted M times, N=all samples/M may hold.

In addition, information indicating an offset of a sample in moof may take an offset value after a sample entry area of a number of subsequent samples is secured as a NULL area.

In addition, auxiliary data may be generated to fragment MF meta data.

[Example of Receiving Operation Using Auxiliary Data]

Figure 31:
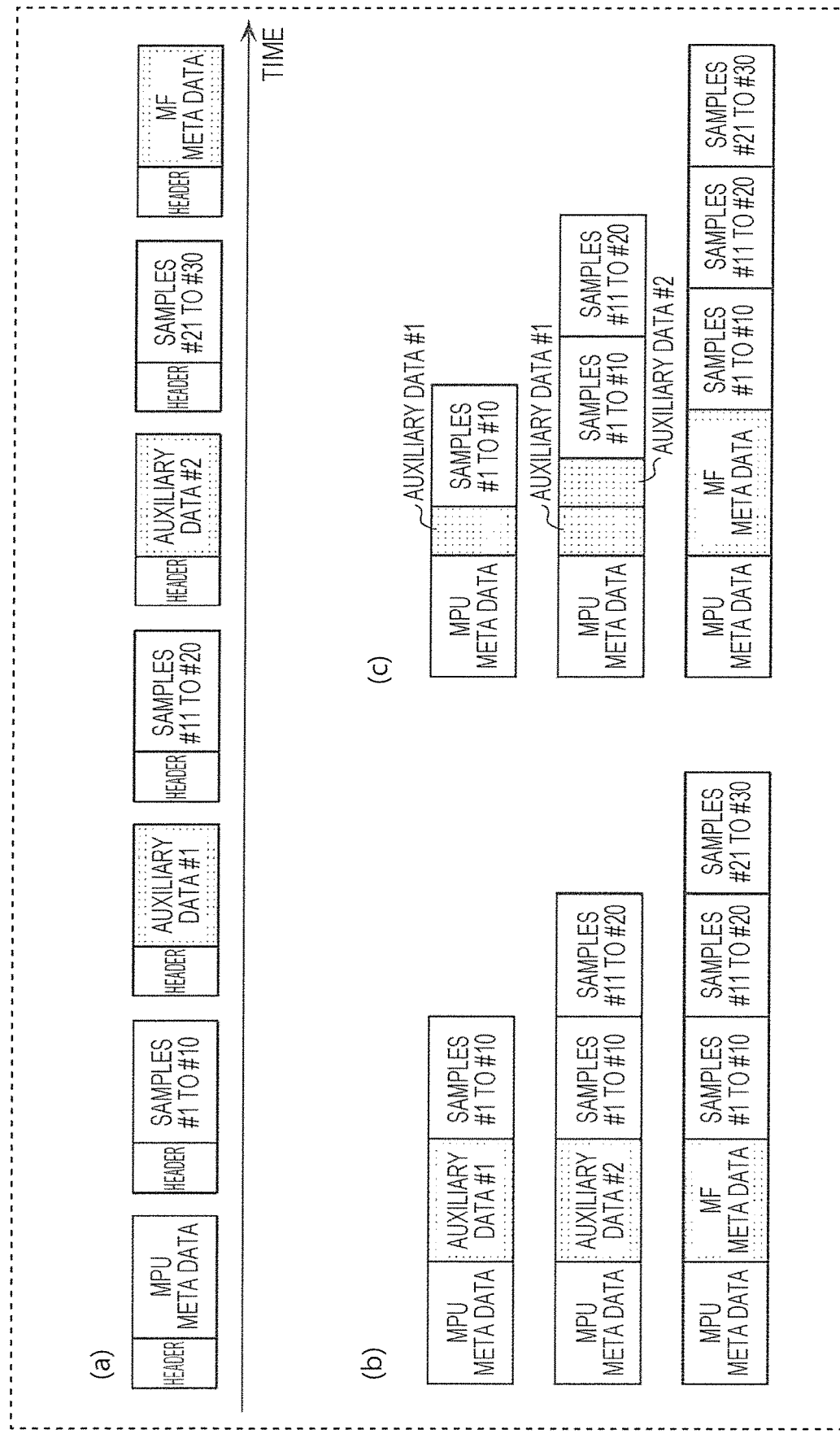
FIG. 31 is a view for explaining reception of auxiliary data.

Reception of auxiliary data generated as described with reference to FIG. 30 will be described. FIG. 31 are views for explaining reception of auxiliary data. In addition, in FIG. 31(a), the number of samples configuring an MPU is 30, and auxiliary data is generated per 10 sample and transmitted.

In FIG. 30(a), auxiliary data #1 includes samples #1 to #10, auxiliary data #2 includes samples #1 to #20, and MF meta data includes pieces of sample information of samples #1 to #30.

In addition, samples #1 to #10, samples #11 to #20 and samples #21 to #30 are stored in one MMT payload, however, may be stored in sample units or NAL units or may be stored in fragmented or aggregated units.

Receiving device 20 receives packets of an MPU meta, a sample, an MF meta and auxiliary data.

Receiving device 20 couples items of sample data in a reception order (to a tail of each sample), receives the latest auxiliary data and then updates the items of auxiliary data so far. Further, receiving device 20 can configure a complete MPU by lastly replacing auxiliary data with MF meta data.

At a point of time at which auxiliary data #1 is received, receiving device 20 couples the items of data as in an upper stage in FIG. 31(b), and configures MP4. Consequently, receiving device 20 can parse samples #1 to #10 by using MPU meta data and information of auxiliary data #1, and perform decoding based on information of a PTS, a DTS, an offset and a size included in the auxiliary data.

Further, at a point of time at which auxiliary data #2 is received, receiving device 20 couples the items of data as in a middle stage in FIG. 31(b), and configures MP4. Consequently, receiving device 20 can parse samples #1 to #20 by using MPU meta data and information of auxiliary data #2, and perform decoding based on information of a PTS, a DTS, an offset and a size included in the auxiliary data.

Further, at a point of time at which MF meta data is received, receiving device 20 couples the items of data as in a lower stage in FIG. 31(b), and configures MP4. Consequently, receiving device 20 can parse samples #1 to #30 by using MPU meta data and MF meta data, and perform decoding based on information of a PTS, a DTS and an offset, a size included in the MF meta data.

When there is no auxiliary data, receiving device 20 can obtain pieces of information of samples for the first time after reception of MF meta data, and therefore needs to start decoding after receiving the MF meta data. However, transmitting device 15 generates and transmits auxiliary data, so that receiving device 20 can obtain information of samples by using the auxiliary data without waiting for reception of MF meta data and, consequently, can advance a decoding start time. Further, transmitting device 15 generates auxiliary data based on moof described with reference to FIG. 30, so that receiving device 20 can perform parsing by using a parser of conventional MP4 as is.

Further, auxiliary data and MF meta data to be newly generated include pieces of information of samples which overlap those of auxiliary data transmitted in the past. Hence, even when past auxiliary data cannot be obtained due to packet loss, it is possible to reconfigure MP4 and obtain sample information (a PTS, a DTS, a size and an offset) by using auxiliary data and MF meta data to be newly obtained.

In addition, auxiliary data does not necessarily need to include past sample data. For example, auxiliary data #1 may correspond to items of sample data #1 to #10, and auxiliary data #2 may correspond to items of sample data #11 to #20. As illustrated in, for example, FIG. 31(*c*), transmitting device 15 may successively output, as auxiliary data, units obtained by fragmenting data units which are complete MF meta data.

Further, for a packet loss countermeasure, transmitting device 15 may repeatedly transmit auxiliary data or repeatedly transmit MF meta data.

In addition, an MMT packet and an MMT payload in which auxiliary data is stored includes an MPU sequence number and an asset ID similar to MPU meta data, MF meta data and sample data.

Figure 32:
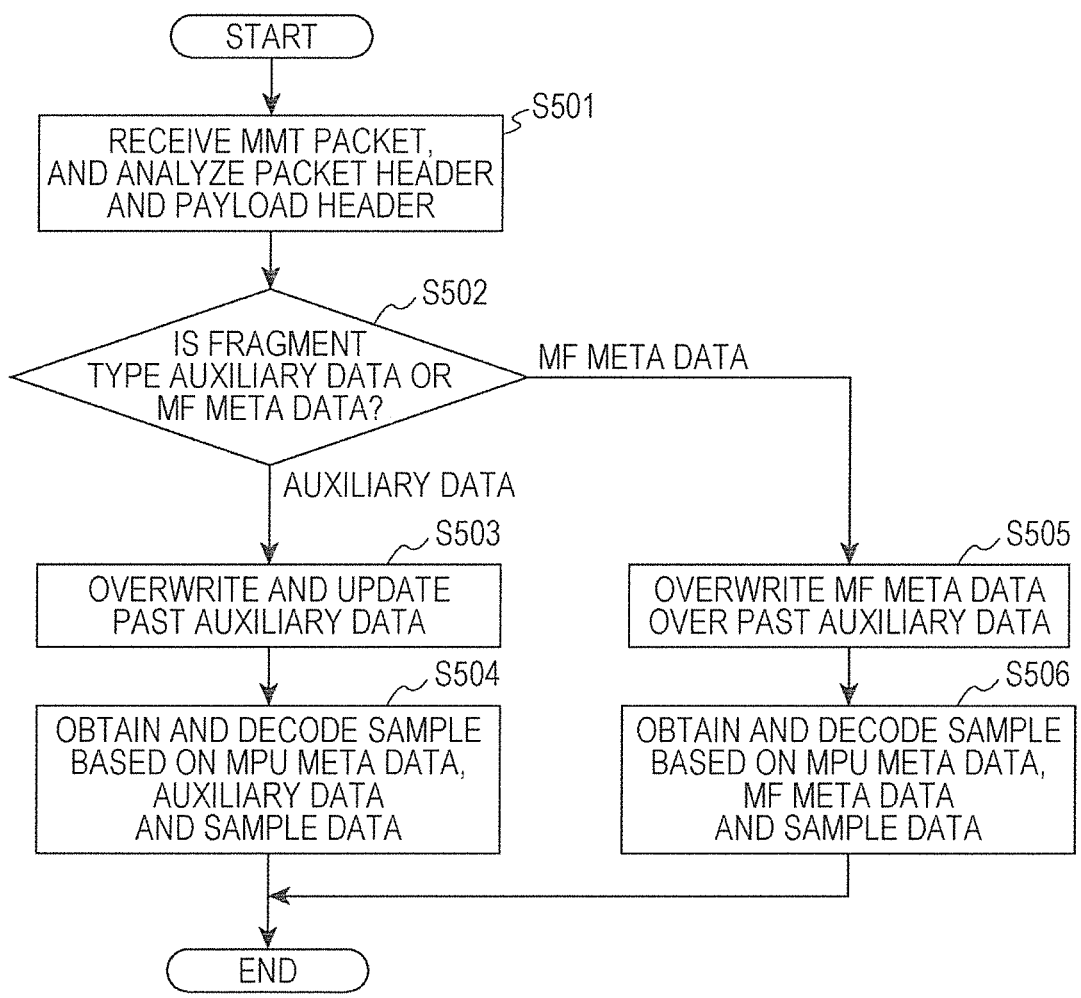
FIG. 32 is a flowchart of a receiving operation using auxiliary data.

The above receiving operation using auxiliary data will be described with reference to a flowchart in FIG. 32. FIG. 32 is a flowchart of the receiving operation using auxiliary data.

First, receiving device 20 receives an MMT packet, and analyzes a packet header and a payload header (step S501). Next, receiving device 20 analyzes whether a fragment type is auxiliary data or MF meta data (step S502), and overwrites and updates past auxiliary data when the fragment type is the auxiliary data (step S503). In this case, when there is no past auxiliary data of the same MPU, receiving device 20 uses received auxiliary data as new auxiliary data. Further, receiving device 20 obtains a sample based on the MPU meta data, the auxiliary data and the sample data to decode (step S504).

Meanwhile, when the fragment type is the MF meta data, receiving device 20 overwrites the MF meta data over the past auxiliary data in step S505 (step S505). Further, receiving device 20 obtains a sample in a complete MPU form based on the MPU meta data, the MF meta data and the sample data, for performing decoding (step S506).

In addition, although not illustrated in FIG. 32, in step S502, receiving device 20 stores data in the buffer when the fragment type is MPU meta data, and stores data coupled to a tail of each sample in the buffer when the fragment type is sample data.

When auxiliary data cannot be obtained due to packet loss, receiving device 20 can overwrite latest auxiliary data over auxiliary data, or decode a sample by using past auxiliary data.

In addition, a transmission cycle and a number of times of transmissions of auxiliary data may take predetermined values. Information of the transmission cycle and the number of times of transmissions (count or count down) may be transmitted together with data. For example, a transmission cycle, the number of times of transmissions, and a time stamp such as initial_cpb_removal_delay may be stored in a data unit header.

By transmitting auxiliary data including information of a first sample of an MPU prior to initial_cpb_removal_delay once or more, it is possible to conform to a CPB (Coded Picture Buffer) buffer model. In this case, in an MPU time stamp descriptor, a value based on picture timing SEI is stored.

In addition, a transmitting method for such a receiving operation using such auxiliary data is not limited to an MMT method, and is applicable to MPEG-DASH in a case where packets configured by an ISOBMFF (ISO base media file format) file format are transmitted by way of streaming.

[Transmitting Method in the case where One MPU is Configured by a Plurality of Movie Fragments]

Figure 33:
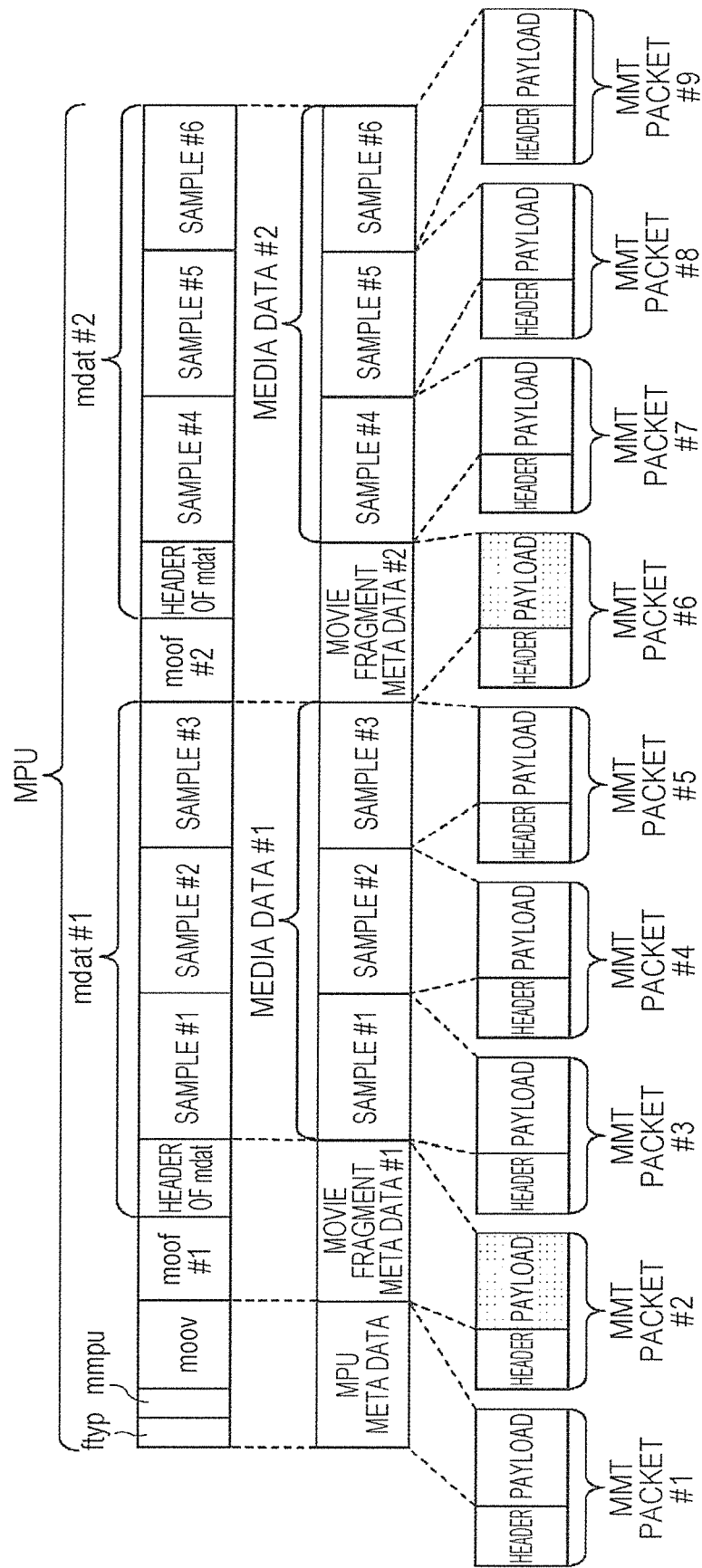
FIG. 33 is a view illustrating a configuration of an MPU configured by a plurality of movie fragments.

A case where one MPU is configured by one movie fragment has been described above with reference to FIG. 19 and subsequent figures. Hereinafter, a case where one MPU is configured by a plurality of movie fragments will be described. FIG. 33 is a view illustrating a configuration of an MPU configured by a plurality of movie fragments.

In FIG. 33, samples (#1 to #6) stored in one MPU are sorted and stored in two movie fragments. A first movie fragment is generated based on samples #1 to #3, and a corresponding moof box is generated. A second movie fragment is generated based on samples #4 to #6, and a corresponding moof box is generated.

Headers of the moof box and the mdat box in the first movie fragment are stored as movie fragment meta data #1 in an MMT payload and an MMT packet. Meanwhile, headers of the moof box and the mdat box in the second movie fragment are stored as movie fragment meta data #2 in an MMT payload and an MMT packet. In addition, in FIG. 33, hatching is applied to MMT payloads in which items of movie fragment meta data are stored.

In addition, the number of samples configuring an MPU and the number of samples configuring a movie fragment are arbitrary. For example, the number of samples configuring an MPU is defined as the number of samples in GOP units, and the number of samples which is half the GOP units is defined as a movie fragment, so that two movie fragments may be configured.

In addition, an example where one MPU includes two movie fragments (the moof box and the mdat box) will be described hereinafter. However, a number of movie fragments included in one MPU may not be two and may be three or more. Further, the number of samples to be stored in a movie fragment may not be equally divided, and may be divided to an arbitrary number of samples.

In addition, in FIG. 33, MPU meta data units and MF meta data units are stored as data units in an MMT payload. However, transmitting device 15 may store units such as ftyp, mmpu, moov and moof as data units in an MMT payload in units of data units, or in an MMT payload in units obtained by fragmenting the data units. Further, transmitting device 15 may store data units in an MMT payload in units obtained by aggregating the data units.

Furthermore, in FIG. 33, samples are stored in an MMT payload in sample units. However, transmitting device 15 may configure data units in units of NAL units or units obtained by aggregating a plurality of NAL units instead of sample units, and store the data units in an MMT payload in the units of the data units. Further, transmitting device 15 may store data units in an MMT payload in units obtained by fragmenting the data units or may store the data units in an MMT payload in units obtained by aggregating the data units.

In addition, in FIG. 33, an MPU is configured in order of moof #1, mdat #1, moof #2 and mdat #2, and offset is allocated to moof #1 assuming that corresponding mdat #1 is allocated subsequent to moof #1. However, offset may be allocated assuming that mdat #1 is allocated prior to moof #1. In this regard, in this case, movie fragment meta data cannot be generated in a form of moof+mdat, and headers of moof and mdat are separately transmitted.

Figure 34:
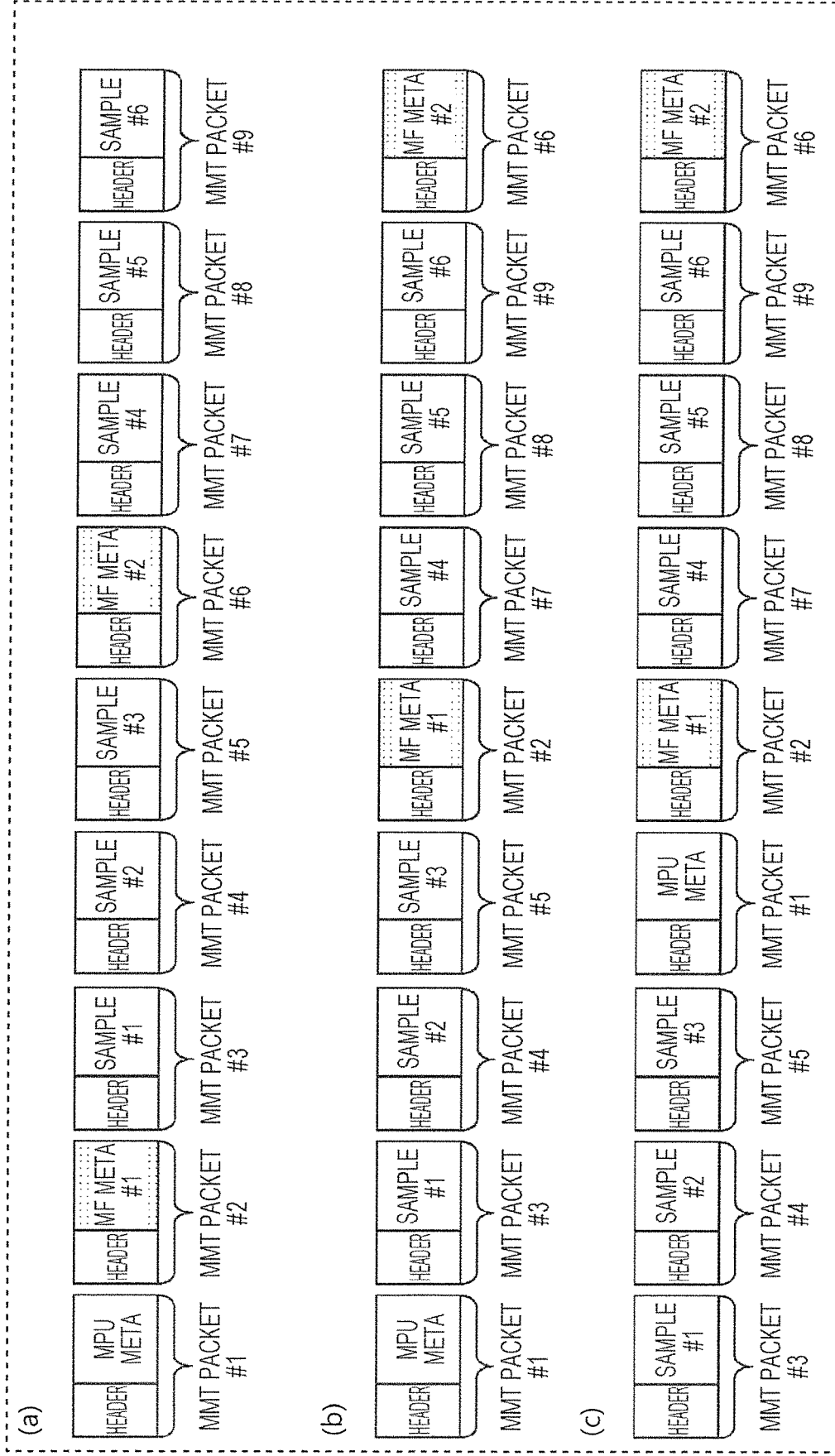
FIG. 34 is a view for explaining an MMT packet transmission order in a case where the MPU configured as in FIG. 33 is transmitted.

Next, an MMT packet transmission order in a case where the MPU configured described with reference to FIG. 33 is transmitted will be described. FIG. 34 are views for explaining an MMT packet transmission order.

FIG. 34(a) illustrates a transmission order in a case where MMT packets are transmitted in an MPU configuration order illustrated in FIG. 33. FIG. 34(a) specifically illustrates an example where an MPU meta, MF meta #1, media data #1 (samples #1 to #3), MF meta #2 and media data #2 (samples #4 to #6) are transmitted in this order.

FIG. 34(b) illustrates an example where an MPU meta, media data #1 (samples #1 to #3), MF meta #1, media data #2 (samples #4 to #6) and MF meta #2 are transmitted in this order.

FIG. 34(c) illustrates an example where media data #1 (samples #1 to #3), an MPU meta, MF meta #1, media data #2 (samples #4 to #6) and MF meta #2 are transmitted in this order.

MF meta #1 is generated by using samples #1 to #3, and MF meta #2 is generated by using samples #4 to #6. Hence, when the transmitting method in FIG. 34(a) is used, encapsulation causes a delay during transmission of sample data.

By contrast with this, when the transmitting methods in FIG. 34(b) and FIG. 34(c) are used, it is possible to transmit samples without waiting for generation of an MF meta. Consequently, encapsulation does not cause a delay and it is possible to reduce an End-to-End delay.

Further, according to the transmission order in FIG. 34(a), one MPU is divided into a plurality of movie fragments and the number of samples to be stored in an MF meta is small compared to that in FIG. 19. Consequently, it is possible to reduce a delay amount caused by encapsulation compared to that in FIG. 19.

In addition to the methods described herein, transmitting device 15 may couple MF meta #1 and MF meta #2 to collectively transmit at the last of an MPU. In this case, MF metas of different movie fragments may be aggregated and stored in one MMT payload. Further, MF metas of different MPUs may be collectively aggregated and stored in an MMT payload.

[Receiving Method in a Case where One MPU is Configured by a Plurality of Movie Fragments]

Figure 35:
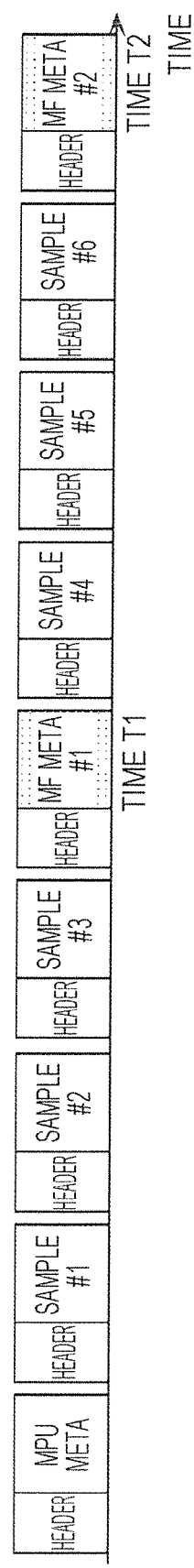
FIG. 35 is a first view for explaining an operation example of the receiving device in a case where one MPU is configured by a plurality of movie fragments.
Figure 36:
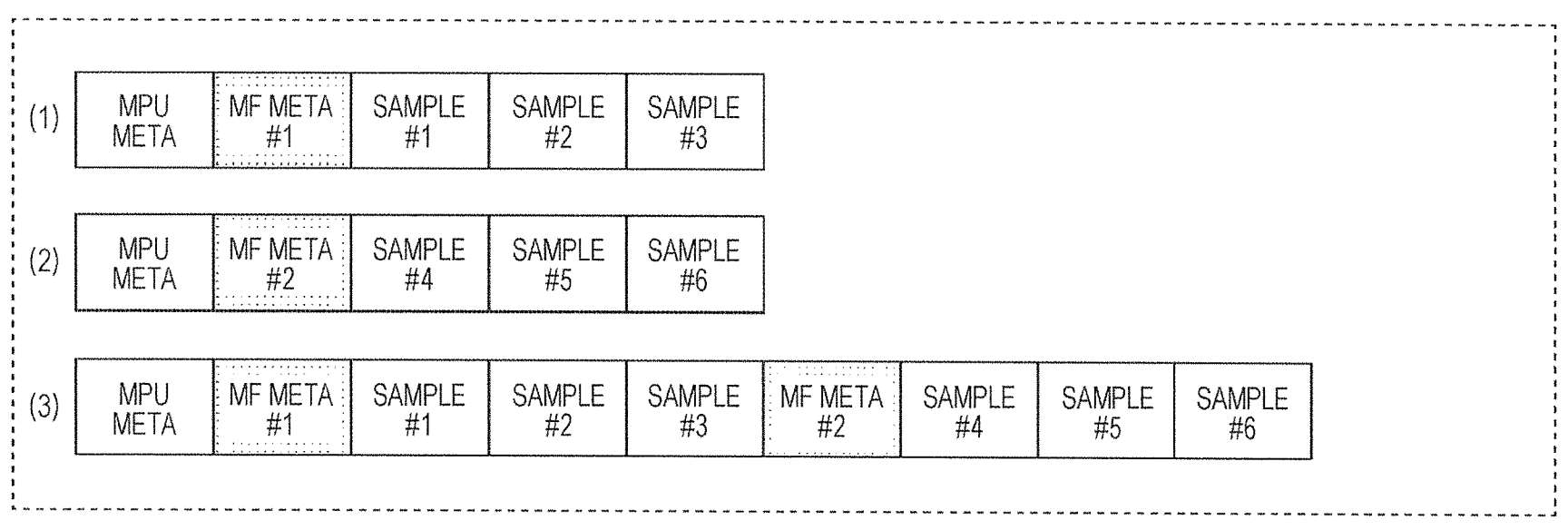

Hereinafter, an operation example of receiving device 20 of receiving and decoding MMT packets transmitted in the transmission order described with reference to FIG. 34(b) will be described. FIGS. 35 and 36 are views for explaining a such operation example.

Receiving device 20 receives each MMT packet including an MPU meta, samples and MF metas in a transmission order illustrated in FIG. 35. Sample data is coupled in a reception order.

Receiving device 20 couples items of data as illustrated in FIG. 36(1) at T1 which is a time at which MF meta #1 is received, and configures MP4. Consequently, receiving device 20 can obtain samples #1 to #3 based on MPU meta data and information of MF meta #1, and perform decoding based on information of a PTS, a DTS, an offset and a size included in the MF meta.

Further, receiving device 20 couples items of data as illustrated in FIG. 36(2) at T2 which is a time at which MF meta #2 is received, and configures MP4. Consequently, receiving device 20 can obtain samples #4 to #6 based on MPU meta data and information of MF meta #2, and perform decoding based on information of a PTS, a DTS, an offset and a size included in the MF meta. Further, receiving device 20 may couple items of data as illustrated in FIG. 36(3) and configure MP4, and thereby obtain samples #1 to #6 based on pieces of information of MF meta #1 and MF meta #2.

By dividing one MPU into a plurality of movie fragments, a time taken to obtain a first MF meta of the MPU is reduced, so that it is possible to advance a decoding start time. Further, it is possible to reduce a buffer size for accumulating samples which are not yet decoded.

In addition, transmitting device 15 may set movie fragment division units such that a time taken to transmit (or receive) an MF meta corresponding to a movie fragment after a first sample of the movie fragment is transmitted (or received) is shorter than initial_cpb_removal_delay specified by an encoder. By making such settings, a reception buffer can conform to a CPB buffer and realize decoding with a low delay. In this case, it is possible to use absolute times based on initial_cpb_removal_delay for a PTS and a DTS.

Further, transmitting device 15 may divide a movie fragment at equal intervals or may divide subsequent movie fragments at intervals shorter than those of previous movie fragments. Consequently, receiving device 20 can receive an MF meta including information of samples without fail before decoding the samples, and perform continuous decoding.

For a method for calculating absolute times of a PTS and a DTS, the following two methods can be used.

(1) The absolute times of the PTS and the DTS are determined based on a reception time (T1 or T2) of MF meta #1 or MF meta #2 and relative times of the PTS and the DTS included in the MF meta.

(2) The absolute times of the PTS and the DTS are determined based on an absolute time such as an MPU time stamp descriptor signaled from the transmission side and the relative times of the PTS and the DTS included in the MF meta.

Further, (2-A) the absolute time signaled from transmitting device 15 may be an absolute time calculated based on initial_cpb_removal_delay specified by the encoder.

Furthermore, (2-B) the absolute time signaled from transmitting device 15 may be an absolute time calculated based on a prediction value of a reception time of an MF meta.

In addition, MF meta #1 and MF meta #2 may be repeatedly transmitted. MF meta #1 and MF meta #2 are repeatedly transmitted, so that receiving device 20 can obtain the MF meta again even when the MF meta cannot be obtained due to packet loss.

In a payload header of an MFU including a sample configuring a movie fragment, an identifier indicating a movie fragment order can be stored. Meanwhile, an identifier indicating an order of MF metas configuring a movie fragment is not included in an MMT payload. Hence, receiving device 20 identifies an order of MF metas according to packet_sequence_number. Alternatively, transmitting device 15 may store an identifier indicating which movie fragment an MF meta belongs to, in control information (a message, a table or a descriptor), an MMT header, an MMT payload header or a data unit header to signal.

In addition, transmitting device 15 may transmit an MPU meta, MF metas and samples in a predetermined transmission order determined in advance, and receiving device 20 may perform reception processing based on the predetermined transmission order determined in advance. Further, transmitting device 15 may signal the transmission order and receiving device 20 may select (determine) reception processing based on the signaling information.

Figure 37:
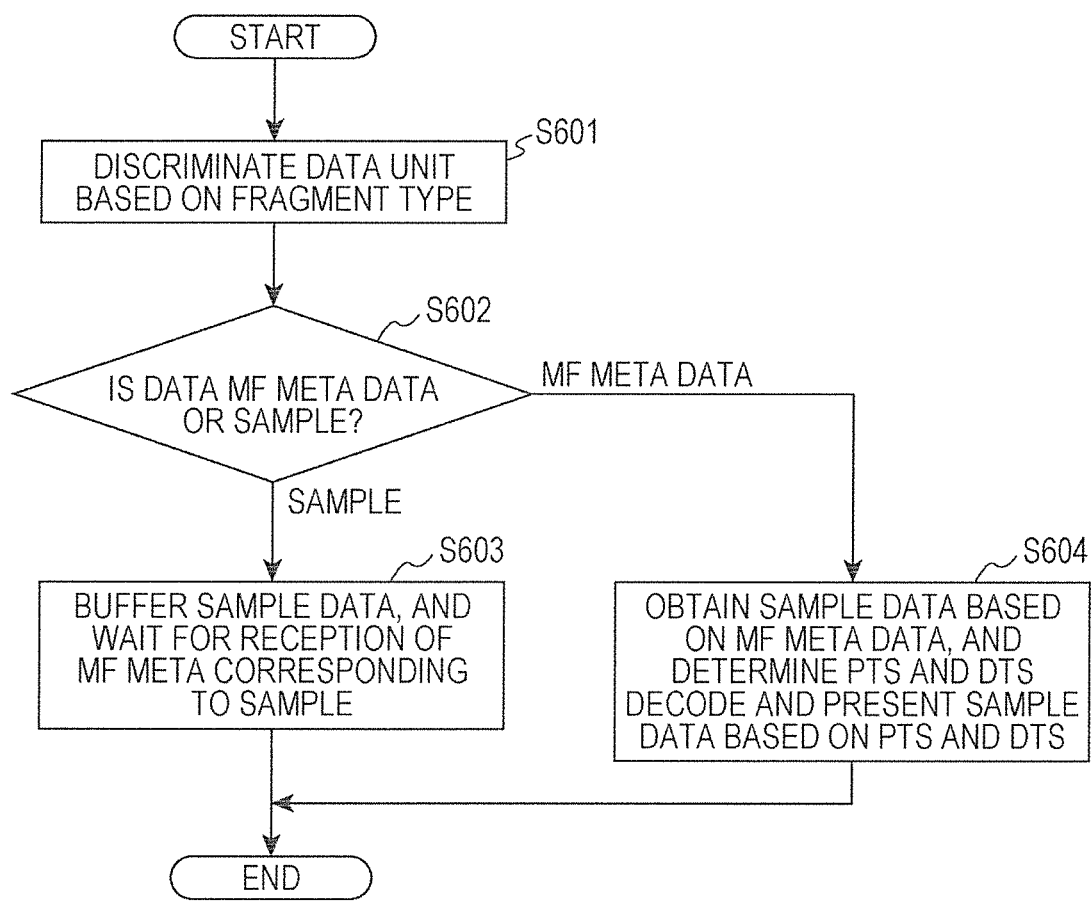
FIG. 37 is a flowchart of an operation of a receiving method described with reference to FIGS. 35 and 36.

The above receiving method will be described with reference to FIG. 37. FIG. 37 is a flowchart of an operation of the receiving method described with reference to FIGS. 35 and 36.

First, receiving device 20 discriminates (identifies) whether data included in a payload is MPU meta data, MF meta data, or sample data (MFU) according to a fragment type included in an MMT payload (steps S601 and S602). When the data is sample data, receiving device 20 buffers the sample, and waits for MF meta data corresponding to the sample to be received and start being decoded (step S603).

Meanwhile, when the data is the MF meta data in step S602, receiving device 20 obtains information (a PTS, a DTS, position information and a size) of the sample from the MF meta data, obtains the sample based on the obtained sample information, and decodes and presents the sample based on the PTS and the DTS (step S604).

In addition, although not illustrated, when the data is MPU meta data, the MPU meta data includes initialization information which is necessary for decoding. Hence, receiving device 20 accumulates this initialization information to decode sample data in step S604.

In addition, when accumulating items of received data of the MPU (MPU meta data, MF meta data and sample data) in an accumulating device, receiving device 20 accumulates the MPU data after rearranging the items of data to an MPU configuration described with reference to FIG. 19 or 33.

In addition, the transmission side allocates a packet sequence number of a packet having the same packet ID to an MMT packet. In this case, packet sequence numbers may be allocated after MMT packets including MPU meta data, MF meta data and sample data are rearranged in a transmission order, or packet sequence numbers may be allocated in an order before a rearrangement.

When the packet sequence numbers are allocated in the order before the rearrangement, receiving device 20 can rearrange items of data in an MPU configuration order based on the packet sequence numbers, so that the items of data can be easily accumulated.

[Method for Detecting Head of Access Unit and Head of Slice Segment]

A method for detecting a head of an access unit and a head of a slice segment based on an MMT packet header and information of an MMT payload header will be described.

In this regard, two examples of a case where non-VCL NAL units (an access unit delimiter, a VPS, an SPS, a PPS and SEI) are collectively stored as data units in an MMT payload, and a case where non-VCL NAL units are used data units and the data units are aggregated and stored in one MMT payload will be described.

Figure 38:
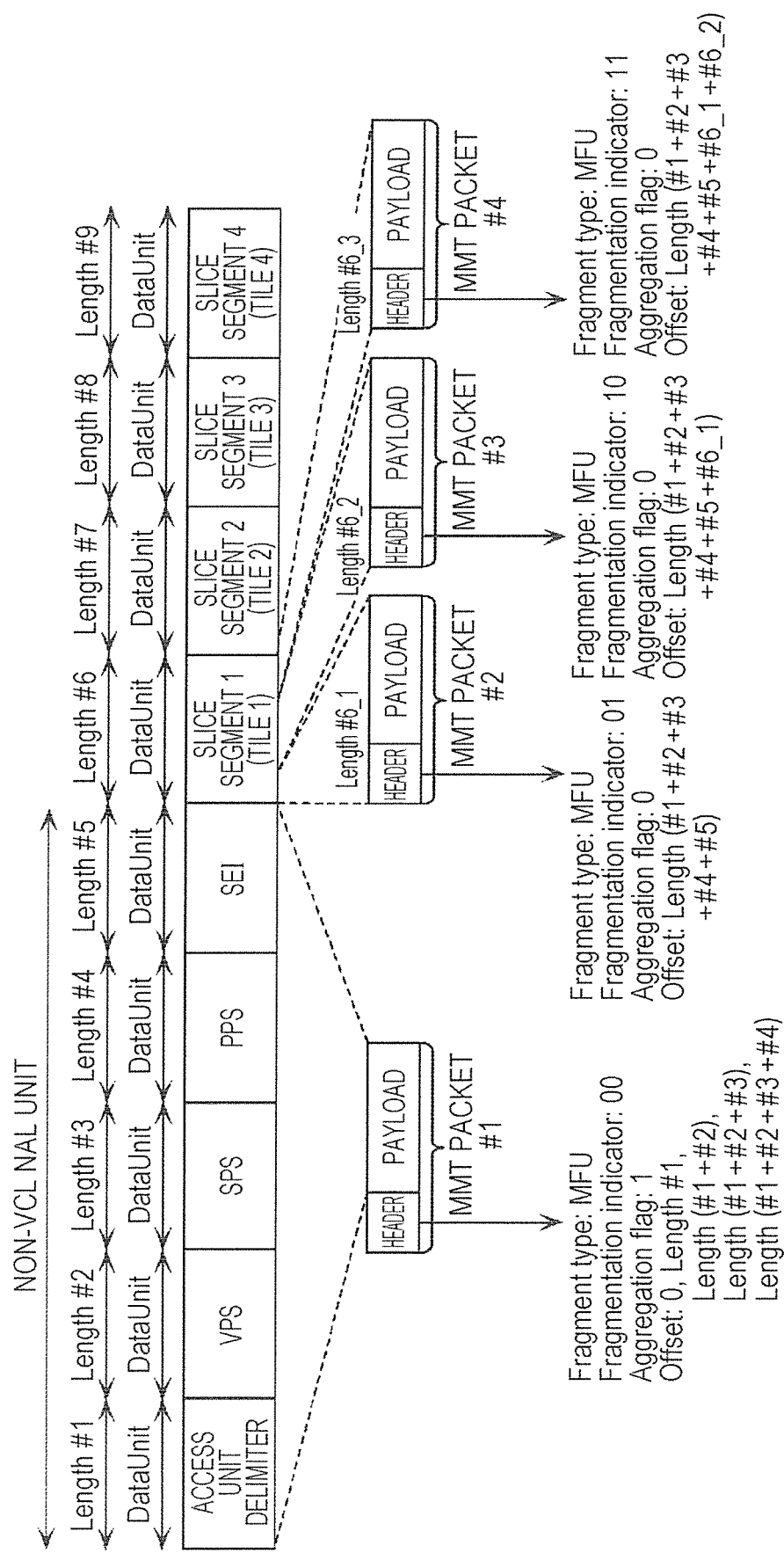
FIG. 38 is a view illustrating that non-VCL (Video Coding Layer) NAL units are individual data units and are aggregated.

FIG. 38 is a view illustrating that non-VCL NAL units are individually defined as data units and are aggregated.

In the case of FIG. 38, the head of the access unit is an MMT packet whose fragment_type value is an MFU, and is head data of an MMT payload including a data unit whose aggregation_flag value is 1 and whose offset value is 0. In this case, a Fragmentation_indicator value takes 0.

Further, in the case of FIG. 38, the head of the slice segment is an MMT packet whose fragment_type value is an MFU, and is head data of an MMT payload whose aggregation_flag value is 0 and whose fragmentation_indicator value is 00 or 01.

Figure 39:
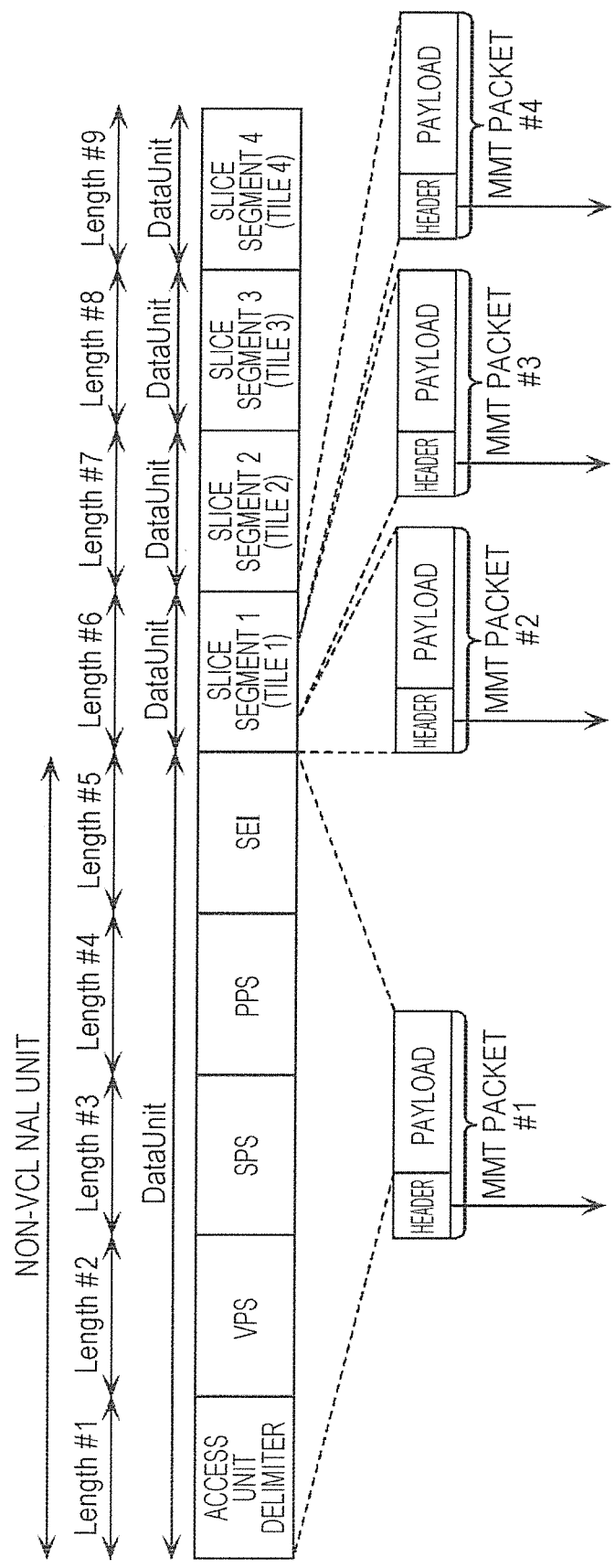
FIG. 39 is a view illustrating that non-VCL NAL units are collectively used as data units.

FIG. 39 is a view illustrating that non-VCL NAL units are collectively used as data units. In addition, a field value of a packet header is as illustrated in FIG. 17 (or FIG. 18).

In the case of FIG. 39, at a head of an access unit, head data of a payload in a packet whose Offset value is 0 is the head of the access unit.

Further, in the case of FIG. 39, the head of the slice segment takes is head data of a payload of a packet whose Offset value takes a value different from 0 and whose Fragmentation indicator value is 00 or 01.

[Reception Processing in the Case where Packet Loss Occurs]

Generally, when MP4 format data is transmitted in environment in which packet loss occurs, receiving device 20 recovers packets by way of ALFEC (Application Layer FEC) and packet retransmission control or the like.

However, when packet loss occurs in a case where ALFEC is not used for streaming such as broadcasting, it is difficult to recover packets.

Receiving device 20 needs to resume decoding a video or an audio after data is lost due to packet loss. Hence, receiving device 20 needs to detect a head of an access unit or an NAL unit, and start decoding from the head of the access unit or the NAL unit.

However, a start code is not allocated to the head of the MP4 format NAL unit, and therefore, receiving device 20 has difficulty in detecting the head of the access unit or the NAL unit by analyzing a stream.

Figure 40:
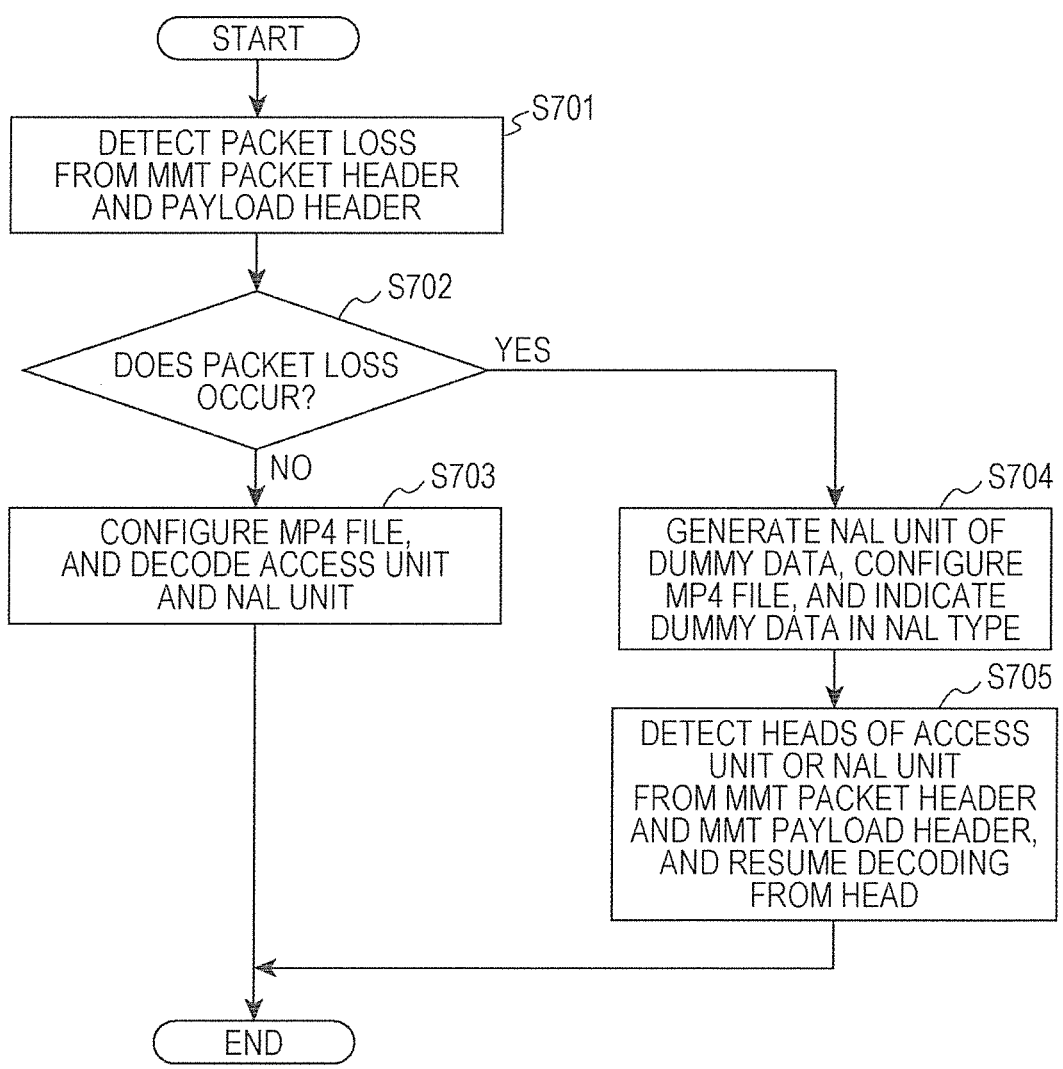
FIG. 40 is a flowchart of an operation of the receiving device in a case where packet loss occurs.

FIG. 40 is a flowchart of an operation of receiving device 20 when packet loss occurs.

Receiving device 20 detects packet loss based on Packetsequence number, packet counter or fragment counter in a header of an MMT packet or an MMT payload (step S701), and determines which packet has been lost based on a preceding and subsequent relationship (step S702).

When it is determined that packet loss does not occur (No in step S702), receiving device 20 configures an MP4 file, and decodes an access unit or an NAL unit (step S703).

When it is determined that packet loss occurs (Yes in step S702), receiving device 20 generates an NAL unit corresponding to an NAL unit whose packet has been lost by using dummy data, and configures an MP4 file (step S704). When inputting the dummy data in the NAL unit, receiving device 20 indicates the dummy data in an NAL unit type.

Further, receiving device 20 can resume decoding by detecting a head of a next access unit or NAL unit and inputting head data to a decoder based on the methods described with reference to FIGS. 17, 18, 38 and 39 (step S705).

In addition, when packet loss occurs, receiving device 20 may resume decoding from the head of the access unit or the NAL unit based on information detected based on a packet header, or may resume decoding from the head of the access unit or the NAL unit based on header information of a reconfigured MP4 file including the NAL unit of the dummy data.

When accumulating MP4 files (MPU), receiving device 20 may additionally obtain and accumulate (replace) packet data (NAL units) whose packet has been lost, by way of broadcasting or communication.

In this case, when obtaining a lost packet by way of communication, receiving device 20 notifies the server of information of the lost packet (a packet ID, an MPU sequence number, a packet sequence number, an IP data flow number and an IP address), and obtains this packet. Receiving device 20 may simultaneously obtain not only lost packets but also a packet group prior to and subsequent to the lost packets.

[Method for Configuring Movie Fragment]

Hereinafter, a method for configuring a movie fragment will be described in detail.

As described with reference to FIG. 33, the number of samples configuring a movie fragment and the number of movie fragments configuring one MPU are arbitrary. For example, the number of samples configuring a movie fragment and the number of movie fragments configuring one MPU may be fixed predetermined numbers or may be dynamically determined.

In this regard, a movie fragment is configured to satisfy the following conditions at the transmission side (transmitting device 15), so that it is possible to guarantee low-delay decoding in receiving device 20.

The conditions are as follows.

Transmitting device 15 generates and transmits an MF meta as a movie fragment in units obtained by dividing sample data to enable receiving device 20 to receive the MF meta including information of arbitrary samples without fail before a decoding time (DTS(i)) of the arbitrary samples (Step Sample(i)).

More specifically, transmitting device 15 configures a movie fragment by using encoded samples (including an ith sample) before DTS(i).

For a method for dynamically determining the number of samples configuring a movie fragment and the number of movie fragments configuring one MPU to guarantee low-delay decoding, for example, the following method is used.

(1) At a start of decoding, decoding time DTS(0) of sample Sample(0) of a GOP head is a time based on initial_cpb_removal_delay. The transmitting device configures a first movie fragment by using encoded samples at a time before DTS(0). Further, transmitting device 15 generates MF meta data corresponding to the first movie fragment, and transmits the MF meta data at a time before DTS(0).

(2) Transmitting device 15 configures a movie fragment to satisfy the above conditions for subsequent samples.

When, for example, a head sample of a movie fragment is a kth sample, an MF meta of the movie fragment including the kth sample is transmitted by decoding time DTS(k) of the kth sample. When an encoding completion time of a lth sample is before DTS(k) and an encoding completion time of a (l+1)th sample is after DTS(k), transmitting device 15 configures a movie fragment by using the kth sample to the lth sample.

In addition, transmitting device 15 may configure a movie fragment by using samples from the kth sample to a sample before the lth sample.

(3) Transmitting device 15 finishes encoding a last sample of an MPU, configures a movie fragment by using the rest of samples and generates, and transmits MF meta data corresponding to this movie fragment.

In addition, transmitting device 15 may configure a movie fragment by using part of encoded samples without configuring a movie fragment by using all encoded samples.

In addition, an example where the number of samples configuring a movie fragment and the number of movie fragments configuring one MPU are dynamically determined based on the above conditions to guarantee low-delay decoding has been described above. However, the method for determining the number of samples and the number of movie fragments is not limited to this. For example, the number of movie fragments configuring one MPU may be fixed to a predetermined value, and the number of samples may be determined to satisfy the above conditions. Further, the number of movie fragments configuring one MPU and a time at which the movie fragments are divided (or an encoding amount of the movie fragments) may be fixed to predetermine values, and the number of samples may be determined to satisfy the above conditions.

Furthermore, when an MPU is divided into a plurality of movie fragments, information indicating whether or not the MPU is divided into a plurality of movie fragments, attributes of the divided movie fragments or an attribute of an MF meta for the divided movie fragments may be transmitted.

In this regard, each movie fragment attribute is information indicating whether the movie fragment is a head movie fragment of an MPU, a last movie fragment of the MPU, or the other movie fragment.

Further, each MF meta attribute is information indicating whether each MF meta indicates an MF meta corresponding to a head movie fragment of an MPU, an MF meta corresponding to a last movie fragment of the MPU or an MF meta corresponding to the other movie fragment.

In addition, transmitting device 15 may store the number of samples configuring a movie fragment and the number of movie fragments configuring one MPU as control information, and transmit the control information.

[Operation of Receiving Device]

The operation of receiving device 20 based on movie fragments configured as described will be described.

Receiving device 20 determines each absolute time of a PTS and a DTS based on MPU time stamp descriptors such as an absolute time signaled from the transmission side and relative times of the PTS and the DTS included in an MF meta.

Receiving device 20 performs processing as follows based on attributes of divided movie fragments when an MPU is divided based on information indicating whether or not the MPU is divided into a plurality of movie fragments.

(1) When a movie fragment is a head movie fragment of the MPU, receiving device 20 generates absolute times of a PTS and a DTS by using an absolute time of the PTS of a head sample included in an MPU time stamp descriptor, and relative times of a PTS and a DTS included in the MF meta.

(2) When the movie fragment is not a head movie fragment of the MPU, receiving device 20 generates absolute times of the PTS and the DTS by using relative times of the PTS and the DTS included in an MF meta without using information of the MPU time stamp descriptor.

(3) When the movie fragment is a last movie fragment of the MPU, receiving device 20 calculates the absolute times of PTSs and DTSs of all samples and then resets processing of calculating the PTSs and the DTSs (relative time addition process). In addition, the reset processing may be performed on the head movie fragment of the MPU.

Receiving device 20 may determine whether or not a movie fragment is divided as described below. Further, receiving device 20 may obtain attribute information of movie fragments as follows.

For example, receiving device 20 may determine whether or not a movie fragment is divided based on an identifier movie fragment_sequence_number field value indicating an order of the movie fragment indicated in an MMTP (MMT Protocol) payload header.

More specifically, when the number of movie fragments included in one MPU is 1, the movie fragment_sequence_number field value is 1 and there is the field value whose value is 2 or more, receiving device 20 may determine that the MPU is divided into a plurality of movie fragments.

Further, when the number of movie fragments included in one MPU is 1, the movie fragment_sequence_number field value is 0 and there is the field value whose value is other than 0, receiving device 20 may determine that the MPU is divided into a plurality of movie fragments.

Attribute information of the movie fragment may be also determined based on movie_fragment_sequence_number likewise.

In addition, whether or not a movie fragment is divided and attribute information of the movie fragment may be determined by counting the number of times of transmissions of movie fragments or MF metas included in one MPU without using movie_freagment_sequence_number.

According to the configurations of transmitting device 15 and receiving device 20 described above, receiving device 20 can receive movie fragment meta data at shorter intervals than that of an MPU and start low-delay decoding. Further, it is possible to perform low-delay decoding by using decoding processing based on an MP4 parsing method.

Figure 41:
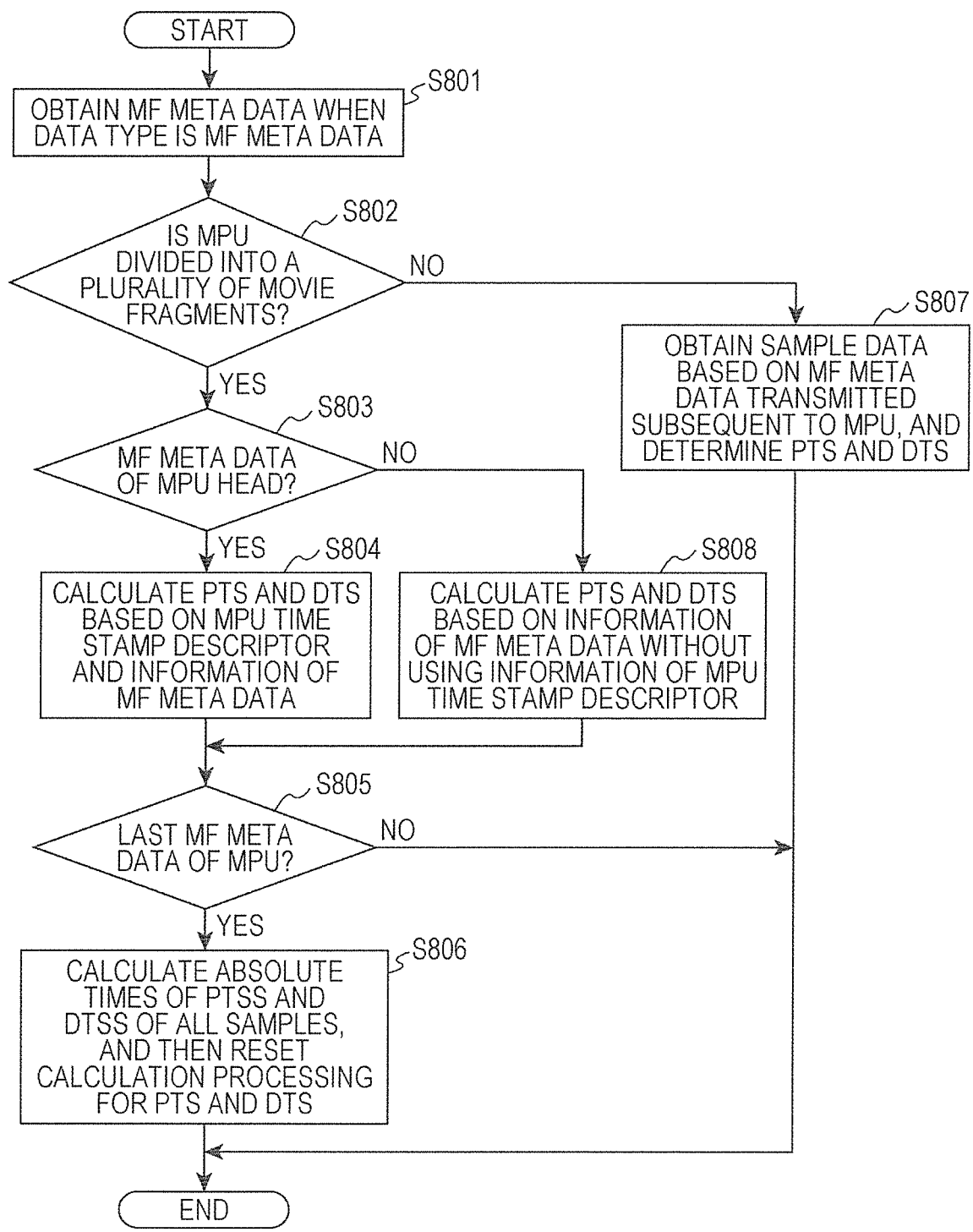
FIG. 41 is a flowchart of a receiving operation in a case where an MPU is divided into a plurality of movie fragments.

A receiving operation in a case where an MPU is divided into a plurality of movie fragments as described above will be described with reference to a flowchart. FIG. 41 is a flowchart of the receiving operation in a case where an MPU is divided into a plurality of movie fragments. In addition, this flowchart illustrates the operation in step S604 in FIG. 37 in more detail.

First, receiving device 20 obtains MF meta data based on a data type indicated in an MMTP payload header when the data type is an MF meta (step S801).

Next, receiving device 20 determines whether or not an MPU is divided into a plurality of movie fragments (step S802), and determines whether or not the received MF meta data is head meta data of the MPU (step S803) when the MPU is divided into a plurality of movie fragments (Yes in step S802). Receiving device 20 calculates absolute times of a PTS and a DTS based on an absolute time of the PTS indicated in an MPU time stamp descriptor and relative times of the PTS and the DTS indicated in the MF meta data (step S804) when the received MF meta data is the head MF meta data of the MPU (Yes in step S803), and determines whether or not the meta data is last meta data of the MPU (step S805).

Meanwhile, receiving device 20 calculates the absolute times of the PTS and the DTS by using the relative times of the PTS and the DTS indicated in the MF meta data without using the information of the MPU time stamp descriptor (step S808) when the received MF meta data is not the head MF meta data of the MPU (No in step S803), and moves to processing in step S805.

When it is determined in step S805 that the MF meta data is the last MF meta data of the MPU (Yes in step S805), receiving device 20 calculates absolute times of PTSs and DTSs of all samples, and then resets processing of calculating the PTS and the DTS. When it is determined in step S805 that the MF meta data is not the last MF meta data of the MPU (No in step S805), receiving device 20 finishes the process.

Further, when it is determined in step S802 that the MPU is not divided into a plurality of movie fragments (No in step S802), receiving device 20 obtains sample data based on MF meta data transmitted subsequent to the MPU, and determines the PTS and the DTS (S807).

Furthermore, although not illustrated, receiving device 20 finally performs decoding processing and presentation processing based on the determined PTS and DTS.

[Phenomenon which Occurs when Movie Fragment is Divided, and Solution of Phenomenon]

A method for reducing an End-to-End delay by dividing a movie fragment has been described so far. Hereinafter, a phenomenon which newly occurs when a movie fragment is divided, and a solution of the phenomenon will be described.

Figure 42:
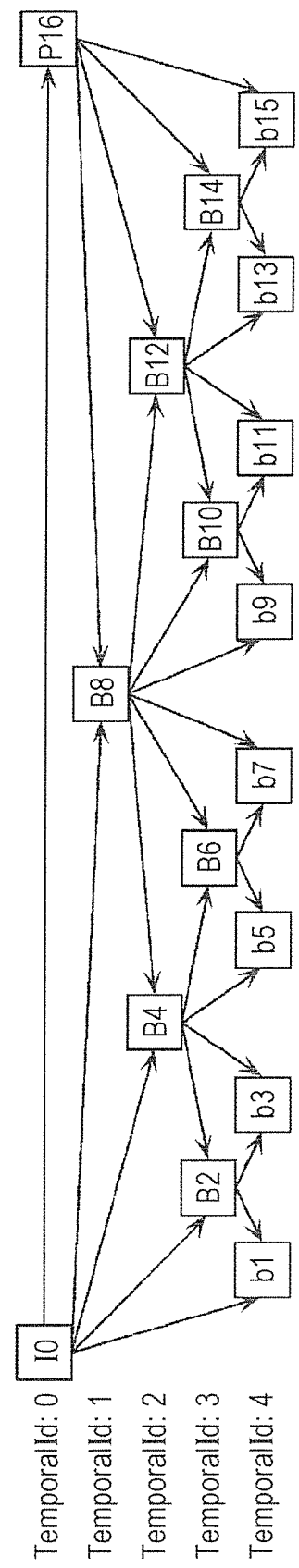
FIG. 42 is a view illustrating an example of a picture predicted structure of each TemporalId in a case where temporal scalability is realized.

First, a picture structure of encoded data will be described as a background. FIG. 42 is a view illustrating an example of a picture predicted structure for each TemporalId when temporal scalability is realized.

According to encoding methods such as MPEG-4 AVC and HEVC (High Efficiency Video Coding), it is possible to realize scalability (temporal scalability) in a time domain by using picture B (bidirectional reference predicted picture) which can be referred from another picture.

TemporalId illustrated in FIG. 42 is an identifier of a layer of an encoding structure, and TemporalId having a higher value indicates a deeper layer. Each square block indicates a picture, Ix in a block represents picture I (intra-plane predicted picture), Px represents picture P (forward reference predicted picture), and Bx and bx represent pictures B (bidirectional reference predicted picture). x of Ix/Px/Bx indicates a display order, and represents an order to display pictures. Each arrow between pictures indicates a reference relationship and, for example, picture B4 indicates that a predicted image is generated by using I0 and B8 as reference images. In this regard, using another picture having a higher TemporalId than TemporalId of one picture as a reference image is forbidden. Layers are defined to secure temporal scalability, and, by, for example, decoding all pictures in FIG. 42, a video of 120 fps (frame per second) is obtained and, by decoding layers whose TemporalIds are 0 to 3, a video of 60 fps is obtained.

Figure 43:
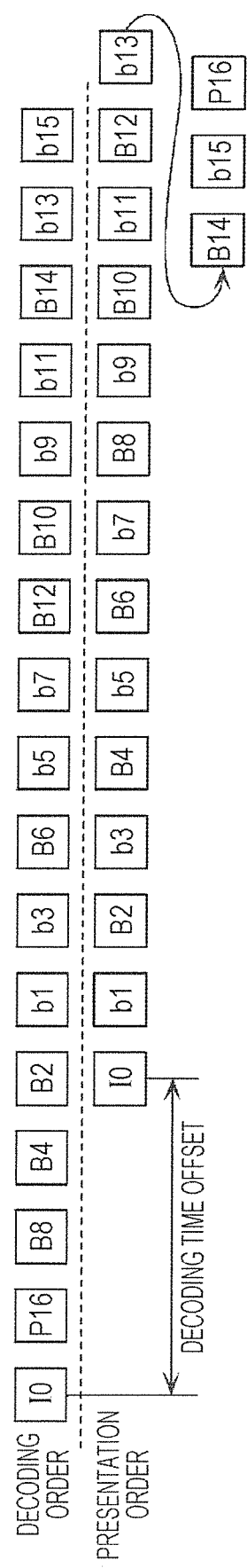
FIG. 43 is a view illustrating a relationship between a decoding time (DTS) and a presentation time (PTS) of each picture in FIG. 42.

FIG. 43 is a view illustrating a relationship between a decoding time (DTS) and a presentation time (PTS) of each picture in FIG. 42. For example, picture I0 illustrated in FIG. 43 is displayed after decoding B4 is finished so as not to produce a gap between decoding and display.

As illustrated in FIG. 43, when picture B is included in a predicted structure, a decoding order and a display order are different. Therefore, receiving device 20 needs to perform picture delay processing and picture rearrangement (reorder) processing after decoding a picture.

Figure 44:
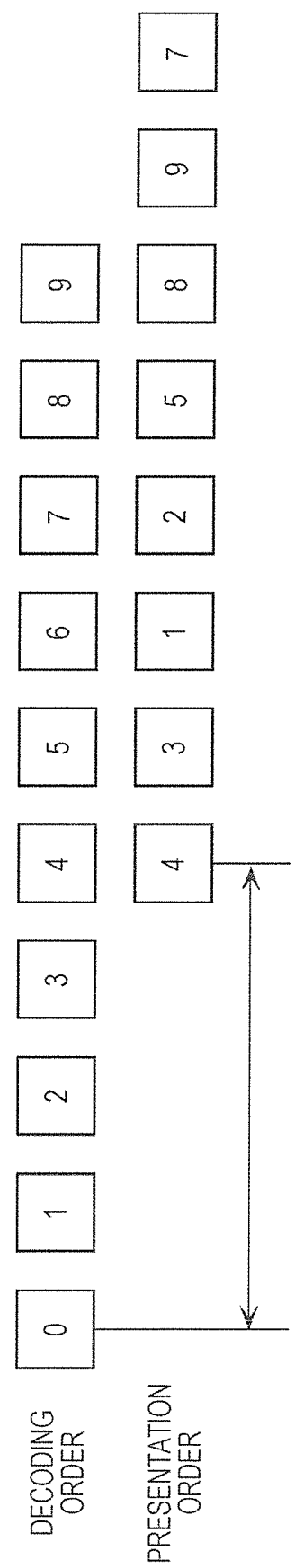
FIG. 44 is a view illustrating an example of a picture predicted structure for which picture delay processing and reorder processing need to be performed.

An example of a picture predicted structure for securing scalability in the time domain has been described. Even when scalability in the time domain is not used, it is necessary to perform the picture delay processing and the reorder processing depending on predicted structures. FIG. 44 is a view illustrating a picture predicted structure example for which a picture delay process and a reorder process need to be performed. In addition, numbers in FIG. 44 indicate a decoding order.

As illustrated in FIG. 44, depending on predicted structures, a head sample in a decoding order and a head sample in a presentation order are different in some cases. In FIG. 44, the head sample in the presentation order is a fourth sample in the decoding order. In addition, FIG. 44 illustrates an example of a predicted structure, and the predicted structure is not limited to such a structure. According to another predicted structure, too, a head sample in a decoding order and a head sample in a presentation order are different in some cases.

Figure 45:
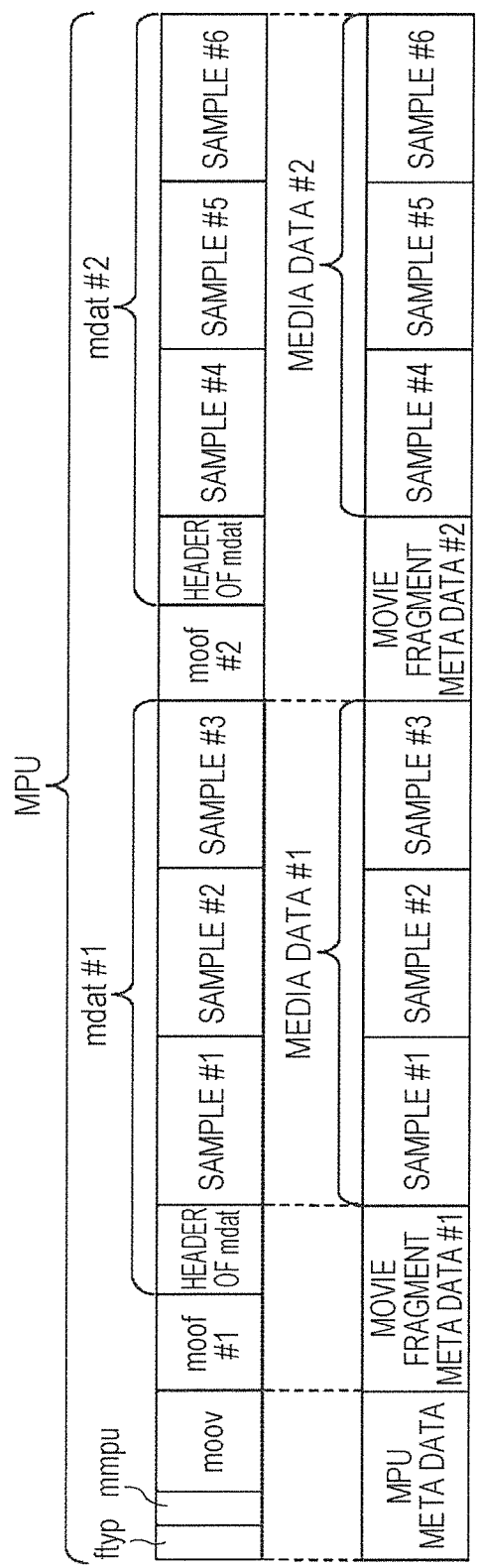
FIG. 45 is a view illustrating an example where an MPU configured by an MP4 format is divided into a plurality of movie fragments, and is stored in an MMTP (MPEG Media Transport Protocol) payload and an MMTP packet.

Similar to FIG. 33, FIG. 45 is a view illustrating an example where an MPU configured by an MP4 format is divided into a plurality of movie fragments, and is stored in an MMTP payload and an MMTP packet. In addition, the number of samples configuring an MPU and the number of samples configuring a movie fragment are arbitrary. For example, the number of samples configuring an MPU is defined as the number of samples in GOP units, and the number of samples which is half the GOP units is defined as a movie fragment, so that two movie fragments may be configured. One sample may be one movie fragment or samples configuring an MPU may not be divided.

FIG. 45 illustrates an example where one MPU includes two movie fragments (a moof box and a mdat box). The number of movie fragments included in one MPU may not be two. The number of movie fragments included in one MPU may be three or more or may be the number of samples included in the MPU. Further, the number of samples to be stored in a movie fragment may not be an equally divided number of samples, and may be divided to an arbitrary number of samples.

Movie fragment meta data (MF meta data) includes information of a PTS, a DTS, an offset and a size of a sample included in a movie fragment, and receiving device 20 extracts the PTS and the DTS from the MF meta including the information of the sample and determines a decoding timing and a presentation timing when decoding the sample.

Hereinafter, for more detailed description, an absolute value of a decoding time of sample i is described as DTS(i), and an absolute time of a presentation time is described as PTS(i).

Information of the ith sample of time stamp information stored in moof of an MF meta is more specifically relative values of decoding times of the ith sample and (i+1)th sample and relative values of the decoding time and a presentation time of the ith sample which will be referred to as DT(i) and CT(i) below.

Movie fragment meta data #1 includes DT(i) and CT(i) of samples #1 to #3, and movie fragment meta data #2 includes DT(i) and CT(i) of samples #4 to #6.

Further, an absolute value of a PTS of a head access unit of an MPU is stored in an MPU time stamp descriptor, and receiving device 20 calculates a PTS and a DTS based on PTS_MPU of the head access unit of the MPU, a CT and a DT.

Figure 46:
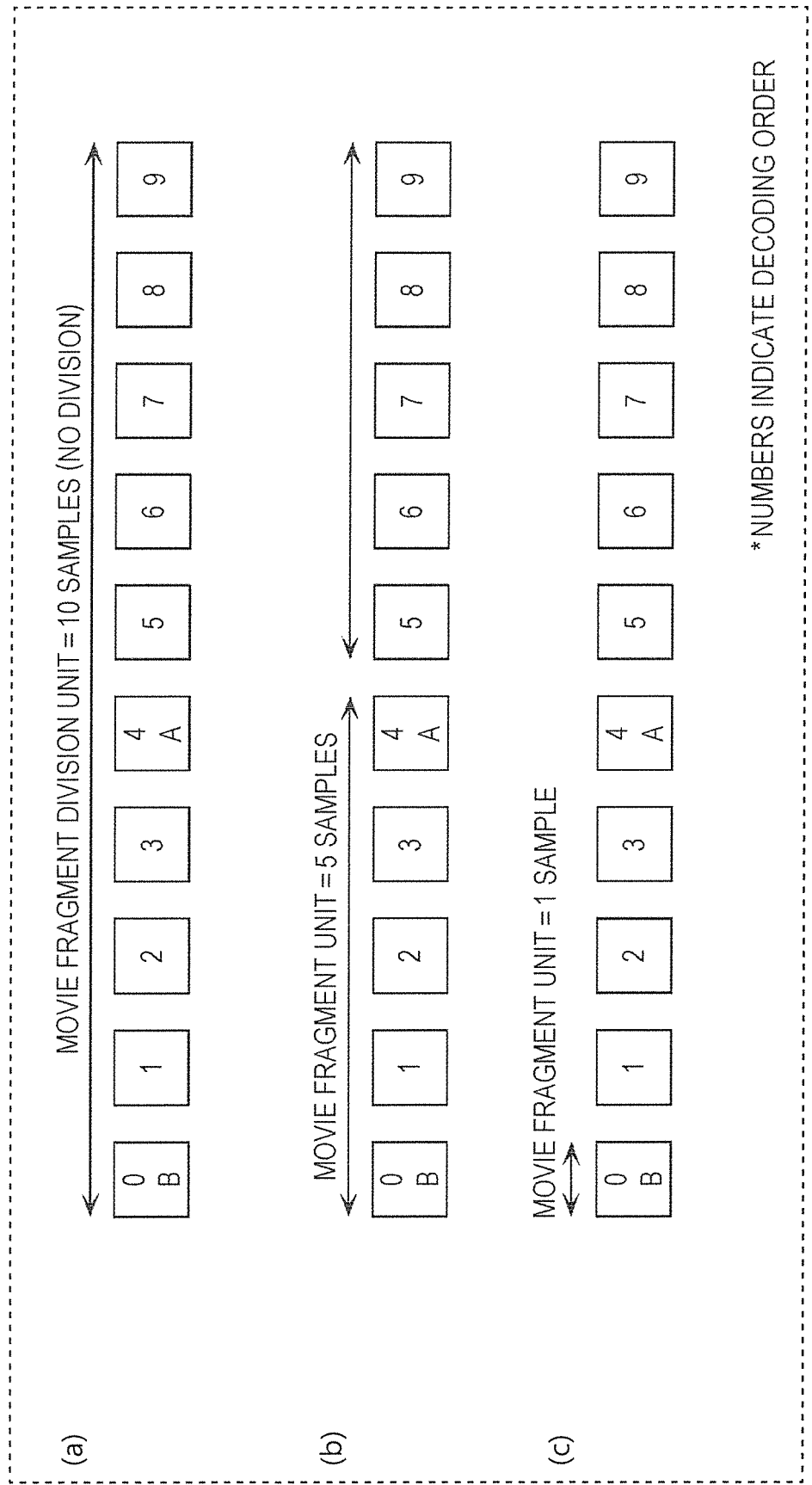
FIG. 46 is a view for explaining a method for calculating a PTS and a DTS and a phenomenon.

FIG. 46 is a view for explaining a method for calculating a PTS and a DTS in a case where samples #1 to #10 configure an MPU, and a phenomenon.

FIG. 46(a) illustrates an example where an MPU is not divided into movie fragments. FIG. 46(b) illustrates an example where an MPU is divided into two movie fragments in five sample units. FIG. 46(c) illustrates an example where an MPU is divided into ten movie fragments in sample units.

As described with reference to FIG. 45, when a PTS and a DTS are calculated by using an MPU time stamp descriptor and time stamp information in MP4 (a CT and a DT), the head sample in the presentation order in FIG. 44 is the fourth sample in the decoding order. Hence, the PTS stored in the MPU time stamp descriptor is a PTS (absolute value) of the fourth sample in the decoding order. In addition, hereinafter, this sample is referred to as sample A. Further, a head sample in a decoding order is referred to as sample B.

Absolute time information related to a time stamp is information of an MPU time stamp descriptor. Therefore, receiving device 20 has difficulty in calculating PTSs (absolute times) and DTSs (absolute times) of other samples until sample A arrives. Receiving device 20 has difficulty in calculating either a PTS or a DTS of sample B.

In an example in FIG. 46(a), sample A is included in the same movie fragment as that of sample B, and is stored in one MF meta. Consequently, receiving device 20 can immediately determine a DTS of sample B after receiving the MF meta.

In an example in FIG. 46(b), sample A is included in the same movie fragment as that of sample B, and is stored in one MF meta. Consequently, receiving device 20 can immediately determine a DTS of sample B after receiving the MF meta.

In an example in FIG. 46(c), sample A and sample B are included in different movie fragments. Hence, receiving device 20 has difficulty in determining a DTS of sample B only if an MF meta including a CT and a DT of a movie fragment including sample A has been received.

Hence, in the case of the example in FIG. 46(c), receiving device 20 has difficulty in immediately starting decoding after sample B arrives.

Thus, when a movie fragment including sample B does not include sample A, if receiving device 20 has not received an MF meta related to a movie fragment including sample A, receiving device 20 has difficulty in starting decoding sample B.

When a head sample in the presentation order and a head sample in the decoding order do not match, a movie fragment is divided until sample A and sample B stop being stored in the same movie fragment, and therefore this phenomenon takes place. Further, this phenomenon takes place irrespectively of whether an MF meta is transmitted earlier or later.

Thus, when the head sample in the presentation order and the head sample in the decoding order do not match, and when sample A and sample B are not stored in the same movie fragment, it is difficult to immediately determine a DTS after reception of sample B. Hence, transmitting device 15 transmits additionally a DTS (absolute value) of sample B or information for enabling the reception side to calculate a DTS (absolute value) of sample B. Such information may be transmitted by using control information, a packet header or the like.

Figure 47:
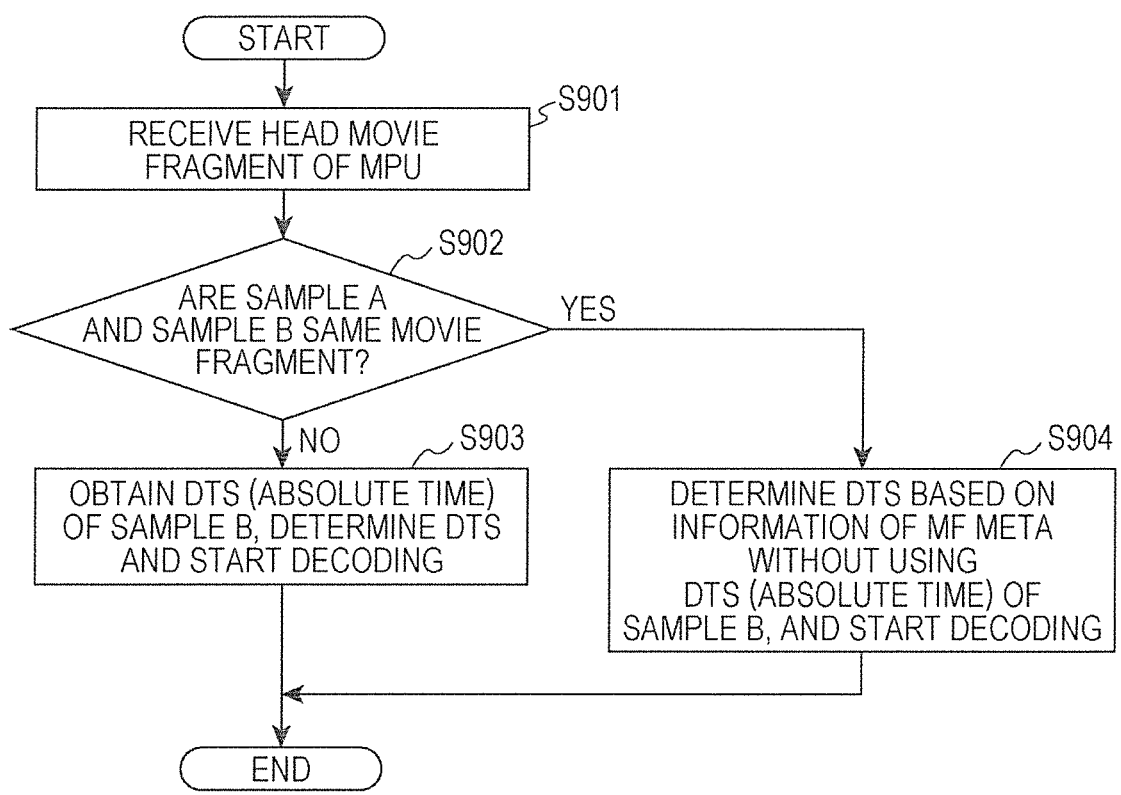
FIG. 47 is a flowchart of a receiving operation in a case where a DTS is calculated by using DTS calculation information.

Receiving device 20 calculates a DTS (absolute value) of sample B by using such information. FIG. 47 is a flowchart of a receiving operation when a DTS is calculated by using such information.

Receiving device 20 receives a head movie fragment of an MPU (step S901), and determines whether or not sample A and sample B are stored in the same movie fragment (step S902). When sample A and sample B are stored in the same movie fragment (Yes in step S902), receiving device 20 calculates a DTS by using information of an MF meta without using the DTS (absolute time) of sample B, and starts decoding (step S904). In addition, in step S904, receiving device 20 may determine a DTS by using the DTS of sample B.

Meanwhile, when sample A and sample B are not stored in the same movie fragment in step S902 (No in step S902), receiving device 20 obtains the DTS (absolute time) of sample B, determines the DTS and starts decoding (step S903).

In addition, an example where an absolute value of a decoding time of each sample and an absolute time of a presentation time are calculated by using an MF meta (time stamp information stored in moof of an MP4 format) according to MMT standards is described above. However, an MF meta may be replaced with arbitrary control information which can be used to calculate an absolute value of a decoding time of each sample and an absolute value of presentation time to carry out the calculation. Such control information includes, for example, control information in which relative values CT(i) of decoding times of the ith sample and the (i+1)th sample are replaced with relative values of presentation times of the ith sample and the (i+1)th sample, and control information including both of relative values CT(i) of decoding times of the ith sample and (i+1)th sample, and relative values of presentation times of the ith sample and the (i+1)th sample.

Third Exemplary Embodiment

[Outline]

A content transmitting method and a content data structure in the case where content such as a video, an audio, a caption and data broadcast is transmitted by way of broadcasting will be described in the third exemplary embodiment. That is, the content transmitting method specialized in broadcast stream playback, and the content data structure will be described.

In addition, an example where an MMT method (referred to simply as MMT below) is used as a multiplexing method will be described in the third exemplary embodiment. However, other multiplexing methods such as DASH and RTP may be used.

First, a method for storing a data unit (DU) in a payload according to MMT will be described in detail. FIG. 48 is a view for explaining a method for storing a data unit in a payload according to MMT.

According to MMT, a transmitting device stores part of data configuring an MPU as a data unit in an MMTP payload, adds a header to the data and transmits the data. The header includes the MMTP payload header and an MMTP packet header. In addition, units of the data unit may be units of NAL units or units of samples.

FIG. 48(a) illustrates an example where the transmitting device aggregates a plurality of data units to store in one payload. In the example in FIG. 48(a), a data unit header (DUH) and a data unit length (DUL) are allocated to a head of each of a plurality of data units, and a plurality of data units to which data unit headers and data unit lengths are allocated is collectively stored in the payload.

FIG. 48(b) illustrates an example where one data unit is stored in one payload. In the example in FIG. 48(b), a data unit header is allocated to a head of the data unit, and the data unit is stored in the payload. FIG. 48(c) illustrates an example where one data unit is divided, data unit headers are allocated to the divided data units, and the data units are stored in a payload.

The data unit includes types of a timed-MPU which is media such as a video, an audio and a caption including information related to synchronization, a non-timed-MFU which is media such as a file not including information related to synchronization, MPU meta data, and MF meta data, and a data unit header is determined according to a data unit type. In addition, MPU meta data and MF meta data do not include a data unit header.

Further, the transmitting device fundamentally has difficulty in aggregating data units of different types, yet it may be defined that the transmitting device can aggregate data units of different types. When, for example, an MF meta data size in the case where data is divided into movie fragments per sample is small, it is possible to reduce a number of packets and reduce a transmission quantity by aggregating the MF meta data and media data.

When a data unit is an MFU, part of information of the MPU such as information for configuring the MPU (MP4) is stored as a header.

For example, a header of a timed-MFU includes movie fragment_sequence_number, sample_number, offset, priority and dependency_counter, and a header of a non-timed-MFU includes item_iD. A meaning of each field is indicated by standards such as ISO/IEC23008-1 or ARIB STD-B60. The meaning of each field defined in these standards will be described below.

movie fragment_sequence_number indicates a sequence number of a movie fragment to which the MFU belongs, and is indicated in ISO/IEC14496-12, too.

sample_number indicates a sample number to which the MFU belongs, and is indicated in ISO/IEC14496-12, too.

offset indicates byte units of an offset amount of the MFU in the sample to which the MFU belongs.

priority indicates a relative importance of the MFU in an MPU to which the MFU belongs, and an MFU of a higher number of priority indicates a more important MFU than MFUs of smaller numbers of priority.

dependency_counter indicates a number of MFUs for which whether or not to perform decoding processing depends on the MFU, i.e., the number of MFUs for which it is difficult to perform decoding processing unless this MFU is decoded. When, for example, the MFU is HEVC and a B picture or a P picture refers to an I picture, it is difficult to decode the B picture or the P picture unless the I picture is decoded.

Hence, when the MFU is in units of samples, dependency_counter of the MFU of the I picture indicates a number of pictures which refer to the I picture. When the MFU is in units of NAL units, dependency_counter in the MFU belonging to the I picture indicates a number of NAL units belonging to pictures which refer to the I picture. Further, in the case of a video signal hierarchically encoded in a time domain, MFUs in an extended layer depend on an MFU of a base layer. Therefore, dependency_counter of the MFU of the base layer indicates a number of MFUs of the extended layer. It is difficult to generate this field if the number of depending MFUs has not been determined.

item_iD indicates an identifier for uniquely specifying an item.

[Non-MP4 Support Mode]

As described with reference to FIGS. 19 and 21, a method of the transmitting device for transmitting an MPU according to MMT includes a method for transmitting MPU meta data or MF meta data before or after media data or a method for transmitting only media data. Further, a receiving device adopts a method for performing decoding by using an MP4-compliant receiving device or receiving method or a method for performing decoding without using a header.

The data transmitting method specialized in broadcast stream playback is, for example, a transmitting method which does not support MP4 reconfiguration in the receiving device.

The transmitting method which does not support MP4 reconfiguration in the receiving device is, for example, a method for not transmitting meta data (MPU meta data and MF meta data) as illustrated in FIG. 21(b). In this case, a field value of a fragment type (information indicating a data unit type) included in an MMTP packet is fixed to 2 (=MFU).

In the case where meta data is not transmitted, as described above, the MP4-compliant receiving device has difficulty in decoding received data as MP4 yet can decode the received data without using meta data (header).

Hence, the meta data is not necessarily indispensable information to decode and play back broadcast streams. Similarly, the information of the data unit header of the timed-MFU described with reference to FIG. 48 is information for reconfiguring MP4 in the receiving device. MP4 does not need to be reconfigured during broadcast stream playback. Therefore, information of the data unit header of the timed-MFU (also described as a timed-MFU header below) is not necessarily necessary information for broadcast stream playback.

The receiving device can easily reconfigure MP4 by using meta data and information for reconfiguring MP4 in a data unit header (such information will be also described as MP4 configuration information). However, the receiving device has difficulty in reconfiguring MP4 even if only one of meta data and MP4 configuration information in the data unit header has been transmitted. An advantage provided by transmitting only one of the meta data and the information for reconfiguring MP4 is little. Generating and transmitting unnecessary information increase processing and lower transmission efficiency.

Hence, the transmitting device controls transmission of a data structure of MP4 configuration information by using a following method. The transmitting device determines whether or not a data unit header indicates the MP4 configuration information, based on whether or not meta data is transmitted. More specifically, when the transmitting device transmits meta data, the data unit header indicates MP4 configuration information, and, when the transmitting device does not transmit meta data, the data unit header does not indicate the MP4 configuration information.

For a method for not indicating the MP4 configuration information in the data unit header, for example, a following method can be used.

1. The transmitting device sets the MP4 configuration information to reserved and is not operated. Consequently, it is possible to reduce a processing amount of a transmission side (the processing amount of the transmitting device) which generates the MP4 configuration information.

2. The transmitting device deletes the MP4 configuration information, and compresses a header. Consequently, it is possible to reduce the processing amount of the transmission side which generates the MP4 configuration information, and reduce a transmission quantity.

In addition, when deleting the MP4 configuration information and compressing the header, the transmitting device may set a flag indicating that the MP4 configuration information has been deleted (compressed). The flag is indicated in the header (an MMTP packet header, an MMTP payload header or a data unit header) or control information.

Further, information indicating whether or not meta data is transmitted may be determined in advance or may be additionally signaled in the header or the control information and transmitted to the receiving device.

For example, information indicating whether or not the meta data corresponding to an MFU is transmitted may be stored in an MFU header.

Meanwhile, the receiving device can determine whether or not the MP4 configuration information is indicated, based on whether or not the meta data is transmitted.

In this regard, when a data transmission order (e.g. an order of MPU meta data, MF meta data, and media data) is determined, the receiving device may determine whether or not the MP4 configuration information is indicated, based on whether or not the meta data has been received prior to media data.

When the MP4 configuration information is indicated, the receiving device can use the MP4 configuration information to reconfigure MP4. Alternatively, the receiving device can use the MP4 configuration information to detect heads of other access units or NAL units.

In addition, the MP4 configuration information may be all or part of a timed-MFU header.

Further, for a non-timed-MFU header, too, the transmitting device may determine likewise whether or not the non-timed-MFU header indicates itemid, based on whether or not the meta data is transmitted.

The transmitting device may determine that only one of the timed-MFU and the non-timed-MFU indicates the MP4 configuration information. When only one of the timed-MFU and the non-timed-MFU indicates the MP4 configuration information, the transmitting device determines whether or not the MP4 configuration information is indicated, based on whether or not the meta data is transmitted and, in addition, in which one of the timed-MFU or the non-timed-MFU the MP4 configuration information is indicated. The receiving device can determine whether or not the MP4 configuration information is indicated, based on whether or not the meta data is transmitted and a timed/non-timed flag.

In addition, in the above description, the transmitting device determines whether or not MP4 configuration information is indicated, based on whether or not meta data (both of MPU meta data and MF meta data) is transmitted. However, the transmitting device may determine not to indicate the MP4 configuration information when not transmitting part of the meta data (one of the MPU meta data and the MF meta data).

Further, the transmitting device may determine whether or not to indicate the MP4 configuration information based on information other than the meta data.

When, for example, a mode such as an MP4 support mode/non-MP4 support mode is defined, the transmitting device may determine that a data unit header indicates MP4 configuration information in the case of the MP4 support mode, and that the data unit header does not indicate the MP4 configuration information in the case of the non-MP4 support mode. Further, the transmitting device may transmit meta data and may determine that the data unit header indicates MP4 configuration information in the case of the MP4 support mode, and may not transmit meta data and may determine that the data unit header does not indicate the MP4 configuration information in the case of the non-MP4 support mode.

[Flowchart of Operation of Transmitting Device]

Figure 49:
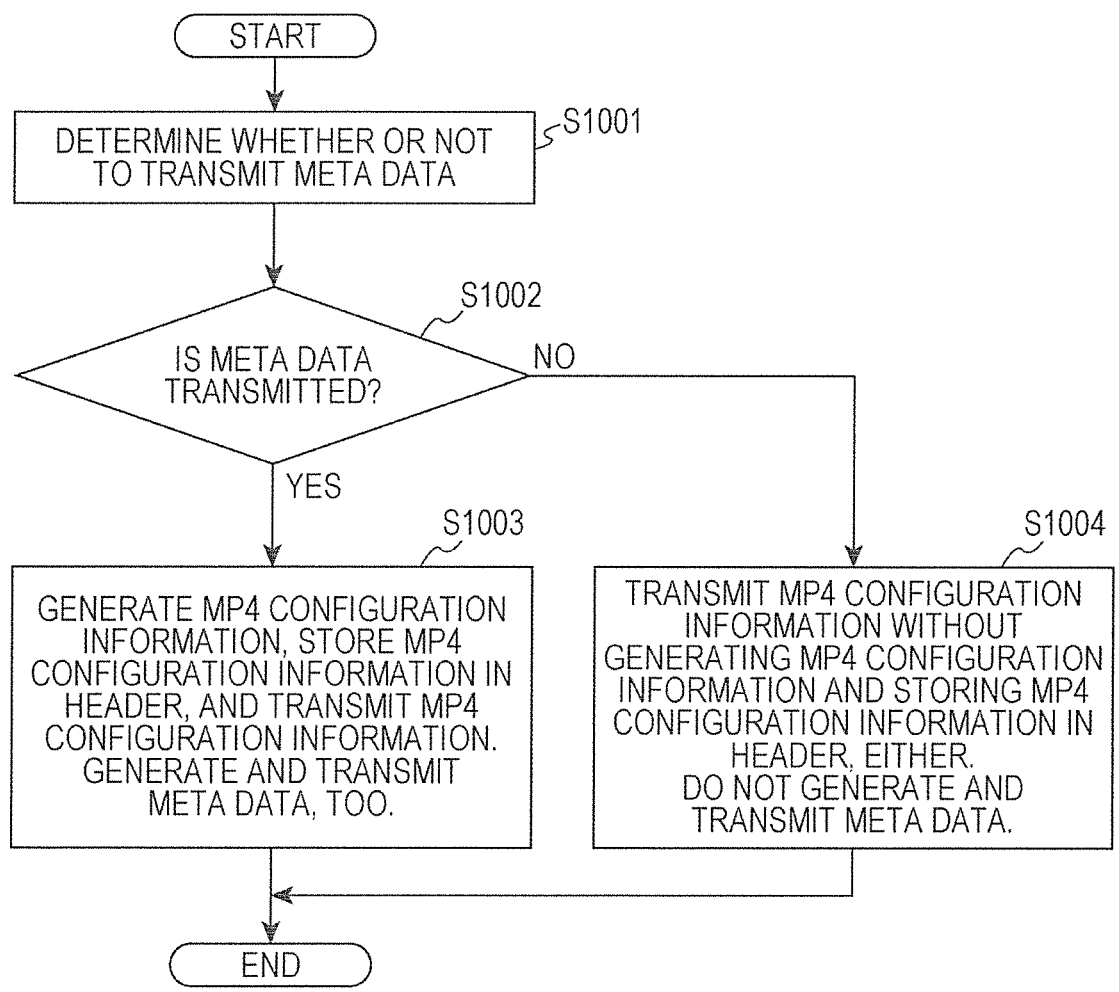
FIG. 49 is a flowchart of an operation of a transmitting device according to a third exemplary embodiment.

Next, a flowchart of an operation of the transmitting device will be described. FIG. 49 illustrates a flowchart of an operation of the transmitting device.

The transmitting device first determines whether or not to transmit meta data (step S1001). When determining to transmit the meta data (Yes in step S1002), the transmitting device moves to step S1003 to generate MP4 configuration information, store the MP4 configuration information in a header and transmit the MP4 configuration information (step S1003). In this case, the transmitting device generates and transmits meta data, too.

Meanwhile, when determining not to transmit the meta data (No in step S1002), the transmitting device transmits the MP4 configuration information without generating the MP4 configuration information and storing the MP4 configuration information in the header, either (step S1004). In this case, the transmitting device does not generate and transmit meta data.

In addition, whether or not to transmit the meta data in step S1001 may be determined in advance, or may be determined based on whether or not the meta data has been generated inside the transmitting device or the meta data has been transmitted inside the transmitting device.

[Flowchart of Operation of Receiving Device]

Figure 50:
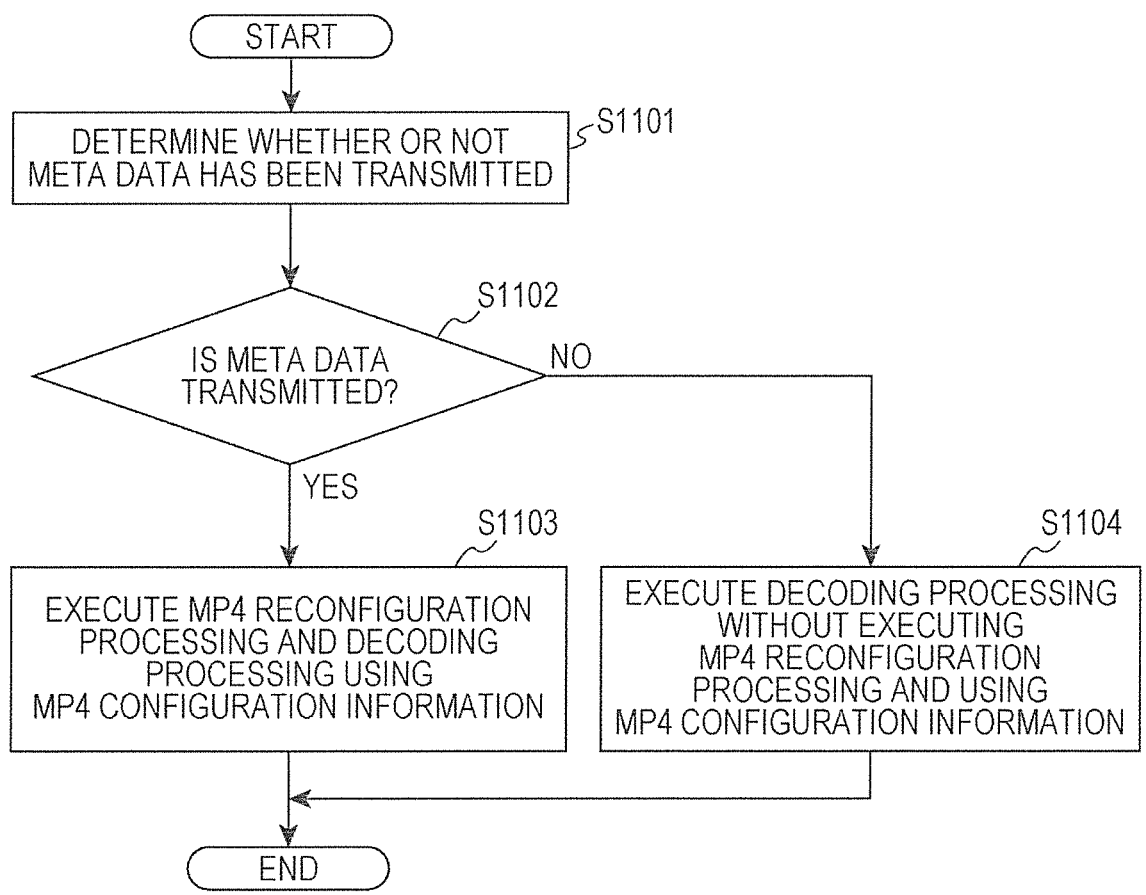
FIG. 50 is a flowchart of an operation of a receiving device according to the third exemplary embodiment.

Next, a flowchart of an operation of the receiving device will be described. FIG. 50 illustrates a flowchart of an operation of the receiving device.

The receiving device first determines whether or not meta data has been transmitted (step S1101). It is possible to determine whether or not the meta data is transmitted, by monitoring a fragment type in an MMTP packet payload. Further, whether or not the meta data is transmitted may be determined in advance.

When determining that the meta data has been transmitted (Yes in step S1102), the receiving device reconfigures MP4, and executes decoding processing using MP4 configuration information (step S1103). Meanwhile, when determining that the meta data is not transmitted (No in step S1102), the receiving device executes the decoding processing without performing MP4 reconfiguration processing, and using the MP4 configuration information (step S1104).

In addition, the receiving device can detect a random access point, detect an access unit head and detect an NAL unit head by using the above-described method without using the MP4 configuration information, and can perform decoding processing, packet loss detection and packet loss recovery processing.

For example, an access unit head is head data of an MMT payload whose aggregation_flag value takes 1. In this case, a Fragmentation_indicator value takes 0.

Further, the head of the slice segment is head data of an MMT payload whose aggregation flag value is 0 and whose fragmentation_indicator value is 00 or 01.

The receiving device can detect the access unit head and detect slice segments based on the above information.

In addition, the receiving device may analyze an NAL unit header in a packet including the data unit head whose fragmentation_indicator value is 00 or 01, and detect that an NAL unit type is an AU (access unit) delimiter and the NAL unit type is a slice segment.

[Broadcast Simple Mode]

The method of the receiving device which does not support MP4 configuration information has been described as the data transmitting method specialized in broadcast stream playback. However, the data transmitting method specialized in broadcast stream playback is not limited to this.

As the data transmitting method specialized in broadcast stream playback, a following method may be used, for example.

- The transmitting device may not use AL-FEC in broadcast fixed reception environment. When AL-FEC is not used, FEC_type is fixed to 0 in an MMTP packet header.
- The transmitting device may use AL-FEC in broadcast mobile reception environment and a communication UDP (User Datagram Protocol) transmission mode. When AL-FEC is used, FEC_type in the MMTP packet header is 0 or 1.
- The transmitting device may not perform bulk transmission of an asset. When the bulk transmission of the asset is not performed, location_infolocation indicating a number of transmission locations of the asset inside MPT may be fixed to 1.
- The transmitting device may not perform hybrid transmission of an assent, a program and a message.

Further, when, for example, the broadcast simple mode is defined, the transmitting device may use the non-MP4 support mode or use the above data transmitting method specialized in broadcast stream playback in the case of the broadcast simple mode. Whether or not the broadcast simple mode is used may be determined in advance, or the transmitting device may store a flag indicating the broadcast simple mode as control information and transmit the control information to the receiving device.

Further, based on whether or not the non-MP4 support mode is used, i.e., whether or not meta data has been transmitted described with reference to FIG. 49, the transmitting device may use the above data transmitting method specialized in broadcast stream playback for the broadcast simple mode in the case of the non-MP4 support mode.

In the case of the broadcast simple mode, the receiving device can determine that the non-MP4 support mode is used and perform decoding processing without reconfiguring MP4.

Further, in the case of the broadcast simple mode, the receiving device can determine that a function specialized in broadcast is used, and perform reception processing specialized in broadcast.

Consequently, in the case of the broadcast simple mode, it is possible to not only reduce processing unnecessary for the transmitting device and the receiving device by using only the function specialized in broadcast but also reduce a transmission overhead since unnecessary information is not compressed and transmitted.

In addition, when the non-MP4 support mode is used, hint information supporting an accumulating method other than MP4 configuration may be indicated.

The accumulating method other than the MP4 configuration may include, for example, a method for directly accumulating MMT packets or IP packets and a method for converting MMT packets into MPEG-2 TS packets.

In addition, in the case of the non-MP4 support mode, a format which is not compliant with the MP4 configuration may be used.

For example, in the case of the non-MP4 support mode, data may be stored in an MFU in a format with a byte start code not in a format of an MP4 format with an NAL unit size added to a head of the NAL unit.

According to MMT, an asset type indicating a type of an asset is described as 4CC registered in MP4REG (http://www.mp4ra.org), and, when HEVC is used for a video signal, 'HEV1' or 'HVC1' is used. 'HEV1' is a format which may include a parameter set in a sample, and 'HVC1' is a format which does not include the parameter set in the sample and includes the parameter set in a sample entry in MPU meta data.

In the case of the broadcast simple mode or the non-MP4 support mode, it may be defined that, when MPU meta data and MF meta data are not transmitted, the parameter set is included in the sample. Further, it may be defined that, even when the asset type indicates any one of 'HEV1' and 'HVC1', the format of 'HVC1' is selected at all times.

[Supplementary Note 1: Transmitting Device]

Figure 51:
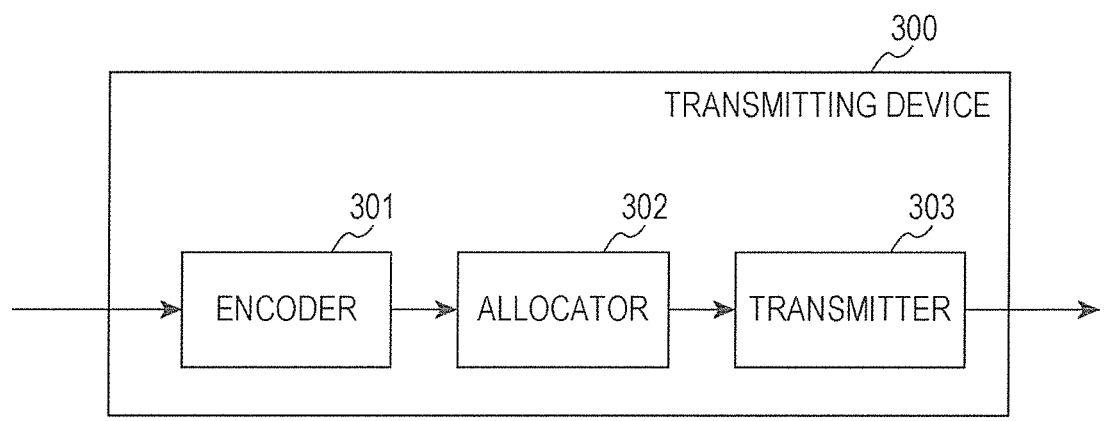
FIG. 51 is a view illustrating a specific configuration example of the transmitting device according to the third exemplary embodiment.

As described above, when meta data is not transmitted, the transmitting device which sets MP4 configuration information to reserved and is not operated can be configured as illustrated in FIG. 51, too. FIG. 51 is a view illustrating a specific configuration example of the transmitting device.

Transmitting device 300 includes encoder 301, allocator 302 and transmitter 303. Each of encoder 301, allocator 302 and transmitter 303 is realized by, for example, a microcomputer, a processor or a dedicated circuit.

Encoder 301 encodes a video signal or an audio signal and generates sample data. The sample data is more specifically a data unit.

Allocator 302 allocates header information including MP4 configuration information, to the sample data which is data obtained by encoding the video signal or the audio signal. The MP4 configuration information is information which is used by a reception side to reconfigure the sample data as a file of an MP4 format and which has contents differing according to whether or not a presentation time of the sample data is determined.

As described above, allocator 302 includes the MP4 configuration information such as movie_fragment_sequence_number, sample_number, offset, priority and dependency_counter in a header (header information) of a timed-MFU which is an example of the sample data (the sample data including information related to synchronization) whose presentation time is determined.

Meanwhile, allocator 302 includes the MP4 configuration information such as item id in the header (header information) of the non-timed-MFU which is an example of the sample data (the sample data which does not include the information related to synchronization) whose presentation time is not determined.

Further, when transmitter 303 does not transmit meta data corresponding to the sample data (in the case of FIG. 21(b), for example), allocator 302 allocates header information which does not include the MP4 configuration information, to the sample data according to whether or not the presentation time of the sample data is determined.

More specifically, allocator 302 allocates the header information which does not include first MP4 configuration, to the sample data when the presentation time of the sample data is determined, and allocates the header information including second MP4 configuration information, to the sample data when the presentation time of the sample data is not determined.

For example, as indicated by step S1004 in FIG. 49, when transmitter 303 does not transmit the meta data corresponding to the sample data, allocator 302 sets the MP4 configuration information to reserved (fixed value) so as not to substantially generate the MP4 configuration information and store the MP4 configuration information in a header (header information). In addition, the meta data includes MPU meta data and movie fragment meta data.

Transmitter 303 transmits the sample data to which the header information is allocated. More specifically, transmitter 303 packetizes the sample data to which the header information is allocated, according to an MMT method, and transmits the sample data.

As described above, according to the transmitting method and the receiving method specialized in broadcast stream playback, the receiving device does not need to reconfigure a data unit to MP4. When the receiving device does not need to reconfigure the data unit to MP4, unnecessary information such as the MP4 configuration information is not generated, so that processing of the transmitting device is reduced.

Meanwhile, the transmitting device needs to transmit necessary information yet needs to secure compliance with the standards such that extra additional information does not need to be additionally transmitted.

According to the configuration of transmitting device 300, an area in which the MP4 configuration information is stored is fixed to a fixed value, so that it is possible to provide an effect that only necessary information is transmitted based on the standards without transmitting the MP4 configuration information, and extra additional information does not need to be transmitted. That is, it is possible to reduce the configuration of the transmitting device and the processing amount of the transmitting device. Further, unnecessary data is not transmitted, so that it is possible to improve transmission efficiency.

[Supplementary Note 2: Receiving Device]

Figure 52:
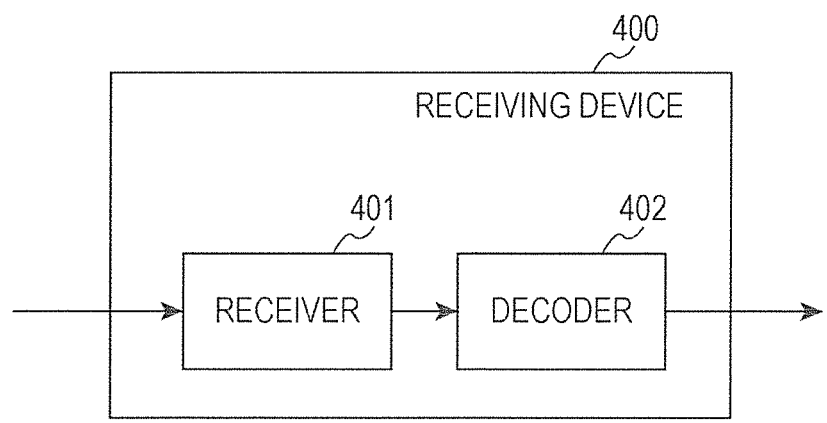
FIG. 52 is a view illustrating a specific configuration example of the receiving device according to the third exemplary embodiment.

Further, the receiving device which supports transmitting device 300 may be configured as illustrated in, for example, FIG. 52. FIG. 52 is a view illustrating another example of a configuration of the receiving device.

Receiving device 400 includes receiver 401 and decoder 402. Receiver 401 and decoder 402 are realized by, for example, microcomputers, processors or dedicated circuits.

Receiver 401 receives sample data which is data obtained by encoding a video signal or an audio signal, and to which header information including MP4 configuration information for reconfiguring the sample data as a file of an MP4 format is allocated.

Decoder 402 decodes the sample data without using the MP4 configuration information when the receiver does not receive meta data corresponding to the sample data, and when the presentation time of the sample data is determined.

For example, as indicated by step S1104 in FIG. 50, decoder 402 executes decoding processing without using the MP4 configuration information when receiver 401 does not receive the meta data corresponding to the sample data.

Consequently, it is possible to reduce the configuration of receiving device 400 and a processing amount of receiving device 400.

Fourth Exemplary Embodiment

[Outline]

In the fourth exemplary embodiment, a method for storing in an MPU a non-timed medium such as a file which does not include information related to synchronization, and a method for transmitting an MMTP packet will be described. In addition, in the fourth exemplary embodiment, an example of an MPU according to MMT will be described. However, DASH which is based on the same MP4 is also applicable.

Figure 53:
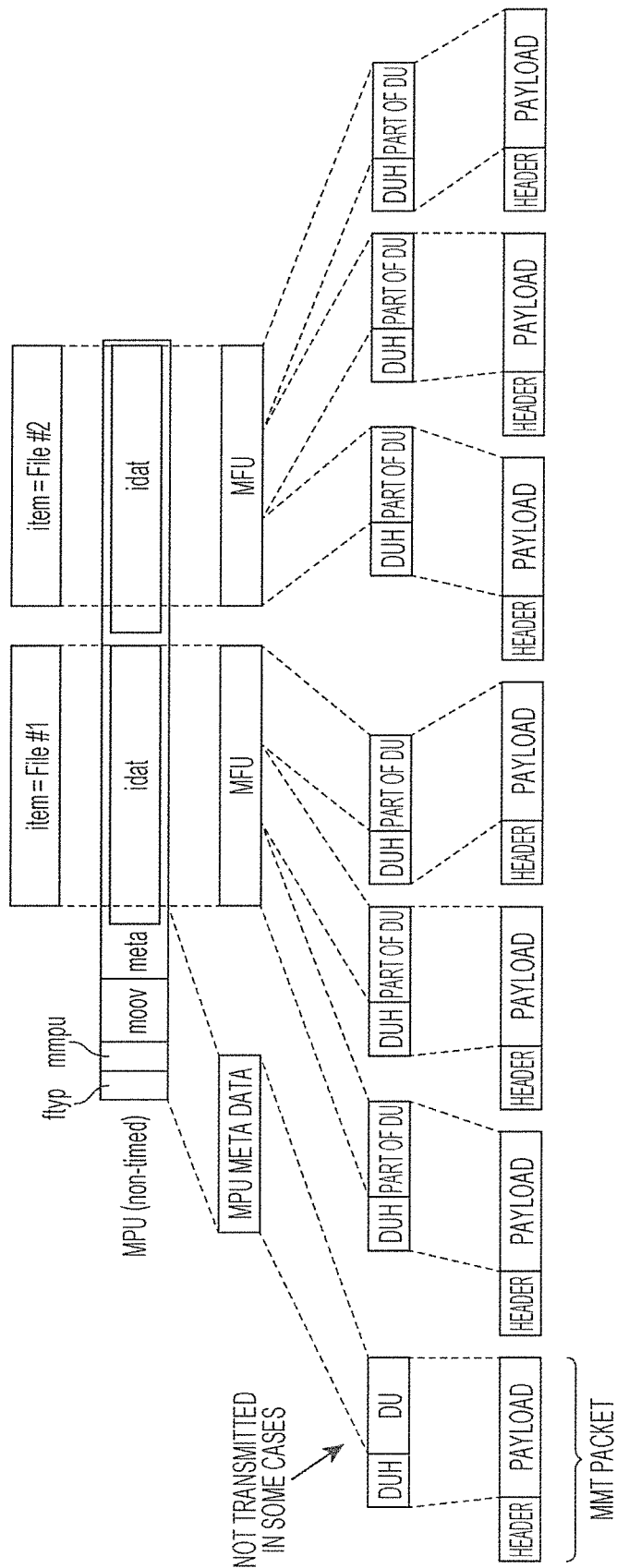
FIG. 53 is a view illustrating a method for storing a non-timed medium in an MPU, and a method for transmitting an MMTP packet.

First, the method for storing a non-timed medium (also referred to as a "non-timed media data" below) in an MPU will be described in detail with reference to FIG. 53. FIG. 53 is a view illustrating the method for storing a non-timed medium in an MPU, and a method for transmitting MMTP packets.

An MPU in which a non-timed medium is stored is configured by ftyp, mmpu, moov and meta boxes, and, in this MPU, information related to a file stored in the MPU is stored. A plurality of idat boxes can be stored in the meta box, and one file can be stored as an item in the idat box.

Part of the ftyp, mmpu, moov and meta boxes configure one data unit as MPU meta data, and the item or the idat box configures a data unit as an MFU.

A data unit is aggregated or fragmented, then is allocated a data unit header, an MMTP payload header and an MMTP packet header, and is transmitted as an MMTP packet.

In addition, FIG. 53 illustrates an example where File #1 and File #2 are stored in one MPU. MPU meta data is not divided or an MFU is divided and stored in an MMTP packet. However, the MPU and the MFU are not limited to these, and may be aggregated or fragmented according to a data unit size. Further, MPU meta data may not be transmitted and, when the MPU meta data is not transmitted, an MFU is transmitted.

Header information such as a data unit header includes itemID (an identifier which uniquely specifies an item). An MMTP payload header and an MMTP packet header include a packet sequence number (a sequence number of each packet) and an MPU sequence number (a sequence number of an MPU and a unique number in an asset).

In addition, a data structure of an MMTP payload header and an MMTP packet header other than a data unit header includes aggregation flag, fragmentation_indicator, and fragment_counter similar to timed media (also referred to as "timed media data" below) described above.

Next, a specific example of header information in the case where a file (=Item=MFU) is divided and packetized will be described with reference to FIGS. 54 and 55.

FIGS. 54 and 55 are views illustrating examples where each of a plurality of items of divided data obtained by dividing a file is packetized and is transmitted. More specifically, FIGS. 54 and 55 illustrate information (a packet sequence number, a fragment counter, a fragmentation indicator, an MPU sequence number and an item ID) included in one of a data unit header, an MMTP payload header and an MMTP packet header which is header information per divided MMTP packet. In addition, FIG. 54 is a view illustrating the example where File #1 is divided into M (M<=256), and FIG. 55 is a view illustrating the example where File #2 is divided into N (256<N).

A divided data number indicates an index of head divided data of a file, yet the divided data number information is not transmitted. That is, the divided data number is not included in header information. Further, the divided data number is a number allocated to a packet associated with each of a plurality of items of divided data obtained by dividing a file, and is a number allocated by incrementing the number by 1 from a head packet in an ascending order.

The packet sequence number is a sequence number of a packet having the same packet ID. In FIGS. 54 and 55, head divided data of a file is A, and continuous numbers are allocated to the items of divided data up to last divided data of a file. The packet sequence number is a number allocated by incrementing the number by 1 from head divided data of the file in the ascending order, and is a number associated with a divided data number.

The fragment counter indicates a number of items of a plurality of divided data which comes after a plurality of items of these divided data among a plurality of items of divided data obtained by dividing one file. Further, the fragment counter indicates a remainder obtained by dividing the number of items of divided data by 256 when the number of items of divided data which is the number of a plurality of items of divided data obtained by dividing one file exceeds 256. In the example in FIG. 54, the number of items of divided data is 256 or less, and therefore a field value of the fragment counter is (M−divided data number). Meanwhile, in the example in FIG. 55, the number of items of divided data exceeds 256, and therefore takes a remainder obtained by dividing (N−divided data number) by 256 and can be expressed as N−divided data number) %256. In this regard, % represents a symbol of an operation indicating a remainder obtained by the division.

In addition, the fragmentation indicator indicates a divided state of data stored in an MMTP packet, and is a value indicating head divided data of divided data units, last divided data, other divided data or one or more undivided data units. More specifically, the fragmentation indicator indicates "01" in the case of the head divided data, indicates "11" in the case of the last divided data, indicates "10" in the case of the rest of items of divided data and indicates "00" in the case of the undivided data units.

In the present exemplary embodiment, a case where, when the number of items of divided data exceeds 256, the number of items of divided data indicates a remainder obtained by dividing the number of items of divided data by 256 will be described. However, the number of items of divided data is not limited to 256, and may take other numbers (predetermined numbers).

Assume a case where a file is divided as illustrated in FIGS. 54 and 55, conventional header information is allocated to each of a plurality of items of divided data obtained by dividing the file, and a plurality of items of divided data is transmitted. In this case, a receiving device does not know what divided data number the items of data stored in received MMTP packets are in the original file (divided data numbers), and the number of items of divided data of the file or has no information which makes it possible to specify divided data numbers and the number of items of divided data. Therefore, according to a conventional transmitting method, even when an MMTP packet is received, it is difficult to uniquely detect divided data numbers of the items of data stored in the received MMTP packets, and the number of items of divided data.

When, for example, the number of items of divided data is 256 or less as illustrated in FIG. 54 and that the number of items of divided data is 256 or less is known in advance, it is possible to specify divided data numbers and the number of items of divided data by referring to fragment counters. However, when the number of items of divided data is 256 or more, it is difficult to specify divided data numbers and the number of items of divided data.

In addition, when the number of items of divided data of a file is limited to 256 or less, and a data size which can be transmitted by one packet is x [bytes], a transmittable maximum size of the file is limited to x*256 [bytes]. For example, broadcast assumes x=4 k [bytes], and, in this case, the transmittable maximum size of the file is limited to 4k*256=1M [bytes]. Hence, when a file exceeding 1 [Mbytes] needs to be transmitted, the transmitting device has difficulty in limiting the number of items of divided data of the file to 256 or less.

Further, by, for example, referring to a fragmentation indicator, the receiving device can detect head divided data or last head data of a file. Therefore, by counting a number of MMTP packets until the MMTP packet including the last divided data of the file is received or by receiving an MMTP packet including the last divided data of the file, and then combining the fragmentation indicator with a packet sequence number, the receiving device can calculate a divided data number or the number of items of divided data. Consequently, by combining the fragmentation indicator and the packet sequence number, the transmitting device may signal the divided data number and the number of items of divided data. However, when starting receiving MMTP packets including items of divided data, i.e., the items of divided data which are not either head divided data of the file or last divided data of the file in the middle of the file, the receiving device has difficulty in specifying divided data numbers of the items of divided data, and the number of items of divided data. The receiving device can specify the divided data numbers of the items of divided data, and the number of divided data for the first time after receiving an MMTP packet including the last divided data of the file.

A following method is used for the phenomenon described with reference to FIGS. 54 and 55, i.e., the following method is used by the receiving device to uniquely specify divided data numbers of items of divided data of a file, and the number of items of divided data in the middle of reception of packets including the items of divided data of the file.

First, each divided data number will be described.

As each divided data number, the transmitting device signals a packet sequence number of head divided data of the file (item).

According to a signaling method, the packet sequence number is stored in control information for managing the file. More specifically, packet sequence number A of the head divided data of the file in FIGS. 54 and 55 is stored in the control information. The receiving device obtains a value of packet sequence number A from the control information, and calculates the divided data number from the packet sequence number indicated in a packet header.

A divided data number of divided data is calculated by subtracting packet sequence number A of the head divided data from a packet sequence number of this divided data.

The control information for managing the file is, for example, an asset management table defined according to ARIB STD-B60. The asset management table indicates a file size and version information per file, and is stored in a data transmission message and transmitted. FIG. 56 is a view illustrating a syntax of a loop per file in the asset management table.

When having difficulty in extending an area of an existing asset management table, the transmitting device may signal a packet sequence number by using a 32-bit area which is part of an item_info_byte field indicating item information. A flag indicating whether or not a packet sequence number in head divided data of a file (item) is indicated in part of an area of item_info_byte may be indicated in, for example, a reserved_future_use field of control information.

When transmitting a file in the case of data carousel, the transmitting device may indicate a plurality of packet sequence numbers or a head packet sequence number of a file transmitted immediately after a plurality of packet sequence numbers.

A packet sequence number is not limited to a packet sequence number of head divided data of a file and needs to be information which links a divided data number of the file and the packet sequence number.

Next, the number of items of divided data will be described.

The transmitting device may define a loop order of each file included in the asset management table as a file transmission order. Thus, head packet sequence numbers of two continuous files in the transmission order can be learned.

Consequently, by subtracting the head packet sequence number of the file transmitted in advance from the head packet sequence number of the file subsequently transmitted, it is possible to specify the number of items of divided data of the file transmitted in advance. That is, when, for example, File #1 illustrated in FIG. 54 and File #2 in FIG. 55 are continuous files in this order, a last packet sequence number of File #1 and a head packet sequence number of File #2 are allocated continuous numbers.

Further, by defining a file dividing method, it may be defined to make it possible to specify the number of items of divided data of a file. When, for example, the number of items of divided data is N, by defining that each size of items of 1st divided data to (N−1)th divided data is L and a size of Nth divided data is a fraction (item_size−L*(N−1)), the receiving device can calculate back the number of items of data from item_size indicated in the asset management table. In this case, an integer value obtained by rounding up (item_size/L) is the number of items of divided data. In addition, the file dividing method is not limited to this.

Further, the number of items of divided data may be directly stored in the asset management table.

By using the above method, the receiving device receives control information, and calculates the number of items of divided data based on the control information. Further, it is possible to calculate a packet sequence number associated with a divided data number of the file based on the control information. In addition, when a timing to receive packets of divided data comes earlier than a timing to receive the control information, a divided data number and the number of items of divided data may be calculated at the timing to receive the control information.

In addition, when the transmitting device signals a divided data number or the number of items of divided data by using the above method, the divided data number or the number of items of divided data is not specified based on fragment counters, and therefore the fragment counters are unnecessary data. Hence, when signaling information which makes it possible to specify a divided data number and the number of items of divided data by using the above method in the case of transmission of a non-timed medium, the transmitting device may not operate fragment counters or may compress a header. Consequently, it is possible to reduce processing amounts of the transmitting device and the receiving device, and improve transmission efficiency, too. That is, when transmitting a non-timed medium, the transmitting device may set fragment counters to reserved (invalidated). More specifically, a value of the fragment counter may be, for example, a fixed value of "0". Further, when a non-timed medium is received, fragment counters may be ignored.

When a timed medium such as a video or an audio is stored, an MMTP packet transmission order of the transmitting device and an MMTP packet arrival order of the receiving device match, and packets are not retransmitted. Therefore, when it is not necessary to detect packet loss and reconfigure packets, fragment counters may not be operated. In other words, in this case, the fragment counters may be set to reserved (invalidated).

In addition, the receiving device can detect a random access point, detect an access unit head and detect an NAL unit head without using fragment counters, and can perform decoding processing, packet loss detection and packet loss recovery processing.

Further, transmission of real-time content such as live broadcast demands lower delay transmission, and demands that data which has been encoded is sequentially packetized and transmitted. However, in the case of the real-time content transmission, general transmitting devices have difficulty in determining the number of items of divided data during transmission of head divided data by using conventional fragment counters. Therefore, the general transmitting devices transmit the head divided data after encoding all data units and determining the number of items of divided data, and therefore delay occurs. By contrast with this, the transmitting device and the receiving device according to the present exemplary embodiment can reduce this delay by using the above method and by not operating fragment counters.

Figure 57:
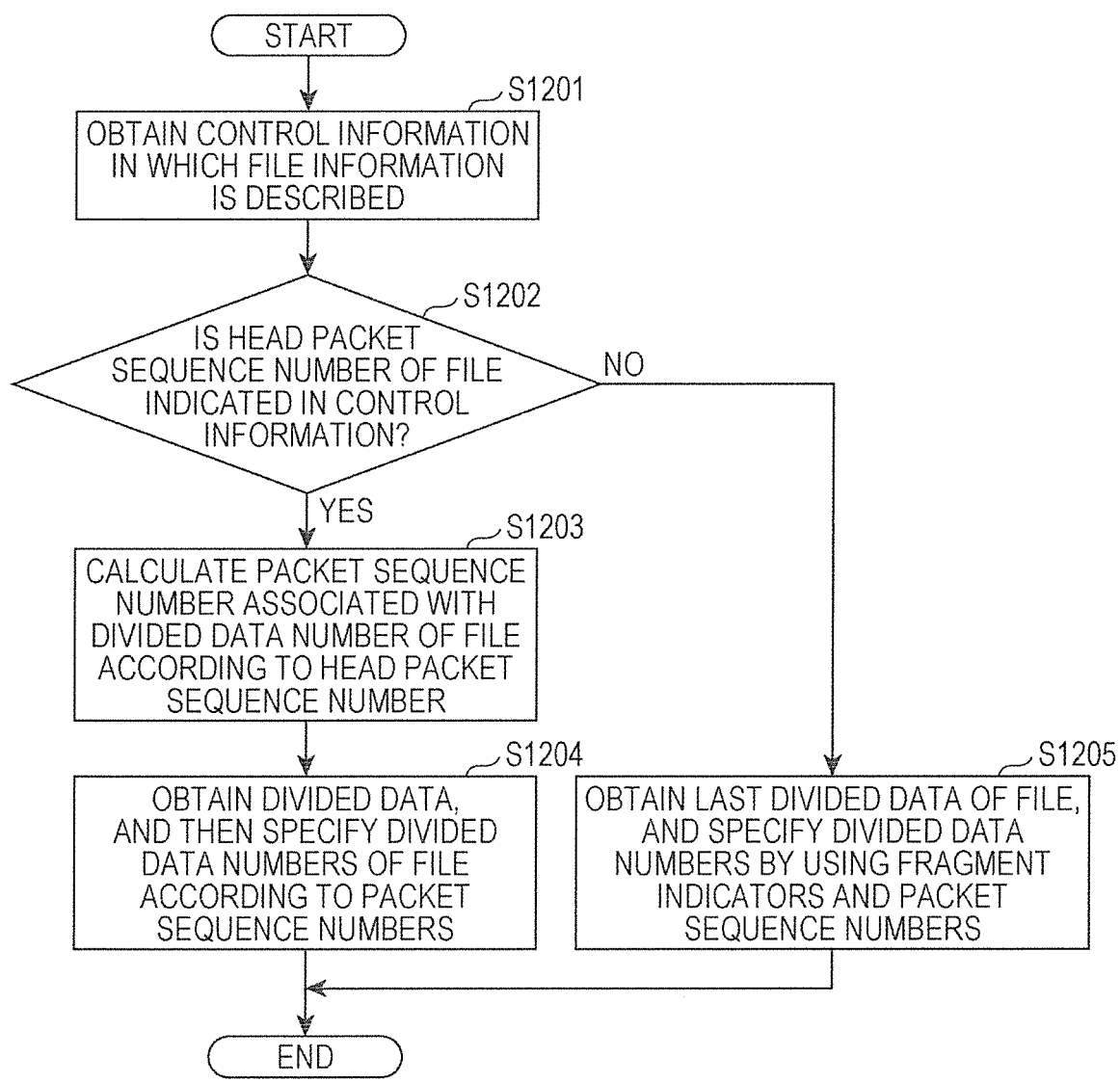
FIG. 57 is a flowchart of an operation of specifying a divided data number in the receiving device.

FIG. 57 is a flowchart of an operation of specifying divided data numbers in the receiving device.

The receiving device obtains control information in which file information is described (step S1201). The receiving device determines whether or not a head packet sequence number of a file is indicated in control information (step S1202), and calculates a packet sequence number associated with a divided data number of divided data of the file (step S1203) when the head packet sequence number of the file is indicated in the control information (Yes in step S1202). Further, the receiving device obtains MMTP packets in which items of divided data are stored, and then specifies divided data numbers of the file from the packet sequence numbers stored in the packet headers of the obtained MMTP packets (step S1204). Meanwhile, when the head packet sequence number of the file is not indicated in the control information (No in step S1202), the receiving device obtains an MMTP packet including last divided data of the file, and then specifies a divided data number by using a fragment indicator stored in a packet header of the obtained MMTP packet, and the packet sequence number (step S1205).

Figure 58:
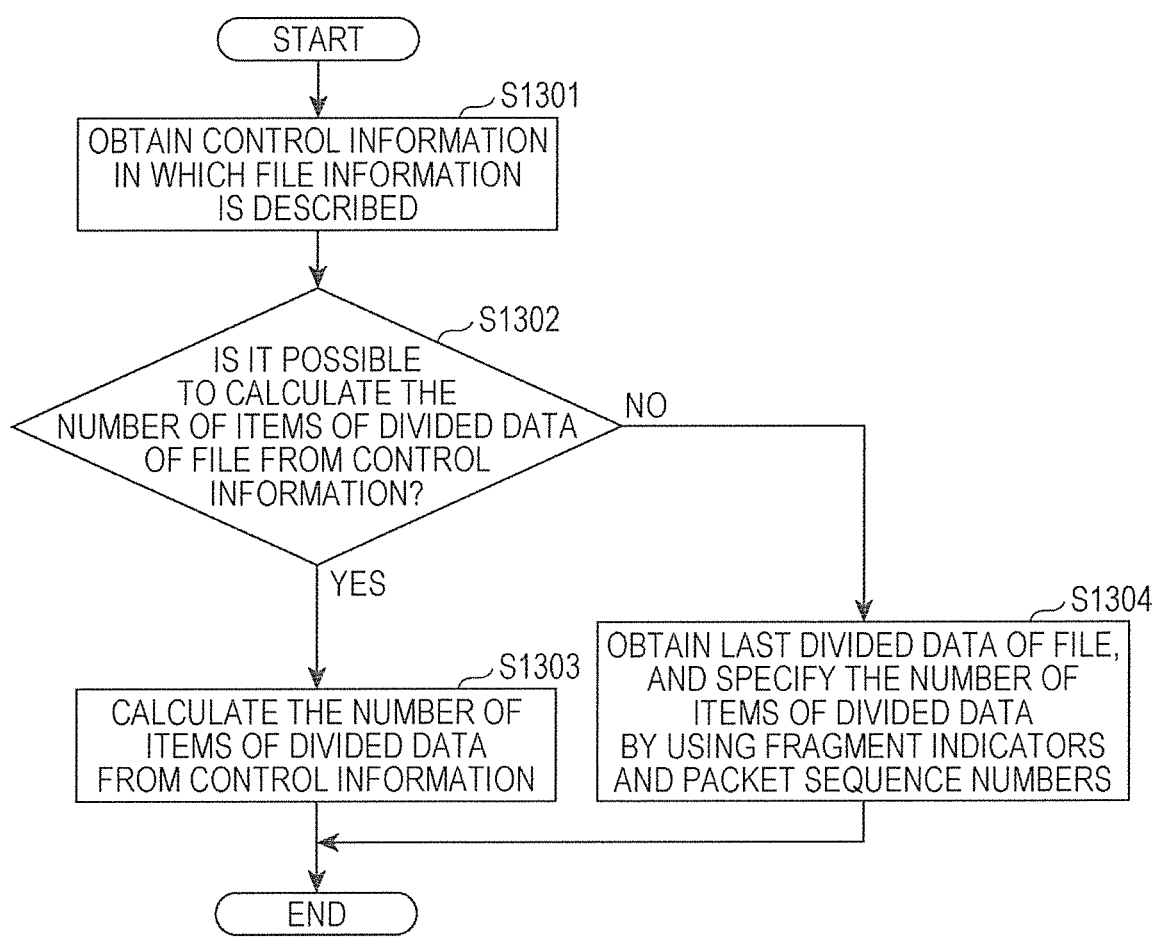
FIG. 58 is a flowchart of an operation of specifying a number of items of divided data in the receiving device.

FIG. 58 is a flowchart of an operation of specifying the number of items of divided data in the receiving device.

The receiving device obtains control information in which file information is described (step S1301). The receiving device determines whether or not the control information includes information which makes it possible to calculate the number of items of divided data (step S1302), and calculates the number of items of divided data based on the information included in the control information (step S1303) when determining that the control information includes the information which makes it possible to calculate the number of items of divided data (Yes in step S1302). Meanwhile, when determining that it is not possible to calculate the number of items of divided data (No in step S1302), the receiving device obtains an MMTP packet including last divided data of the file, and then specifies the number of items of divided data by using a fragment indicator stored in a packet header of the obtained MMTP packet, and the packet sequence number (step S1304).

Figure 59:
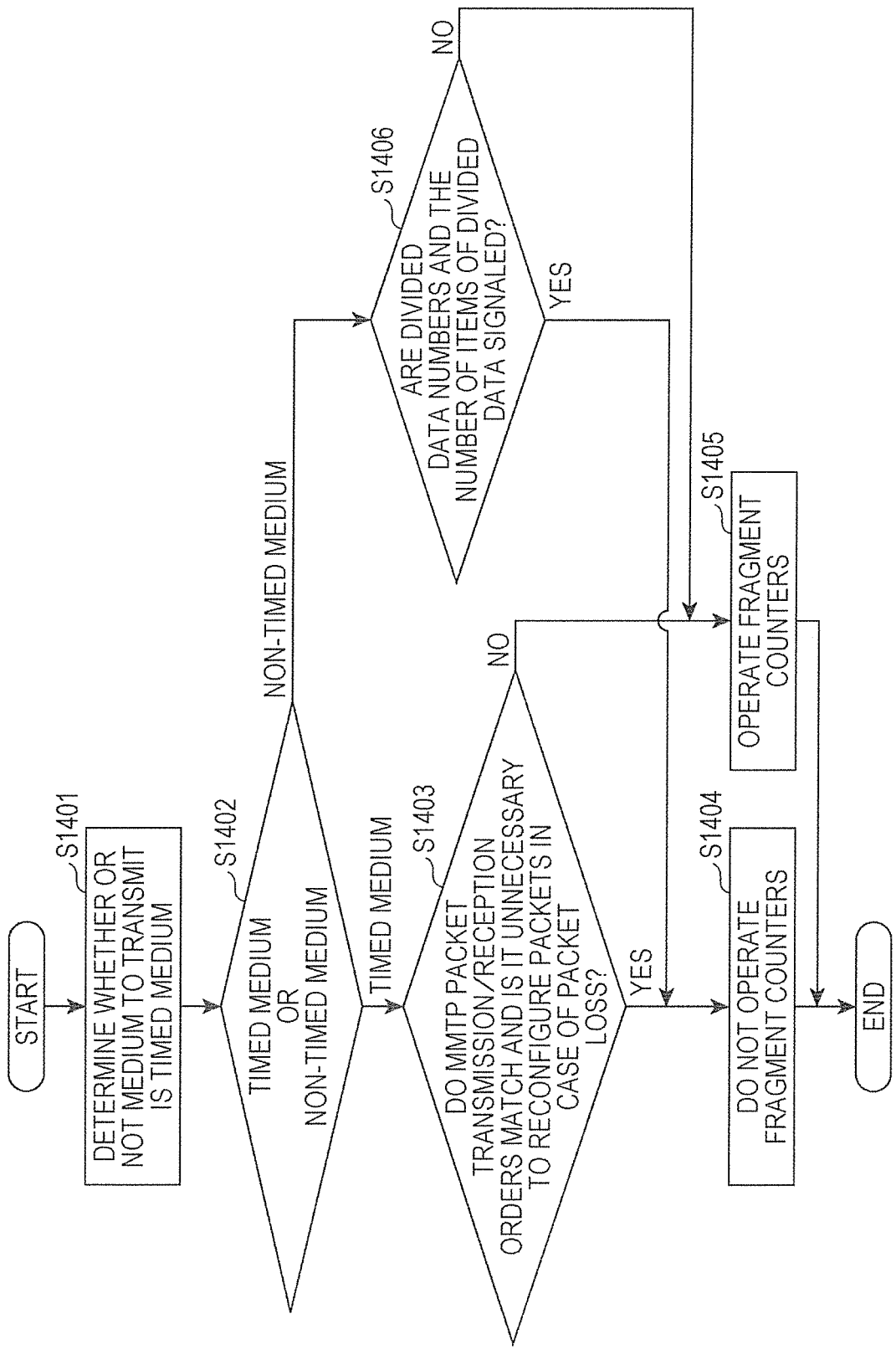
FIG. 59 is a flowchart of an operation of determining whether or not to operate fragment counters in the transmitting device.

FIG. 59 is a flowchart of an operation of determining whether or not to operate fragment counters in the transmitting device.

First, the transmitting device determines whether a medium to transmit (also referred to as "media data" below) is a timed medium or a non-timed medium (step S1401).

When a determination result in step S1401 indicates the timed medium (the timed medium in step S1402), the transmitting device determines whether or not MMTP packet transmission/reception orders match in environment in which the timed medium is transmitted and whether or not it is unnecessary to reconfigure packets in the case of packet loss (step S1403). When determining that it is unnecessary to reconfigure the packets (Yes in step S1403), the transmitting device does not operate fragment counters (step S1404). Meanwhile, when determining that it is not unnecessary to reconfigure the packets (No in step S1403), the transmitting device operates the fragment counters (step S1405).

When the determination result in step S1401 indicates the non-timed medium (the non-timed medium in step S1402), the transmitting device determines whether or not to operate the fragment counters based on whether or not the divided data numbers and the number of items of divided data are signaled by using the above-described method. More specifically, when signaling the divided data numbers and the number of items of divided data (Yes in step S1406), the transmitting device does not operate the fragment counters (step S1404). Meanwhile, when not signaling the divided data numbers and the number of items of divided data (No in step S1406), the transmitting device operates the fragment counters (step S1405).

In addition, when not operating the fragment counters, the transmitting device may set values of the fragment counters to reserved or may compress a header.

In addition, the transmitting device may determine whether or not to signal the above-described divided data numbers and number of items of divided data, based on whether or not to operate the fragment counters.

In addition, when not operating the fragment counters for the timed medium, the transmitting device may signal divided data numbers or the number of divided data by using the above-described method for the non-timed medium. In addition, the transmitting device may determine how to operate the timed medium, based on whether or not to operate the fragment counters for the non-timed medium. In this case, the transmitting device can determine whether or not to operate the fragment counters likewise both for the timed medium and the non-timed medium.

Figure 60:
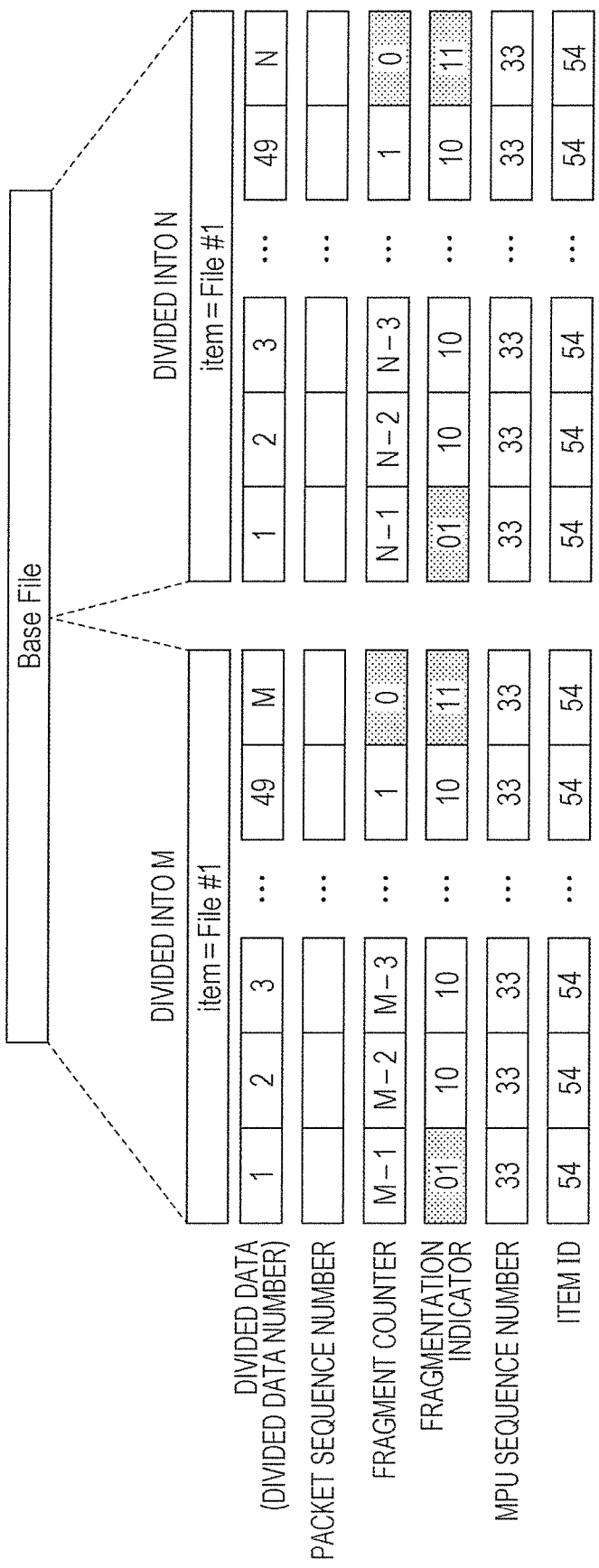
FIG. 60 is a view for explaining a method for specifying the number of items of divided data and divided data numbers (in the case where the fragment counters are used)

Next, a method for specifying the number of items of divided data and divided data numbers (in the case where fragment counters are used) will be described. FIG. 60 is a view for explaining a method for specifying the number of items of divided data and divided data numbers (in the case where the fragment counters are used).

As described with reference to FIG. 54, when the number of items of divided data is 256 or less and that the number of items of divided data is 256 or less is known in advance, it is possible to specify divided data numbers and the number of items of divided data by referring to the fragment counters.

When the number of items of divided data of a file is limited to 256 or less, and a data size which can be transmitted by one packet is x [bytes], a transmittable maximum size of the file is limited to x*256 [bytes]. For example, broadcast assumes x=4 k [bytes], and, in this case, the transmittable maximum size of the file is limited to 4k*256=1M [bytes].

When a file size exceeds a transmittable maximum size of the file, the transmitting device divides the file in advance such that the sizes of the divided files are x*256 [bytes] or less. The transmitting device handles each of a plurality of divided files obtained by dividing the file as one file (item), then divides one file into 256 or less, and stores divided data obtained by further dividing the file in MMTP packets and transmits the MMTP packets.

In addition, the transmitting device may store information indicating that an item is a divided file, the number of divided files and a sequence number of each divided file in control information, and transmit the control information to the receiving device. Further, the transmitting device may store these pieces of information in the asset management table, or may indicate these pieces of information by using part of existing field item_info_byte.

When a received item is one divided file of a plurality of divided files obtained by dividing one file, the receiving device can specify other divided files, and reconfigure the original file. Further, by using the number of divided files of the divided files of received control information, indices of the divided files and the fragment counters, the receiving device can uniquely specify the number of items of divided data and divided data numbers. Furthermore, it is possible to uniquely specify the number of items of divided data and the divided data numbers without using packet sequence numbers.

In this regard, item_id of each of a plurality of divided files obtained by dividing one file is desirably the same between each other. In addition, when different item_id is allocated, item_id of a head divided file may be indicated to uniquely refer to a file from another control information.

Further, a plurality of divided files may belong to the same MPU at all times. When a plurality of files is stored in an MPU, files obtained by dividing one file may be stored at all times without storing files of different types. The receiving device can detect a file update by checking version information per MPU without checking version information per item.

Figure 61:
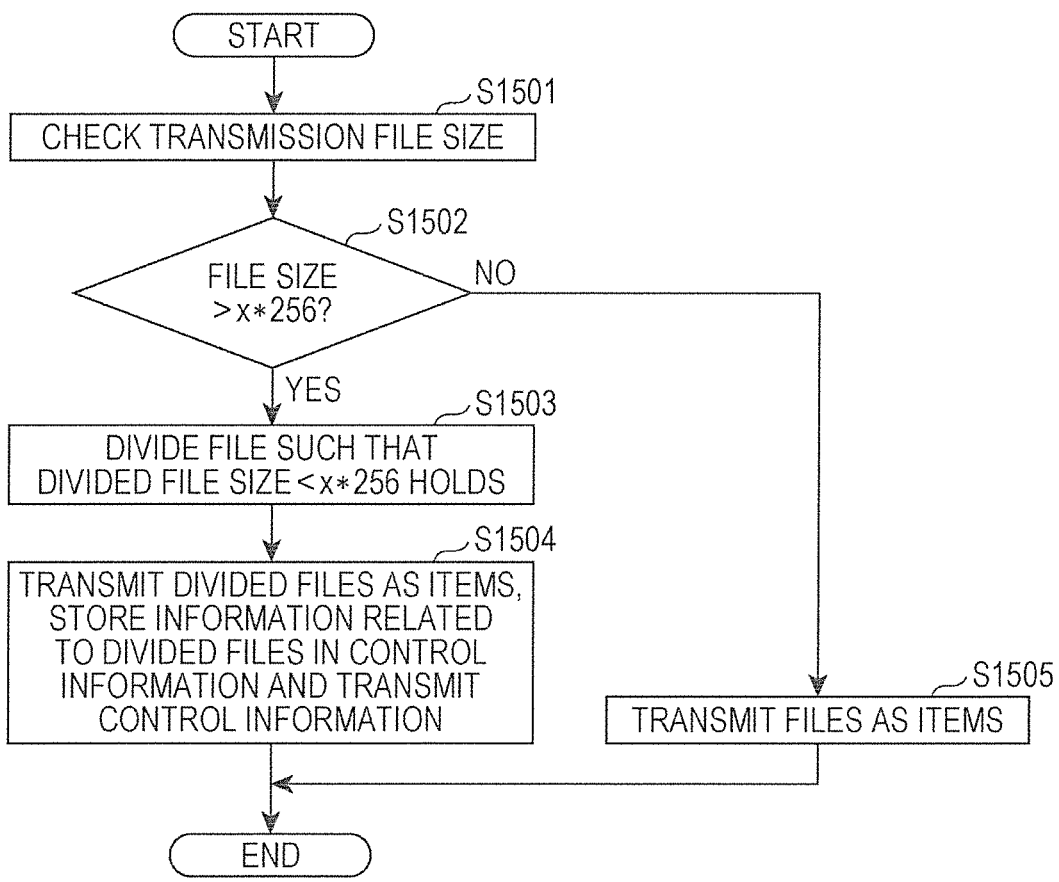
FIG. 61 is a flowchart of an operation of the transmitting device in the case where the fragment counters are used.

FIG. 61 is a flowchart of an operation of the transmitting device in the case where the fragment counters are used.

First, the transmitting device checks a size of a file to transmit (step S1501). Next, the transmitting device determines whether or not the file size exceeds x*256 [bytes] (x indicates a data size which can be transmitted by one packet such as an MTU (Maximum Transmission Unit) size) (step S1502), and divides the file such that sizes of divided files are less than x*256 [bytes] (step S1503) when the file size exceeds x*256 [bytes] (Yes in step S1502). Further, the transmitting device transmits the divided files as items, stores information related to the divided files (information indicating, for example, a divided file or a sequence number of the divided file) in control information, and transmits the control information (step S1504). Meanwhile, when the file size is less than x*256 [bytes] (No in step S1502), the transmitting device transmits the files as items as usual (step S1505).

Figure 62:
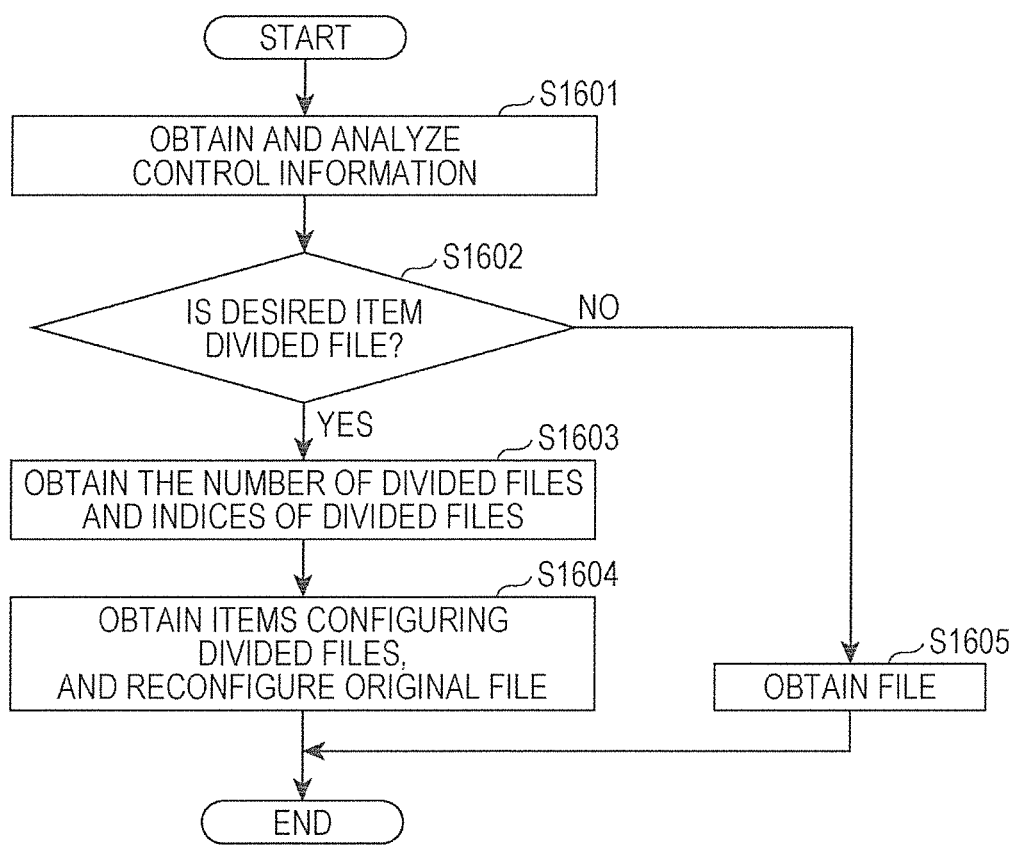
FIG. 62 is a flowchart of an operation of the receiving device in the case where the fragment counters are used.

FIG. 62 is a flowchart of an operation of the receiving device in the case where the fragment counters are used.

First, the receiving device obtains and analyzes control information such as the asset management table related to transmission of a file (step S1601). Next, the receiving device determines whether or not a desired item is a divided file (step S1602). When determining that the desired file is the divided file (Yes in step S1602), the receiving device obtains information such as divided files or indices of the divided files for reconfiguring the file from the control information (step S1603). Further, the receiving device obtains items configuring the divided files, and reconfigures the original file (step S1604). Meanwhile, when determining that the desired file is not the divided file (No in step S1602), the receiving device obtains files as usual (step S1605).

That is, the transmitting device signals a packet sequence number of head divided data of the file. Further, the transmitting device signals information which makes it possible to specify the number of items of divided data. Alternatively, the transmitting device defines a division rule which makes it possible to specify the number of items of divided data. Further, the transmitting device sets the fragment counters to reserved or compresses a header without operating the fragment counters.

When the packet sequence number of head data of the file is signaled, the receiving device specifies divided data numbers and the number of items of divided data from the packet sequence number of the head divided data of the file and the packet sequence number of the MMTP packet.

From another viewpoint, the transmitting device divides a file, divides data per divided file and transmits the divided files. The transmitting device signals information (sequence numbers and a number of times of division) which links divided files.

The receiving device specifies divided data numbers and the number of items of divided data from the fragment counters and sequence numbers of divided files.

Consequently, the receiving device can uniquely specify the divided data numbers or the items of divided data. Further, in the middle of reception of items of divided data, the receiving device can specify divided data numbers of the items of divided data, and, consequently, reduce a standby time and reduce a memory, too.

Furthermore, by not operating the fragment counters, the configurations of the transmitting and receiving devices can reduce processing amounts and improve transmission efficiency.

Figure 63:
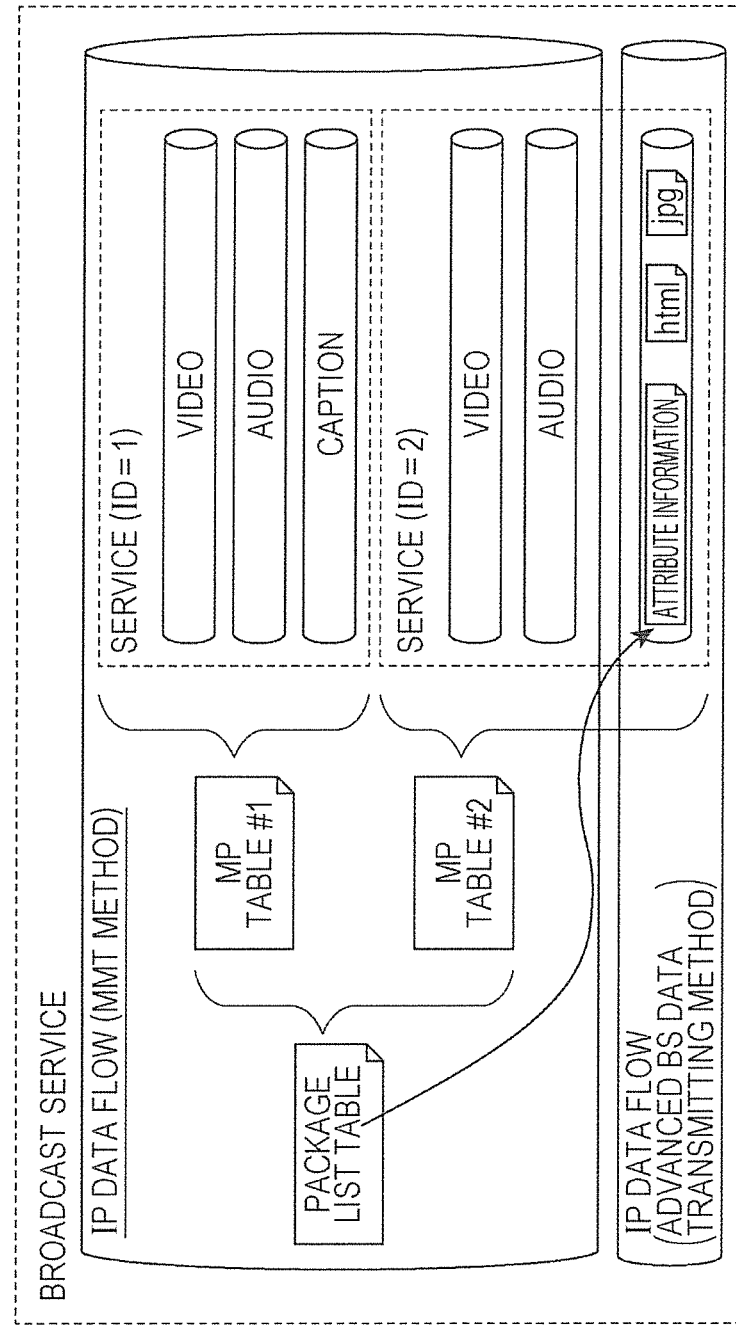
FIG. 63 is a view illustrating a service configuration in the case where an identical program is transmitted by a plurality of IP data flows.

FIG. 63 is a view illustrating a service configuration in the case where an identical program is transmitted by a plurality of IP data flows. In this example, part of data (video/audio) of a program service ID=2 is transmitted by the IP data flows using the MMT method, and data which has the same service ID and is different from the part of data is transmitted by IP data flows using an advanced BS data transmitting method. In addition, file transmission protocols are also different in this example yet the same protocol may be used The transmitting device multiplexes IP data to guarantee that the receiving device has all items of data configured by a plurality of IP data flows by a decoding time.

The receiving device can realize the guaranteed receiver operation by performing processing based on a decoding time by using the data configured by a plurality of IP data flows.

[Supplementary Note: Transmitting Device and Receiving Device]

Figure 64:
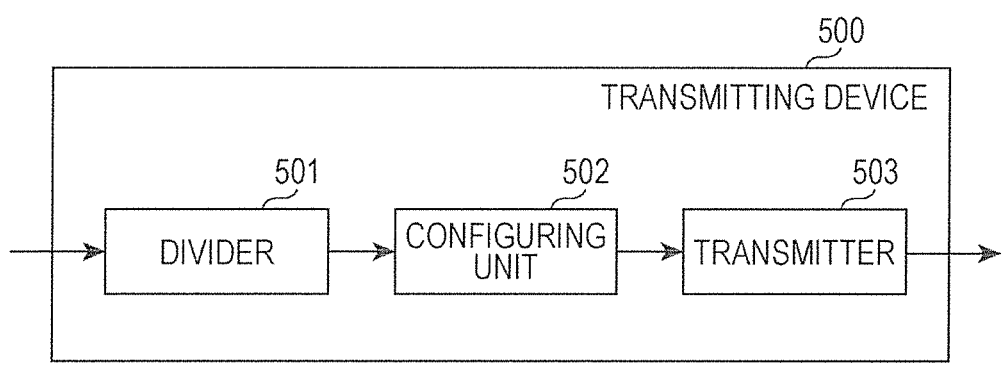
FIG. 64 is a view illustrating a specific configuration example of the transmitting device.
Figure 65:
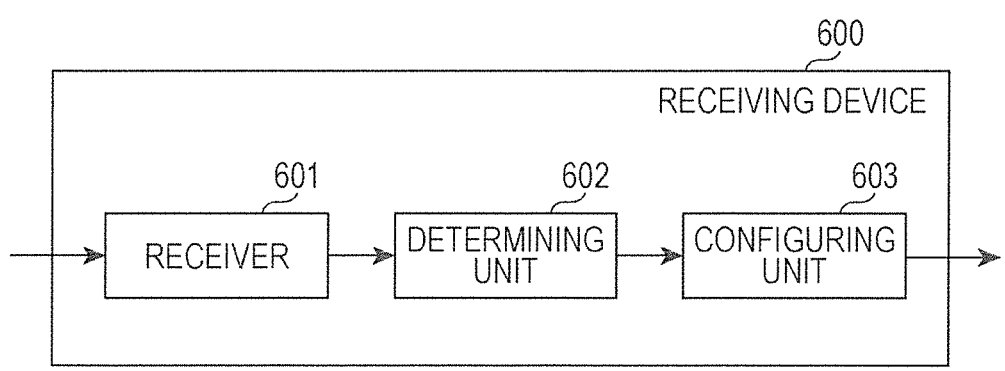
FIG. 65 is a view illustrating a specific configuration example of the receiving device.

As described above, a transmitting device which transmits data without operating fragment counters can be configured as illustrated in FIG. 64, too. Further, a receiving device which receives data without operating fragment counters can be configured as illustrated in FIG. 65, too. FIG. 64 is a view illustrating a specific configuration example of the transmitting device. FIG. 65 is a view illustrating a specific configuration example of the receiving device.

Transmitting device 500 includes divider 501, configuring unit 502 and transmitter 503. Each of divider 501, configuring unit 502 and transmitter 503 is realized by, for example, a microcomputer, a processor or a dedicated circuit.

Receiving device 600 includes receiver 601, determining unit 602 and configuring unit 603. Each of receiver 601, determining unit 602 and configuring unit 603 is realized by, for example, a microcomputer, a processor or a dedicated circuit.

Each component of transmitting device 500 and receiving device 600 will be described in detail by explaining a transmitting method and a receiving method.

Figure 66:
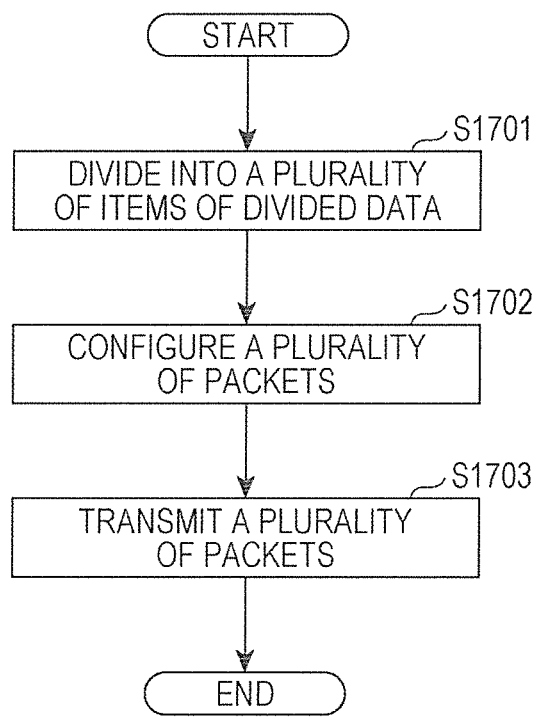
FIG. 66 is a flowchart of an operation example of the transmitting device.

First, the transmitting method will be described with reference to FIG. 66. FIG. 66 is a flowchart of an operation of the transmitting device (transmitting method).

First, divider 501 of transmitting device 500 divides data into a plurality of items of divided data (step S1701).

Next, configuring unit 502 of transmitting device 500 configures a plurality of packets by allocating header information to each of a plurality of items of divided data and packetizing the plurality of items of divided data (step S1702).

Further, transmitter 503 of transmitting device 500 transmits a plurality of configured packets (step S1703). Transmitter 503 transmits divided data information and values of invalidated fragment counters. In addition, the divided data information is information for specifying divided data numbers and the number of items of divided data. Further, the divided data numbers are numbers indicating what divided data number the items of divided data are among a plurality of items of divided data. The number of items of divided data is the number of items of a plurality divided data.

Consequently, it is possible to reduce a processing amount of transmitting device 500.

Figure 67:
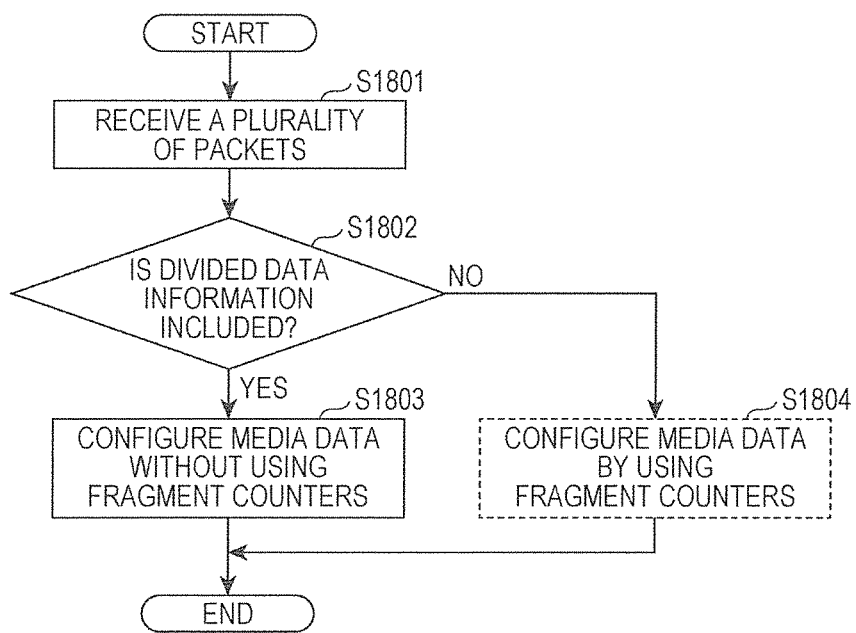
FIG. 67 is a flowchart of an operation example of the receiving device.

Next, the receiving method will be described with reference to FIG. 67. FIG. 67 is a flowchart of an operation of the receiving device (receiving method).

First, receiver 601 of receiving device 600 receives a plurality of packets (step S1801).

Next, determining unit 602 of receiving device 600 determines whether or not the divided data information has been obtained from a plurality of received packets (step S1802).

Further, when determining unit 602 determines that the divided data information has been obtained (Yes in step S1802), configuring unit 603 of receiving device 600 configures data from a plurality of received packets without using the values of the fragment counters included in the header information (step S1803).

Meanwhile, when determining unit 602 determines that the divided data information is not obtained (No in step S1802), configuring unit 603 may configure data from a plurality of received packets by using the values of the fragment counters included in the header information (step S1804).

Consequently, it is possible to reduce a processing amount of receiving device 600.

Fifth Exemplary Embodiment

[Outline]

A transmitting method of transmitting packets (TLV packets) in the case where an NAL unit is stored in an NAL size format in a multiplexing layer will be described in the fifth exemplary embodiment.

As described in the first exemplary embodiment, there are following two types of formats for storing NAL units according to H.264 and H.265 in multiplexing layers. A first format is a format called a byte stream format for adding a start code including a specific bit sequence to a portion immediately before an NAL unit header. A second format is a format called an NAL size format for adding a field indicating an NAL unit size. The byte stream format is used for a MPEG-2 system or RTP, and the NAL size format is used for MP4 or DASH or MMT for using MP4.

In the byte stream format, the start code can also be configured by three bytes, and arbitrary bytes (a byte whose value is 0) can also be added to the start code.

Meanwhile, in the NAL size format according to general MP4, size information is indicated by one of one byte, two bytes and four bytes. This size information is indicated in a lengthSizeMinusOne field in an HEVC sample entry. The size information indicates one byte when the field value takes "0", indicates two bytes when the field value takes "1" and indicates four bytes when the field value takes "3".

According to "a media transport method according to MMT for digital broadcast" of ARIB STD-B60 standardized in July, 2014, when an NAL unit is stored in a multiplexing layer, if an output of an HEVC encoder is a byte stream, a byte start code is removed, and an NAL unit size indicated in byte units by 32 bits (an integer without a sign) is added as length information to a portion immediately before the NAL unit. In this regard, MPU meta data including an HEVC sample entry is not transmitted, and size information is fixed to 32 bits (four bytes).

Further, according to "a media transport method according to MMT for digital broadcast" of ARIB STD-B60, a pre-decoding buffer for video signals in a receiving buffer model which a transmitting device takes into account during transmission in order to guarantee a buffering operation of a receiving device is defined as a CPB (Coded Picture Buffer).

However, a following phenomenon occurs. The CPB in the MPEG-2 system and an HRD (Hypothetical Reference Decoder) according to HEVC are defined assuming that video signals have byte stream formats. Hence, when, for example, a rate of transmitting packets is controlled assuming a byte stream format to which 3-byte start code is added, a phenomenon that a receiving device which has received the transmitting packet of an NAL size format to which a four-byte size area is added has difficulty in satisfying a receiving buffer model according to ARIB STD-B60 is likely to occur. Further, the receiving buffer model according to ARIB STD-B60 does not indicate a specific buffer size and an extraction rate, and therefore has difficulty in guaranteeing a buffering operation of the receiving device.

Hence, a receiving buffer model which guarantees a buffering operation of a receiver is defined as follows to solve the above phenomenon.

Figure 68:
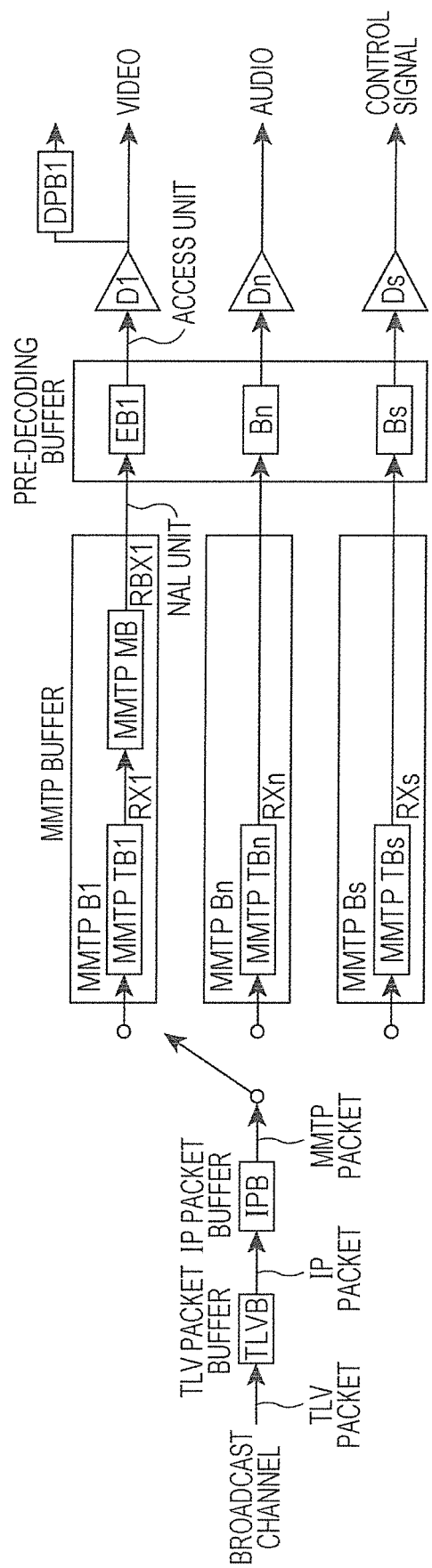
FIG. 68 is a view illustrating a receiving buffer model in the case where, for example, a broadcast channel is used based on a receiving buffer model defined according to ARIB STD B-60.

FIG. 68 illustrates a receiving buffer model in the case where, for example, a broadcast channel is used based on the receiving buffer model defined according to ARIB STD-B60.

The receiving buffer model includes a TLV packet buffer (first buffer), an IP packet buffer (second buffer), an MMTP buffer (third buffer) and a pre-decoding buffer (fourth buffer). In this regard, a dejitter buffer and a buffer for FEC (Forward Error Correction) are not necessary for the broadcast channel, and therefore are omitted.

The TLV packet buffer receives the TLV packet (transmitting packet) from the broadcast channel, converts an IP packet configured by packet headers (an IP packet header, a full header of a compressed IP packet and a compressed header of a compressed IP packet) of variable lengths stored in the received TLV packet, and a payload of a variable length into an IP packet (first packet) including an IP packet header of a fixed length of an extended header, and outputs the IP packet obtained by the convention at a fixed bit rate.

The IP packet buffer converts the IP packet into an MMTP packet (second packet) including a packer header and a payload of a variable length, and outputs the MMTP packet obtained by the conversion at a fixed bit rate. In this regard, the IP packet buffer may be merged with the MMTP packet buffer.

The MMTP buffer converts the output MMTP packet into an NAL unit, and outputs the NAL unit obtained by the conversion at a fixed bit rate.

The pre-decoding buffer sequentially accumulates the output NAL unit, and generates an access unit from a plurality of accumulated NAL units, and outputs the generated access unit to a decoder at a timing of a decoding time corresponding to the access unit.

In the receiving buffer model illustrated in FIG. 68, the MMTP buffer and the pre-decoding buffer other than the TLV packet buffer and the IP packet buffer at a previous stage take over buffers of the receiving buffer model according to MPEG-2 TS.

For example, an MMTP buffer (MMTP B1) for a video includes buffers corresponding to a transport buffer (TB) and a multiplexing buffer (MB) according to MPEG-2 TS. Further, an MMTP buffer (MMTP Bn) for an audio includes a buffer corresponding to a transport buffer (TB) according to MPEG-2 TS.

A buffer size of the transport buffer takes the same fixed value as the fixed value of MPEG-2 TS. For example, the buffer size is n times (n may be a decimal or an integer and is 1 or more) as an MTU size.

Further, an MMTP packet size is defined such that an overhead rate of the MMTP packet header is lower than an overhead rate of a PES packet header.

Consequently, extraction rates RX1, RXn and RXs of the transport buffer according to MPEG-2 TS are applicable to an extraction rate from the transport buffer.

Further, a multiplexing buffer size and an extraction rate are an MB size and RBX1 according to MPEG-2 TS.

In addition to the above receiving buffer model, a following restriction is placed to solve the phenomenon.

The HRD definition according to HEVC assumes the byte stream format, and MMT adopts an NAL size format for adding a four-byte size area to a head of an NAL unit. Hence, a rate is controlled to satisfy the HRD in the NAL size format during encoding.

That is, a transmitting device controls a rate of a transmitting packet based on the receiving buffer model and the restriction.

The receiving device can perform a decoding operation without causing an underflow or an overflow by performing reception processing by using the above signal.

In this regard, even if the size area at the head of the NAL unit does not have four bytes, the rate is controlled to satisfy the HRD by taking into account the size area at the head of the NAL unit.

In this regard, an extraction rate of the TLV packet buffer (a bit rate at which the TLV packet buffer outputs an IP packet) is set by taking into account a transmission rate after an IP header is extended.

That is, after receiving an input of the TLV packet whose data size is a variable length, removing a TLV header and extending (restoring) the IP header, the transmitting device takes into account a transmission rate of the IP packet to be output. In other words, the transmitting device takes into account a header increase/decrease amount with respect to the input transmission rate.

More specifically, the data size is the variable length, there is a mixture of a packet whose IP header is compressed and a packet whose IP header is not compressed and an IP header size differs according to a packet type such as IPv4 and IPv6, and therefore a transmission rate of an IP packet to be output is not uniform. Hence, an average packet length of a data size of a variable length is determined, and a transmission rate of an IP packet output from the TLV packet is determined.

In this case, the transmission rate is determined assuming that an IP header is compressed to define a maximum transmission rate after an IP header is extended.

Further, when there is a mixture of packet types of IPv4 and IPv6 or when the definition is made without distinguishing a packet type, a transmission rate is determined assuming an IPv6 packet whose header size is large and whose increase rate after a head is extended is high.

When, for example, S represents an average packet length of the TLV packet input to the TLV packet buffer, all IP packets stored in the TLV packets are IPv6 packets and headers are compressed, a maximum output transmission rate after the TLV header is removed and the IP header is extended is $$\text{input rate} \times \{S/(\text{step } S + \text{IPv6 header compression amount})\}.$$

More specifically, when average packet length S of the TLV packet is set based on $$S=0.75 \times 1500 (1500 \text{ assumes a maximum MTU size}),$$

and

IPv6 header compression amount=TLV header length−IPv6 header length−UDP header length $$=3-40-8 \text{ holds},$$

the maximum output transmission rate after the TLV header is removed and the IP header is extended is $$\text{input rate} \times 1.0417 \approx \text{input rate} \times 1.05.$$

Figure 69:
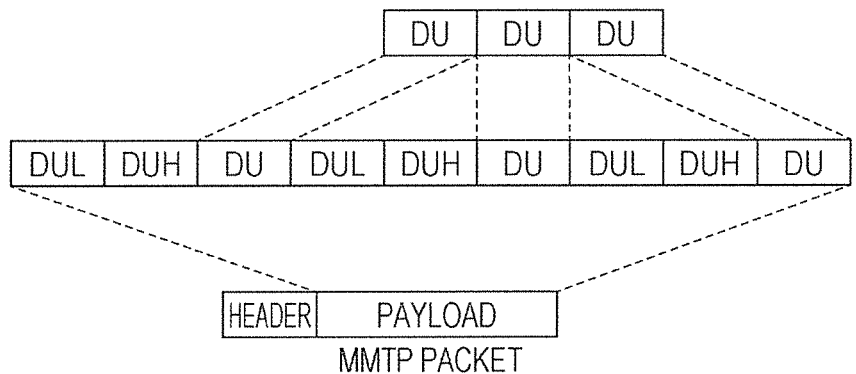
FIG. 69 is a view illustrating an example where a plurality of data units is aggregated and is stored in one payload.

FIG. 69 is a view illustrating an example where a plurality of data units is aggregated and is stored in one payload.

When a data unit is aggregated according to the MMT method, a data unit length and a data unit header are added to a portion before a data unit as illustrated in FIG. 69.

Figure 70:
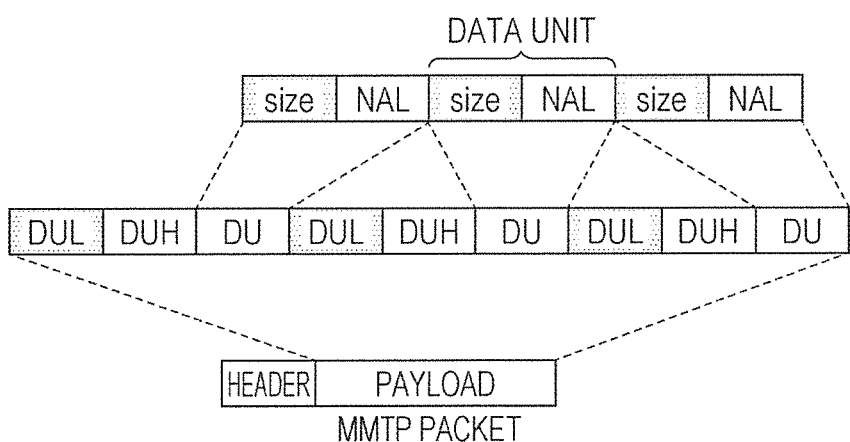
FIG. 70 is a view illustrating an example where a plurality of data units is aggregated and is stored in one payload, and illustrating an example where a video signal of an NAL size format is one data unit.

However, when, for example, a video signal of an NAL size format is stored as one data unit, as illustrated in FIG. 70, there are two fields indicating sizes for one data unit, and these are pieces of overlapping information. FIG. 70 is a view illustrating an example where a plurality of data units is aggregated and is stored in one payload, and an example where a video signal of an NAL size format is one data unit. More specifically, both of a size area at a head of an NAL size format (referred to a "size area" below) and a data unit length field positioned before a data unit header of an MMTP payload header are fields indicating sizes and are pieces of overlapping information. When, for example, a length of an NAL unit has L bytes, the size area indicates the L bytes, the data unit length field indicates L bytes+"size area length" (bytes). Although values indicated by the size area and the data unit length field do not completely match, it is possible to easily calculate the other value from one value, and therefore these are overlapping values.

When data including data size information inside is stored as a data unit and a plurality of data units is aggregated and is stored in one payload, pieces of size information overlap, and therefore a phenomenon that an overhead is great and transmission efficiency is poor occurs.

Figure 71:
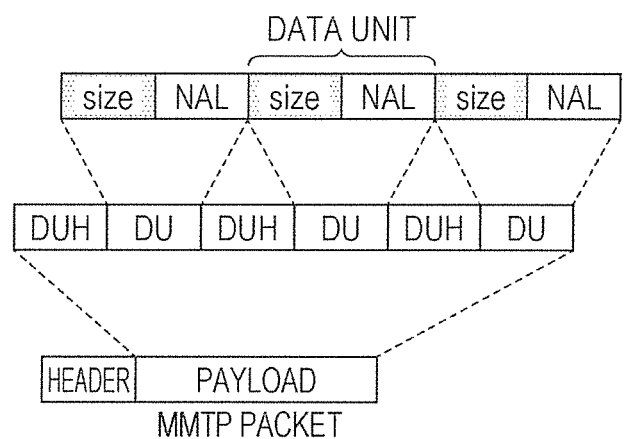
FIG. 71 is a view illustrating a configuration of a payload of an MMTP packet which does not indicate a data unit length.
Figure 72:
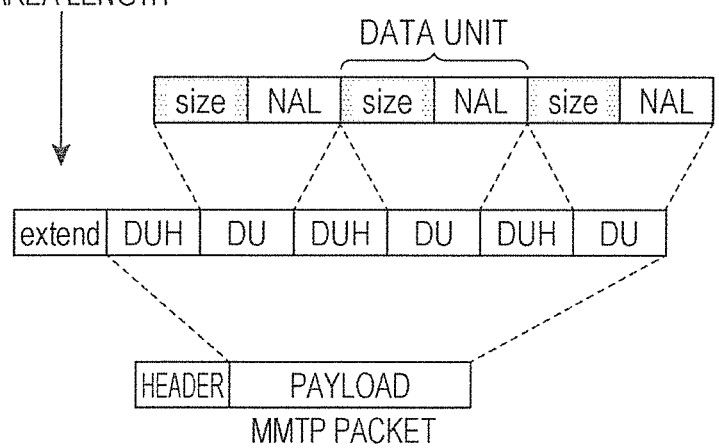
FIG. 72 is a view illustrating an extend area allocated in packet units.

Hence, when the transmitting device stores the data including the data size information inside as a data unit and aggregates and stores a plurality of data units in one payload, the transmitting device may store a plurality of data units as illustrated in FIGS. 71 and 72.

As illustrated in FIG. 71, there is a case where a data unit length which is conventionally included is not indicated in an MMTP payload header in which an NAL unit including a size area is stored as a data unit. FIG. 71 is a view illustrating a configuration of a payload of an MMTP packet which does not indicate a data unit length.

Further, as illustrated in FIG. 72, a flag indicating whether or not a data unit length is indicated or information indicating a size area length may be additionally stored in a header. A location to store the flag or the information indicating the size area length may be indicated in units of data units such as a data unit header or may be indicated in units obtained by aggregating a plurality of data units (in packet units). FIG. 72 illustrates an example of an extend area allocated in packet units. In this regard, the location to store the information to be additionally indicated is not limited to this, and the information may be stored in an MMTP payload header, an MMTP packet header and control information.

When a flag indicating whether or not a data unit length is compressed indicates that a data unit length is compressed, the receiving device obtains the length information of the size area inside the data unit, and obtains the size area based on the length information of the size area and, consequently, can calculate a data unit length by using the obtained length information of the size area and the size area.

According to the above method, the transmitting device can reduce a data amount and improve transmission efficiency.

In this regard, an overhead may be reduced by reducing the size area instead of reducing the data unit length. When the size area is reduced, the information indicating whether or not the size area is reduced or information indicating the length of the data unit length field may be stored.

In this regard, an MMTP payload header also includes length information.

When an NAL unit including a size area is stored as a data unit, a payload size area in an MMTP payload header may be reduced irrespectively of whether or not data units are aggregated.

Further, even when data which does not include a size area is stored as a data unit, if data units are aggregated and a data unit length is indicated, a payload size area in an MMTP payload header may be reduced.

When a payload size area is reduced, a flag indicating whether or not the payload size area has been reduced, length information of the reduced size field or length information of a size field which has not been reduced may be indicated similar to the above.

Figure 73:
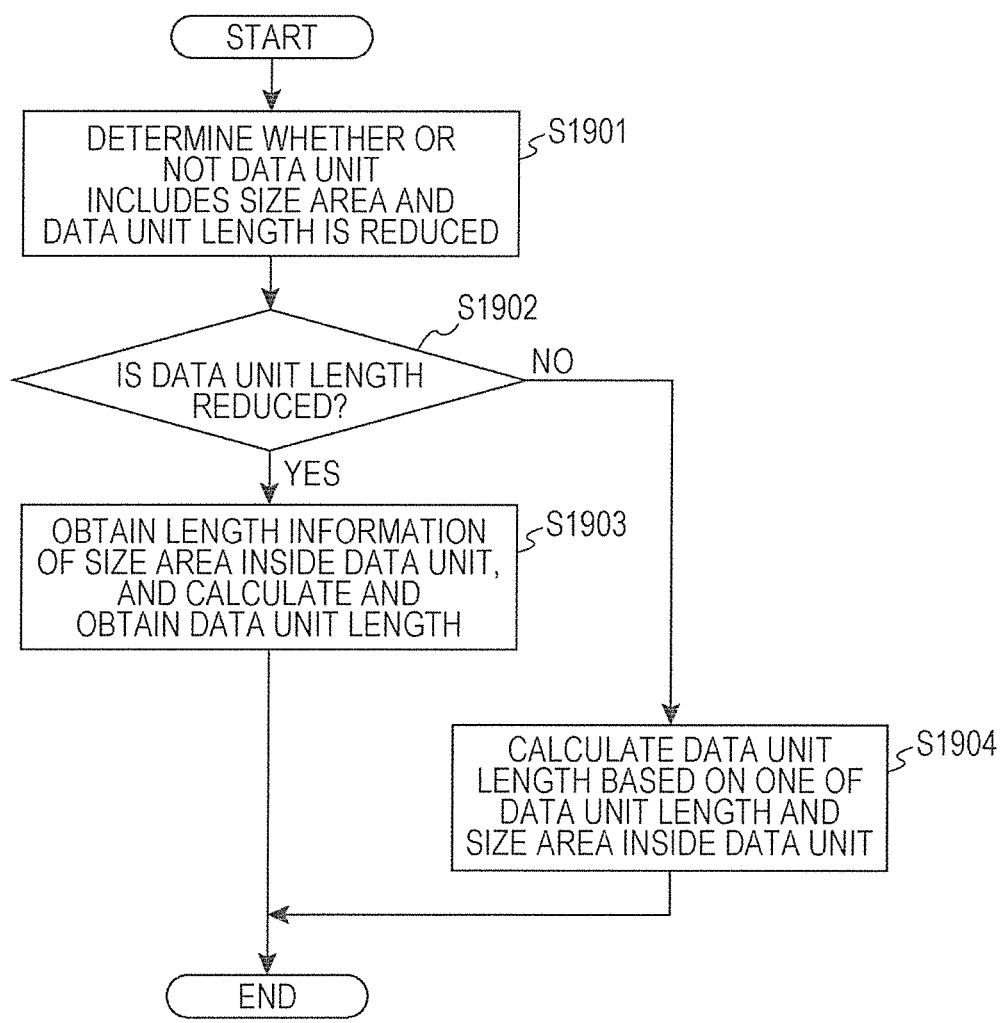
FIG. 73 is a view illustrating a flowchart of an operation of the receiving device.

FIG. 73 illustrates a flowchart of an operation of the receiving device.

As described above, the transmitting device stores an NAL unit including a size area as a data unit, and does not indicate a data unit length included in an MMTP payload header in an MMTP packet.

An example where a flag indicating whether or not a data unit length is indicated or length information of a size area is indicated in an MMTP packet will be described below.

The receiving device determines whether or not a data unit includes the size area and the data unit length is reduced, based on information transmitted from a transmission side (step S1901).

When it is determined that the data unit length is reduced (Yes in step S1902), length information of the size area inside the data unit is obtained, the size area inside the data unit is subsequently analyzed, and the data unit length is calculated and obtained (step S1903).

Meanwhile, when it is determined that the data unit length is not reduced (No in step S1902), the data unit length is calculated based on one of the data unit length and the size area inside the data unit as usual (step S1904).

In this regard, when the receiving device learns the flag indicating whether or not the data unit length is reduced or the length information of the size area in advance, the flag or the length information may not be transmitted. In this case, the receiving device performs processing illustrated in FIG. 73 based on predetermined information.

[Supplementary Note: Transmitting Device and Receiving Device]

Figure 74:
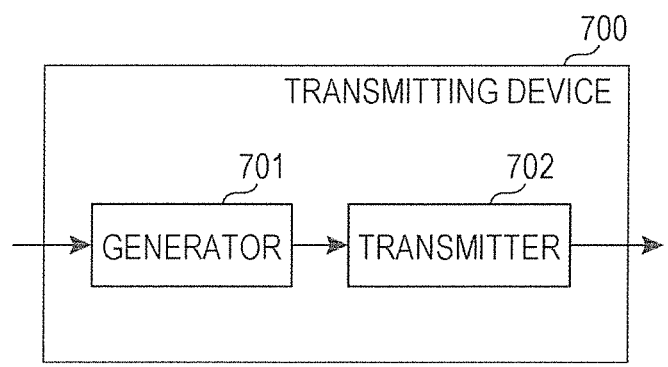
FIG. 74 is a view illustrating a specific configuration example of the transmitting device.
Figure 75:
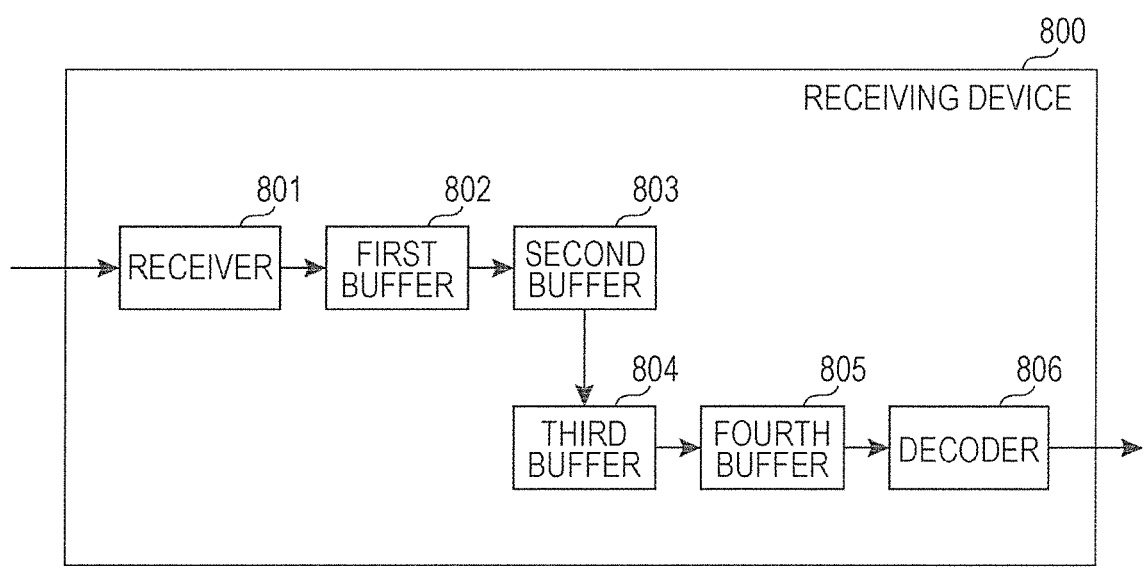
FIG. 75 is a view illustrating a specific configuration example of the receiving device.

As described above, the transmitting device which controls a rate to satisfy the definition of the receiving buffer model during encoding can be also configured as illustrated in FIG. 74. Further, the receiving device which receives and decodes a transmitting packet transmitted from the transmitting device can be also configured as illustrated in FIG. 75. FIG. 74 is a view illustrating a specific configuration example of the transmitting device. FIG. 75 is a view illustrating a specific configuration example of the receiving device.

Transmitting device 700 includes generator 701 and transmitter 702. Generator 701 and transmitter 702 are realized by, for example, microcomputers, processors or dedicated circuits.

Receiving device 800 includes receiver 801, first buffer 802, second buffer 803, third buffer 804, fourth buffer 805 and decoder 806. Receiver 801, first buffer 802, second buffer 803, third buffer 804, fourth buffer 805 and decoder 806 are realized by, for example, microcomputers, processors or dedicated circuits.

Each component of transmitting device 700 and receiving device 800 will be described in detail when a transmitting method and a receiving method will be described.

Figure 76:
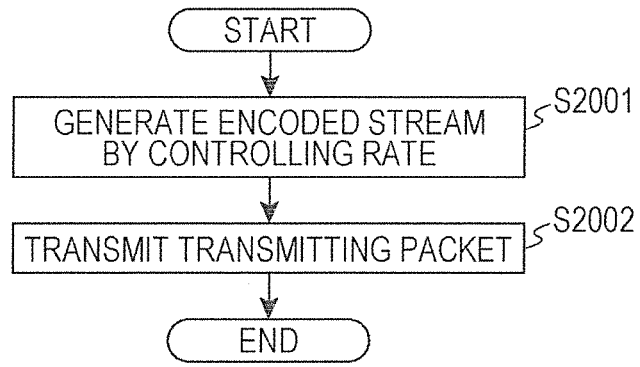
FIG. 76 is a view illustrating a flowchart of an operation of the transmitting device.

First, the transmitting method will be described with reference to FIG. 76. FIG. 76 illustrates a flowchart of an operation (transmitting method) of the transmitting device.

First, generator 701 of transmitting device 700 generates an encoded stream by controlling a rate to satisfy the predetermined definition of the receiving buffer model to guarantee the buffering operation of the receiving device (step S2001).

Next, transmitter 702 of transmitting device 700 packetizes the generated encoded stream, and transmits the transmitting packet obtained by the packetizing (step S2002).

In this regard, the receiving buffer model used in transmitting device 700 employs a configuration including first to fourth buffers 802 to 805 which are components of receiving device 800, and therefore will not be described.

Consequently, transmitting device 700 can guarantee a buffering operation of receiving device 800 when transmitting data by using a method such as MMT.

Figure 77:
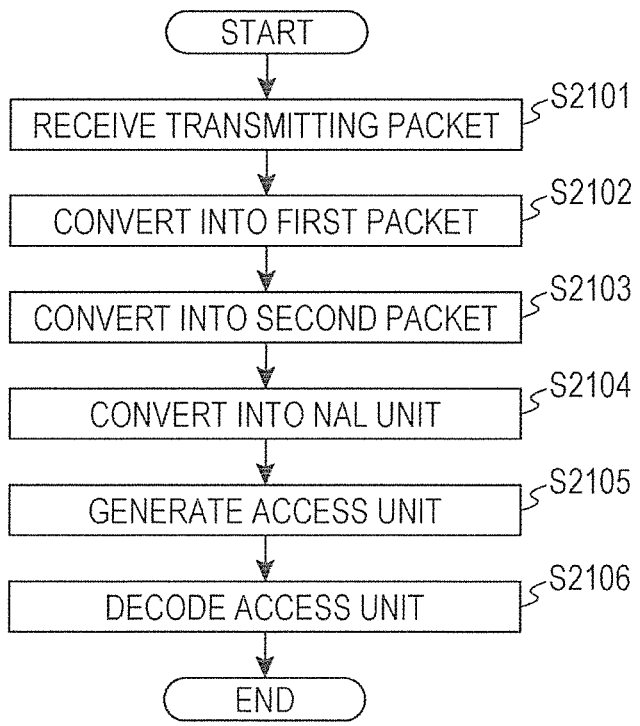
FIG. 77 is a view illustrating a flowchart of an operation of the receiving device.

Next, the receiving method will be described with reference to FIG. 77. FIG. 77 illustrates a flowchart of an operation (receiving method) of the receiving device.

First, receiver 801 of receiving device 800 receives the transmitting packet configured by the packet header of the fixed length and the payload of the variable length (step S2101).

Next, first buffer 802 of receiving device 800 converts a packet configured by a packet header of a variable length and a payload of a variable length stored in the received transmitting packet, into a first packet including a packet header of a fixed length of an extended header, and outputs the first packet obtained by the conversion at a fixed bit rate (step S2102).

Next, second buffer 803 of receiving device 800 converts the first packet obtained by the conversion into a second packet configured by a packet header and a payload of a variable length, and outputs a second packet obtained by the conversion at a fixed bit rate (step S2103).

Next, third buffer 804 of receiving device 800 converts the output second packet into an NAL unit, and outputs the NAL unit obtained by the conversion at a fixed bit rate (step S2104).

Next, fourth buffer 805 of receiving device 800 sequentially accumulates the output NAL unit, generates an access unit from a plurality of accumulated NAL units, and outputs the generated access unit to a decoder at a timing of a decoding time corresponding to the access unit (step S2105).

Further, decoder 806 of receiving device 800 decodes the access unit output from the fourth buffer (step S2106).

Consequently, receiving device 800 can perform a decoding operation without causing an underflow or an overflow.

Sixth Exemplary Embodiment

[Outline]

The sixth exemplary embodiment describes a transmitting method and a receiving method in the case where a leap second adjustment is made to the time information serving as a reference for a reference clock under the MMT/TLV transfer scheme.

Figures 78, 79:
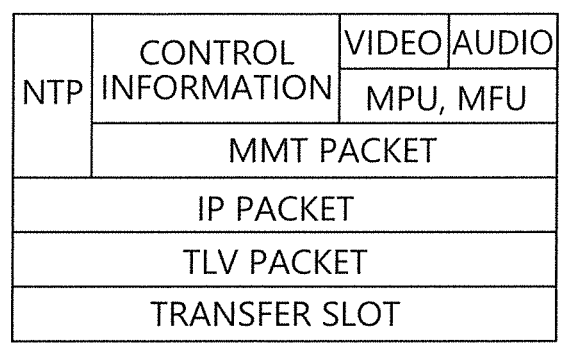
FIG. 78 is a diagram showing a protocol stack under the MMT/TLV scheme defined according to the ARIB STD-B60.
FIG. 79 is a diagram showing a structure of a TLV packet.

FIG. 78 is a diagram showing a protocol stack under the MMT/TLV scheme defined according to the ARIB STD-B60.

Under the MMT scheme, in a packet, data such as video and audio is stored per predetermined data units such as media presentation units (MPUs) and media fragment units (MFUs), and an MMTP packet is generated as a predetermined packet by an attachment of an MMTP packet header to the packet (MMTP packetization). In addition, by attaching an MMTP packet header also to control information such as a control message under the MMTP, an MMTP packet is generated as a predetermined packet. A field that stores a 32-bit short-format network time protocol (NTP defined in IETF RFC 5905) is set for the MMTP packet header and can be used for the QoS control of communication lines or the like.

Moreover, a reference clock of a transmission side (transmitting device) is synchronized with a 64-bit long-format NTP defined in the RFC 5905, and a time stamp such as a presentation time stamp (PTS) and/or a decode time stamp (DTS) are attached to a synchronized media based on the synchronized reference clock. In addition, reference clock information of the transmission side is transmitted to a reception side, and a receiving device generates a system clock based on the reference clock information received from the transmission side.

To be specific, the PTS and/or the DTS are stored in an MPU time stamp descriptor or in an MPU extension time stamp descriptor which is MMTP control information. Such PTS and/or DTS are stored in an MP table for each asset, and then transmitted after having been MMTP packetized as a control message.

A UDP header or an IP header is attached to the MMTP packetized data, and is encapsulated into an IP packet. Here, an assembly of the packets having, in the IP header or in the UDP header, the same source IP address, the same destination IP address, the same source port number, and the same protocol type shall be defined as an IP data flow. Note that the respective IP packets of the same IP data flow have a redundant header; therefore, a header is compressed for some of the IP packets.

Furthermore, a 64-bit NTP time stamp is stored into an NTP packet as reference clock information, and then stored into an IP packet. Here, in the IP packet that stores the NTP packet, the source IP address, the destination IP address, the source port number, the destination port number, and the protocol type are fixed values, and the header of the IP packet is not compressed.

FIG. 79 is a diagram showing a structure of a TLV packet.

As shown in FIG. 79, a TLV packet can include, as data, an IP packet, a compressed IP packet, and transfer control information such as an address map table (AMT) and a network information table (NIT), and these data is identified using an 8-bit data type. In addition, in the TLV packet, a data length (in byte units) is indicated using a 16-bit field and a data value is stored after that. Moreover, the TLV packet has 1-byte header information before the data type and the header information is stored into a header area of 4 bytes in total. The TLV packet is also mapped into a transfer slot under an advanced BS transfer scheme, and the mapping information is stored into transmission and multiplexing configuration control (TMCC) control information.

Figure 80:
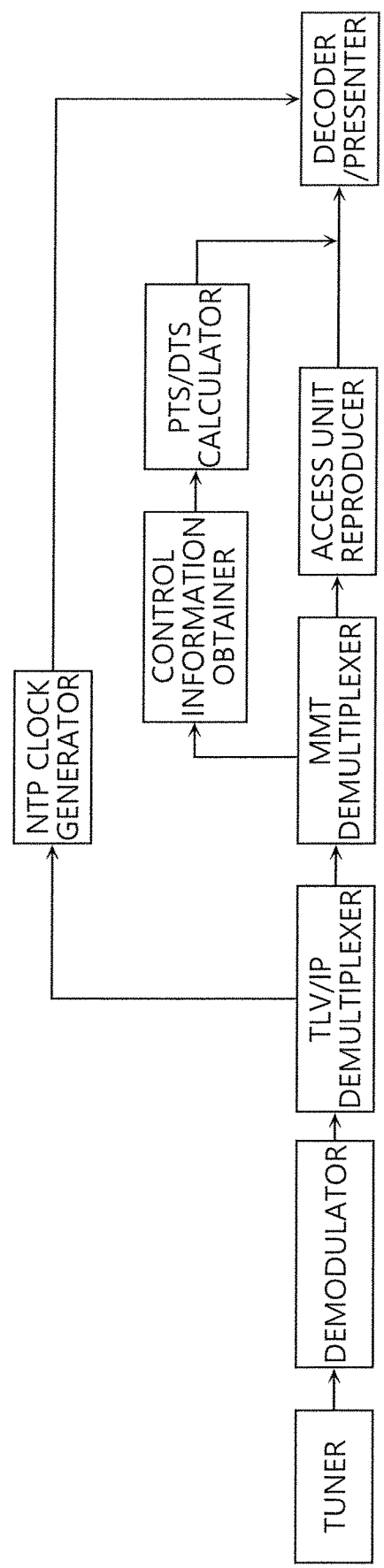
FIG. 80 is a diagram showing an example of a block diagram of the receiving device.

FIG. 80 is a diagram showing an example of the block diagram of the receiving device.

First, in the receiving device, through the decoding by a demodulator and error correction and so on that are performed onto a broadcast signal received by a tuner, the TLV packets are extracted. Then, a TLV/IP demultiplexer performs DEMUX processing of the TLV packets and the IP packets. The DEMUX processing of the TLV packets is performed according to the data type of the TLV packet. For example, in the case where a TLV packet has an IP packet, a compressed header of a compressed IP packet is restored. An IP demultiplexer performs processing such as an analysis on the headers of the IP packets and the UDP packets, and extracts the MMTP packets and the NTP packets.

An NTP clock generator reproduces an NTP clock based on the extracted NTP packets. An MMTP demultiplexer performs filtering onto the components such as video and audio and the control information, based on a packet ID stored in the extracted MMTP packet header. A time stamp descriptor stored in an MP table is obtained from a control information obtainer, and a PTS/DTS calculator calculates a PTS and a DTS for each access unit. Note that the time stamp descriptor includes both of an MPU time stamp descriptor and an MPU extension time stamp descriptor.

An access unit reproducer transforms the video, audio, and others that have been filtered from the MMTP packets into data in units for presentation. More specifically, the data in units for presentation refers to NAL units and access units of a video signal, audio frames, presentation units for subtitles, and the like. A decoder/presenter decodes and presents an access unit at a time when the PTS and the DTS of the access unit match, based on the reference time information of the NTP clock.

Note that the configuration of the receiving device is not limited to this.

Next, time stamp descriptors will be described below.

FIG. 81 is a diagram for explaining the time stamp descriptors.

A PTS and/or a DTS are stored in an MPU time stamp descriptor as the first control information or in an MPU extension time stamp descriptor as the second control information, which is MMT control information. Such PTS and/or DTS are stored in an MP table for each asset, and then transmitted after having been MMTP packetized as a control message.

(a) in FIG. 81 is a diagram showing a structure of the MPU time stamp descriptor defined according to the ARIB STD-B60. The MPU time stamp descriptor stores a PTS (an absolute value indicated by 64-bit NTP) of the AU positioned at a head (first) (hereinafter referred to as "head AU") in a presentation order of presenting the plural AUs included in each of the MPUs. In other words, the presentation time information attached to an MPU is included in the control information of the MMTP packet and then transmitted.

(b) in FIG. 81 is a diagram showing a structure of the MPU extension time stamp descriptor. The MPU extension time stamp descriptor stores the information for calculating the PTS and the DTS of the AU included in each of the MPUs. The MPU extension time stamp descriptor includes relative information from the PTS of the head AU in the MPU, which is stored in the MPU time stamp descriptor, and the PTS and the DTS of the AU included in the MPU can be calculated based on both the MPU time stamp descriptor and the MPU extension time stamp descriptor. In other words, the PTSs and the DTSs of the AUs other than the head AU included in the MPU can be calculated based on the PTS of the head AU, which is stored in the MPU time stamp descriptor, and the relative information stored in the MPU extension time stamp descriptor.

The NTP is reference time information based on a coordinated universal time (UTC). The UTC makes an adjustment for a leap second (hereinafter referred to as "leap second adjustment") in order to adjust a difference from an astronomical time based on a rotation velocity of the earth. More specifically, the leap second adjustment is made at 9 a.m. in the Japanese standard time and is an adjustment of inserting or deleting one second.

FIG. 82 is a diagram for explaining the leap second adjustment.

(a) in FIG. 82 is a diagram showing an example of inserting a leap second in the Japanese standard time. As shown in the diagram, in the leap second insertion in the Japanese standard time, after 8:59:59, the time 8:59:59 follows at the timing when it is supposed to be 9:00:00 in the original time, and thus, the time 8:59:59 is repeated two times.

(b) in FIG. 82 is a diagram showing an example of deleting a leap second in the Japanese standard time. As shown in the diagram, in the leap second deletion in the Japanese standard time, after 8:59:58, the time 9:00:00 follows at the timing when it is supposed to be 8:59:59 in the original time, and thus, one second of the time 8:59:59 is deleted.

In the NTP packet, 2-bit leap indicator is stored other than a 64-bit time stamp. The leap indicator is a flag for previously notifying that a leap second adjustment will be made, and leap indicator=1 indicates a leap second insertion whereas leap_indicator=2 indicates a leap second deletion. The methods for the previous notification include, among others, a notification at the beginning of the month in which a leap second adjustment is made, a notification that is 24 hours prior to a leap second adjustment, a method of starting the notification at an arbitrary time. In addition, leap indicator becomes 0 at the time when the leap second adjustment is ended (9:00:00). For example, in the case of notifying a leap second adjustment 24 hours in advance before the leap second adjustment is made, leap_indicator indicates "1" or "2" during a period of time starting from 9 a.m. on the day before the day on which the leap second adjustment is made up to the time that is immediately before the leap second adjustment is made on the day of the adjustment in the Japanese standard time (i.e., the first 8:59:59 for the case of the leap second insertion and the time 8:59:58 for the case of the leap second deletion).

Next, the problems to be solved at the time of leap second adjustment will be described below.

Figure 83:
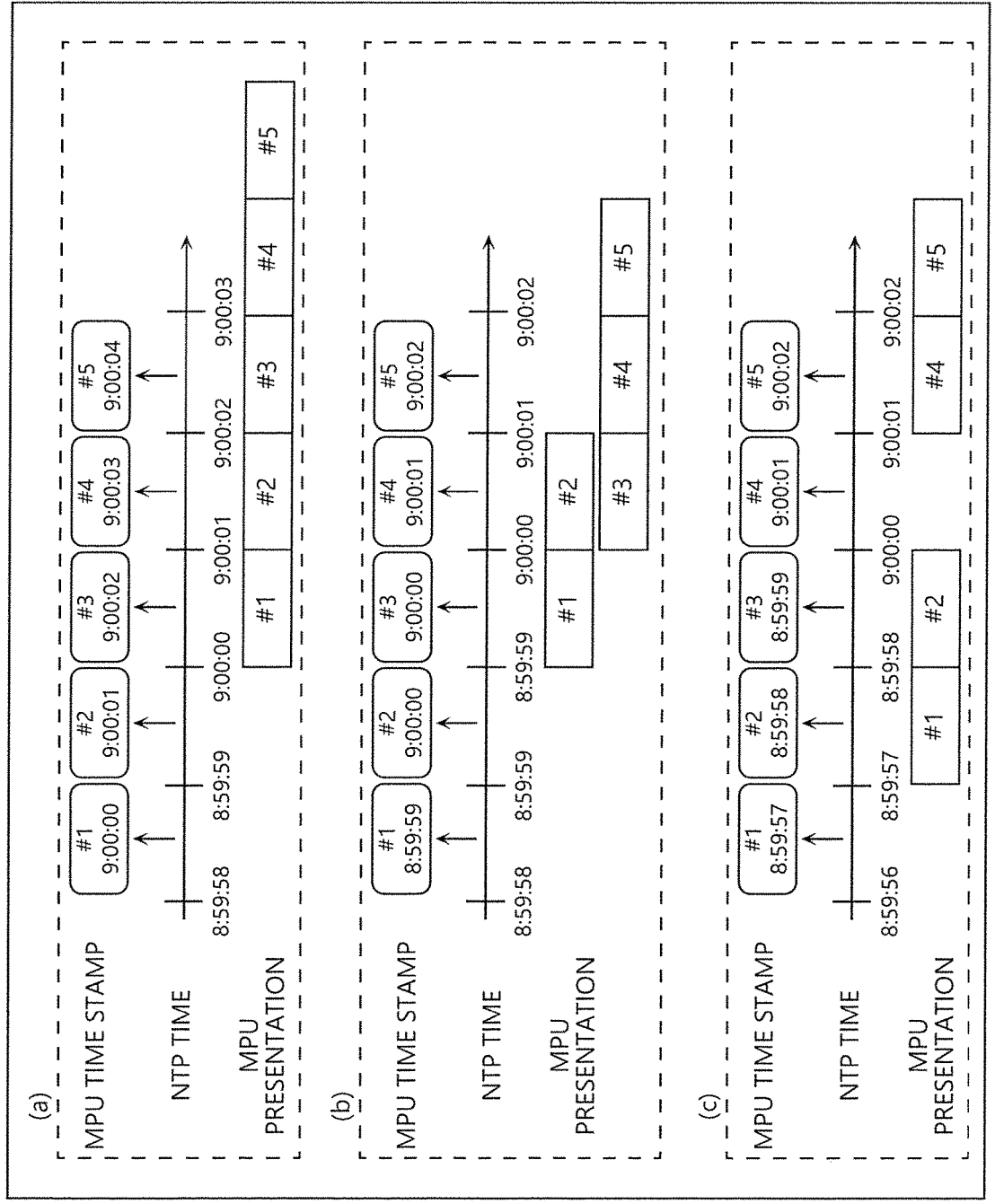
FIG. 83 is a diagram showing a relationship among an NTP time, an MPU time stamp, and MPU presentation timing.

FIG. 83 is a diagram showing a relationship among an NTP time, an MPU time stamp and MPU presentation timing. Note that the NTP time is a time indicated by the NTP. The MPU time stamp is a time stamp indicating a PTS of the head AU in an MPU. The MPU presentation timing is a timing at which the receiving device should present an MPU according to an MPU time stamp. To be more specific, (a) to (c) in FIG. 83 respectively shows the relationship among the NTP time, the MPU time stamp, and the MPU presentation time in the respective cases where: (a) a leap second adjustment does not occur; (b) a leap second is inserted; and (c) a leap second is deleted.

Here, the case where the NTP time (reference clock) of the transmission side synchronizes with an NTP server while the NTP time (system clock) of the reception side synchronizes with the NTP time of the transmission side will be described as an example. In this case, the receiving device reproduces based on the time stamp stored in the NTP packet transferred from the transmission side. In addition, both the NTP time of the transmission side and the NTP time of the reception side synchronize with the NTP server, and therefore, +1 or −1 second adjustment is made at the time of the leap second adjustment. Moreover, the NTP time in FIG. 83 shall be commonly used for the NTP time of the transmission side and the NTP time of the reception side. Note that the description is provided under the assumption that no transit delay shall occur.

The MPU time stamp in FIG. 83 indicates a time stamp of a head AU in a presentation order of presenting the plural AUs included in each of the MPUs, and is generated (set) based on the NTP time indicated by an arrow. More specifically, the presentation time information of an MPU is generated by adding a predetermined period of time (e.g., 1.5 seconds in FIG. 83) to the NTP time as the reference time information at the timing of generating the presentation time information of the MPU. The generated MPU time stamp is stored into the corresponding MPU time stamp descriptor.

The receiving device presents an MPU at the MPU presentation time that is based on the time stamp stored in the MPU time stamp descriptor.

Note that, in FIG. 83, it is described that a reproduction time of one MPU is one second, however, the reproduction time may be a period of time other than one second, e.g., 0.5 seconds or 0.1 seconds.

In the example shown in (a) in FIG. 83, the receiving device can sequentially present MPU #1 through MPU #5 based on the time stamps each being stored in the corresponding MPU time stamp descriptor.

However, in (b) in FIG. 83, the presentation time of MPU #2 and the presentation time of MPU #3 overlap due to the leap second insertion. Therefore, when the receiving device presents an MPU based on the time stamp stored in the MPU time stamp descriptor, the receiving device cannot determine as to which MPU shall be presented because two MPUs are to be presented at the same time of 9:00:00. Moreover, the receiving device cannot determine as to at which of the two MPU presentation times an MPU shall be presented because the MPU presentation time (8:59:59) indicated by the time stamp MPU #1 is presented for two times.

Moreover, in (c) in FIG. 83, the receiving device cannot present MPU #3 because the MPU presentation time (8:59:59) indicated by the MPU time stamp MPU #3 does not exist in the NTP time due to the leap second deletion.

In the case of decoding and presenting MPUs without reference to the time stamps, the receiving device can solve the problems as described above. Nevertheless, it is difficult for the receiving device that performs processing based on the time stamps to perform different processing (processing without reference to the time stamps) only when a leap second occurs.

Next, the method of solving the problems at the time of the leap second adjustment by correcting a time stamp on the transmission side will be described.

Figure 84:
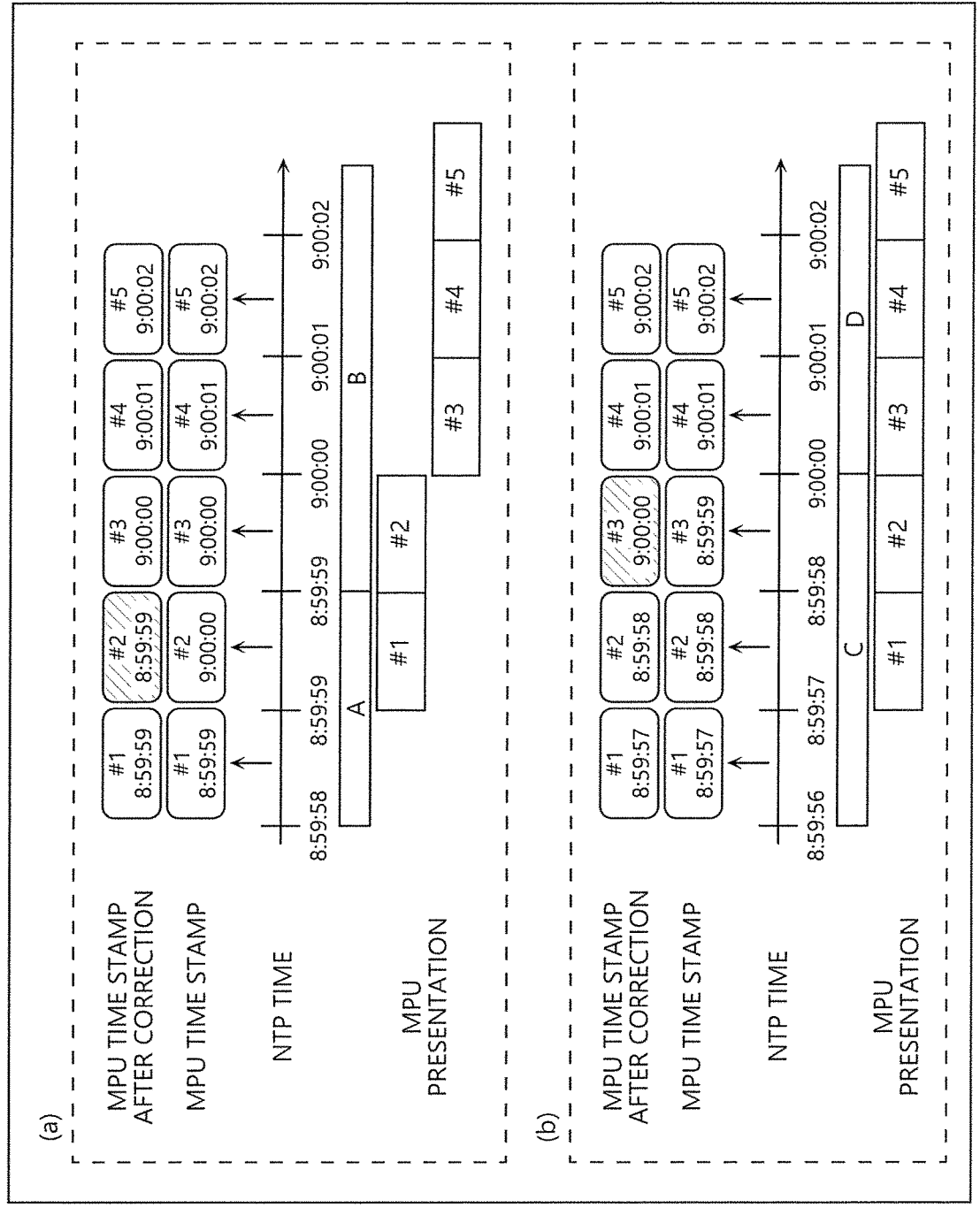
FIG. 84 is a diagram for explaining a correction method for correcting a time stamp on the transmission side.

FIG. 84 is a diagram for explaining a correction method of correcting a time stamp on the transmission side. Specifically, (a) in FIG. 84 shows an example of the leap second insertion while (b) in FIG. 84 shows an example of the leap second deletion.

First, the case of the leap second insertion will be described.

As shown in (a) in FIG. 84, in the case of the leap second insertion, a time range up to the time immediately before the leap second insertion (i.e., up to the first 8:59:59 in the NTP time) is defined as a region A, and a time range that follows the leap second insertion (i.e., after and including the second 8:59:59 in the NTP time) is defined as a region B. Note that the regions A and B are temporal regions and are time spans or periods of time. The MPU time stamp in (a) in FIG. 84 is the same as the time stamp described in FIG. 83 and is the time stamp generated (set) based on the NTP time at the timing of attaching an MPU time stamp.

The method for correcting a time stamp on the transmission side in the case of the leap second insertion will be described in detail.

The following processing is performed by the transmission side (transmitting device).

1. In the case where the timing of attaching an MPU time stamp (the timing indicated by an arrow in (a) in FIG. 84) is included in the region A and the MPU time stamp (a value of the MPU time stamp before correction) indicates the time 9:00:00 or thereafter, the transmission side (transmitting device) makes −1 second correction of decreasing one second from the MPU time stamp value and stores the corrected MPU time stamp into the MPU time stamp descriptor. In other words, in the case where an MPU time stamp is generated based on the NTP time included in the region A and the MPU time stamp indicates the time 9:00:00 or thereafter, the transmission side (transmitting device) corrects the MPU time stamp by decreasing one second. Note that the time "9:00:00" here is the time, which serves as a reference for the leap second adjustment, corresponding to the Japanese standard time (i.e., the time derived by adding nine hours to the UTC time scale). The transmission side (transmitting device) separately transmits the correction information which is information indicating that a correction has been made to the receiving device.

2. In the case where the timing of attaching an MPU time stamp (the timing indicated by an arrow in (a) in FIG. 84) is in the region B, the transmission side (transmitting device) does not correct the MPU time stamp. In other words, in the case where an MPU time stamp is generated based on the NTP time included in the region B, the transmission side (transmitting device) does not correct the MPU time stamp.

The receiving device presents an MPU based on the corresponding MPU time stamp and the correction information indicating whether or not the MPU time stamp has been corrected (i.e., whether or not the information indicating that a correction has been made is included).

In the case where it is determined that the MPU time stamp has not been corrected (i.e., in the case where it is determined that the information indicating that a correction has been made is not included), the receiving device presents the MPU at the time when the time stamp stored in the MPU time stamp descriptor corresponds to the NTP time (including both the NTP time before correction and the NTP time after correction) of the receiving device. In other words, in the case where the MPU time stamp is the one that is stored in the MPU time stamp descriptor of the MPU transmitted before the MPU to be corrected, the receiving device presents the MPU at the time when the MPU time stamp corresponds to the NTP time before the leap second insertion (i.e., before the first 8:59:59). In the case where the MPU time stamp stored in the MPU time stamp descriptor of the received MPU is the time stamp transmitted after the MPU time stamp to be corrected, the receiving device presents the MPU at the timing corresponding to the NTP time after the leap second insertion (i.e., after and including the second 8:59:59).

Moreover, in the case where the MPU time stamp stored in the MPU time stamp descriptor of the received MPU has been corrected, the receiving device presents the MPU based on the NTP time after the leap second insertion (i.e., after and including the second 8:59:59).

Note that the information indicating that an MPU time stamp value has been corrected is stored in a control message, a descriptor, MPU metadata, MF metadata, an MMTP packet header, or the like, and then transferred.

Next, the case of the leap second deletion will be described.

As shown in (b) in FIG. 84, in the case of the leap second deletion, a time range up to the time immediately before the leap second deletion (i.e., up to 9:00:00 in the NTP time) is defined as a region C, and a time range that follows the leap second deletion (i.e., after and including 9:00:00 in the NTP time) is defined as a region D. Note that the regions C and D are temporal regions and are time spans or periods of time. The MPU time stamp in (b) in FIG. 84 is the same as the time stamp described in FIG. 83 and is the time stamp generated (set) based on the NTP time at the timing of attaching an MPU time stamp.

The method for correcting a time stamp on the transmission side in the case of the leap second deletion will be described in detail.

The following processing is performed by the transmission side (transmitting device).

1. In the case where the timing of attaching an MPU time stamp (the timing indicated by an arrow in (b) in FIG. 84) is included in the region C and the MPU time stamp (a value of the MPU time stamp before correction) indicates the time 8:59:59 or thereafter, the transmission side (transmitting device) makes +1 second correction of adding one second to the MPU time stamp value and stores the corrected MPU time stamp into the MPU time stamp descriptor. In other words, in the case where an MPU time stamp is generated based on the NTP time included in the region C and the MPU time stamp indicates the time 8:59:59 or thereafter, the transmission side (transmitting device) corrects the MPU time stamp by adding one second. Note that the time "8:59:59" here is the time obtained by decreasing one second from the time corresponding to the Japanese standard time (i.e., the time derived by adding nine hours to the UTC time scale). In addition, the transmission side (transmitting device) separately transmits the correction information which is information indicating that a correction has been made to the receiving device. Note that the transmission side (transmitting device) may not necessarily transmit the correction information in this case.

2. In the case where the timing of attaching an MPU time stamp (the timing indicated by an arrow in (b) in FIG. 84) is in the region D, the transmission side (transmitting device) does not correct the MPU time stamp. In other words, in the case where an MPU time stamp is generated based on the NTP time included in the region D, the transmission side (transmitting device) does not correct the MPU time stamp.

The receiving device presents an MPU based on the MPU time stamp. Note that, when the correction information indicating whether or not an MPU time stamp has been corrected is provided, the receiving device may present an MPU based on the MPU time stamp and the correction information.

With the processing as described above, the receiving device can perform a normal presentation using the MPU time stamp stored in the MPU time stamp descriptor, even when a leap second adjustment has been made to the NTP time.

Note that the transmission side (transmitting device) may signal that the timing of attaching an MPU time stamp is in the region A, B, C, or D so as to notify the receiving device of it. In other words, the transmission side (transmitting device) may signal that an MPU time stamp is generated based on the NTP time included in the region A, B, C, or D so as to notify the reception side of it. To put it another way, the transmission side (transmitting device) may transmit identification information indicating whether or not an MPU time stamp (presentation time) is generated based on the reference time information (NTP time) before the leap second adjustment. The identification information is attached based on leap indicator included in an NTP packet and thus is the information indicating whether or not an MPU time stamp is set based on a time within the time range from 9:00:00 on the previous day of the day a leap second adjustment is made up to the time immediately before the leap second adjustment (i.e., the first 8:59:59 in the case of the leap second insertion and at 8:59:58 in the case of the leap second deletion). In other words, the identification information is the information indicating whether or not an MPU time stamp is generated based on the NTP time within a time range from a time preceding, by a predetermined period of time (e.g., 24 hours), the time immediately before a leap second adjustment is made up to the time immediately before the leap second adjustment.

Next, the method for solving the problems at the time of leap second adjustment by correcting a time stamp in the receiving device will be described.

Figure 85:
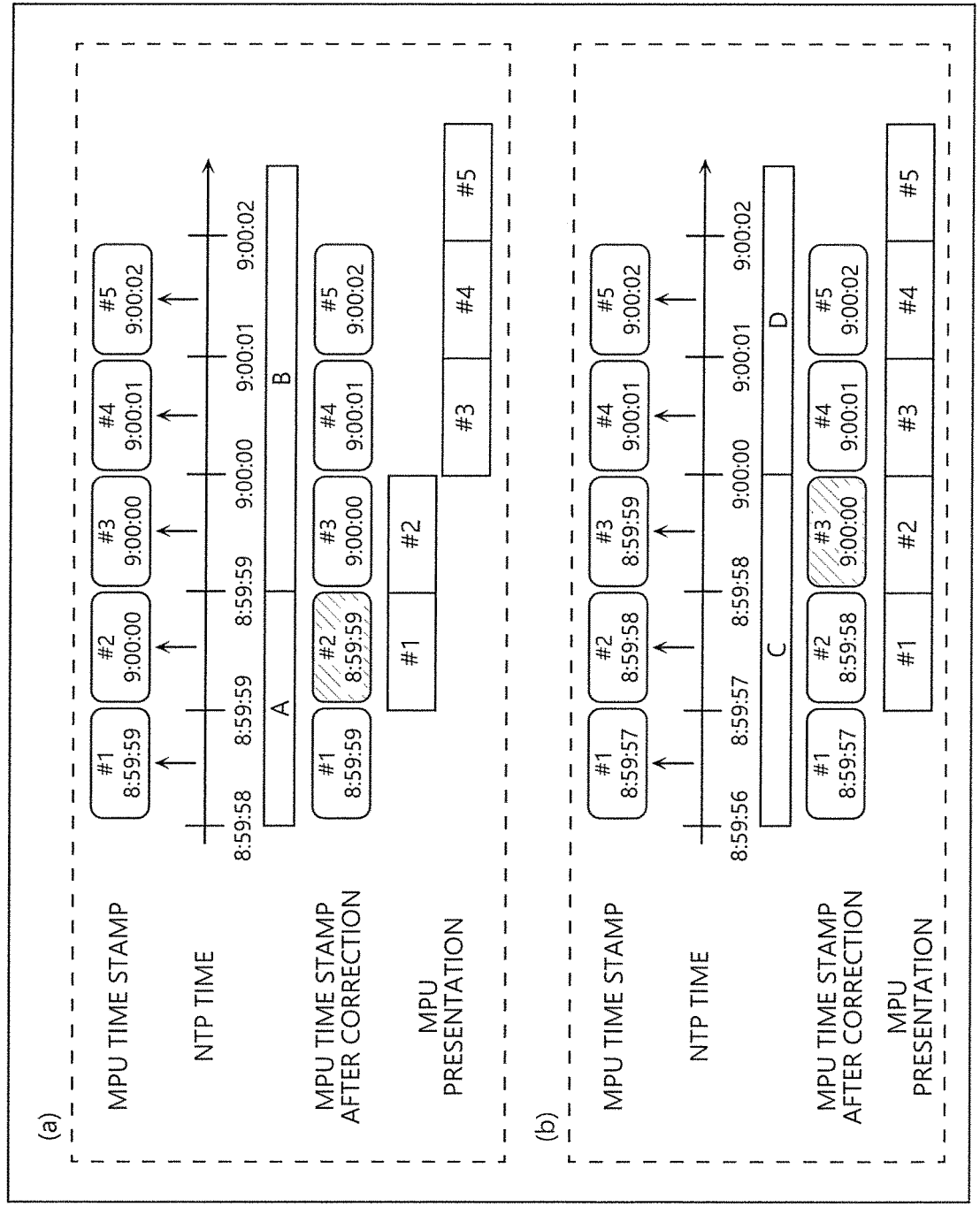
FIG. 85 is a diagram for explaining a correction method for correcting a time stamp by the receiving device.

FIG. 85 is a diagram for explaining a correction method of correcting a time stamp in the receiving device. More specifically, (a) in FIG. 85 shows an example of the leap second insertion whereas (b) in FIG. 85 shows an example of the leap second deletion.

First, the case of the leap second insertion will be described.

As shown in (a) in FIG. 85, in the case of the leap second insertion, a time range up to the time immediately before the leap second insertion (i.e., up to the first 8:59:59 in the NTP time) is defined as a region A, and a time range that follows the leap second insertion (i.e., after and including the first 8:59:59 in the NTP time) is defined as a region B. Note that the regions A and B are temporal regions and are time spans or periods of time. The MPU time stamp in (a) in FIG. 85 is the same as the time stamp described in FIG. 83 and is the time stamp generated (set) based on the NTP time at the timing of attaching an MPU time stamp.

The method for correcting a time stamp in the receiving device in the case of the leap second insertion will be described in detail.

The following processing is performed on the transmission side (transmitting device).

The transmission side (transmitting device) does not correct but stores the generated MPU time stamp into the MPU time stamp descriptor and transmits the stored MPU time stamp to the receiving device.

The transmission side (transmitting device) transmits, as the identification information, the information indicating whether the timing of attaching an MPU time stamp is in the region A or in the region B to the receiving device. In other words, the transmission side (transmitting device) transmits, to the receiving device, the identification information indicating whether the MPU time stamp is generated based on the NTP time included in the region A or in the region B.

The receiving device performs the following processing.

The receiving device corrects an MPU time stamp based on the corresponding MPU time stamp and the identification information indicating whether the timing of attaching the MPU time stamp is in the region A or in the region B.

More specifically, the following processing is performed.

1. In the case where the timing of attaching an MPU time stamp (the timing indicated by an arrow in (a) in FIG. 85) is included in the region A and the MPU time stamp (a value of the MPU time stamp before correction) indicates the time 9:00:00 or thereafter, the receiving device makes −1 second correction of decreasing one second from the MPU time stamp value and stores the corrected MPU time stamp into the MPU time stamp descriptor. In other words, in the case where an MPU time stamp is generated based on the NTP time included in the region A and the MPU time stamp indicates the time 9:00:00 or thereafter, the receiving device corrects the MPU time stamp by decreasing one second. Note that the time "9:00:00" here is the time, which serves as a reference for the leap second adjustment, corresponding to the Japanese standard time (i.e., the time derived by adding nine hours to the UTC time scale).

2. In the case where the timing of attaching an MPU time stamp (the timing indicated by an arrow in (a) in FIG. 85) is in the region B, the receiving device does not correct the MPU time stamp. In other words, in the case where the MPU time stamp is generated based on the NTP time included in the region B, the receiving device does not correct the MPU time stamp.

In the case where an MPU time stamp has not been corrected, the receiving device presents the corresponding MPU at the time when the MPU time stamp stored in the MPU time stamp descriptor corresponds to the NTP time (including both the NTP time before correction and the NTP time after correction) of the receiving device.

Namely, in the case where an MPU time stamp is the one received before the MPU time stamp to be corrected, the receiving device presents the MPU at the time corresponding to the NTP time before the leap second insertion (i.e., before the first 8:59:59). In addition, in the case where the MPU time stamp is the one received after the MPU time stamp to be corrected, the receiving device presents the MPU at the time corresponding to the NTP time after the leap second insertion (i.e., after the second 8:59:59).

In the case where an MPU time stamp has been corrected, the receiving device presents the corresponding MPU at the time when the corrected MPU time stamp corresponds to the NTP time after the leap second insertion (i.e., after the second 8:59:59) of the receiving device.

Note that the transmission side stores the identification information indicating whether the timing of attaching an MPU time stamp is in the region A or in the region B into a control message, a descriptor, MPU metadata, MF metadata, an MMTP packet header, or the like, and then transfers the stored identification information.

Next, the case of the leap second deletion will be described.

As shown in (b) in FIG. 85, in the case of the leap second deletion, a period of time immediately before the leap second deletion (i.e., immediately before 9:00:00 in the NTP time) is defined as a region C, and a time range that follows the leap second deletion (i.e., the time after 9:00:00 in the NTP time) is defined as a region D, as in (b) in FIG. 84. Note that the regions C and D are temporal regions and are time spans or periods of time. The MPU time stamp in (b) in FIG. 85 is the same as the time stamp described in FIG. 83 and is the time stamp generated (set) based on the NTP time at the timing of attaching an MPU time stamp.

The method for correcting a time stamp in the receiving device in the case of the leap second deletion will be described in detail.

The following processing is performed on the transmission side (transmitting device).

The transmission side (transmitting device) does not correct but stores the generated MPU time stamp into the MPU time stamp descriptor and transmits the stored MPU time stamp to the receiving device.

The transmission side (transmitting device) transmits, to the receiving device, the information indicating whether the timing of attaching an MPU time stamp is in the region C or in the region D as the identification information. In other words, the transmission side (transmitting device) transmits, to the receiving device, the identification information indicating whether the MPU time stamp is generated based on the NTP time included in the region C or in the region D.

The receiving device performs the following processing.

The receiving device corrects an MPU time stamp based on the MPU time stamp and the identification information indicating whether the timing of attaching the MPU time stamp is in the region C or in the region D.

More specifically, the following processing is performed.

1. In the case where the timing of attaching an MPU time stamp (the timing indicated by an arrow in (b) in FIG. 85) is included in the region C and the MPU time stamp (a value of the MPU time stamp before correction) indicates the time 8:59:59 or thereafter, the receiving device makes +1 second correction of adding one second to the MPU time stamp value. Note that the time "8:59:59" here is the time obtained by decreasing one second from the time corresponding to the Japanese standard time (i.e., the time derived by adding nine hours to the UTC time scale).

2. In the case where the timing of attaching an MPU time stamp (the timing indicated by an arrow in (b) in FIG. 85) is in the region D, the receiving device does not correct the MPU time stamp. In other words, in the case where an MPU time stamp is generated based on the NTP time included in the region D, the receiving device does not correct the MPU time stamp.

The receiving device presents an MPU based on the corresponding MPU time stamp and the corrected MPU time stamp.

With the processing as described above, the receiving device can perform a normal presentation using an MPU time stamp stored in an MPU time stamp descriptor, even when a leap second adjustment has been made to the NTP time.

Note that, even in this case, the transmission side (transmitting device) may signal whether the timing of attaching an MPU time stamp is in the region A, B, C, or D so as to notify the reception side of it, as is the case of correcting an MPU time stamp on the transmission side described in FIG. 84. As to the details of the notification, the description shall be omitted as it is the same as described in FIG. 84.

Note that the information indicating whether or not an MPU time stamp has been corrected, as described in FIGS. 84 and 85, and additional information (identification information) such as the information indicating whether the timing of attaching an MPU time stamp is in the region A, B, C, or D may be made effective in the case where leap indicator of the NTP packet indicates deletion (leap_indicator=2) or insertion (leap_indicator=1) of the leap second. Such information may be made effective at a predetermined arbitrary time (e.g., three seconds before a leap second adjustment) or it may be made effective dynamically.

Moreover, the timing to end the effective period of the additional information and the timing to end the signaling of the additional information may be adjusted to leap_indicator of the NTP packet. Alternatively, such timings may be made effective at a predetermined arbitrary time (e.g., three seconds before a leap second adjustment) or may be made effective dynamically.

Note that the 32-bit time stamp stored in the MMTP packet and the time stamp information included in the TMCC information are also generated and attached based on the NTP time, which causes the same kind of problem as mentioned above. Therefore, also in the case of the 32-bit time stamp and the time stamp information included in the TMCC information, a time stamp can be corrected using the same method as described in FIGS. 84 and 85 so that the receiving device can perform processing based on the time stamps. For example, in the case of storing the additional information for the 32-bit time stamp stored in an MMTP packet, an extension area in the MMTP packet header can be used to indicate that the stored information is the additional information. In this case, that the stored information is additional information is indicated using an extension type of multi-header type. During the time in which leap indicator is flagged, that the stored information is additional information may be indicated using the bits that are part of 32-bit or 64-bit time stamp.

Note that in the example in FIG. 84, it is defined that a corrected MPU time stamp is stored into an MPU time stamp descriptor, however, the MPU time stamps before and after correction (i.e., the MPU time stamps that have not been corrected and the MPU time stamps that have been corrected) may be both transmitted to the receiving device. For example, the MPU time stamp descriptor before correction and the MPU time stamp descriptor after correction may be stored into the same MPU time stamp descriptor or they may be respectively stored into two MPU time stamp descriptors. In this case, whether the MPU time stamp is before correction or after correction may be identified according to an order of placing the two MPU time stamp descriptors or a description order in the MPU time stamp descriptor. The MPU time stamp before correction may be defined to be always stored in an MPU time stamp descriptor, and in the case of correction, the time stamp after correction may be stored in an MPU extension time stamp descriptor.

Note that, in the present exemplary embodiment, the Japanese standard time (9 a.m.) is used as an example of the NTP time; however, the time is not limited to the Japanese one. The leap second adjustment is based on the UTC time scale and is thus corrected simultaneously at a global level. The Japanese standard time is the time that is nine hours in advance with reference to the UTC time and is indicated by a value (+9) with respect to the UTC time. Thus, the time adjusted to a different time due to a time difference may be used depending on a place.

As has been described above, by correcting a time stamp based on the information indicating the timing of attaching the time stamp, the transmission side or the receiving device can perform a normal reception processing using the time stamp.

Note that, in some cases, the receiving device that has continued decoding since ten minutes before a leap second adjustment may possibly perform decoding and presentation without using the time stamps. In other cases, however, the receiving device that has selected a channel immediately before the leap second adjustment cannot determine a time stamp and thus can present the corresponding MPU only after the leap second adjustment is ended. Even in such case, with the use of the correction method described in the present exemplary embodiment, the reception processing using the time stamps can be realized and a channel can be selected even at the time that is immediately before the leap second adjustment.

Figure 86:
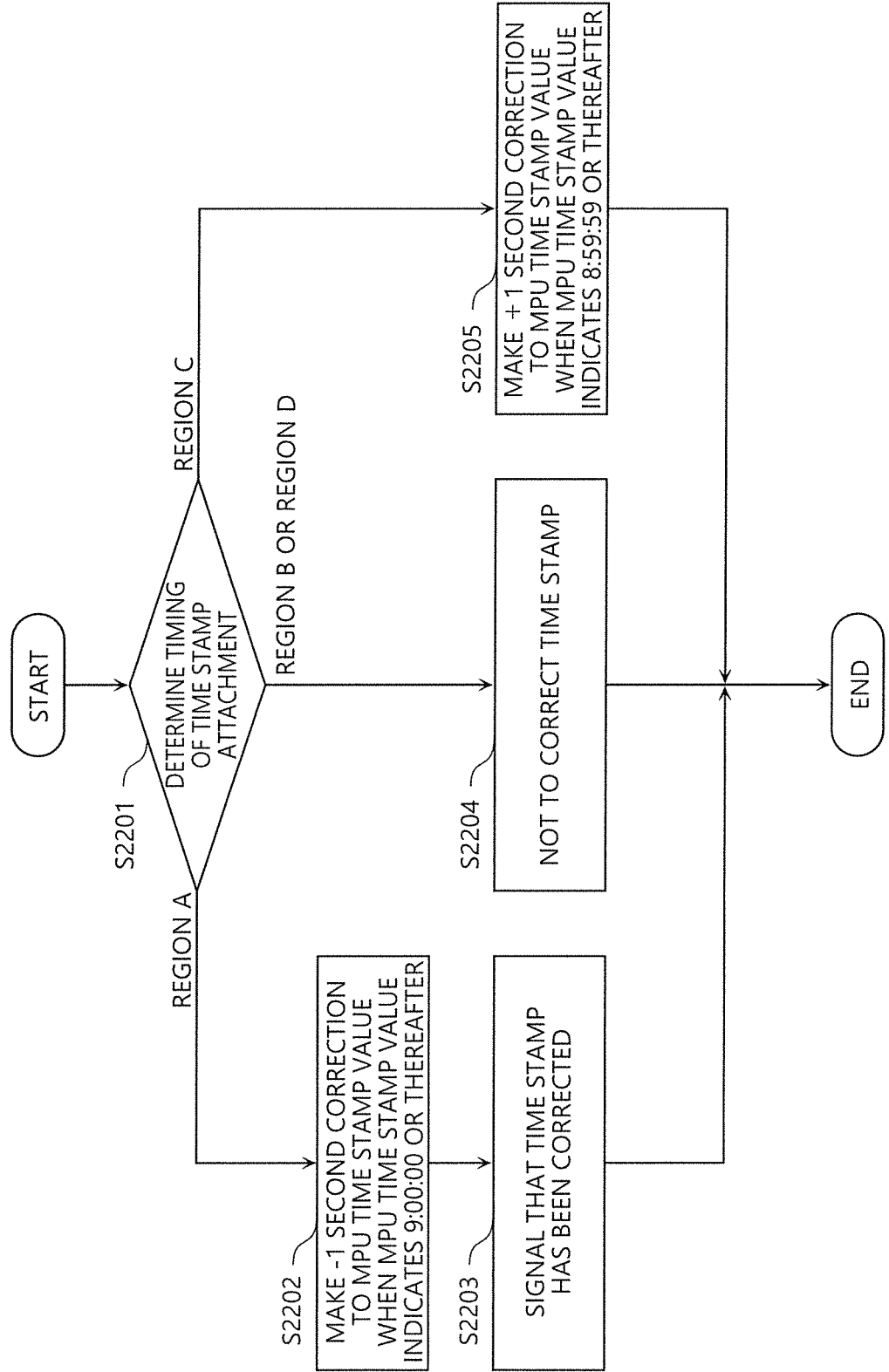
FIG. 86 is a flowchart showing a flow of operations performed by the transmission side (transmitting device) in the case where an MPU time stamp is corrected by the transmission side (transmitting device)
Figure 87:
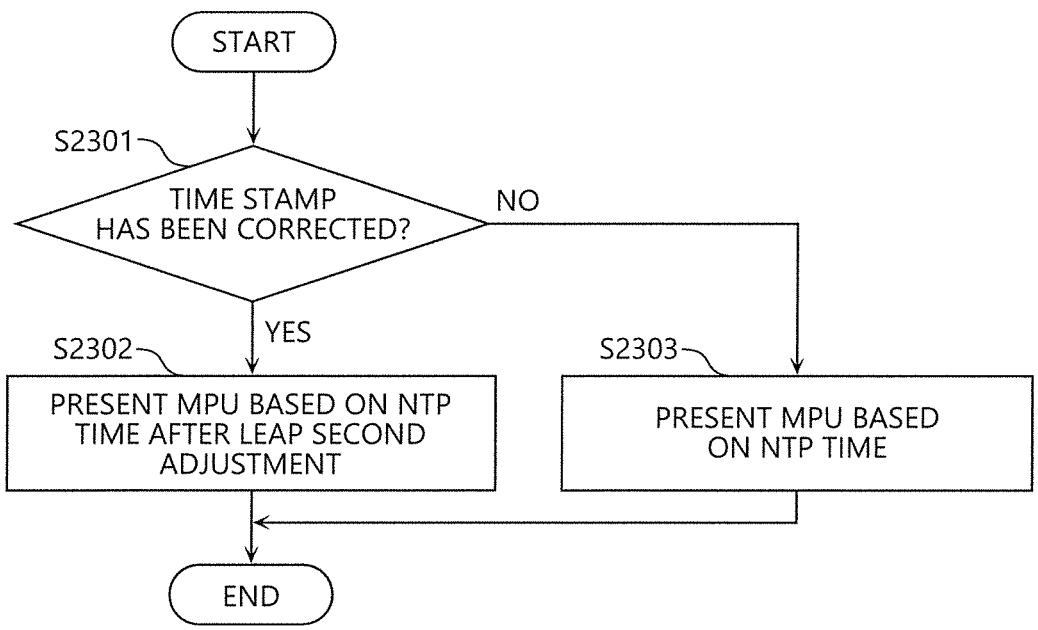
FIG. 87 is a flowchart showing a flow of operations performed by the receiving device in the case where an MPU time stamp is corrected by the transmission side (transmitting device)

FIG. 86 is a flowchart showing a flow of operations performed by the transmission side (transmitting device) whereas FIG. 87 is a flowchart showing a flow of operations performed by the receiving device, in the case where an MPU time stamp is corrected by the transmission side (transmitting device), as has been described with reference to FIG. 84.

First, the operation flow on the transmission side (transmitting device) will be described with reference to FIG. 86.

In the case where a leap second insertion or deletion is performed, the transmission side (transmitting device) determines whether the timing of attaching an MPU time stamp is in the region A, B, C, or D (S2201). Note that the case where a leap second insertion or deletion is not performed is not shown in the diagram.

Here, the regions A to D are defined as follows.

Region A: a time up to the time immediately before a leap second insertion (up to the first 8:59:59)

Region B: a time after and including a leap second insertion (after and including the second 8:59:59)

Region C: a time up to the time immediately before a leap second deletion (up to 9:00:00)

Region D: a time after and including the leap second deletion (after and including 9:00:00)

In Step S2201, in the case where it is determined that the timing of attaching an MPU time stamp is in the region A and the corresponding MPU time stamp indicates 9:00:00 or thereafter, the transmission side (transmitting device) makes −1 second correction to the MPU time stamp and stores the corrected MPU time stamp into the MPU time stamp descriptor (S2202).

Then, the transmission side (transmitting device) signals and transmits the correction information indicating that the MPU time stamp has been corrected, to the receiving device (S2203).

In Step S2201, in the case where it is determined that the timing of attaching an MPU time stamp is in the region C and the corresponding MPU time stamp indicates 8:59:59 or thereafter, the transmission side (transmitting device) makes +1 second correction to the MPU time stamp and stores the corrected MPU time stamp into the MPU time stamp descriptor (S2205).

In Step S2201, in the case where it is determined that the timing of attaching an MPU time stamp is in the region B or in the region D, the transmission side (transmitting device) does not correct but stores the MPU time stamp into the MPU time stamp descriptor (S2204).

Next, the operation flow of the receiving device will be described with reference to FIG. 87.

The receiving device determines whether an MPU time stamp has been corrected or not based on the information signaled by the transmission side (S2301).

In the case where it is determined that the MPU time stamp has been corrected (Yes in S2301), the receiving device presents the corresponding MPU based on the MPU time stamp according to the NTP time after the leap second adjustment (S2302).

In the case where it is determined that the MPU time stamp has not been corrected (No in S2301), the receiving device presents the corresponding MPU based on the MPU time stamp according to the NTP time.

Note that in the case where an MPU time stamp is corrected, the receiving device presents the MPU corresponding to the MPU time stamp in the section in which a leap second is inserted.

On the contrary, in the case where an MPU time stamp is not corrected, the receiving device presents the MPU corresponding to the MPU time stamp not in the section in which a leap second is inserted but in the section in which the leap second is not inserted.

Figure 88:
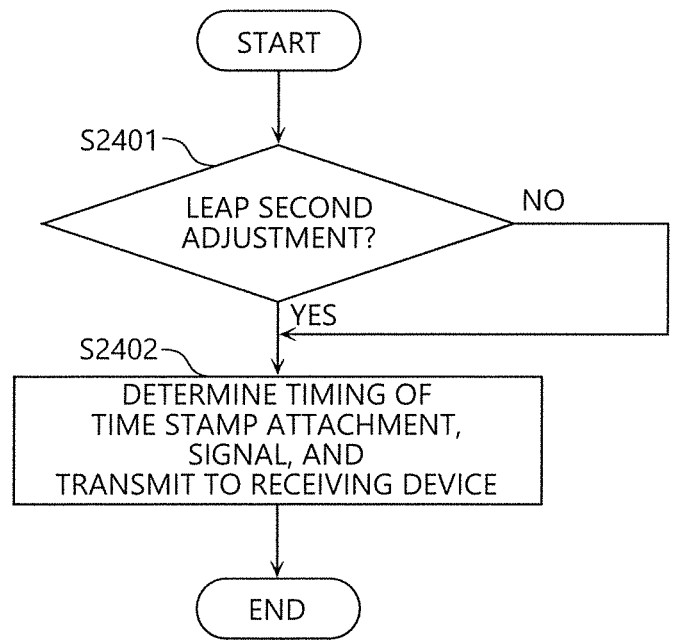
FIG. 88 is a flowchart showing a flow of operations performed by the transmission side (transmitting device) in the case where an MPU time stamp is corrected by the receiving device.
Figure 89:
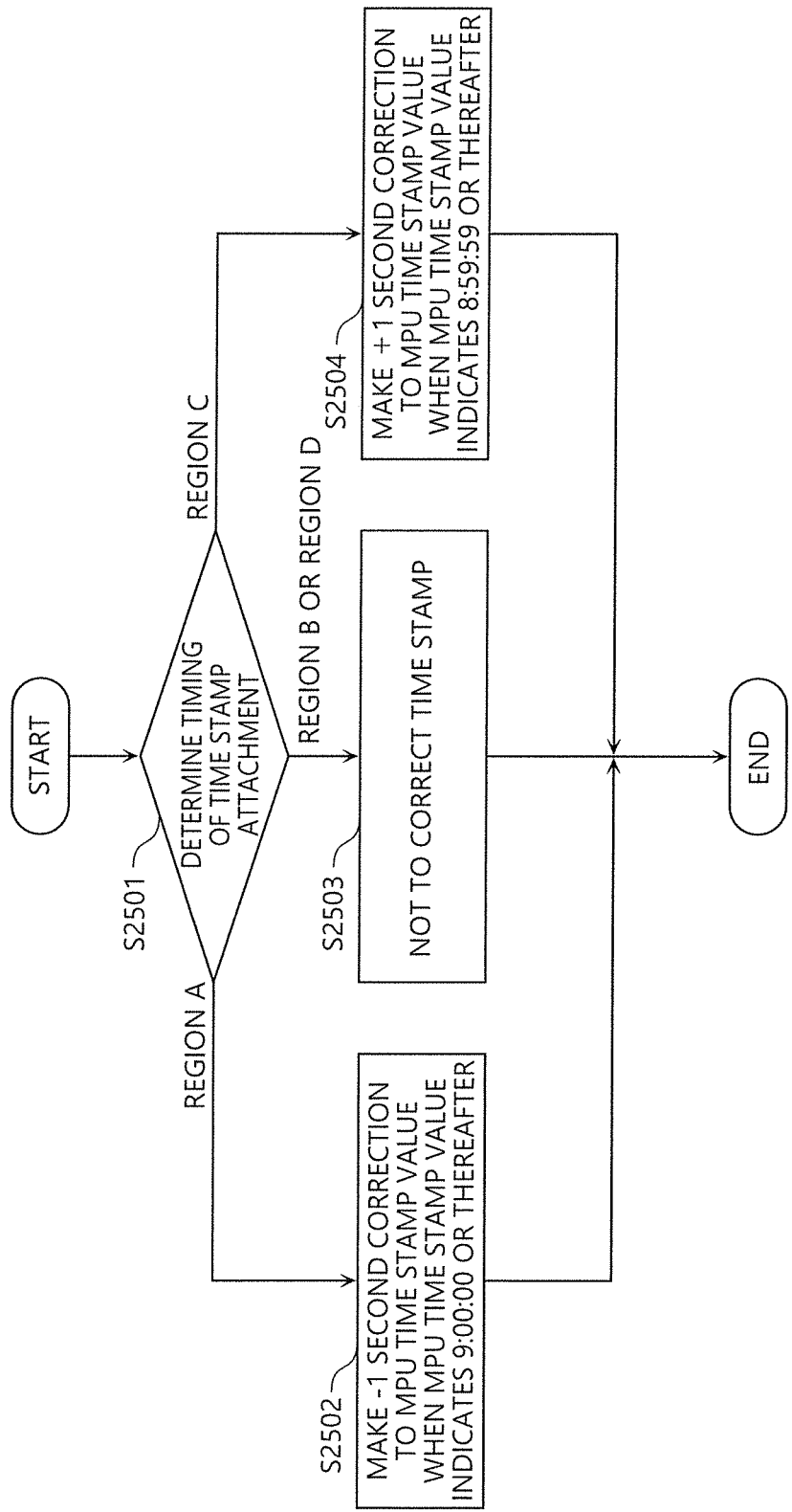
FIG. 89 is a flowchart showing a flow of operations performed by the receiving device in the case where an MPU time stamp is corrected by the receiving device.

FIG. 88 shows an operation flow performed by the transmission side whereas FIG. 89 shows an operation flow performed by the receiving device, in the case where an MPU stamp is corrected by the receiving device, as described with reference to FIG. 85.

First, the operation flow of the transmission side (transmitting device) will be described with reference to FIG. 88.

The transmission side (transmitting device) determines whether a leap second adjustment (insertion or deletion) is made based on leap indicator of the NTP packet (S2401).

In the case where it is determined that a leap second adjustment is made (Yes in S2401), the transmission side (transmitting device) determines the timing of the MPU time stamp attachment, signals, and transmits the identification information to the receiving device (S2402).

On the contrary, in the case where it is determined that a leap second adjustment is not made (No in S2401), the transmission side (transmitting device) ends the processing as a normal operation.

Next, the operation flow of the receiving device will be described with reference to FIG. 89.

The receiving device determines whether the timing of the MPU time stamp attachment is in the region A, B, C, or D based on the identification information signaled by the transmission side (transmitting device) (S2501). Here, the regions A to D are the same as defined above, therefore the description shall be omitted. Note that the case where a leap second insertion or deletion is not performed is not shown in the diagram, as is the case described with reference to FIG. 87.

In Step S2501, in the case where it is determined that the timing of attaching an MPU time stamp is in the region A and the corresponding MPU time stamp indicates 9:00:00 or thereafter, the receiving device makes −1 second correction to the MPU time stamp (S2502).

In Step S2501, in the case where it is determined that the timing of attaching an MPU time stamp is in the region C and the corresponding MPU time stamp indicates 8:59:59 or thereafter, the receiving device makes +1 second correction to the MPU time stamp (S2504).

In Step S2501, in the case where it is determined that the timing of attaching an MPU time stamp is in the region B or in the region D, the receiving device does not correct the corresponding MPU time stamp (S2503).

Furthermore, the receiving device presents the MPU based on the corrected MPU time stamp in the processing that is not shown in the diagram.

Note that in the case of correcting an MPU time stamp, the receiving device presents the MPU corresponding to the MPU time stamp based on the MPU time stamp according to the NTP time after the leap second adjustment.

On the contrary, in the case of not correcting an MPU time stamp, the receiving device presents the MPU corresponding to the MPU time stamp not in the section in which a leap second is inserted but in the section in which the leap second is not inserted.

In short, the transmission side (transmitting device) determines, for each of the MPUs, the timing of attaching an MPU time stamp corresponding to each MPU. Then, as a result of the determination, in the case where the timing is the time up to the time immediately before the leap second adjustment and the MPU time stamp indicates 9:00:900 or thereafter, the transmission side (transmitting device) makes −1 second correction to the MPU time stamp. In addition, the transmission side (transmitting device) signals and transmits, to the receiving device, the correction information indicating that the MPU time stamp has been corrected. As a result of the determination, in the case where the timing is the time up to the time immediately before the leap second deletion and the MPU time stamp indicates 8:59:59 or thereafter, the transmission side (transmitting device) makes +1 second correction to the MPU time stamp.

Moreover, the receiving device presents an MPU based on whether or not the corresponding MPU time stamp has been corrected, which is indicated in the correction information signaled by the transmission side (transmitting device). In the case where the correction information indicates that the MPU time stamp has been corrected, the receiving device presents the corresponding MPU based on the MPU time stamp according to the NTP time after the leap second adjustment. In the case where the MPU time stamp has not been corrected, the receiving device presents the corresponding MPU based on the MPU time stamp according to the NTP time before the leap second adjustment.

Furthermore, the transmission side (transmitting device) determines, for each of the MPUs, the timing of the MPU time stamp attachment and signals. The receiving device performs the following processing based on the information indicating the timing of the MPU time stamp attachment, which has been signaled by the transmission side. Specifically, in the case where the information indicating the timing indicates that the timing is a time up to the time immediately before a leap second insertion and the MPU time stamp indicates 9:00:00 or thereafter, the receiving device makes −1 second correction to the MPU time stamp. In the case where the information indicating the timing indicates that the timing is a time up to the time immediately before a leap second deletion and the MPU time stamp indicates 8:59:59 or thereafter, the receiving device makes +1 second correction to the MPU time stamp.

In the case where an MPU time stamp has been corrected, the receiving device presents the corresponding MPU based on the MPU time stamp according to the NTP time after the leap second adjustment. In the case where an MPU time stamp has not been corrected, the receiving device presents the corresponding MPU based on the MPU time stamp according to the NTP time before the leap second adjustment.

Thus, by determining the timing of the MPU time stamp attachment in the leap second adjustment, it becomes possible to correct an MPU time stamp. This enables the receiving device to determine which MPU should be presented and perform an appropriate reception processing using an MPU time stamp descriptor and an MPU extension time stamp descriptor. In other words, even when a leap second adjustment has been made to the NTP time, the receiving device can perform a normal MPU presentation using an MPU time stamp stored in an MPU time stamp descriptor.

[Supplementary Description: Transmitting Device and Receiving Device]

Figure 90:
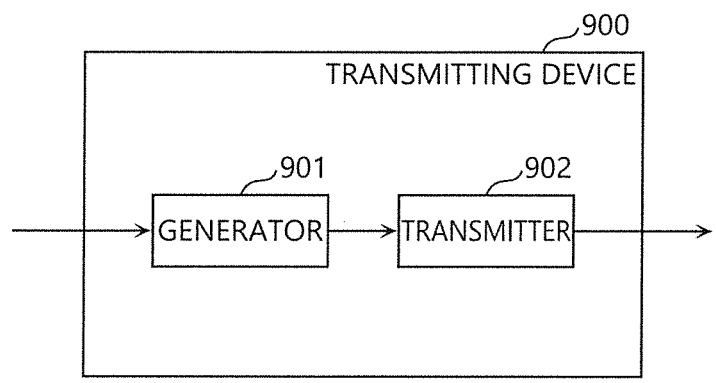
FIG. 90 is a diagram showing an example of a specific configuration of the transmitting device.
Figure 91:
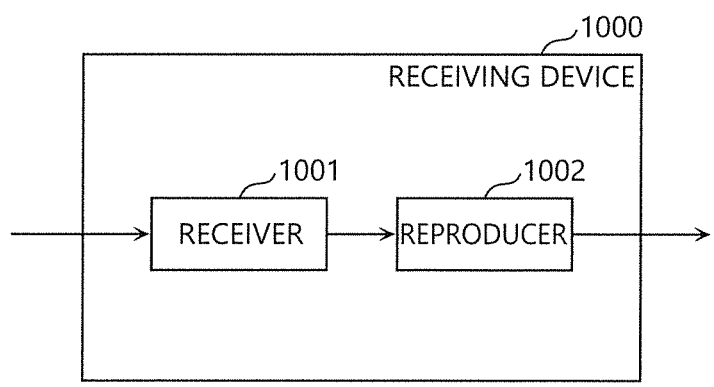
FIG. 91 is a diagram showing an example of a specific configuration of the receiving device.

As has been described above, the transmitting device that stores, into an MPU, the data making up a coded stream and transmits the stored data may have the configuration as described in FIG. 90. Also, the receiving device that receives the MPU in which the data making up a coded stream is stored may have the configuration as described in FIG. 91. FIG. 90 is a diagram showing an example of a specific configuration of the transmitting device. FIG. 91 is a diagram showing an example of a specific configuration of the receiving device.

Transmitting device 900 includes generator 901 and transmitter 902. Each of generator 901 and transmitter 902 is realized by, for instance, a microcomputer, a processor, a dedicated circuit, or the like.

Receiving device 1000 includes receiver 1001 and reproducer 1002. Each of receiver 1001 and reproducer 1002 is realized by, for instance, a microcomputer, a processor, a dedicated circuit, or the like.

Each of the components in transmitting device 900 and receiving device 1000 will be explained in detail in the descriptions of transmitting and receiving methods.

Figure 92:
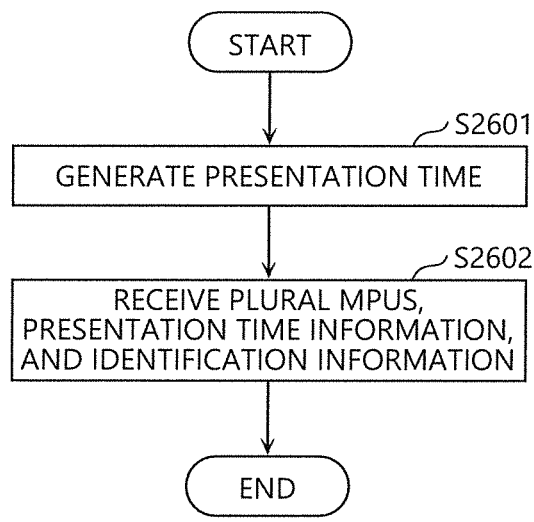
FIG. 92 is a flowchart showing a flow of operations performed by the transmitting device.

First, the transmitting method will be described with reference to FIG. 92. FIG. 92 is an operation flow (transmitting method) performed by the transmitting device.

First, generator 901 of transmitting device 900 generates presentation time information (MPU time stamp) indicating a presentation time of an MPU as a predetermined data unit, based on an NTP time serving as the reference time information received from an external source (S2601).

Next, transmitter 902 of transmitting device 900 transmits an MPU, the presentation time information generated by generator 901, and the identification information indicating whether or not the presentation time information (MPU time stamp) is generated based on the NTP time indicating a time that is before a leap second adjustment (S2602).

This enables the receiving device having received the information transmitted from transmitting device 900 to reproduce an MPU based on the identification information even when a leap second adjustment has been made. Accordingly, the receiving device can reproduce an MPU at an intended time.

Figure 93:
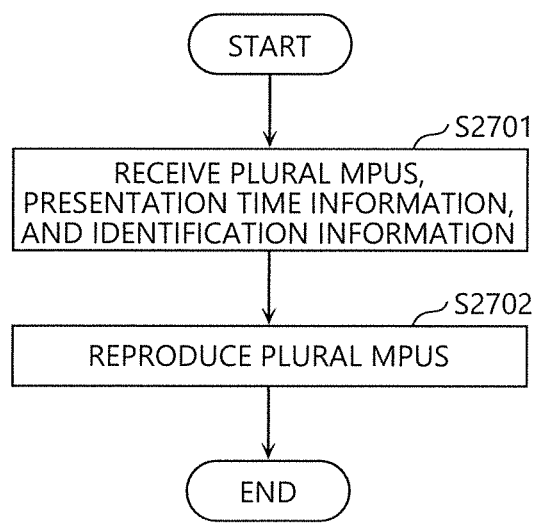
FIG. 93 is a flowchart showing a flow of operations performed by the receiving device.

Next, the receiving method will be described with reference to FIG. 93. FIG. 93 is an operation flow (receiving method) performed by the receiving device.

First, receiver 1001 of receiving device 1000 receives an MPU, the presentation time information indicating a presentation time of the MPU, and the identification information indicating whether or not the presentation time information (MPU time stamp) is generated based on the NTP time indicating a time that is before a leap second adjustment (S2701).

Next, reproducer 1002 of receiving device 1000 reproduces the MPU received by receiver 1001, based on the presentation time information (MPU time stamp) and the identification information that are received by receiver 1001 (S2702).

This enables receiving device 1000 to reproduce an MPU at an intended time even when a leap second adjustment has been made Note that, in the sixth exemplary embodiment, the reproduction is a processing that includes at least one of decoding and presentation.

Variation of Sixth Exemplary Embodiment

Next, a concrete example of the method of signaling the additional information (identification information), which has been described with reference to FIGS. 84 and 85 will be described.

Here, the method of signaling the additional information using, in combination, the MPU time stamp descriptor shown in (a) in FIG. 81 and the MPU extension time stamp descriptor shown in (b) in FIG. 81 will be described.

FIG. 94 is a diagram showing an extension example of an MPU extension time stamp descriptor. The field underlined in FIG. 94 is a field to be newly added to the MPU extension time stamp descriptor shown in (b) in FIG. 81.

NTP_leap_indicator in FIG. 94 indicates a flag indicating whether or not to indicate the additional information (identification information) related to the leap second adjustment of the NTP in the MPU extension time stamp descriptor as the second control information. When the flag stands, mpu_presentation_time_type in a loupe of each of the MPUs is made effective.

In the case where the correction of the MPU time stamp as described in FIG. 84 is made by the transmission side (transmitting device), mpu_presentation_time_type in FIG. 94 indicates whether or not mpu_presentation_time of the same sequence number described in the MPU time stamp descriptor has been corrected. In addition, in the case where the correction of the MPU time stamp as described in FIG. 85 is made by the receiving device, mpu_presentation_time_type indicates whether the timing of attaching mpu_presentation_time of the same sequence number described in the MPU time stamp descriptor is in the region A, B, C, or D.

In other words, the identification information, which indicates whether or not an MPU time stamp is generated based on the time information (NTP time) indicating a time that is before a leap second adjustment, is stored in an MPU extension time stamp descriptor. The identification information corresponding to each of the MPUs in each loupe of the respective MPUs is stored in the MPU extension time stamp descriptor.

Transmitter 902 of transmitting device 900 transmits, in Step S2602 described above, an MPU, the MPU time stamp descriptor serving as the first control information, in which the presentation time information (MPU time stamp) generated by generator 901 is stored, and the MPU extension time stamp descriptor serving as the second control information, in which the identification information indicating whether or not the presentation time information is generated based on the time information (NTP time) indicating a time that is before a leap second adjustment is stored.

In Step 2701, receiver 1001 of receiving device 1000 receives the MPU, the MPU time stamp descriptor, and the MPU extension time stamp descriptor. Then, reproducer 1002 of receiving device 1000 reproduces the MPU received by receiver 1001 based on the MPU time stamp descriptor and the MPU extension time stamp descriptor that are received by receiver 1001. Thus, by analyzing both the MPU time stamp descriptor and the MPU extension time stamp descriptor, receiving device 1000 can realize the decoding using the MPU time stamps at the time of the leap second adjustment. Therefore, even when a leap second adjustment has been made, receiving device 1000 can reproduce an MPU at an intended time. Moreover, because the identification information is stored in an MPU extension time stamp descriptor, it is possible to extend the function to signal whether or not an MPU time stamp is generated based on the time information (NTP time) indicating a time that is before a leap second adjustment while keeping the configuration such that the MPU time stamp descriptor complies with the existing standards (MPEG). Thus, the use of the conventional configuration can minimize a design change and reduce the cost of manufacturing a transmitting device and a receiving device, even in the case where the signaling function is extended.

Note that the timing of flagging NTP_leap_indicator may be the same as the timing of flagging leap_indicator in the NTP packet or may be a time in an arbitrary period of time in which leap indicator is flagged. Namely, NTP_leap_indicator is determined to be a value corresponding to the value of leap indicator in the NTP packet which stores the NTP time serving as a reference for the generation of the MPU time stamp.

Second Variation of Sixth Exemplary Embodiment

The problems related to a leap second adjustment as described in the present exemplary embodiment is not limited to the case of using the time based on the NTP time, and the same problems occur even in the case of using the time based on the UTC time scale.

In the case where a time system is the one based on the UTC time scale and the presentation time information (MPU time stamp) is generated and attached based on such time system, by using the same methods as those described so far, the receiving device can correct the presentation time information using the presentation time information and the signaling information (additional information and identification information) even at the time of the leap second adjustment.

For example, in the ARIB STD-B60, when an event message is transferred with the view to notify the application operated by a receiver of the time specifying an operation from a broadcast station (time specification information), an event message descriptor is stored in an MMTP packet and the time at which the event message pops up is indicated in the event message descriptor. In this case, the data constituting the application is stored in an MPU as a predetermined data unit and then transmitted. Plural methods are provided for specifying the time at which an event message pops up and the applied method is indicated by time_mode. In the case of expressing the time at which an event message pops up, using the UTC time scale, the identification information indicating whether the UTC time is the time information attached based on the time information indicating a time that is before a leap second adjustment or after a leap second adjustment is signaled. In other words, the identification information is the information indicating whether or not the presentation time information has been generated based on the time information (NTP time) indicating a time that is before a leap second adjustment, like the identification information described in the present exemplary embodiment. It is desirable to store such identification information (signaling information) in an event message descriptor. For example, it is possible to signal using reserved_future_use field of the event message descriptor.

In other words, in Step S2601 described above, generator 901 of transmitting device 900 generates the time specification information indicating an operation time of the application, based on the NTP time as the reference time information received from an external source. Then, in Step S2602, transmitter 902 of transmitting device 900 transmits an MPU and the event message descriptor as the control information which includes: the time specification information indicating the operation time of the application (the time at which an event message pops up), which has been generated by generator 901; and the identification information indicating whether or not the time information is the one indicating a time that is before a leap second adjustment.

Note that it may be defined that the transmission side (transmitting device) determines a time period or a program in which a leap second adjustment is necessary, and uses time_mode that is not associated with the UTC, prohibiting the use of time_mode expressed by the UTC.

Alternatively, the transmission side (transmitting device) may calculate the UTC time at which an event message pops up and determine whether or not the time at which the event message pops up is after a leap second adjustment. In the case where it is after the leap second adjustment, the transmitting device may calculate the UTC time that is after the leap second adjustment and store it into the event message descriptor. In addition, the transmission side (transmitting device) may separately signal whether or not the leap second adjustment has been made to the time indicated in the presentation time information.

Likewise, a universal time coordinated-normal play time (UTC-NPT) reference descriptor indicates a relationship between the UTC and the NPT using UTC Reference field and NPT Reference field. Whether the time information indicated in UTC Reference field or in NPT Reference field is the time information attached based on the reference time information (NTP time) indicating a time that is before or after a leap second adjustment is signaled. Namely, the UTC-NPT reference descriptor is the control information which includes the presentation time information generated by generator 901 of transmitting device 900 and the identification information indicating whether or not the presentation time information is the time information (NTP time) indicating a time that is before a leap second adjustment. The identification information can be signaled using reserved field in the UTC-NPT reference descriptor, or the like.

Furthermore, the method for specifying the time to present subtitles or superimposed characters, as defined in the ARIB STD-B60 or in the ARIB STD-B62, is indicated by a TMD (time control mode) in additional identification information (Additional_Arib_Subtitle_Info). The additional identification information is stored into an asset loupe of an MPT.

When the TMD (time control mode) is a mode of the time based on the MPU time stamps or on the normal play time (NPT), the presentation time of the subtitles or superimposed characters is indicated in an MPU extension time stamp descriptor or in a UTC-NPT reference descriptor. With the use of the signaling information as described above, it is possible for the receiving device to correct the time information using the time information and the signaling information even at the time of the leap second adjustment.

When the TMD indicates '0000' (UTC_TTML description), the presentation time based on the UTC is indicated in a time code in ARIB-TTML subtitles. In this case, whether the UTC time indicated in the time code is the time information that is attached based on the time information indicating a time that is before or after a leap second adjustment is signaled. It is desirable that the signaling information transmitted here is indicated in the ARIB-TTML subtitles.

When the TMD indicates '0010' (UTC_TTML description), the presentation time is the time based on the UTC indicated in reference_start_time field in the additional identification information. In this case, the information in the additional identification information is signaled in the same way as the case where the TMD indicates '0000' (UTC_TTML description). In this case, the transmission side (transmitting device) transmits, as identification information, the information indicating whether or not the UTC time is within a time range from a time preceding, by a predetermined period of time (e.g., 24 hours), the time immediately before a leap second adjustment is made (e.g., the time up to 9:00:00) (i.e., at 9:00:00 on the previous day of the day the leap second adjustment is made) up to the time immediately before the leap second adjustment.

Note that it may be defined that the transmission side (transmitting device) determines a time period or a program in which a leap second adjustment is necessary, and uses the time control mode that is not associated with the UTC, prohibiting the use of the time control mode expressed by the UTC.

The same also applies to an MH-Expire descriptor.

Seventh Exemplary Embodiment

The broadcast station facilities in general has plural transmission systems and a single system is operated as normal facilities while the systems other than that are operated as redundant facilities for backup. This allows the switching to the redundant facilities when an error occurs in the service provided for the viewers due to the problems in the transmission facilities or the like. Here, under the MMT/TLV scheme, a phenomenon as described below occurs at the time of switching to the redundant facilities.

1. Adjustment in MPU Sequence Numbers

Figure 95:
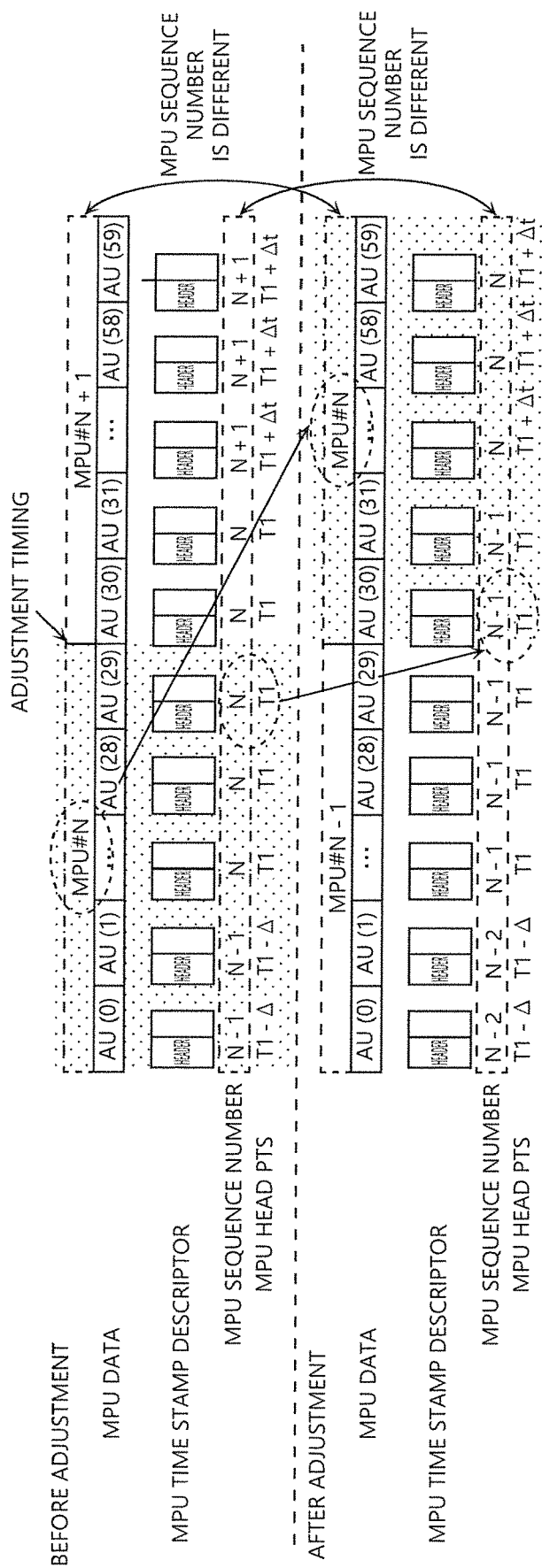
FIG. 95 is a diagram for explaining the case where a discontinuity occurs in MPU sequence numbers due to an adjustment made to the MPU sequence numbers.

An adjustment is made in the MPU sequence numbers as a pre-processing of switching to the redundant facilities. As shown in FIG. 95, when an adjustment is made in the MPU sequence numbers, a discontinuity occurs, in some cases, in the MPU sequence numbers before and after the adjustment. FIG. 95 shows an example of an overlap of the MPU sequence numbers.

The access units and the MPU time stamps with respect to the access units remain the same even after the adjustment in the MPU sequence numbers. However, the same MPU sequence numbers are attached to different MPUs, and thus, the same MPU sequence numbers are attached across two MPUs.

This causes an overlap of the MPU sequence numbers of different MPUs such that the MPU sequence number stored in the MMTP packet header overlaps with the MPU sequence number stored in the MPU time stamp descriptor or in the MPU extension time stamp descriptor. Likewise, an MPU sequence number may be skipped or may return to the previous MPU sequence number in some cases.

2. Discontinuity in Packet Sequence Numbers

Figure 96:
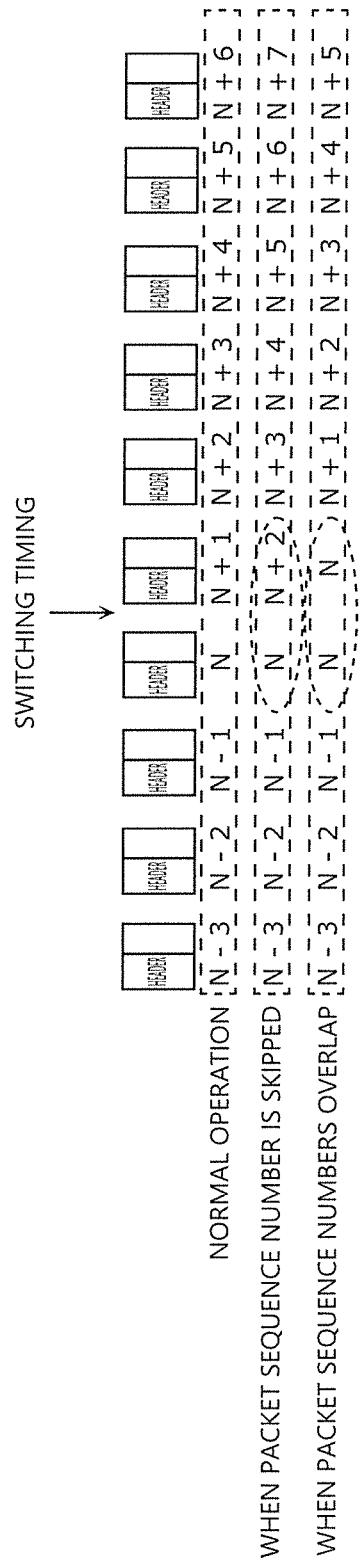
FIG. 96 is a diagram for explaining the case where packet sequence numbers become discontinuous at the timing of switching from normal facilities to redundant facilities.

Due to the difference in packet sequence numbers or in the numbers indicated by packet counters between the normal facilities and the redundant facilities, the packet sequence numbers or the numbers indicated by the packet counters may become discontinuous, in some cases, when switching from the normal facilities to the redundant facilities. As shown in FIG. 96, although the packet sequence numbers are consecutive in the normal operation, a packet sequence number may be skipped or may return to the previous one, or the packet sequence numbers may overlap, in some cases. Note that FIG. 96 is a diagram for explaining the case where the packet sequence numbers become discontinuous at the timing of switching from the normal facilities to the redundant facilities.

When the MPU sequence numbers or the packet sequence numbers become discontinuous as described in 1 or 2 above, the receiving device undoubtedly operating based on these sequence numbers might malfunction.

Note that even when a discontinuity occurs in the MPU sequence numbers or in the packet sequence numbers, the access units and the MPU time stamps with respect to the access units keep continuity and consecutive data is transmitted to the receiving device.

The following describes the reception processing in the case where a discontinuity occurs in the MPU sequence numbers or in the packet sequence numbers, as described with reference to FIGS. 95 and 96.

When a discontinuity occurs in the MPU sequence numbers or in the packet sequence numbers, the receiving device which performs processing using the MPU sequence numbers or the packet sequence numbers might malfunction.

The processing using the MPU sequence numbers is, for example, the processing of detecting an MPU boundary by the switching of the MPU sequence numbers in the MMTP packet header.

Another example of the processing using the MPU sequence numbers is that a time stamp with respect to an MPU sequence number is described in an MPU time stamp descriptor or in an MPU extension time stamp descriptor, and the receiving device performs decoding and/or presentation using the time stamp.

The processing using the packet sequence numbers is, for example, the processing of determining as a packet loss when a packet sequence number is skipped and determining as a switching of the packets when a packet sequence number returns to the previous packet sequence number, using the packet sequence numbers in the detection of the packet loss.

In order to prevent the malfunction due to the processing using the MPU sequence numbers or the packet sequence numbers, the receiving device determines that the MPU sequence numbers or the packet sequence numbers are discontinuous, and performs the processing without using the MPU sequence numbers or the packet sequence numbers when determining that the numbers are discontinuous.

Here, the following method can be used as a method for determining a discontinuity in the MPU sequence numbers or in the packet sequence numbers.

First, one of the determining methods may be signaling the additional information indicating a switching to the redundant facilities. This allows the receiving device to perform reception processing without using the MPU sequence numbers or the packet sequence numbers, based on the additional information.

The methods of signalizing the additional information include a method of storing the additional information into a control message, a descriptor, a table, MPU metadata, MF metadata, an MMTP packet header, an MMTP packet extension header, or the like, and transmitting the stored information.

Next, the method for detecting a discontinuity by the receiving device using other information will be described.

For example, the methods of indicating an MPU boundary include a method of detecting a switching of MPU sequence numbers in an MMTP payload header and a method using RAP_flag which is a flag indicating whether or not it is a random access point in an MMTP packet header. Other methods may include detecting an MPU boundary by a switching of the packets whose Sample_number indicates 0 or by a switching of fragment types. An MPU boundary may also be detected by counting the number of access units.

Here, in the case where a switching to the redundant facilities is likely to be performed, an MPU boundary is detected using other method instead of using the switching of the MPU sequence numbers. For example, the packet with RAP_flag indicating 1 is determined to be a head packet in an MPU. Here, when the MPU sequence number of the packet that is after the MPU boundary remains the same as the MPU sequence number of the previous packet, it is determined that an overlap of the MPU sequence numbers has occurred in the MMTP packet.

Alternatively, the packet with RAP_flag indicating 1 is determined to be a head packet in an MPU. Here, when the MPU sequence number of the packet that has been determined as a head packet is skipped or returns to the MPU sequence number of the previous packet, it is determined that a discontinuity has occurred in the MPU sequence numbers in the MMTP packet.

Note that in the case where a discontinuity in the MPU sequence numbers in an MMTP payload header always occurs prior to a discontinuity in the MPU sequence numbers or in the packet sequence numbers in an MPU time stamp descriptor or in an MPU extension time stamp descriptor, the reception processing without using the time stamps or the processing without using the packet sequence numbers may be performed based on the determination results.

Moreover, in the case where a discontinuity in the MPU sequence numbers in an MMTP payload header of a video packet always occurs prior to a discontinuity in the MPU sequence numbers in the MTTP payload header of an audio packet or a discontinuity in the MPU sequence numbers or in the packet sequence numbers in an MPU time stamp descriptor or in an MPU extension time stamp descriptor for the audio, the reception processing without using the audio time stamps or the processing without using the packet sequence numbers may be performed based on the results of detecting the discontinuity in the MPU sequence numbers of the video packet. The detection results may be used to determine a timing to start the switching to the redundant facilities.

Note that with the use of the method of signaling the additional information indicating the switching to the redundant facilities, the receiving device may perform the processing without using the MPU sequence numbers or the packet sequence numbers only when the additional information indicating the switching to the redundant facilities is signaled.

Note also that with the use of the method of signaling the additional information indicating the switching to the redundant facilities, the receiving device may perform the detection of the discontinuity in the MPU sequence numbers such as RAP_flag or the like only when the additional information indicating the switching to the redundant facilities is signaled.

Here, the determination by the receiving device using the time stamp descriptors will be described. In general, a time stamp with respect to an MPU sequence number is described and is transferred for plural times in many cases. However, when a time stamp value has been updated in spite that the MPU sequence numbers remain the same, the receiving device determines that the MPU sequence numbers have overlapped.

Moreover, in the case where a time stamp value does not correspond to its MPU sequence number such that two or more MPU sequence numbers are updated although a time stamp value has been updated for the time equivalent to the presentation of one MPU, the receiving device determines that a discontinuity has occurred in the MPU sequence numbers.

Note that, at the time of updating an MPU time stamp or an MPU extension time stamp, the version in an MP table may not be updated. In addition, version information may be separately defined and the version of the time stamp information and the version of the information other than the time stamp information may be separately transmitted. This enables the reduction in the frequency of updating the version of the information other than the time stamp information and thus realizes the reduction in the reception processing.

Note that in the case where a discontinuity occurs in the MPU sequence numbers, the relationship between the MPU time stamp and the time stamp information is unreliable. Therefore, that the time stamp information is unreliable may be signaled using a descriptor. For example, that the timing of attaching an MPU time stamp is the timing immediately before or after the switching to the redundant facilities and thus the time stamp is unreliable may be signaled using the same field as NTP_leap_indicator or mpu_presentation_time_type as described with reference to FIG. 94. Alternatively, assuming the use of an MPU extension time stamp descriptor in combination with an MPU time stamp descriptor, that the time stamp is unreliable may be indicated in the MPU extension time stamp descriptor.

With the use of the methods as described above, by determining that a discontinuity has occurred in the MPU sequence numbers or in the packet sequence numbers, the receiving device can perform the processing without using the MPU sequence numbers or the packet sequence numbers. Accordingly, the receiving device can prevent the malfunction in synchronization and reproduction.

Figure 97:
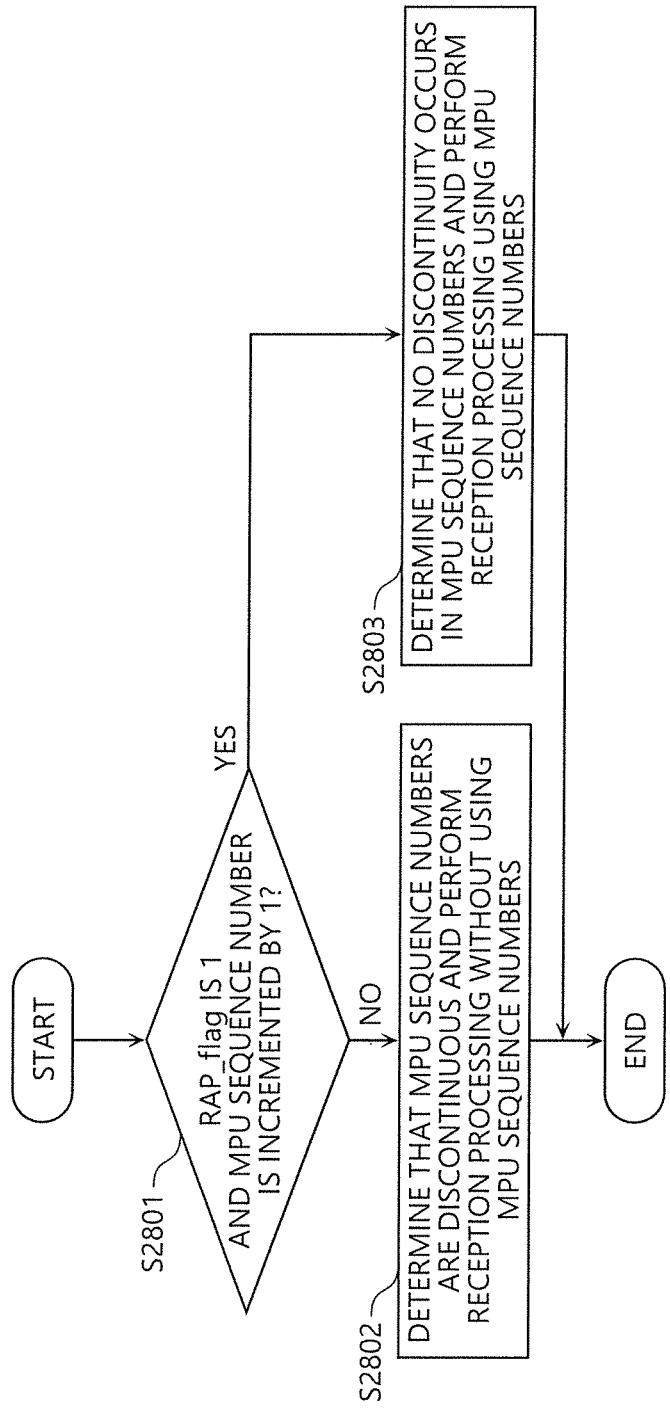
FIG. 97 is a flowchart showing a flow of operations performed by the receiving device in the case where a discontinuity occurs in the MPU sequence numbers or in the packet sequence numbers.

An operation flow of the receiving device in the case where a discontinuity has occurred in the MPU sequence numbers or in the packet sequence numbers, as has been described above, will be explained. FIG. 97 is the operation flow performed by the receiving device in the case where a discontinuity has occurred in the MPU sequence numbers or in the packet sequence numbers.

The receiving device determines an MPU boundary based on a packet header or a payload header in an MMTP packet, or the like. More specifically, the receiving device detects an MPU boundary by determining that the packet with RAP_flag indicating 1 is an MPU head packet. Moreover, the receiving device determines the MPU sequence number and determines whether or not the MPU sequence number of the previous packet is incremented by 1 (S2801).

In the case where it is determined that RAP_flag indicates 1 and the MPU sequence number is incremented by 1 (Yes in S2801), the receiving device determines that a discontinuity has not occurred in the MPU sequence numbers and performs the reception processing using the MPU sequence numbers (S2803).

On the contrary, in the case where it is determined that RAP_flag indicates 0 or that the MPU sequence number is not incremented by 1 from the MPU sequence number of the previous packet even when RAP_flag indicates 1 (No in S2801), the receiving device determines that a discontinuity has occurred in the MPU sequence numbers and performs the reception processing without using the MPU sequence numbers (S2802).

OTHER EXEMPLARY EMBODIMENTS

A transmitting device, a receiving device, a transmitting method and a receiving method according to the exemplary embodiments have been described above. However, the present disclosure is not limited to these exemplary embodiments.

Further, each processor included in the transmitting device and the receiving device according to the exemplary embodiment is typically realized as an LSI which is an integrated circuit including an input terminal and an output terminal. These circuits may be individually realized as one chip or may be realized as one chip including part or all of the circuits.

Further, each processor to be realized as an integrated circuit is not limited to an LSI, and each processor may be realized as a dedicated circuit or a general-purpose processor. An FPGA (Field Programmable Gate Array) which can be programmed after an LSI is manufactured or a reconfigurable processor which can reconfigure connection or a setting of circuit cells inside the LSI may be used.

In each of the above exemplary embodiments, each component may be configured by dedicated hardware or may be realized by executing a software program suitable to each component. Each component may be realized by causing a program executing unit such as a CPU or a processor to read a software program recorded on a recording medium such as a hard disk or a semiconductor memory and execute the software program.

In other words, the transmitting device and the receiving device each include a processing circuit (processing circuitry), and a storage device (step storage) which is electrically connected to the processing circuit (is accessible from the control circuit). The processing circuit includes at least one of dedicated hardware and the program executing unit. Further, when the processing circuit includes the program executing unit, the storage device stores a software program which is executed by the program executing unit. The processing circuit executes the transmitting method and the receiving method according to the exemplary embodiments by using the storage device.

Further, the present disclosure may be the software program or may be a non-transitory computer-readable recording medium on which the program is recorded. Furthermore, naturally, the program can be distributed via a transmission medium such as the Internet.

Still further, all numbers used above are exemplary numbers to specifically describe the present disclosure, and the present disclosure is not limited to the illustrated numbers.

Moreover, division of a functional block in each block diagram is an example, and a plurality of functional blocks may be realized as one functional block, one functional block may be divided into a plurality of functional blocks or part of functions may be transferred to other functional blocks. Besides, single hardware or software may process functions of a plurality of functional blocks including similar functions in parallel or by way of time division.

Further, an order to execute the steps included in the above transmitting method or receiving method is an exemplary order for specifically describing the present disclosure, and may be other than the above order. Furthermore, part of the above steps may be executed at the same time as those of (in parallel to) other steps.

The various exemplary embodiments according to the present disclosure include the following.

The transmitting method according to the first disclosure is a transmitting method of storing data configuring an application into a predetermined data unit and transmitting the stored data in the predetermined data unit. The transmitting method includes: generating time specification information indicating an operation time of the application, based on reference time information received from an external source; and transmitting (i) the predetermined data unit and (ii) control information indicating the generated time specification information, wherein the control information includes the generated time specification information and identification information indicating whether or not the time specification information is time information indicating a time that is before a leap second adjustment. The transmitting method according to the second disclosure is the transmitting method according to the abovementioned first disclosure, and in the generating, the time specification information of the predetermined data unit is generated by adding a predetermined period of time to the time information.

The transmitting method according to the third disclosure is the transmitting method according to the abovementioned first disclosure, and the identification information indicates whether or not the time specification information is generated based on the time information indicating a time within a time range from a time preceding, by a predetermined period of time, a time immediately before a leap second adjustment up to the time immediately before the leap second adjustment.

The transmitting method according to the fourth disclosure is the transmitting method according to the abovementioned first disclosure, and the time specification information is a coordinated universal time (UTC) time and a normal play time (NPT), and the control information is a UTC-NPT reference descriptor indicating a relationship between the UTC time and the NPT.

The transmitting method according to the fifth embodiment is the transmitting method according to the abovementioned first disclosure, and the reference time information complies with a network time protocol (NTP).

The receiving method according to the sixth disclosure is a receiving method of receiving a predetermined data unit in which data configuring an application is stored, the receiving method comprising: receiving (i) the predetermined data unit, and (ii) control information which includes: time specification information indicating an operation time of the application; and identification information indicating whether or not the time specification information is time information indicating a time that is before a leap second adjustment, and executing the application stored in the received predetermined data unit, based on the received control information.

The transmitting device according to the seventh disclosure is a transmitting device which stores data configuring an application into a predetermined data unit and transmits the stored data in the predetermined unit. The transmitting device includes: a generator which generates time specification information indicating an operation time of the application, based on reference time information received from an external source; and a transmitter which transmits (i) the predetermined data unit and (ii) control information indicating the time specification information generated by the generator. The control information includes the time specification information generated by the generator and identification information indicating whether or not the time specification information is time information indicating a time that is before a leap second adjustment.

The receiving device according to the eighth disclosure is a receiving device which receives a predetermined data unit in which data configuring an application is stored. The receiving device includes a receiver which receives (i) the predetermined data unit and (ii) control information which includes: time specification information indicating an operation time of the application; and identification information indicating whether or not the time specification information is time information indicating a time before a leap second adjustment. The application stored in the predetermined data unit received by the receiver is executed based on the control information received by the receiver.

The transmitting method according to the ninth disclosure is a transmitting method of storing data making up a coded stream into a predetermined data unit and transmitting the stored data in the predetermined data unit. The transmitting method includes: generating presentation time information indicating a presentation time of the predetermined data unit, based on reference time information received from an external source; and transmitting the predetermined data unit, the generated presentation time information, and identification information indicating whether or not the presentation time information is generated based on the reference time information indicating a time that is before a leap second adjustment.

The transmitting method according to the tenth disclosure is the transmitting method according to the abovementioned ninth disclosure, and the presentation time of the predetermined data unit is a time to present an access unit positioned at a head in an order of presenting plural access units included in the predetermined data unit.

The transmitting method according to the eleventh disclosure is the transmitting method according to the abovementioned ninth disclosure, and in the generating, the presentation time of the predetermined data unit is generated by adding a predetermined period of time to the reference time information.

The transmitting method according to the twelfth disclosure is the transmitting method according to the abovementioned ninth disclosure, and the identification information indicates whether or not the presentation time information is generated based on the reference time information indicating a time within a time range from a time preceding, by a predetermined period of time, a time immediately before a leap second adjustment up to the time immediately before the leap second adjustment.

The transmitting method according to the thirteenth disclosure is the transmitting method according to the abovementioned ninth disclosure, and in the transmitting, a plurality of the predetermined data units are stored into a predetermined packet and transmitted. The presentation time information which is generated in the generating and corresponds to each of the plurality of the predetermined data units is included in control information of the predetermined packet and transmitted.

The transmitting method according to the fourteenth disclosure is the transmitting method according to the abovementioned thirteenth disclosure, and in the transmitting, a media presentation unit (MPU) is stored into a MPEG media transport protocol (MMTP) packet and transmitted. The presentation time information which is generated in the generating and corresponds to each of the plurality of the MPUs is stored into an MPU time stamp descriptor and transmitted. The MPU serves as each of the plurality of the predetermined data units, the MMTP packet serves as the predetermined packet, and the MPU time stamp descriptor is included in the control information of the MMTP packet.

The transmitting method according to the fifteenth disclosure is the transmitting method according to the abovementioned ninth disclosure, and the reference time information complies with a network time protocol (NTP).

The receiving method according to the sixteenth disclosure is a receiving method of receiving a predetermined data unit in which data making up a coded stream is stored. The receiving method includes: receiving the predetermined data unit, presentation time information indicating a presentation time of the predetermined data unit, and identification information indicating whether or not the presentation time information is generated based on time information indicating a time that is before a leap second adjustment; and reproducing the received predetermined data unit based on the presentation time information and the identification information that are received.

The transmitting device according to the seventeenth disclosure is a transmitting device which stores data making up a coded stream into a predetermined data unit and transmits the stored data in the predetermined data unit. The transmitting device includes: a generator which generates presentation time information indicating a presentation time of the predetermined data unit, based on time information received from an external source; and a transmitter which transmits the predetermined data unit, the presentation time information generated by the generator, and identification information indicating whether or not the presentation time information is generated based on the time information indicating a time that is before a leap second adjustment.

A receiving device according to the eighteenth disclosure is a receiving device which receives a predetermined data unit in which data making up a coded stream is stored. The receiving device includes: a receiver which receives the predetermined data unit, presentation time information indicating a presentation time of the predetermined data unit, and identification information indicating whether or not the presentation time information is generated based on time information indicating a time that is before a leap second adjustment; and a reproducer which reproduces the predetermined data unit received by the receiver, based on the presentation time information and the identification information that are received by the receiver.

A transmitting method according to the nineteenth disclosure is a transmitting method of storing data making up a coded stream into a predetermined data unit and transmitting the stored data in the predetermined data unit. The transmitting method includes: generating presentation time information indicating a presentation time of the predetermined data unit, based on reference time information received from an external source; and transmitting (i) the predetermined data unit, (ii) first control information which includes the generated presentation time information, and (iii) second control information which includes identification information indicating whether or not the presentation time information is generated based on the reference time information indicating a time that is before a leap second adjustment.

A transmitting method according to the twentieth disclosure is the transmitting method according to the abovementioned nineteenth disclosure, and in the generating, the presentation time information corresponding to each of a plurality of the predetermined data units is generated for the each of the plurality of the predetermined data units, and the second control information transmitted in the transmitting includes the identification information corresponding to the each of the plurality of the predetermined data units in each loupe of the each of the plurality of the predetermined data units.

A transmitting method according to the twenty-first disclosure is the transmitting method according to the abovementioned nineteenth disclosure, and the presentation time of the predetermined data unit is a time to present an access unit positioned at a head in an order of presenting plural access units included in the predetermined data unit.

The transmitting method according to the twenty-second disclosure is the transmitting method according to the abovementioned nineteenth disclosure, and in the generating, the presentation time of the predetermined data unit is generated by adding a predetermined period of time to the reference time information.

The transmitting method according to the twenty-third disclosure is the transmitting method according to the abovementioned nineteenth disclosure, and the identification information indicates whether or not the presentation time information is generated based on the reference time information indicating a time within a time range from a time preceding, by a predetermined period of time, a time immediately before a leap second adjustment up to the time immediately before the leap second adjustment is made.

The transmitting method according to the twenty-fourth disclosure is the transmitting method according to the abovementioned nineteenth disclosure, and the predetermined data unit is a media presentation unit (MPU), the first control information is an MPU time stamp descriptor, and the second control information is an MPU extension time stamp descriptor.

The transmitting method according to the twenty-fifth disclosure is the transmitting method according to the abovementioned nineteenth disclosure, and the reference time information complies with a network time protocol (NTP).

The receiving method according to the twenty-sixth disclosure is a receiving method of receiving a predetermined data unit in which data making up a coded stream is stored. The receiving method includes: receiving (i) the predetermined data unit, (ii) first control information which includes presentation time information indicating a presentation time of the predetermined data unit, and (iii) second control information which includes identification information indicating whether or not the presentation time information is generated based on the reference time information indicating a time that is before a leap second adjustment; and reproducing the received predetermined data unit based on the first and second control information that are received.

The transmitting device according to the twenty-seventh disclosure is a transmitting device which stores data making up a coded stream into a predetermined data unit and transmits the stored data in the predetermined data unit. The transmitting device includes: a generator which generates presentation time information indicating a presentation time of the predetermined data unit; and a transmitter which transmits (i) the predetermined data unit, (ii) first control information which includes the presentation time information generated by the generator, and (iii) second control information which includes identification information indicating whether or not the presentation time information is generated based on the reference time information indicating a time that is before a leap second adjustment.

The receiving device according to the twenty-eighth disclosure is a receiving device which receives a predetermined data unit in which data making up a coded stream is stored. The receiving device includes: a receiver which receives (i) the predetermined data unit, (ii) first control information which includes presentation time information indicating a presentation time of the predetermined data unit, and (iii) second control information which includes identification information indicating whether or not the presentation time information is generated based on reference time information indicating a time that is before a leap second adjustment; and a reproducer which reproduces the predetermined data unit received by the receiver, based on the first and second control information received by the receiver.

Thus, the transmitting device, the receiving device, the transmitting method, and the receiving method according to one or more aspects of the present disclosure have been described above based on the exemplary embodiments. However, the present disclosure is not limited to these exemplary embodiments. The present exemplary embodiments to which various modifications conceivable by a person skilled in the art are made and aspects of the present disclosure that are made by combining elements of different exemplary embodiments may also be included within the scope of the one or more aspects as long as such aspects do not depart from the gist of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

What is claimed is:

1. A transmitting method of storing data making up a coded stream into a predetermined data unit and transmitting the stored data in the predetermined data unit, comprising:
   generating presentation time information indicating a presentation time of the predetermined data unit, based on reference time information received from an external source, the predetermined data unit being presented at the presentation time in a receiving device to receive the coded stream; and
   transmitting, to the receiving device, (i) the predetermined data unit, (ii) first control information which includes the generated presentation time information, and (iii) second control information which includes leap second information indicating whether or not the presentation time information is a time that is before a leap second adjustment.

2. The transmitting method according to claim 1, wherein in the generating, the presentation time information corresponding to each of a plurality of the predetermined data units is generated for the each of the plurality of the predetermined data units, and the second control information transmitted in the transmitting includes the identification information corresponding to the each of the plurality of the predetermined data units in each loupe of the each of the plurality of the predetermined data units.

3. The transmitting method according to claim 1, wherein the presentation time of the predetermined data unit is a time to present an access unit positioned at a head in an order of presenting plural access units included in the predetermined data unit.

4. The transmitting method according to claim 1, wherein in the generating, the presentation time of the predetermined data unit is generated by adding a predetermined period of time to the reference time information.

5. A transmitting method of storing data making up a coded stream into a predetermined data unit and transmitting the stored data in the predetermined data unit, comprising:
   generating presentation time information indicating a presentation time of the predetermined data unit, based on reference time information received from an external source, the predetermined data unit being presented at the presentation time in a receiving device to receive the coded stream; and
   transmitting (i) the predetermined data unit, (ii) first control information which includes the generated presentation time information, and (iii) second control information which includes identification information indicating whether or not the presentation time information is generated based on the reference time information indicating a time that is before a leap second adjustment,
   wherein the identification information indicates whether or not the presentation time information is generated based on the reference time information indicating a time within a time range from a time preceding, by a predetermined period of time, a time immediately before a leap second adjustment up to the time immediately before the leap second adjustment is made.

6. The transmitting method according to claim 1, wherein the predetermined data unit is a media presentation unit (MPU), the first control information is an MPU time stamp descriptor, and the second control information is an MPU extension time stamp descriptor.

7. The transmitting method according to claim 1, wherein the reference time information complies with a network time protocol (NTP).

8. A receiving method of receiving a predetermined data unit in which data making up a coded stream is stored, comprising:
   receiving (i) the predetermined data unit, (ii) first control information which includes presentation time information indicating a presentation time of the predetermined data unit, and (iii) second control information which includes leap second information indicating whether or not the presentation time information is a time that is before a leap second adjustment, the predetermined data unit being presented at the presentation time in a receiving device to receive the coded stream; and
   reproducing the received predetermined data unit based on the first and second control information that are received.

* * * * *

UNITED STATES PATENT AND TRADEMARK OFFICE
CERTIFICATE OF CORRECTION

PATENT NO. : 11,323,751 B2
APPLICATION NO. : 16/423756
DATED : May 3, 2022
INVENTOR(S) : Noritaka Iguchi et al.

It is certified that error appears in the above-identified patent and that said Letters Patent is hereby corrected as shown below:

On the Title Page

Insert after Item (63), Line 1:
--(30)  Foreign Application Priority Data
Oct. 28, 2015   (JP).................. 2015-212359
Oct. 28, 2015   (JP).................. 2015-212363
Oct. 28, 2015   (JP).................. 2015-212367--

Signed and Sealed this
Twelfth Day of July, 2022

Katherine Kelly Vidal
*Director of the United States Patent and Trademark Office*